(12) United States Patent
Williams et al.

(10) Patent No.: US 8,600,913 B2
(45) Date of Patent: Dec. 3, 2013

(54) APPARATUS, SYSTEMS AND METHODS FOR ONLINE, MULTI-PARCEL, MULTI-CARRIER, MULTI-SERVICE PARCEL RETURNS SHIPPING MANAGEMENT

(75) Inventors: Daniel F. Williams, Yarrow Point, WA (US); David Allison Bennett, Bothell, WA (US); Lynn Shaindell Goldhaber, Suohomish, WA (US); Dennis Glavin, Seattle, WA (US); Lory Elizabeth Krett, Kirkland, WA (US); Charles D. Mentzer, Redmond, WA (US); Stephen M. Teglovic, Redmond, WA (US); John M. Dietz, Bothell, WA (US); William W. Smith, III, Medina, WA (US); Paul Bilibin, Lynnwood, WA (US); Jinyue Liu, Redmond, WA (US); Paul R. McLaughlin, Redmond, WA (US); Scott Meyer, Woodinville, WA (US); Sean Hu, Bellevue, WA (US); Richard M. Antush, Preston, WA (US); Scott Joseph Bean, Seattle, WA (US)

(73) Assignees: Stamps.com Inc., El Segundo, CA (US); iShip Inc., Atlanta, GA (US)

( * ) Notice: Subject to any disclaimer, the term of this patent is extended or adjusted under 35 U.S.C. 154(b) by 312 days.

(21) Appl. No.: 12/626,487

(22) Filed: Nov. 25, 2009

(65) Prior Publication Data

US 2010/0131420 A1 May 27, 2010

Related U.S. Application Data

(62) Division of application No. 09/820,292, filed on Mar. 27, 2001, now Pat. No. 7,660,721.

(60) Provisional application No. 60/192,692, filed on Mar. 28, 2000, provisional application No. 60/195,748, filed on Apr. 6, 2000, provisional application No. 60/232,103, filed on Sep. 12, 2000.

(51) Int. Cl.
*G06Q 30/00* (2012.01)

(52) U.S. Cl.
USPC .......................................................... 705/340

(58) Field of Classification Search
USPC .......................................................... 705/340
See application file for complete search history.

(56) References Cited

U.S. PATENT DOCUMENTS 4,024,380 A    5/1977    Gunn ........................ 235/61.9 A
(Continued)

FOREIGN PATENT DOCUMENTS

EP         0845749 A2    6/1998
(Continued)

OTHER PUBLICATIONS

FedEx(R) Services, (www.fedex.com) Archived on Jan. 16, 1997.
(Continued)

*Primary Examiner* — Allen J Jung
(74) *Attorney, Agent, or Firm* — Khorsandi Patent Law Group, A Law Corporation; Marilyn R. Khorsandi

(57) ABSTRACT

The present invention provides a computer system (the "Return System") that provides multi-carrier shipment rating, shipment labeling, shipment tracking, shipment tracking management reports, returns analysis and returns management reporting. In an exemplary embodiment, the Return System has three major components: 1.) A Returns Manager Subsystem that provides a user interface to each Merchant to setup the Merchant's account, setup the Merchant's return policy and rules, and to monitor the status and movement of return shipments; 2.) A Consumer Returns Subsystem that provides each consumer using the Returns System with an online user interface that leads the consumer through the returns process, displays the return policies and rules to the consumer, provides shipping document to ship the return package if appropriate, and permits the consumer to track their return shipments; and 3.) a Returns Processing Subsystem that, in the exemplary embodiment, provides background shipping and tracking functionality.

18 Claims, 99 Drawing Sheets

(56) References Cited

U.S. PATENT DOCUMENTS

| | | | |
|---|---|---|---|
| 4,868,757 A | 9/1989 | Gil | 364/464.03 |
| 5,072,397 A | 12/1991 | Barns-Slavin et al. | 364/464.02 |
| 5,117,364 A | 5/1992 | Barns-Slavin et al. | 364/464.03 |
| 5,233,532 A | 8/1993 | Ramsden | 364/464.03 |
| 5,293,310 A | 3/1994 | Carroll et al. | 364/408 |
| 5,315,508 A | 5/1994 | Bain et al. | 364/401 |
| 5,337,246 A | 8/1994 | Carroll et al. | 364/464.02 |
| 5,481,464 A | 1/1996 | Ramsden | 364/464.03 |
| 5,485,369 A | 1/1996 | Nicholls et al. | 364/401 |
| 5,513,112 A | 4/1996 | Herring et al. | 364/464.02 |
| 5,586,037 A | 12/1996 | Gil et al. | 364/464.03 |
| 5,595,264 A * | 1/1997 | Trotta, Jr. | 186/56 |
| 5,615,120 A | 3/1997 | Schwartz et al. | 364/464.17 |
| 5,631,827 A | 5/1997 | Nicholls et al. | 395/228 |
| 5,666,493 A * | 9/1997 | Wojcik et al. | 705/22 |
| 5,675,493 A | 10/1997 | Schwartz et al. | 364/464.03 |
| 5,699,258 A | 12/1997 | Thiel | 364/464.19 |
| 5,710,887 A | 1/1998 | Chelliah et al. | 395/226 |
| 5,729,459 A | 3/1998 | Brandien et al. | |
| 5,778,348 A | 7/1998 | Manduley et al. | 705/409 |
| 5,787,400 A | 7/1998 | Weber | 705/1 |
| 5,869,819 A | 2/1999 | Knowles et al. | 235/375 |
| 5,878,400 A * | 3/1999 | Carter, III | 705/20 |
| 6,005,945 A * | 12/1999 | Whitehouse | 380/51 |
| 6,012,065 A | 1/2000 | Boucher et al. | 707/103 |
| 6,018,725 A | 1/2000 | Boucher et al. | 705/401 |
| 6,029,140 A | 2/2000 | Martin et al. | 705/11 |
| 6,047,273 A | 4/2000 | Vaghi | 705/410 |
| 6,064,981 A | 5/2000 | Barni et al. | 705/26 |
| 6,078,889 A | 6/2000 | Boucher et al. | 705/1 |
| 6,085,172 A | 7/2000 | Junger | 705/28 |
| 6,134,561 A | 10/2000 | Brandien et al. | |
| 6,233,568 B1 | 5/2001 | Kara | 705/410 |
| 6,269,344 B1 | 7/2001 | Junger | 705/28 |
| 6,363,357 B1 * | 3/2002 | Rosenberg et al. | 705/51 |
| 6,369,840 B1 | 4/2002 | Barnett et al. | 715/853 |
| 6,430,457 B1 * | 8/2002 | Van De Loo | 700/115 |
| 6,754,637 B1 | 6/2004 | Stenz | 705/26 |
| 7,117,170 B1 | 10/2006 | Bennett et al. | |
| 7,197,465 B1 | 3/2007 | Hu et al. | |
| 7,359,887 B1 | 4/2008 | Hu et al. | |
| 7,421,400 B2 | 9/2008 | Bilibin et al. | |
| 7,660,721 B2 | 2/2010 | Williams et al. | |
| 2001/0032147 A1 | 10/2001 | Siegel | |
| 2001/0047315 A1 | 11/2001 | Siegel | 705/28 |
| 2002/0010689 A1 | 1/2002 | Tibbs et al. | |
| 2002/0019777 A1 | 2/2002 | Schwab et al. | 705/26 |
| 2004/0143519 A1 | 7/2004 | Siegel | 705/28 |

FOREIGN PATENT DOCUMENTS

| | | | |
|---|---|---|---|
| EP | 0858057 A2 | 8/1998 | |
| EP | 0858057 A3 | 8/1998 | |
| GB | 2331601 A | 5/1999 | |
| WO | 9933016 A1 | 7/1999 | |
| WO | WO 99/52026 A2 | 10/1999 | |
| WO | WO 99/52026 A3 | 10/1999 | |
| WO | WO 00/46718 | 8/2000 | |
| WO | WO 00/46728 | 8/2000 | |
| WO | WO 00/70519 | 11/2000 | |

OTHER PUBLICATIONS

UPS Service Guide, (www.ups.com) Archived on Dec. 6, 1998.

Caldwell, Bryce, Reverse Logistics—Untapped Oppotunities Exist in Returned Products, A Side of Logistics Few Businesses Have Thought About—Until Now, Apr. 12, 1999, Information Week, pp. 1-6.

"UPS on Call Air Pickup", http://web.archive.org/web/19990508182528/wwwapps.ups.com/servlet/ODSServlet/, Copyright 1994-1999, 1 page, United Parcel Service of America, Inc.

"UPS Ground", http://web.archive.org./web/20040304152132/ups.com/using/services/domestic/gnd-guide.html, Copyright 1994-2000, 2 pages, United Parcel Service of America, Inc.

"UPS World Wide Time-In-Transit/World Wide Delivery Times", http://web.archive.org/web/20000301031405/ups.com/wwtransit/engtimetran.html, Copyright 1994-2000, 1 page, United Parcel Service of America, Inc.

Quick Cost Calculator, http://web.archive.org/web/19981203124546/ups.com/using/services/rave/rate.html, Copyright 1994-1998, 2 pages, United Parcel Service of America, Inc.

"UPS Quick Cost Calculator™", http://web.archive.org/web/19990220223708/ups.com/using/services/rave/rate.html, Copyright 1994-1999, 1 page, United Parcel Service of America, Inc.

"UPS Quick Cost Calculator™", http://web.archive.org/web/20000229184425/ups.com/using/services/rave/rate.html, Copyright 1994-2000, 1 page, United Parcel Service of America, Inc.

Notice of Allowance for co-pending case U.S. Appl. No. 09/684,808; Now U.S. Patent 7,359,887, dated May 8, 2007, pp. 1-8, USPTO.

Notice of Allowance for co-pending case U.S. Appl. No. 09/684,865; Now U.S. Patent 7,117,170, dated Dec. 22, 2004, pp. 1-5. USPTO.

Notice of Allowance for co-pending case U.S. Appl. No. 09/684,152; Now U.S. Patent 7,197,465, dated Aug. 10, 2006, pp. 1-8, USPTO.

Notice of Allowance for co-pending case U.S. Appl. No. 11/123,536; Now U.S. Patent 7,421,400, dated Jan. 7, 2008, pp. 1-6, USPTO.

Office Action for co-pending case Canadian Patent Application No. 2,404,814, dated Mar. 27, 2006, pp. 1-11, Canadian Intellectual Property Office, "CIPO".

Office Action for co-pending case Canadian Patent Application No. 2,404,814, dated Dec. 18, 2006, pp. 1-8, Canadian Intellectual Property Office, "CIPO".

Office Action for co-pending case Japanese Patent Application No. 2001-570080, dated Nov. 28, 2006, pp. 1-15 (English Translation).

"Notification of The First Office Action," for co-pending case Chinese Patent Application No. 01810223.9, dated Apr. 6, 2007, pp. 1-3, The Patent Office of the People's Republic of China.

"Notification of Second Office Action," for co-pending case Chinese Patent Application No. 01810223.9, dated Jan. 18, 2008, pp. 1-3, The Patent Office of the People's Republic of China.

"Communication Pursuant to Article 94(3) EPC," for co-pending European Patent Application No. 01924379.9, dated Nov. 12, 2008, pp. 1-5, The European Patent Office.

Williams, Martyn, Internet Update, Feb. 18, 1998, Newsbytes, pp. 1-3.

Brown, Judy. As web pages proliferate, finding what . . . ; Feb. 8, 1999, Milwaukee Journal Sentinel (Wisconson), Business page 2 connected, pp. 1-2.

Business Wire, "Web Site Offers Money-Saving Services for Free . . . " Feb. 16, 1998; pp. 1-2.

McCandless, Michael, "Let's Go Shopping", *IEEE Intelligent Systems*, Jan./Feb, 1999, pp. 24, United States.

Yesil, Magdalena, Creating the Virtual Store, John Wiley & Sons, Inc., 1997, pp. 188-189, United States.

Kosiur, David, "Understanding Electronic Commerce", Strategic Technology Series, Microsoft Press, 1997, pp. 16-18, Redmond, Washington, United States.

Declaration by John Dietz, entitled "Verified Statement (Declaration) No. 1 in Support of Information Disclosure Statement in U.S. Appl. No. 09/684,010, U.S. Appl. No. 09/684,871, U.S. Appl. No. 09/684,870, U.S. Appl. No. 09/684,808, U.S. Appl. No. 09/684,869, U.S. Appl. No. 09/685,078, U.S. Appl. No. 09/680,649, U.S. Appl. No. 09/680,654, U.S. Appl. No. 09/684,865, U.S. Appl. No. 09/685,077, U.S. Appl. No. 09/684,014, U.S. Appl. No. 09/684,861, U.S. Appl. No. 09/684,152, U.S. Appl. No. 09/684,866, U.S. Appl. No. 09/820,377, and U.S. Appl. No. 09/820,292", executed Jul. 20, 2001, pp. 1-8 (with Exhibits A-J attached).

Declaration by John Dietz, entitled "Verified Statement (Declaration) No. 1 in Support of Information Disclosure Statement in U.S. Appl. No. 09/684,010, U.S. Appl. No. 09/684,871, U.S. Appl. No. 09/684,870, U.S. Appl. No. 09/684,808, U.S. Appl. No. 09/684,869, U.S. Appl. No. 09/685,078, U.S. Appl. No. 09/680,649, U.S. Appl. No. 09/680,654, U.S. Appl. No. 09/684,865, U.S. Appl. No. 09/685,077, U.S. Appl. No. 09/684,014, U.S. Appl. No. 09/684,861, U.S. Appl. No. 09/684,152, U.S. Appl. No. 09/684,866, U.S. Appl. No. 09/820,377, and U.S. Appl. No. 09/820,292", executed Jul. 20, 2001, pp. 1-6 (with Exhibits A and B attached).

(56) References Cited

OTHER PUBLICATIONS

"Smartship.com Announces Multi-Carrier Shipping and Tracking Function for E-Commerce", SmartShip.com Press Release, Apr. 3, 2000, 2 pages, Irvine California.

"New Web site offers quick shipping-rate comparisons", SrnartShip. com, Philadelphia Inquirer Jan. 13, 2000, Henry J. Holcomb, 3 pages.

Ogg, et al.; U.S. Appl. No. 09/651,390, titled "Virtualizecl Printing of Indicia, Logos and Graphics") filed Aug. 29, 2000; pages—throughout.

Ogg, et al.; U.S. Appl. No. 09/651,389, titled "Method and Apparatus for Printing Indicia Logos and Graphics Onto Print Media") fled Aug. 29, 2000; pages—throughout.

Williams, et al.; Apparatus, Systems and Methods for Online, Multi-Parcel, Multi-Carrier, Multi-Service Enterprise Parcel Shipping Management; U.S. Appl. No. 09/820,377, filed Mar. 27, 2001; pages—throughout.

Smith, III, et al.; Online, Multi-Carrier, Multi-Service Parcel Shipping Management Functional Alignment of Computer Devices; U.S. Appl. No. 09/684,010, filed Oct. 6, 3000; pages—throughout.

Bennett, et al.; Apparatus, Systems and Methods for Online, Multi-Carrier, Multi-Service Parcel Shipping Management Featuring Shipping Location Comparison Across Multiple Carriers; U.S. Appl. No. 09/684,871, filed Oct. 6, 2000; pp. 1-3 and 98-104.

Bennett, et al.; Apparatus, Systems and Methods for Online, Multi-Carrier, Multi-Service parcel Shipping Management Featuring Parcel Handling Rules Comparison Across Multiple Carriers; U.S. Appl. No. 09/684,870, filed Oct. 6, 2000; pp. 1-3 and 98-108.

Hu, et al.; Apparatus, Systems and Methods for Interfacing with Digital Scales Configured with Remote Client Computer Devices; U.S. Appl. No. 09/684,808, filed Oct. 6, 2000; pp. 1-3 and 98-103.

Bennett, et al.; Reporting Shipping Rates and Delivery Schedules for Multiple Service and Multiple Carriers; U.S. Appl. No. 09/684,869, filed Oct. 6, 2000; pp. 1-3 and 98-112.

Bennett, et al.; Apparatus, Systems and Methods for Online, Multi-Carrier, Multi-Service Parcel Shipping Management Featuring Notification Service Option Comparison for Multiple Carriers; U.S. Appl. No. 09/685,078, filed Oct. 6, 2000; pp. 1-6 and 100-117.

Bennett, et al.; Apparatus, Systems and Methods for Online, Multi-Carrier, Multi-Service Parcel Shipping Management Featuring Delivery Service Option Comparison for Multiple Carriers; U.S. Appl. No. 09/680,649, filed Oct. 6, 2000; pp. 1-7 and 102-123.

Bennett, et al.; Apparatus, Systems and Methods for Online, Multi-Carrier, Multi-Service Parcel Shiping Management Featuring Shipping Rate and Delivery Schedule Comparison for Multiple Carriers; U.S. Appl. No. 09/680,654, filed Oct. 6, 2000; pp. 1-4 and 100-124.

Bennett, et al.; Apparatus, Systems and Methods for Applying Billing Options for Multiple Carriers for Online, Multi-Carrier, Multi-Service Parcel Shipping Management; U.S. Appl. No. 09/684,865, filed Oct. 6, 2000; pp. 1-3 and 98-104.

Bilibin, et at.; Apparatus, Systems and Methods for Online, Multi-Carrier, Multi-Service Parcel Shipping Management Determination of Ratable Weight for Multiple Carriers; U.S. Appl. No. 09/685,877, filed Oct. 6, 2000; pp. 1-5 and 100-116.

Bilibin, et al.; Apparatus, Systems and Methods for Zone Level Rating for each of Multiple Carriers; U.S. Appl. No. 09/684,014, filed Oct. 6, 2000; pp. 1-3 and 97-100.

Bilibin, et al.; Apparatus, Systems and Methods for Determining Delivery Time Schedules for each of Multiple Carriers; U.S. Appl. No. 09/684,861, filed Oct. 6, 2000; pp. 1-3 and 97-100.

Hu, et al.; Apparatus, Systems and Methods for Printing Dimensionally Accurate Syrnbologies on Laser Printers Configured with Remote Client Computer Devices; U.S. Appl. No. 09/684,152, filed Oct. 6, 2000; pp. 1-3 and 98-110.

Bennett, et al.; Apparatus, Systems and Methods for Online, Multi-Carrier, Multi-Service Parcel Shipping Management; U.S. Appl. No. 09/684,866, filed Oct. 6, 2000; pp. 1-2 and 97-112.

Kewill Systems, Inc., "Kewill Systems PLC Acquires Leading U.S. Shipping and Receiving E-Commerce Software Firm for $18 Million", *Aristo Computers Press Releases and Product Developments*, Jul. 27, 1999, pp. 1-3 of 13, Marlborough, Mass.

Kewill Systems, Inc., "USPS Delivery Confirmation Support Now Available in Aristo's Economical APSS® Lite Shipping System", Aristo Computers Press Releases and Product Developments, Jun. 23, 1999, p. 3 of 13, Beaverton, Oregon.

Kewill Systems, Inc., "Aristo Parcel Shipping System® Certified by USPS to Support New Express Mail Manifesting", Aristo Computers Press Releases and Product Developments, Jun. 21, 1999, pp. 3 and 4 of 13, Beaverton, Oregon.

Kewill Systems, Inc., "Aristo Parcel Shipping System® Certified UPS OnLine®Compatible to Support UPS International Shipping", Aristo Computers Press Releases and Product Developments, May 12, 1999, pp. 4 and 5 of 13, Beaverton, Oregon.

Kewill Systems, Inc., "Aristo Parcel Shipping System® Certified to Fully Supoort FedEx PowerShip® Server, "Aristo Computers Press Releases and Product Developments, May 10, 1999, pp. 5 and 6 of 13, Beaverton, Oregon.

Kewill Systems, Inc., "Aristo Computers Names AliPoints Systems Strategic Partner" *AliPoints Systems to Integrate Aristo shipping functionality into its Demand Chian Soilware*, Aristo Computers Press Releases and Product Developments, Apr. 13, 1999, pp. 6 and 7 of 13, Beaverton, Oregon and Dedham, Massatuchutes.

Kewill Systems, Inc., "Midgard Information Systems and Aristo-integrated Shipping Solutions for Today's Marketplace", Aristo Computers Press Releases and Product Developments, Jan. 19, 1999, pp. 7-9 of 13, Charlotte, North Carolina.

Kewill Systems, Inc., "Aristo's OLE Server Provides Shipping & Manifesting Engine for Third Party Developers", Aristo Computers Press Releases and Product Developments, Jul. 28, 1998, pp. 9 and 10 of 13, Beaverton, Oregon.

Kewill Systems, Inc., "Aristo Computers Adds New Economical Shipping Solution to Its Product Line", Aristo Computers Press Releases and Product Development, Apr. 30, 1998, p. 10 of 13, Beaverton, Oregon.

Kewill Systems, Inc., "Aristo announces latest APSS® developments!", Aristo Computers Press Releases and Product Developments, Jun. 9, 1997, pp. 10 and 11 of 13, Beaverton, Oregon.

Kewill Systems, Inc., "Aristo launches APSS® for Windows", Aristo Computers Press Releases and Product Developments, Oct. 20, 1996, pp. 11-13 of 13, Beaverton, Oregon.

"Netscape and FDX Unveil Plans for Next Generation Internet Package Delivery Center", Netscape Press Releases, Apr. 7, 1999, 3 pages, Mt.View, California and Memphis, Tennessee.

"TanData Announces Release of ChainLink™ Applications Suite" TanData Press Releases, Dec. 8, 1999, 2 pages, Tulsa, Oklahoma.

UPS Extends Capability of ICat Electronic Commerce Software, TanData Press Releases, Oct. 26, 1998, 2 pages, Atlanta.

Andy Wang, "FedEx and Netscape Build Shipping Portal", E-Commerce Times, Apr. 8, 1999, 2 pages.

Mary Hillebrand, "Frorn2.Com Gives International E-Commerce A Hand", E-Commerce Times, Jul. 9, 1999. 3 pages.

Tim Wilson, "Shippers Repackaged As E-Providers", InformationWeek, Issue: 758, Section: Transportation Transformation: A Special Report From Internetweek, Oct. 25, 1999, 6 pages.

James Hollander, UPS Boosts E-Commerce Strategy with New Web Tools, E-Commerce times, Apr. 6, 1999, 3 pages.

Collection of Screen Printouts (Copyright © 2000) from "anythingovernight.com" referring to shipping product Shiplet, entitled "Shiplet", 4 pages, "About Us", 1 page, "Shipping", 1 page, "Reporting", 1 page, "User Profile" 1 page, "Shipments to Me", 1 page, and "API", 1 page.

Lisa Corbin, "Electronic Commerce Strategies", Government Executive Magazine, Aug. 30, 1999, 5 pages.

Computer Support, Inc. (CSI), p. 10 of 117 listed in "Electronic Data Interchange (EDI): Software Profiles" Datapro, Jul. 1998).

TradePoint Systems LLC, International Trade and Transportion, and Transportation Concepts and Services, Inc, (TCS), p. 19 of 177 listed in "Electronic Data Interchange (EDI): Software Profiles" Datapro, Jul. 1998).

Carrier Quality Performance Software, p. 39 of 177 listed in "Electronic Data Interchange (EDI): Software Profiles" Datapro, Jul. 1998).

(56) References Cited

OTHER PUBLICATIONS

Late Delivery Quality Monitor Software (for Federal Exress Shipments), p. 97 of 177 listed in "Electronic Data Interchange (EDI): Software Profiles" Datapro, Jul. 1998).

Scheme Software Order Entry/Billing 5.0, p. 156 of 177 listed in "Electronic Data Interchange (EDI): Software Profiles" Datapro, Jul. 1998).

Software for International Trade, p. 157 of 177 listed in "Electronic Data Interchange (EDI): Software Profiles" Datapro, Jul. 1998).

Brandon Fleming, "Hot List for Electronic Data Interchange (EDI)", http://www.usatrade.gov/us/annarbor/hot_list_for EDI.htm. 9 pages, Copyright © 1999; Revised Feb. 1, 2000.

Microsoft Corporation, "Microsoft Internet Commerce Strategy: A Foundation for Doing Business on the Internet", May 1997, 27 pages.

Survey of E-Commerce Companies & Products: Business Logistics, Customer Service, Supply Chain Management, http://pages.hotbot.com/biz/jayml/BP9.html, 28 pages, Richard Karpinski, Appendix II Feb. 9, 1999 on p. 26.

FedEx Standardizes on Netscape, News Source: Mountain View, Calif., Jane 11/PRNewswire; News Date Jun. 12, 1996 12:55 pm; Keywords: Federal Express, Electronic Commerce; 3 pages.

Email Message; From SmartShip Online Support, To: smartshippers@smartship.com; Subject: You can ship online now! Sent: Tuesday, Dec. 15, 1998 11:53 AM: 1 page.

"Smartship.com Announces Multi-Carrier Shipping and Tracking Function for E-Commerce", SmartShip.com Press Release, Apr. 3, 2000, 2 pages, Irvine, California.

Notice of Allowance for U.S. Appl. No. 09/820,292 dated Aug. 21, 2009, pp. 1-7, USPTO.

Office Action for co-pending Canadian Patent Application No. 2,404,814, dated Mar. 18, 2010, pp. 1-12, Canadian Intellectual Property Office (CIPO).

Office Action for co-pending Canadian Patent Application No. 2,404,814, dated Aug. 9, 2011, pp. 1-13, Canadian Intellectual Property Office (CIPO).

Office Action for co-pending Canadian Patent Application No. 2,404,814, dated Jun. 18, 2012, pp. 1-5, Canadian Intellectual Property Office (CIPO).

* cited by examiner

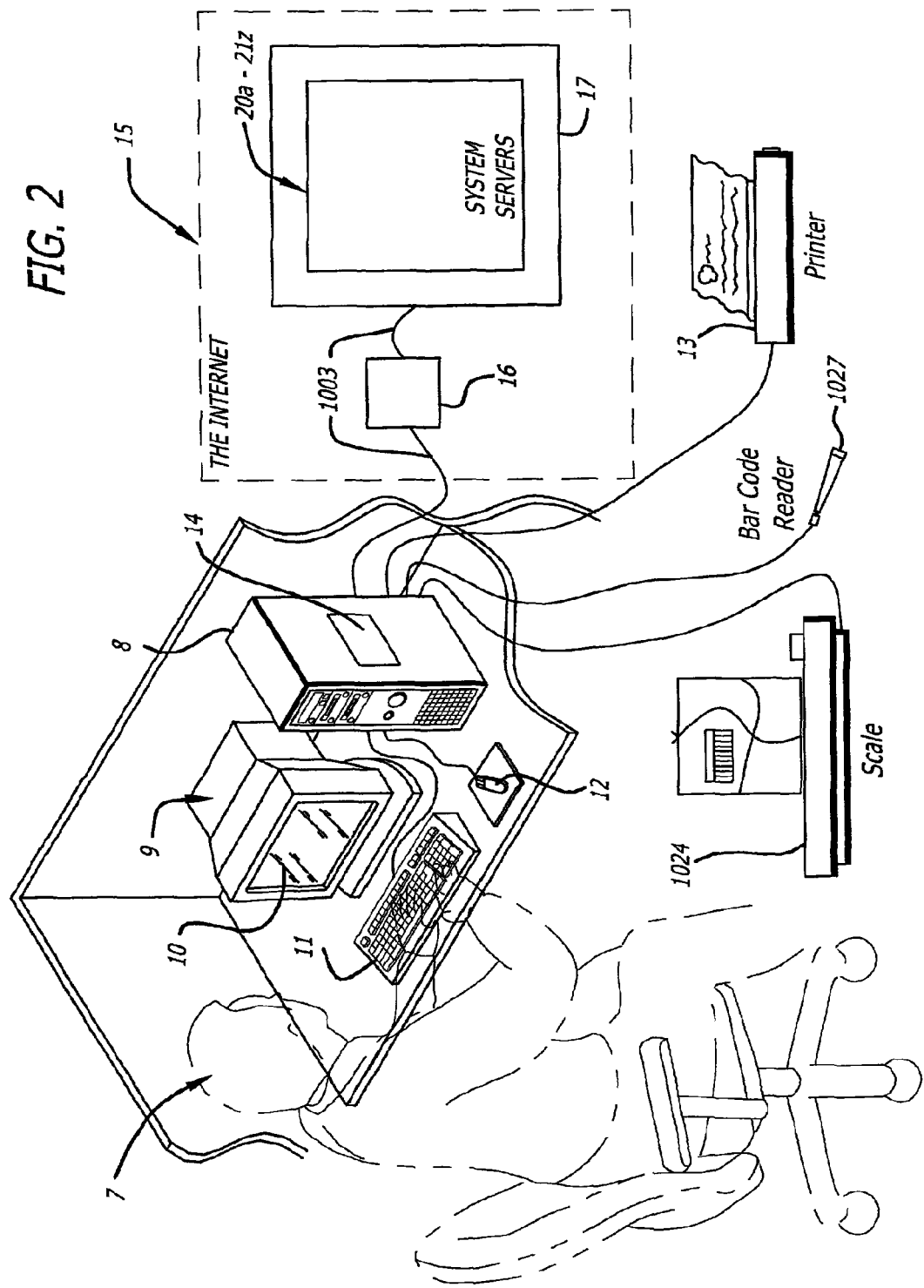

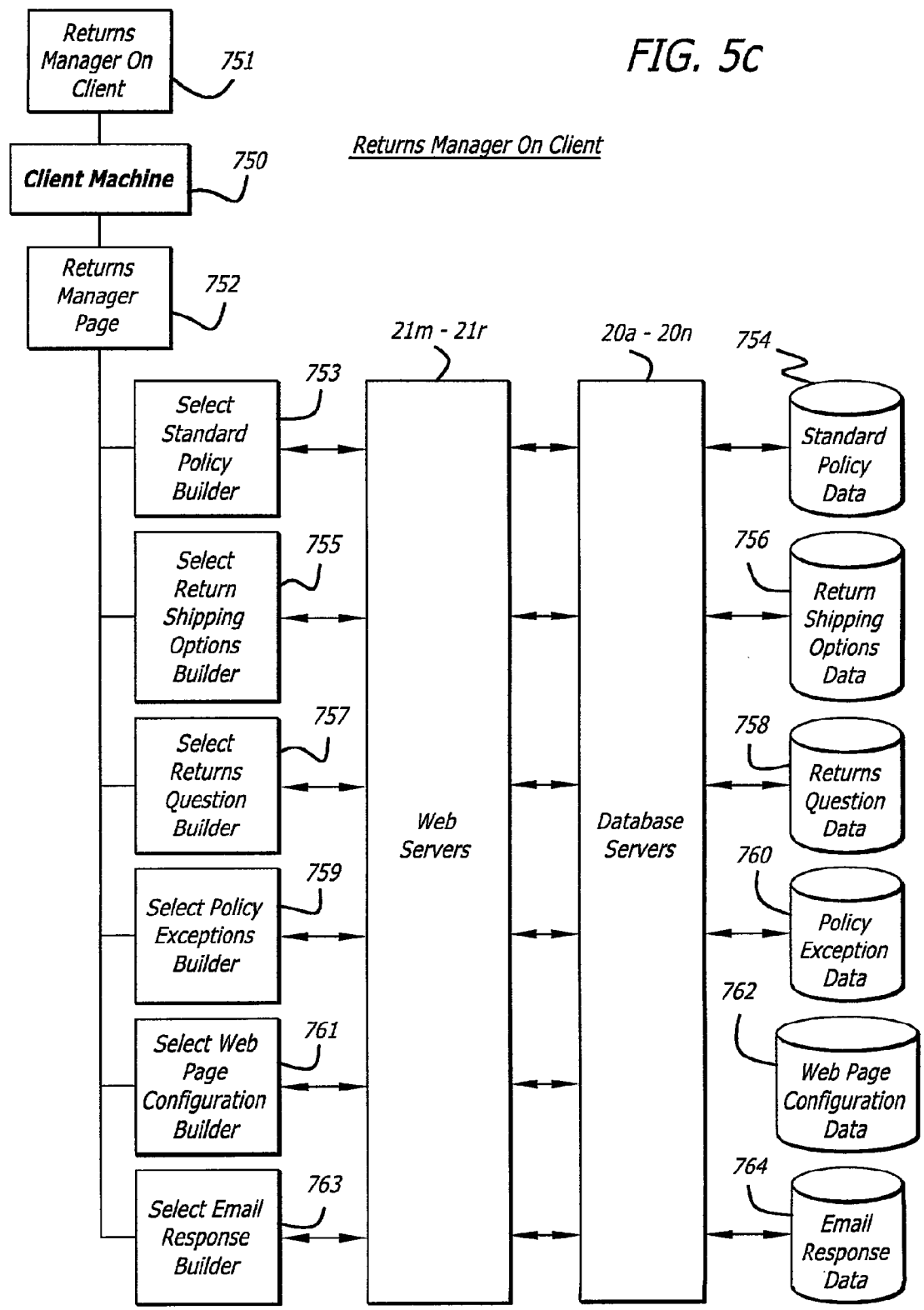

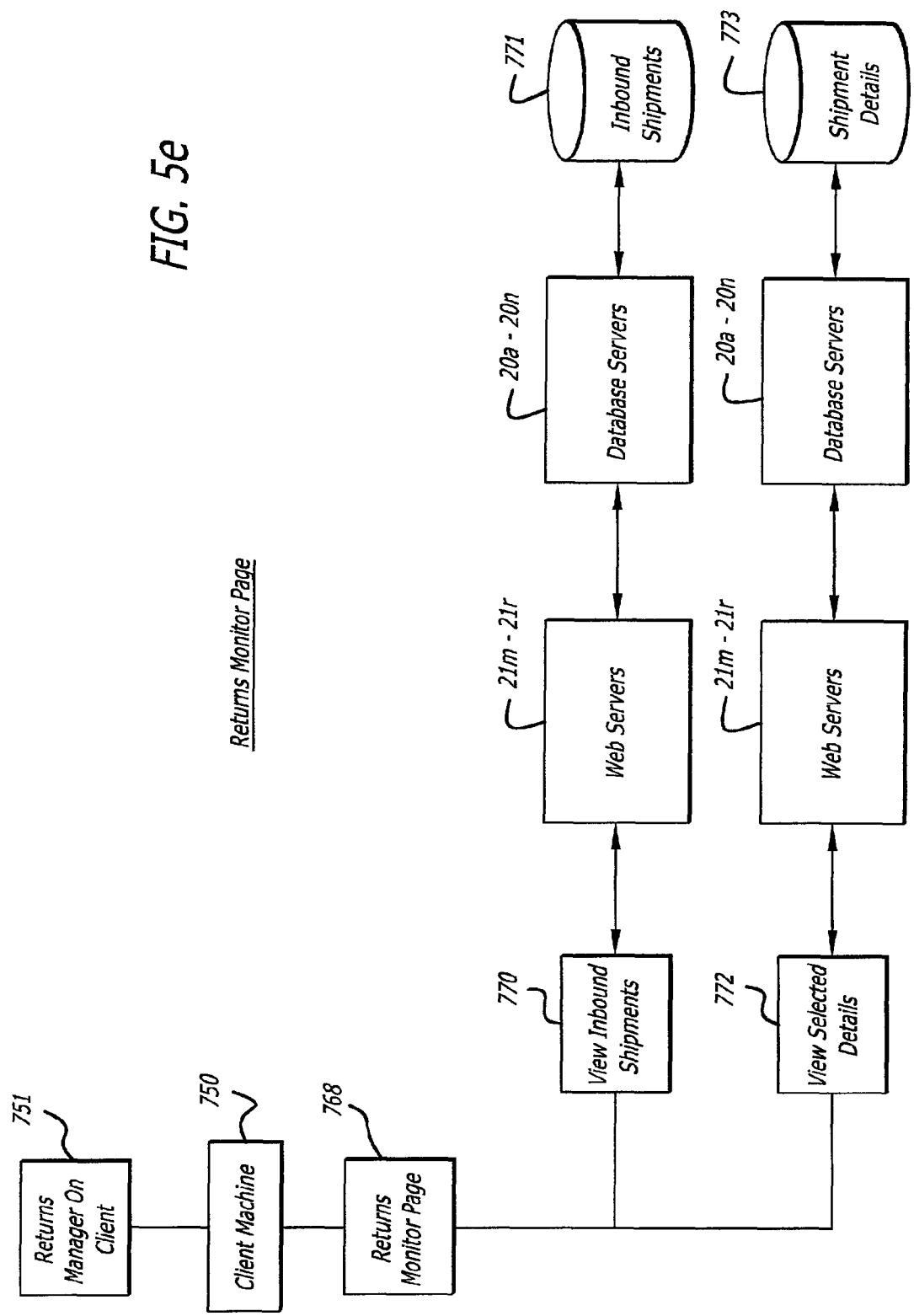

| MerchantSite.com | Returns Manager | Log Out | Help | iShip.com |

Merchant Logo

Company Information iShip.com
Your Internet Package Shipper
User: John Smith

Company Name: —⁀— 140

Logo URL: —⁀— 141

Color Preference: —⁀— 142

Customer Sevice: email, phone number to be used as escape hatch for tricky responses —⁀— 143

*FIG. 8*

| MerchantSite.com | Returns Manager | Log Out | Help | iShip.com |

Merchant Logo

User Administration iShip.com
Your Internet Package Shipper
User John Smith

User Names: —⁀— 145

Access Privileges: —⁀— 150
- Return Monitor: Warehouse Receiving Manager, Store Manager —⁀— 146
- Return Policy Builder: Store Manager, Merchandise Manager —⁀— 147
- Account Setup: Administrator (global) —⁀— 148

Email, Phone Numbers —⁀— 149

*FIG. 9*

| MerchantSite.com | Returns Manager | Log Out | Help | iShip.com |

Merchant Logo

Return Centers iShip.com
Your Internet Package Shipper
User: John Smith

Add and edit Return Centers (where do return shipments go?)

- Center Name: —⁀— 151
- Attn: —⁀— 152
- Address 1, 2 —⁀— 153
- City, ST ZIP —⁀— 154
- Country —⁀— 155
- Tel Number —⁀— 156

Multiple centers may be configured  Import function for multiple stores (especially retail locations). Feeds ZIP-based retail store locator feature.

*FIG. 10*

| MerchantSite.com | Returns Manager | Log Out | Help | iShip.com |

Merchant Logo

*Standard Policy* iShip.com
Your Internet Package Shipper
User: John Smith

Use this page to create and edit a consistant, automated returns policy for your online store. This is the general policy for the entire store - to configure exceptions to the policy at the category or item level, click here.

Policy Overview Statement

Summarize your store's overall returns policy. This text will appear at the beginning of the customer's returns process, and is an overview of the returns logic you will build. Best to keep it brief. Use HTML to format the text if you wish

*160-1*

*160-3*

```
<B> Within 30 days of receipt of your shipment</B>, you may return:
<UL>
Any apparel, lawn & garden equipment, furniture, or books in original
condition.
Any unopened CD, DVD, VHS tape, or software.
Any electronics merchandse or toy in new condition with its original
packaging and accessories.
</UL>
```

*160-2*

We are unable to refund returned pharmeceuticals or food.

With few exceptions, we issue a <b>full refund</b> for the price of an item that meets these conditions. We only refund shipping costs if the item is a result of our error.

*160*

*161-1*

*161-2*

[Preview] — *162*

Return Window — *167*

*163* Customer may return items for: *165*

[30] from [Receipt of Shipment ▼] — *166*

*164*

Refund Method — *168*

Customer may return items for:

*169* ● Refund

*170* ○ Store Credit Only

*171* ○ Choice of Refund or Store Credit

Refund Amount — *172*

Refund amount will include:

*173* ☑ Price of Item

*174* ☑ Tax on Item

*175* ☑ Original Shipping Charge

*176* [Cancel]   *177* [Save]

FIG. 11

| MerchantSite.com | Returns Manager | Log Out | Help | iShip.com |

*Merchant Logo* iShip.com
Your Internet Package Shipper
User: John Smith

*Return Shipping Options*

Return Locations — 180

Where will you permit customers to return items?

☑ Online Only. — 181

Customers can print a shipping label from your store and ship the package to a returns center.

Select Primary return center: [Returns Center, Ames IA ▼] — 182, 183

☑ Any retail store — 184

Customers can return items purchased online to convenient retail location.

Online Shipping Options — 185

Which online shipping options do you want to offer?

☑ Merchant Pays. — 186

Allow your company to pay return shipping costs for justified returns. Select carrier and service options:

187-1 ☑ UPS    188-1 ☑ US Postal Service    189-1 ☐ FedEx    190 ☐ Mail Boxes Etc.
187-2 ☑ UPS Ground    188-2 ☑ Priority Mail    189-2 ☐ FedEx Standard Overnight
187-3 ☐ UPS 3 Day Select    ☐ Express Mail    189-3 ☐ FedEx Priority Overnight
187-4 ☐ UPS 2nd Day Air    188-3    189-4 ☐ FedEx 2Day
187-5 ☐ UPS Next Day Air    189-5 ☐ FedEx Express Saver ☑ Customer pays. — 191

For unjustified returns, offer customers the convenience of paying for and printing a label during the return process. Select carrier options:

192 ☑ UPS    193 ☑ US Postal Service    194 ☑ FedEx    195 ☑ Mail Boxes Etc.

176 [ Cancel ]    [ Save ] 177

*FIG. 12*

| MerchantSite.com | Returns Manager | Log Out | Help | iShip.com |

*Merchant Logo* iShip.com
Your Internet Package Shipper

*Return Responses*

User: John Smith

Create a series of questions to ask customers returning items, and define an appropriate response for each answer. To create a "no questions asked" policy, turn all questions off.

Question 1 — 200

- 201 ☑ On (enabled)
- 202 ☐ Off (disabled)

Question: [Why are you returning this item?] — 203

Ask: ⦿ About each item to be returned — 204   ◯ Once per return — 205

Answer Heading: [You may return items for the following reasons:] — 206

Answer Choices: — 207

[Incorrect Item Received]

Response: 209-1

[We apologize for our error. We will issue a full refund for your item, and pay for shipping the correct item to you.] — 208

210 ☑ Display Response — 209-2

Follow Up *Issue Refund, Pay Return Shipping, Pay Replacement Shipping* — 211-1, 211-2, 211-3

*Edit Follow up* ✓ 211-4

— 212
[Item Arrived Damaged or Defective]

213-2
[We apologize for the problem with your shipment.]
213-1

214 ☑ Display Response — 213-3

Follow Up *Ask Q2* — 215-1

*Edit Follow up* ✓ 215-2

— 216
[Customer Choice (Problem with Size, Color)]

217-2
[We apologize for the problem with your order. We will issue a full refund for your item.]
217-1

218 ☑ Display Response — 217-3

Follow Up: *Issue Refund, Do Not Pay for Shipping* — 219-1, 219-2

*Edit Follow up* ✓ 219-3

— 220
[Other (Please specify)]

221-2
[We apologize for the problem with your order. We will issue a full refund for your item]
221-1

222 ☑ Display Response — 221-3

Follow Up: *Issue Refund, Do Not Pay for Shipping* — 223-1, 223-2

*Edit Follow up* ✓ 223-3

— 224
[Add/ Remove Answer Choices]

☑ Add Customer comments field.
— 225

*FIG. 13a*

Question 2 — 230

☑ On (enabled)  ☐ Off (disabled)

Question: [Would you like a replacement for the item, or a refund?]

Ask: ● About each item to be returned   ○ Once per return

Answer Heading: [                                                  ]

Answer Choices:                          Response:

[Replacement]                            [We apologize for the problem with your order. We will send a replacement immediately.]

☑ Display Response

Follow Up  *Do not Issue Refund, Pay Return Shipping, Pay Replacement Shipping*
                                         *Edit Follow up*

[Refund]                                 [We apologize for the problem with your order. We will issue a full refund for your item.]

☑ Display Response

Follow Up  *Issue Refund, Pay Return Shipping*
                                         *Edit Follow up*

[ Add/ Remove Answer Choices ]

☑ Add Customer comments field.

Question 3 — 231

☐ On (enabled)  ☑ Off (disabled)

Question: [                                                  ]

Ask: ● About each item to be returned   ○ Once per return

Answer Heading: [                                                  ]

Answer Choices:                          Response:

[Replacement]                            [                                    ]

☐ Display Response

Follow Up:
                                         *Edit Follow up*

[ Add/ Remove Answer Choices ]

☑ Add Customer comments field

Question 4 — 232

☐ On (enabled)   ☑ Off (disabled)

Question: [                                                    ]

Ask: ◉ About each item to be returned   ○ Once per return

Answer Heading: [                                                ]

Answer Choices:                    Response:
[Replacement                ]      [                              ]

☐ Display Response
                                   Follow Up·
                                   *Edit Follow up*

[      Add/ Remove Answer Choices      ]

☑ Add Customer comments field.

Question 5 — 233

☐ On (enabled)   ☑ Off (disabled)

Question: [                                                    ]

Ask: ◉ About each item to be returned   ○ Once per return

Answer Heading: [                                                ]

Answer Choices:                    Response:
[Replacement                ]      [                              ]

☐ Display Response
                                   Follow Up
                                   *Edit Follow up*

[      Add/ Remove Answer Choices      ]

☑ Add Customer comments field.

176 — [ Cancel ]    [ Save ] — 177

FIG. 13d 234-1-a

Question 1

| Response 11 235-1-a | Instruction A 236-1-a | Instruction B 236-2-a | |
|---|---|---|---|
| Response 12 235-2-a | Instruction M 236-13-a | Instruction L 236-12-a | Instruction S 236-19-a |

234-2-a

Question 2

| Response 21 235-3-a | Instruction L 236-12-a | Instruction B 236-2-a | |
|---|---|---|---|
| Response 22 235-4-a | Instruction A 236-1-a | | |
| Response 23 235-5-a | Instruction S 236-19-a | Instruction M 236-13-a | Instruction T 236-20-a |

•
•
•

234-XX-a

Question XX

| Response XX1 235-6-a | Instruction B 236-2-a | Instruction A 236-1-a | |
|---|---|---|---|
| Response XX2 235-7-a | Instruction T 236-20-a | Instruction L 236-12-a | |

FIG. 13e

| Question Table | |
|---|---|
| Question 1 | Question text 1 |
| Question 2 | Question text 2 |
| ⋮ | ⋮ |
| Question n | Question text n |
| ⋮ | ⋮ |
| Question xx | Question text xx |

| Instruction Table | |
|---|---|
| Instruction A | executable code 1 |
| Instruction B | executable code 2 |
| ⋮ | ⋮ |
| Instruction L | executable code 12 |
| Instruction M | executable code 13 |
| Instruction N | executable code 14 |
| ⋮ | ⋮ |
| Instruction S | executable code 19 |
| Instruction T | executable code 20 |
| ⋮ | ⋮ |

| Response Table | |
|---|---|
| Response 11 | Response 11 text |
| Response 12 | Response 12 text |
| ⋮ | ⋮ |
| Response 21 | Response 21 text |
| ⋮ | ⋮ |
| Response xx1 | Response xx1 text |
| Response xx2 | Response xx2 text |
| ⋮ | ⋮ |

| MerchantSite.com | Returns Manager | Log Out | Help | iShip.com |

Merchant Logo

*Exception Categories* iShip.com
Your Internet Package Shipper
User: John Smith

280 { Exception categories are used to define special return processing certain groups of items. Store categories are generally the departments in your store. If you always have the same return policy for every item in your store, you do not need to create categories. If you do treat some items differently than others, you need categories.

For example, your store may accept return of any apparel merchandise, except opened packages of underware. You would use categories to except opened underware from your standard policy.

Main Categories (Level One)

| 281 Apparel | 282 Furniture | 283 Food | 284 Pharmeceuticals |
| 285 Audio CDs | 286 Lawn & Garden | 287 Books | 288 Computer Hardware |
| 289 Electronics | 290 Video DVD | 291 Video Tape | 292 Computer Software |
| 293 Toys | 294 | 295 | 296 |
| 297 | 298 | 299 | 300 |

176 [ Cancel ]  [ Next Step >> ] 301

| MerchantSite.com | Returns Manager | Log Out | Help | iShip.com |

Merchant Logo

*Store Categories* iShip.com
Your Internet Package Shipper
User: John Smith

Apparel —— 281

Subcategories

- 302 Mens
- 303 Womens
- 304 Outerwear
- 305 Underwear
- 306
- 307
- 308
- 309

Second-Level Subcategories —— 310

Furniture —— 282

Subcategories

Second-Level Subcategories

Food —— 283

Subcategories

FIG. 17b

Second-Level Subcategories

Pharmaceuticals —— 284

Subcategories

Second-Level Subcategories

Category Name

Subcategories

Second-Level Subcategories

176 — [ Cancel ]   [ Save ] — 177

Merchant Logo

Merchant Main Menu Choices

Merchant SubMenu Selections

Order Summary 　　　*401-1*　　　Return to Your Order History

| | |
|---|---|
| Order #: | 002-0152586-5576810 — *407* |
| Date: | July 19,1999 at 09 58 AM PDT |
| Status: | All items shipped |

Shipping Address:
Scott J. Beam
iSHip.com
2515 - 140th Ave NE Suite E-110　*408*
Bellevue, WA 98005 USA
425.602.5022

*402*

Returns? Click Here:
Return services by iShip.com iShip.com
Your Internet Package Shipper

| Ship Method: | Number of Shipments: | Payment Method: |
|---|---|---|
| Standard Shipping | One shipment when complete order is ready | VISA Last 5 digits 26781 |

*403*

Items Ordered:

*404-1* — 1 of: Permission Marketing: Turning Strangers into Friends and Friends into Customers [Audio Cassette]
　　By: Seth Godin(Reader)
　　1 shipped on Jul. 19, 1999 via US Priority.　　　$14.40

*404-2* — 1 of: Yeah, It's That Easy [ECD] [Audio CD]
　　By: G. Love & Special Sauce
　　1 shipped on Jul. 20, 1999 via US First Class　　　$12.99

*404-3* — 1 of: For those About To Rock We Salute You [ORIGINAL RECORDING REMASTERED] [Audio CD]
　　By: AC.DC
　　1 shipped on Jul. 19, 1999 via US Priority.　　　$11.49

*404-4* — 1 of: Odelay [Audio CD]
　　By: Beck
　　1 shipped on Jul. 19, 1999 via US Priority　　　$12.99

*404-5* — 1 of: Natty Dread [Audio CD]
　　By: Charlie Hunter Quartet
　　1 shipped on Jul. 19, 1999 via US Priority　　　$12.99

*404-6* — 1 of: Duo [Audio CD]
　　By: Charlie Hunter, Leon Parker
　　1 shipped on Jul. 19, 1999 via US Priority　　　$12.99

*404-7* — 1 of: RCA WSP150 900MHz Wireless Speakers [Electronics]
　　By: RCA
　　1 shipped on Jul. 20, 1999 via UPS Ground　　　$149.95

*405* — Track your package with iShip.com

| | |
|---|---|
| Item(s) Subtotal: | $227.80 |
| Shipping & Handling: | $19.56 |
| Total Before Tax | $247.36 |
| Tax | $21.29 |
| TOTAL | $268.65 |

*406* — Return to Your Order History

Top of Page

FIG. 22

Merchant Logo

Merchant Main Menu Choices

Returns Service                                        Return to Your Order History 420 { Within 30 days of receipt of your shipment, you may return:

- Any book in original condition.
- Any unopened CD, DVD, VHS tape, or software
- Any electronics merchandise or toy in new condition with its original packaging and accessories.

We will issue a full refund for the price of any item that meets these conditions. We only refund shipping costs if the item is a result of our error.

Merchant

SubMenu

Selections

| | | |
|---|---|---|
| Order #: | 002-0152586-5576810 — 401-1 | |
| Date: | July 19, 1999 at 09:58 AM PDT | |
| Status: | All items shipped | |

Select the items you would like to return:                                        Price:

421-1 ☐   1 of: Permission Marketing: Turning Strangers into Friends and Friends into Customers [Audio Cassette]
By: Seth Godin(Reader)
1 shipped on Jul. 19, 1999 via US Priority.   } 404-1   $14.40

421-2 ☐   1 of: Yeah, It's That Easy [ECD] [Audio CD]
By: G. Love & Special Sauce
1 shipped on Jul. 20, 1999 via US First Class   } 404-2   $12.99

421-3 ☐   1 of: For those About To Rock We Salute You [ORIGINAL RECORDING REMASTERED] [Audio CD]
By: AC.DC
1 shipped on Jul. 19, 1999 via US Priority   } 404-3   $11.49

421-4 ☐   1 of: Odelay [Audio CD]
By: Beck
1 shipped on Jul. 19, 1999 via US Priority   } 404-4   $12.99

421-5 ☐   1 of: Natty Dread [Audio CD]
By: Charlie Hunter Quartet
1 shipped on Jul. 19, 1999 via US Priority   } 404-5   $12.99

421-6 ☐   1 of Duo [Audio CD]
By: Charlie Hunter, Leon Parker
1 shipped on Jul. 19, 1999 via US Priority   } 404-6   $12.99

421-7 ☑   1 of: RCA WSP150 900MHz Wireless Speakers [Electronics]
By: RCA
1 shipped on Jul. 20, 1999 via UPS Ground
Track your package with iShip.com   } 404-7   $149.95

405

| | |
|---|---|
| Item(s) Subtotal | $227.80 |
| Shipping & Handling | $19.56 |
| Total Before Tax. | $247.36 |
| Tax. | $21.29 |
| TOTAL | $268.65 |

406       [ Next Step >> ]  422

Return to Your Order History

Top of Page

FIG. 23a

Merchant Logo

Merchant Main Menu Choices

Returns Service            Return to Your Order History

Order #:     002-0152586-5576810 —401-1
Date:     July 19,1999 at 09:58 AM PDT
Status:     All items shipped
Items to Return:     Price:

421-7 ☑ 1 of RCA WSP150 900MHz Wireless Speakers [Electronics] — 404-7    173   $149 95
By: RCA
1 shipped on Jul. 20, 1999 via UPS Ground
Track your package with iShip.com    173
405     Item(s) Subtotal Before Tax,   $149 95

Merchant SubMenu Selections

Refunded Tax: $12 90
174    TOTAL   $162 85

206
Reason for Return:    172

427-1 ☐ Customer Choice —216
427-2 ☐ Incorrect Item Received —207
427-3 ☑ Arrived Damaged/Defective —212
                                    425     426-1
427-4 ☐ Other (please specify below): —220

```
Right speaker does not receive signal.
```
426-2

406            [ Next Step >> ] 422
Return to Your Order History

Top of Page

*FIG. 24*

Merchant Logo

Merchant Main Menu Choices

Returns Service                                                                 Return to Your Order History Within 30 days of receipt of your shipment, you may return:

- Any book in original condition.
- Any unopened CD, DVD, VHS tape, or software
- Any electronics merchandise or toy in new condition with its original packaging and accessories.

We will issue a full refund for the price of any item that meets these conditions. We only refund shipping costs if the item is a result of our error.

Merchant

SubMenu

Selections

| | |
|---|---|
| Order #: | 002-0152586-5576810 |
| Date: | July 19,1999 at 09:58 AM PDT |
| Status: | All items shipped |

Select the items you would like to return:                                                                 Price:

☐ 1 of: Permission Marketing: Turning Strangers Into Friends and Friends Into Customers [Audio Cassette]
By: Seth Godin(Reader)
1 shipped on Jul. 19, 1999 via US Priority.                                                                 $14.40

☐ 1 of: Yeah, It's That Easy [ECD] [Audio CD]
By: G. Love & Special Sauce
1 shipped on Jul. 20, 1999 via US First Class                                                              $12.99

☐ 1 of: For those About To Rock We Salute You [ORIGINAL RECORDING REMASTERED] [Audio CD]
By: AC.DC
1 shipped on Jul. 19, 1999 via US Priority.                                                                $11.49

☐ 1 of: Odelay [Audio CD]
By: Beck
1 shipped on Jul. 19, 1999 via US Priority                                                                 $12.99

421-5 ☑ 1 of: Natty Dread [Audio CD]
By: Charlie Hunter Quartet                                                       } 404-5
1 shipped on Jul. 19, 1999 via US Priority                                                                 $12.99

☐ 1 of: Duo [Audio CD]
By: Charlie Hunter, Leon Parker
1 shipped on Jul. 19, 1999 via US Priority                                                                 $12.99

☐ 1 of: RCA WSP150 900MHz Wireless Speakers [Electronics]
By. RCA
1 shipped on Jul. 20, 1999 via UPS Ground
Track your package with IShip com                                                                          $149.95

|  |  |
|---|---|
| Item(s) Subtotal: | $227.80 |
| Shipping & Handling: | $19.56 |
| Total Before Tax: | $247.36 |
| Tax | $21.29 |
| TOTAL. | $268.65 |

406                    [ Next Step >> ]  ~422

Return to Your Order History

Top of Page

*FIG. 31*

Merchant Logo

Merchant Main Menu Choices

| Returns Service | Return to Your Order History |

Order #: 002-0152586-5576810
Date: July 19, 1999 at 09:58 AM PDT
Status: All items shipped
Items to Return:          173 — Price:
☑ 1 of Natty Dread [Audio CD]     $12.99
     By: Charlie Hunter Quartet

Merchant

173 —
        Item(s) Subtotal Before Tax. $12.99

SubMenu

206       Refunded Tax: $1.30
      174 —

Selections     Reason for Return:      TOTAL $14.29

427-1 — ☑ Customer Choice — 216     172 —

☐ Incorrect Item Received

☐ Arrived Damaged/Defective     — 425

☐ Other (please specify below):     426-1

```
I thought this was the Bob Marley CD,
not some Jazz thing.
```
                                               426-2

406         [ Next Step >> ] — 422

Return to Your Order History                Top of Page

*FIG. 32*

Merchant Logo

Merchant Main Menu Choices

Returns Service Return to Your Order History

Returning Your Package: Price:
Please make sure your item is in original condition. Please use the original packaging, or other appropriate packaging. We will not issue a refund for items damaged in transit.

1 of Natty Dread [Audio CD] $12.99
 By: Charlie Hunter Quartet
 Reason for return: Customer Choice
 Comments: I thought this was the Bob Marley CD, not some jazz thing
 TOTAL REFUND $14.29

Merchant SubMenu Selections

*Through our partnership with iShip.com, you can print a return label directly from your computer or take your package to a Mail Boxes Etc. To print a shipping label, you must have a printer that prints 300 dpi or better*

469 — How would you like to return the package? (Select One)

470 ⊙ UPS 471 ○ US Postal Service 472 ○ FedEx 473 ○ Mail Boxes Etc 474 ○ Retail Store 475 — Is your item packaged in the original shipping box?

476 ○ YES 477 ⊙ NO

478 — How would you like to pay for the return shipping? (Select One)

479 ⊙ Credit Card 480 ⊙ Visa 481 ○ MasterCard 482 ○ AmEx

Name on Card: [ Scott J. Bean ] — 483
 Number: [ 4444444444444444 ] — 484
 Expiration: [ 09/02 ] — 485

486 ○ My Carrier Account Number: [ ] — 487

406 [ Next Step >> ] — 422

Return to Your Order History Top of Page

*FIG. 33* iShip.com

Prepare Your Shipping Estimate

To find out the available services and charges for your shipment, fill out the information below. You will be able to add options on the next Page

To get started, simply complete the form below and choose Continue!

Enter the Shipment Weight and Packaging

500 — My shipment will weight:

[ ] lbs [ 2 ] oz (Include the weight of all packing materials. You may use a weight estimate for shipments that weigh more than 150 pounds.)

501 — I am using the following packaging:

- 502 ◉ Carrier Letter
- 503 ○ Carrier Box
- 504 ○ Carrier Pak or Tube
- 505 ○ Other packaging. The dimensions (in inches) are:

506 — Length [ ] in. Width [ ] in. Height [ ] in.

507 — ☐ The packaging is irregular or is not standard (Learn More)

Enter Your Postal Codes

I will ship the item FROM: — 510

This postal code: [ 91105 ] 98125, for example

I will ship the item TO: — 511

This postal code: [ 98125 ] 98125, for example

This city: [ ] — 512

This country: [ USA ▼ ] — 513

The delivery address for my shipment is a: ◉ Business 514  ○ Residence 515 iShip.com currently supports packages shipped from the U.S. (Learn More)

Add Carrier Loss Protection

516 — I want to protect my shipment from carrier loss or damage. The value of the contents is:

$ [ ]

Most services automatically protect your shipment up to $100. However, USPS Priority Mail and Parcel Post do not have automatic protection. Some USPS services have no available Loss Protection.

(Learn More)

125 — [ Cancel ]    [ Continue >> ] — 422

Having trouble? Click here for help. * Questions or comments about iShip.com? Click here. * iShip.com Privacy Policy

*FIG. 34* iShip.com

Select Your Options

| | |
|---|---|
| Select Your Carriers | I will ship my item using any of the following carriers:<br>520 ☑ Airborne Express    521 ☑ FedEx<br>522 ☑ UPS    523 ☑ United States Postal Service<br><br>Note: Your shipping charges will be based on carriers' basic rate. If you have an account with custom rates, your actual shipping charges will be different from those shown. |
| Select Your DroppOff/Pickup Option 524 | I will ship my package from:    525<br>[ My location by calling the carrier for pickup ▼ ]<br><br>OR<br><br>My Drop-Off/Pickup Option is different for each carrier:<br><br>( Advanced ) 526<br><br>If you are unsure of which shipping location to select, click the Learn More button for more information.    527 ( Learn More ) |
| Enter Your Handling Charges | I will add labor or materials fees to my shipping charge:<br><br>[    ] % of shipping charges and/or<br><br>$ [    ] fixed amount<br><br>You will see the total of carrier shipping charges plus your handling charges.<br>   527 ( Learn More ) |
| Select Your Shipping Date | I will ship my item on: 530<br>[ 3/21/00 - Today ▼ ] 531<br>   527 ( Learn More ) |
| Select Tracking | I want to be able to track the shipment until it has been delivered:<br>532 ○ Required    533 ● Optional    527 ( Learn More ) |

540 [ << Back ] [ Continue >> ]

422

Having trouble? Click hser for help * Questions or comments about iShip.com? Click here * iShip.com Privacy Policy

*FIG. 35* iShip.com

Shipping Charges and Delivery Times

Rates & Delivery TIMES - Place cursor over square next to the rate to view carrier and services

|  | WED<br>22 MAR 00 | THU<br>23 MAR 00 | FRI<br>23 MAR 00 | CARRIERS |
|---|---|---|---|---|
| 8:00 AM | $42.00 | | | FedEx |
| 10:30 AM | $18.45 | —549 | | UPS |
| | $17.00 | | | USPS |
| 12:00 PM | $20.00 | $10.90 | | |
| 3:00 PM | $16.65 | | | |
| | $15.25 | | | |
| 4:30 PM | | $11.50 | $10.16 | |
| End<br>Of<br>Day | | $10.00<br>$11.45 | | |

To view a printable summary, click on a rate.   527 ~ (Learn More)

I want a guarnteed delivery time:  550  °Yes 551  ●No 552    560 —

540 ~ [<< Back] [Update] [Done]

Having trouble? Click here for help. * Questions or comments about iShip.com? Click here. * iShip.com Privacy Policy

--- iShip.com

Summary

| Shipment | | |
|---|---|---|
| | Origin Postal Code: | 91105 |
| | Destination Country | USA |
| | Destination Postal Code: | 98125 |
| | Actual Weight: | 0.125 |
| | Billed Weight | 1 lbs |
| | Packaging: | Carrier Letter |
| | Service: | UPS Second Day Air AM |
| | Sevice Options | None Chosen |
| Charges | Service: | $10 80 |
| | Service Option: | $0 00 |
| | Total | $10 80 |

To arrange for Pickup, contact UPS at: 1-800-PICK-UPS (1-800-742-5877)
To find a drpp off location near you, click here.

[<< Back] [Done]

Having trouble? Click here for help. * Questions or comments about iShip.com? Click here. * iShip.com Privacy Policy

*FIG. 38*

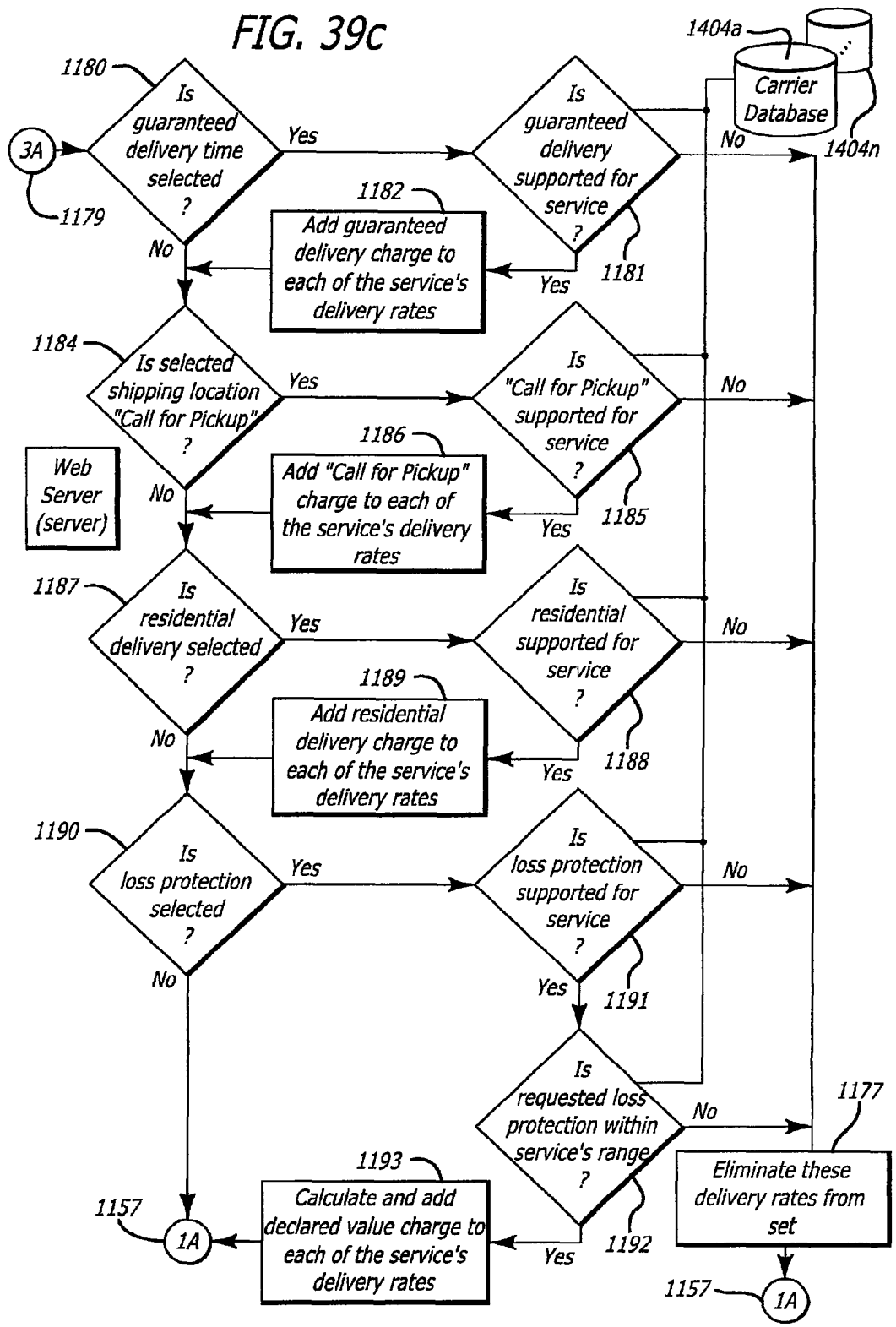

*Merchant Logo*

Merchant Main Menu Choices

Package Tracking Results                            Return to Your Order History

Tracking Information:
Status: DELIVERED
Delivered To: Bellevue, WA USA
Delivery Date: Thursday, July 22, 1999
Delivery Time: 9:13 AM
Delivery Location: Reception
Signed By: Bourne
Carrier: UPS
Service: Ground
Tracking Number: 1Z53X86X0302121560

Shipping Address:
Scott J Beam
iShip com
2515 - 140th Ave NE Suite E-110
Bellevue, WA 98005 USA
425 602 5022

Tracking Services By:

iShip.com
Your Internet Package Shipper

Merchant

SubMenu

Selections

Order #: 002-0152586-5576810
Date: July 19, 1999 at 09 58 AM PDT
Status: All items shipped Return to Your Order History                        Top of Page

FIG. 41

Merchant Logo

Merchant Main Menu Choices

Order Summary                                      Return to Your Order History

| | |
|---|---|
| Order #: | 002-0152586-5576810 |
| Date: | July 19,1999 at 09 58 AM PDT |
| Status: | All items shipped |

Shipping Address:
Scott J. Beam
iShip.com
2515 - 140th Ave NE Suite E-110
Bellevue, WA 98005 USA
425.602.5022

Returns? Click Here:
Return services by iShip com iShip.com
Your Internet Package Shipper

Merchant

SubMenu

Selections

| Ship Method: | Number of Shipments: | Payment Method: |
|---|---|---|
| Standard Shipping | One shipment when complete order is ready | VISA<br>Last 5 digits 26781 |

Items Ordered:                                                              Price:

1 of: Permission Marketing: Turning Strangers Into Friends and Friends Into Customers [Audio Cassette]
By: Seth Godin(Reader)
1 shipped on Jul. 19, 1999 via US Priority        $14.40

1 of Yeah, It's That Easy [ECD] [Audio CD]
By: G. Love & Special Sauce
1 shipped on Jul. 20, 1999 via US First Class        $12.99

1 of: For those About To Rock We Salute You [ORIGINAL RECORDING REMASTERED] [Audio CD]
By: AC.DC
1 shipped on Jul. 19, 1999 via US Priority.        $11 49

1 of Odelay [Audio CD]
By: Beck
1 shipped on Jul 19, 1999 via US Priority        $12.99

1 of Natty Dread [Audio CD]
By: Charlie Hunter Quartet
1 shipped on Jul. 19, 1999 via US Priority        $12 99

1 of Duo [Audio CD]
By Charlie Hunter, Leon Parker
1 shipped on Jul. 19, 1999 via US Priority        $12 99

1 of RCA WSP150 900MHz Wireless Speakers [Electronics]
By: RCA
1 shipped on Jul. 20, 1999 via UPS Ground
Track your package with iShip.com        $149 95

405

| | |
|---|---|
| Item(s) Subtotal: | $227.80 |
| Shipping & Handling | $19.56 |
| Total Before Tax | $247.36 |
| Tax. | $21 29 |
| TOTAL | $268 85 |

Return to Your Order History

Top of Page

FIG. 42 iShip. com

Your Tracking Information

| | |
|---|---|
| Status: | DELIVERED: |
| Last Scan: | 3/3/00 3:53:00 PM DELIVERY |
| | SAN ANTONIO-SOUTHWES, TX US |
| Delivered To: | SAN ANTONIO, TX US |
| Delivery Date. | Friday, March 3, 2000 |
| Delivery Time | 3:53:00 PM |
| Delivery Location | PORCH |
| Carrier: | UPS |
| Service: | GROUND |
| Tracking number | 1Z53X86N0302121560 |

[ Done ]

*Status as of Tuesday, March 21, 2000 2.26:19 PM Pacific Standard Time*

( Learn More )

Track Another Package

Enter Tracking Number: [_____] —601   [ Submit ] —602

Tracking Provided for:

Airborne Express    DHL    UPS
FedEx    United States Postal Service    YELLOW

Having trouble? Click hser for help  *  Questions or comments about iShip com? Click here  *  iShip com Privacy Policy

FIG. 45

| MerchantSite.com | Returns Manager | Log Out | Help | iShip.com |

Merchant Logo

*View Inbound Return Shipment* iShip.com
Your Internet Package Shipper
User: John Smith

View Inbound Return Shipment                              626 — [ Update View ]

Display: [All Returns ▼]    To Be Delivered: [Today ▼]    Sort By: [Status ▼]
        620   621              622    623 ─ 629            624        625

RETURNED FROM — 627    SERVICE CARRIER — 628    SHIP DATE / DELIVERED DATE — 630    DESTINATION — 631

632 —
RETURN REQUESTED (M A5UWAN PLF45T)                      629-1                    631-1
   Suzanna Smith — 627-1 — 633    Retail Store Return    9/7/99                  006-NYC         Details
                                                         9/7/99 5:00PM **                        — 640
                                         — 628-1         — 630-1
RETURN REQUESTED (M A5UWAN GDMF8K)
                                                         9/7/99                                  Details...
   Conrad Dobler                  Retail Store Return    9/7/99 5:00PM **         235-Chicago RETURN REQUESTED (M A5UWAN C2MYK8)
                                                         9/7/99                                  Details
   Julie Diener                   Retail Store Return    9/7/99 5:00PM **         016-San Jose IN TRANSIT (M A5UWAN YM2DYN)
                                  Ground ARS             9/1/99                                  Details
   Jennifer Chase                 UPS                    9/7/99 5:00PM **         ReturnsCenter IN TRANSIT (M A5UWAN UWQ7V1)
                                  Ground                 9/1/99                                  Details
   Gianpietro Ottolini            UPS                    9/7/99 5:00PM **         ReturnsCenter IN TRANSIT (M A5UWAN F38YWN)
                                  Ground ARS             9/1/99                                  Details
   Caroline Richardson            UPS                    9/7/99 5:00PM **         ReturnsCenter IN TRANSIT (M A5UWAN U3FJHV)
                                  Ground ARS             9/1/99                                  Details
   Bernard Simpson                UPS                    9/7/99 5:00PM **         ReturnsCenter IN TRANSIT (M A5UWAN 2NRDJE)
                                  Ground ARS             9/1/99                                  Details
   Carla Smith                    UPS                    9/7/99 5:00PM **         ReturnsCenter IN TRANSIT (M A5UWAN UDD1XF)
                                  Ground ARS             9/1/99                                  Details
   Larry Schweitzberg             UPS                    9/7/99 5:00PM **         ReturnsCenter IN TRANSIT (M A5UWAN NV35Z6)
   Hermann'sGerman Auto Parts     Standard Overnight     9/6/99                                  Details
   Georgia Schrader               FedEx                  9/7/99 5:00PM **         ReturnsCenter IN TRANSIT (M A5UWAN DB9K4V)
   California Creative            One Day (PM)           9/6/99                                  Details
   Ernesto Storthenser            UPS                    9/7/99 5:00PM **         ReturnsCenter DELIVERED (M A5UWAN 3TNCHR)
   Baja Technologies              Two Days (AM)          9/5/99                                  Details
   Robert O'Farrell               UPS                    9/7/99 4:18AM            ReturnsCenter DELIVERED (M A5UWAN 9ETV6F)
   iShip.com                      Ground ARS             9/5/99                                  Details
   Scott J Bean                   UPS                    9/7/99 4:18AM            ReturnsCenter

** Indicates expected delivery date and time

*FIG. 46*

| Display | | To Be Delivered | | Sort By | |
|---|---|---|---|---|---|
| | — 620 | | — 622 | | — 624 |
| • All Returns | — 620-1 | • Today | — 622-1 | • Attention | — 624-1 |
| • Delivered | — 620-2 | • In 2 days | — 622-2 | • Carrier | — 624-2 |
| • Exceptions | — 620-3 | • In 3 days | — 622-3 | • Company | — 624-3 |
| • In-transit | — 620-4 | • In 4 days | — 622-4 | • Service | — 624-4 |
| • Return Requested | — 620-5 | • In 5 days | — 622-5 | • Ship Date | — 624-5 |
| | | • In 6 days | — 622-6 | • Status | — 624-6 |
| | | • In 7 days | — 622-7 | | |
| | | • This Week | — 622-8 | | |
| | | • In the next 7 days | — 622-9 | | |
| | | • In the next 14 days | — 622-10 | | |

FIG. 47

| MerchantSite.com | Returns Manager | Log Out | Help | iShip.com |

Merchant Logo

*View Inbound Return Shipment* iShip.com
Your Internet Package Shipper
User: John Smith

Return to View Inbound Return Shipments — 680

Tracking Information — 650
| | |
|---|---|
| Status: | RETURN REQUESTED |
| Delivered To: | |
| Delivery Date: | Tuesday, September 7, 1999** |
| Delivery Time: | 5:00 PM** |
| Delivery Location: | |
| Signed By: | |
| Carrier: | Retail Store Return |
| Service: | |
| Tracking Number: | M A5UWAN PLF45T |
| Ref Number: | |

Shipping TO
Merchant Name Retail Store
008-NYC
6000 Fifth Avenue
New York, NY 10001 USA
888-555-1212

** Indicates expected delivery date and time

— 633

Return Information — 660
| | |
|---|---|
| Return Authorization Number: | R-52586-98411 |
| Category: | Audio CD |
| SKU: | GEFWSP-150-001 |
| Item Description: | Natty Dread |
| Manufacturer: | Charlie Hunter Quartet |
| Quantity: | 1 |
| Item Price: | $12.99 |
| Item Tax: | $1.30 |
| Refund Amount: | $14.29 |
| Reason for Return: | Customer Choice |
| Customer Comments: | I thought this was the Bob Marley CD, not some jazz thing |
| Shipping Paid By: | N/A - walk-in return |

Original Order Information — 670
| | |
|---|---|
| Order Number: | A-52586-98411 |
| Order Date: | July 19, 1999 at 09:58 AM PDT |
| Order Status: | All items shipped |
| Customer Name: | Suzanna Smith |
| Customer ID: | 00184322 |

```
<iship.com.request xmlns="x-schema:http://iship.com/api/schema/trackrequest.xml"
transactionid="3855BD2185E111d3984400A0C9D6C226">
        <header mode="interactive">
                <version major="0" minor="1"/>
                <batch id="AE5E54F08E2311d3984900A0C9D6C226"
                url="http://shasta/api/track/trackresponse.asp" email="bob@iship.com"/>
        </header>
        <sigon sessionid="" userid="test" password="7777777"/>
        <trackit>
                <package sequencenumber="1">
                        <trackingnumber carrier="ups">
                                1Z18125302020075466
                        </trackingnumber>
                </package>
        </trackit>
        <logoff/>
</iship.com.request>
```

*FIG. 51*

```
<iship.com.response transactionid="3855BD2185E111d3984400A0C9D6C226">
        <status ishiprcode="0" signonrcode="0" trackitrcode="0" parsercode="0"
        systemrcode="0"/>
        <trackit>
                <package sequencenumber="1" packagercode="0">
                        <deliveredto></deliveredto>
                        <deliverylocation>LEFT AT 3S</deliverylocation>
                        <signedby>HOWARD</signby>
                        <lastscan>9/1/99 1:50:00 PM DELIVERY </lastscan>
                        <status>Delivered</status>
                        <deliverytime>9/1/99 1:50:00 PM</deliverytime>
                        <carrier>UPS</carrier>
                        <service>2ND DAY AIR</service>
                        <shipdate>8/28/99 </shipdate>
                        <trackingnumber>1Z18125302020075466</trackingnumber>
                        <scanlocation>FORT HAMILTON, NY US</scanlocation>
                        <weight>400</weight>
                </package>
        </trackit>
<iship.com.response>
```

*FIG. 52*

| | | | Inbound Manager | Help |
|---|---|---|---|---|

○ Monitor - Details

Package Information: 4150

Origin:
2289 East Main Street
Ellensburg, WA 98926, US — 4152

Destination: — 4151
ReturnsCenter
3309 East Pritchard
New York, NY 10001, US
888-555-1899

Package: — 506
10" x 8" x 5"
4 lb 2 oz — 500

Products Included:
2 — 4161

Service:
UPS Ground — 4119

Options:
Loss Protection — 516

○ Monitor
Reports
Preferences
Log Off

Shipping Charges:

Service Charge: $6.30 — 4153
Service Options: $ .35
Total Cost: $6.65 — 4154

Payment Type: — 4160
Your Company UPS Account
— 4162

Tracking Results:

Status as of 03/30/00, 02:32:30 PM Pacific Standard Time.

| Status. | DELIVERED — 4116 | [ Help] |
| Carrier. | UPS — 4119-1 |
| Service. | Ground — 4119-2 |
| iShip Number. | MAHEYZH89WBIT — 633 |
| Tracking Number. | 1Z3374W5040002374 — 450 |
| Reference Number. | MBEL02254 — 4155 — 4121 |
| Ship Date. | Monday, March 27, 2000 — 4156 |
| Destination: | BELLEVUE WA 98006 — 4122 |
| Expected Delivery Date: | Wednesday, March 29, 2000 |
| Expected Delivery Time. | 04:30:00 PM — 4157 |
| Signed By: | Clement — 4158 |

Original Order Information: 4163

Order Number: A-52586-98411 — 401
Order Date: 4/28/00, 09:58:23 AM — 407
Order Status: All items shipped — 673
Customer Name: Jacob Lewis — 627
Customer ID: 00184322 — 675

Product #1 Information: 4164-1

Record Key. 123456-011 — 4159-1
Authorization Number. R-52586-98411 — 661-1
Category: Audio CD — 662-1
SKU: GEFWSP150-001 — 700-1
Description: Natty Dread — 404a-1
Manufacture. Charlie Hunter Quartet — 404b-1
Quantity: 1 — 404c-1
Price: $12.99 — 173-1
Tax: $1.30 — 174-1
Refund Amount: $14.29 — 172-1
Shipping Paid By: Customer — 707-1
Reason for Return: Customer Choice — 427-1 — 425-1
Customer Comments: I thought this was the Bob Marley CD, not some jazz thing

Product #2 Information: 4164-2

Record Key. 123456-012 — 4159-2
Authorization Number: R-52586-99815 — 661-2
Category: Audio CD — 662-2
SKU: GEFWSP250-581 — 700-2
Description: Pink, Can't take Me Home — 404b-2 — 404a-2
Manufacturer: Arista Records
Quantity: 1 — 404c-2
Price: $12.99 — 173-2
Tax: $1.30 — 174-2
Refund Amount: $14.29 — 172-2
Shipping Paid By: Customer — 707-1
Reason for Return: Customer Choice — 427-1
Customer Comments: I thought this was a Pink Floyd album — 425-2 stamps
.com

◁ Back — 4171    ● Done — 4172

FIG. 58

Sorted: by most frequently returned item
Returns by SKU for Current Month   4306   4307   4309

| SKU | Warehouse 1 | Warehouse 2 | Warehouse 3 | Totals | Percent of Total |
|---|---|---|---|---|---|
| SKU1 | 311 | 515 | 230 | 1,056 | 16.8% |
| SKU2 | 597 | 179 | 222 | 998 | 15.9% |
| SKU3 | 499 | 233 | 215 | 947 | 15.1% |
| SKU4 | 17 | 70 | 729 | 816 | 13.0% |
| SKU5 | 220 | 201 | 259 | 680 | 10.8% |
| SKU6 | 251 | 171 | 123 | 545 | 8.7% |
| SKU7 | 335 | 53 | 64 | 452 | 7.2% |
| SKU8 | 103 | 146 | 106 | 355 | 5.6% |
| SKU9 | 96 | 111 | 61 | 268 | 4.3% |
| SKU10 | 54 | 59 | 58 | 171 | 2.7% |
|  |  |  |  |  |  |
| Totals | 2484 | 1740 | 2070 | 6,288 |  |

FIG. 61     4308

Sorted: by most frequently returned product category
Returns by Product Category for Current Week
4313

| Category | Totals | Percent of Total |
|---|---|---|
| Category6 | 702 | 23.5% |
| Category1 | 456 | 15.3% |
| Category10 | 399 | 13.4% |
| Category7 | 345 | 11.6% |
| Category4 | 321 | 10.7% |
| Category3 | 234 | 7.8% |
| Category9 | 211 | 7.1% |
| Category2 | 125 | 4.2% |
| Category5 | 116 | 3.9% |
| Category8 | 78 | 2.6% |
|  |  |  |
| Totals | 2987 |  |

*Sorted : by date*

*Expected Return Volume for Next Two Weeks*

| Date | Warehouse 1 | Warehouse 2 | Totals |
|---|---|---|---|
| Mon 6/5 | 1,000 | 750 | 1,750 |
| Tue 6/6 | 800 | 600 | 1,400 |
| Wed 6/7 | 256 | 175 | 431 |
| Thur 6/8 | 100 | 85 | 185 |
| Fri 6/9 | 25 | 15 | 40 |
| Mon 6/12 | 1,100 | 950 | 2,050 |
| Tue 6/13 | 875 | 750 | 1,625 |
| Wed 6/14 | 275 | 200 | 475 |
| Thur 6/15 | 125 | 100 | 225 |
| Fri 6/16 | 50 | 45 | 95 |
| | | | |
| Totals | 4,607 | 3,672 | 8,276 |

*Sorted: by most frequently cited return reason*
*Page 1 of 10*

Return Reasons for Product Category 1 for Current Quarter

| Reason | Totals | Percent of Total |
|---|---|---|
| Reason1 | 1,027 | 51.5 % |
| Reason2 | 567 | 28.4 % |
| Reason3 | 209 | 10.5 % |
| Reason4 | 117 | 5.9 % |
| All others reasons | 75 | 3.8 % |
| Totals | 1,995 | |

<new page>

FIG. 67a

*Sorted: by most frequently cited return reason*
*Page 2 of 10*

Return Reasons for Product Category 2 for Current Quarter

| Reason | Totals | Percent of Total |
|---|---|---|
| Reason4 | 1,331 | 41.4 % |
| Reason2 | 1,042 | 32.4 % |
| Reason1 | 408 | 12.7 % |
| Reason3 | 331 | 10.3 % |
| All others reasons | 101 | 1.0 % |
| Totals | 3,213 | |

<new page>
repeating for each Product Category
at end, grand total page for all Categories

FIG. 67b

Sorted: Expected Ship Date

Packages with No Scan for this week

| Package Tracking # | Carrier/Service | Expected Ship Date | Customer | Merchant Record # |
|---|---|---|---|---|
| MATKP9GUZFXG3 | UPS Ground | 06/19/2000 | MX123 | 20000619000001 |
| MFTKP9GUZFXG3 | UPS Ground | 06/19/2000 | RA333 | 20000619000022 |
| MHTKP9GUZFXG3 | UPS Ground | 06/19/2000 | ST553 | 20000619000008 |
| MTXKP9GUZFXG3 | UPS Ground | 06/20/2000 | DB881 | 20000620003001 |
| MT3KBP9GUZFXG | UPS Ground | 06/20/2000 | SG241 | 20000620000009 |
| MTQPC9GUZFXG3 | UPS Ground | 06/21/2000 | LK123 | 20000621000011 |
| M8OP9VGUZFXG3 | UPS Ground | 06/21/2000 | MK763 | 20000621000451 |
| MTKP9GWUZFXG3 | UPS Ground | 06/21/2000 | MX123 | 20000621030098 |
| M44P9GU3ZFXG3 | UPS Ground | 06/21/2000 | MX123 | 20000621001234 |
| MPLP9GUZ5FXG3 | UPS Ground | 06/21/2000 | RA427 | 20000621009876 |
| MEKP9GUZF6XG3 | UPS Ground | 06/22/2000 | ZL912 | 20000622000022 |
| MTUP9GUZFX7G3 | UPS Ground | 06/22/2000 | IG400 | 20000622000437 |
| M6XP9GUZFXGQ3 | UPS Ground | 06/22/2000 | DB881 | 20000622001204 |

FIG. 68

Late Packages for this week  
Sorted: Expected Delivery Date

| Package Tracking # | Carrier/Service | Expected Dlvry Date | Status | Customer | Merchant Record # |
|---|---|---|---|---|---|
| MATKP9GUZFXG3 | USPS Parcel P | 06/19/2000 | | MX123 | 20000619000001 |
| MFTKP9GUZFXG3 | UPS Ground | 06/19/2000 | In Transit | RA333 | 20000619000022 |
| MHTKP9GUZFXG3 | UPS Ground | 06/19/2000 | In Transit | ST553 | 20000619000008 |
| MTXKP9GUZFXG3 | USPS Parcel P | 06/20/2000 | | DB881 | 20000620003001 |
| MT3KBP9GUZFXG | USPS Parcel P | 06/20/2000 | | SG241 | 20000620000009 |
| MTQPC9GUZFXG3 | UPS Ground | 06/21/2000 | In Transit | LK123 | 20000621000011 |
| M8OP9VGUZFXG3 | UPS Ground | 06/21/2000 | Delivered | MK763 | 20000621000451 |
| MTKP9GWUZFXG3 | UPS Ground | 06/21/2000 | In Transit | MX123 | 20000621030098 |
| M44P9GU3ZFXG3 | USPS Parcel P | 06/21/2000 | | MX123 | 20000621001234 |
| MPLP9GUZ5FXG3 | UPS Ground | 06/21/2000 | Delivered | RA427 | 20000621009876 |
| MEKP9GUZF6XG3 | UPS Ground | 06/22/2000 | In Transit | ZL912 | 20000622000022 |
| MTUP9GUZFX7G3 | USPS Parcel P | 06/22/2000 | | IG400 | 20000622000437 |
| M6XP9GUZFXGQ3 | UPS Ground | 06/22/2000 | In Transit | DB881 | 20000622001204 |

FIG. 69

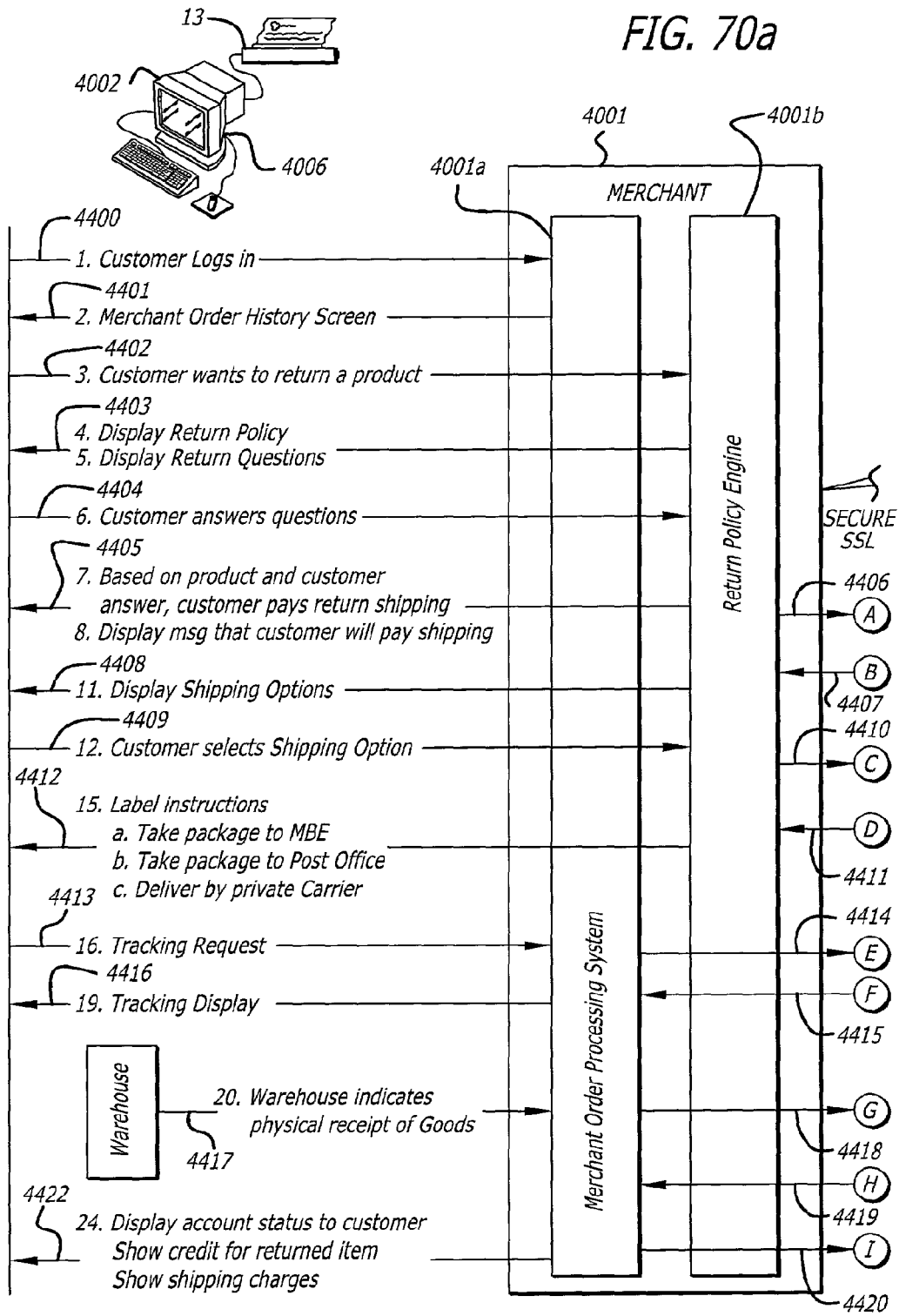

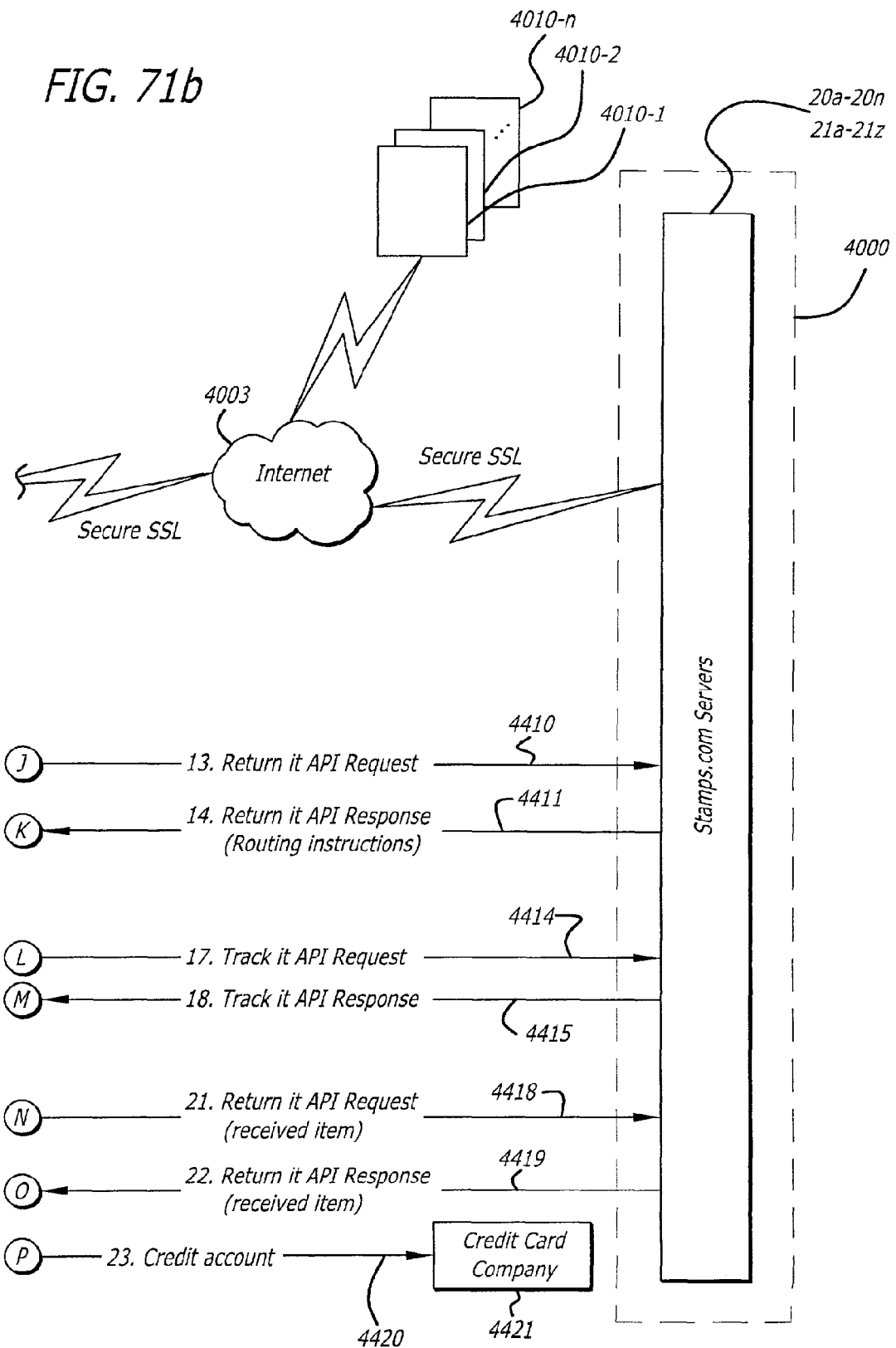

PRINT THIS LABEL NOW

DO NOT PHOTOCOPY

Using a photocopy could delay the delivery of your package and will result in additional shipping charges.

To prepare your parcel for shipment, you need to do the following:

Use the Print button in your browser to print this page to your laser printer.
Fold the printer page in half and use as the shipping label.
Affix the shipping label to the address side of your parcel so that the entire label is visible.
Completely cover any previous delivery address and barcode.
Do NOT overlap any adjacent side.
If tape or similar material is used to affix the label to the package it must NOT cover any part of the label where postage and fee information is to be recorded.
Obliterate any other addresses and barcodes on the outside of the parcel.
Take the parcel to a post office.
Drop in a collection box, or
Give to a postal carrier.
If a mailing acknowledgment is attached or insurance is marked on the label, the parcel must be taken to a post office.

FIG. 75b

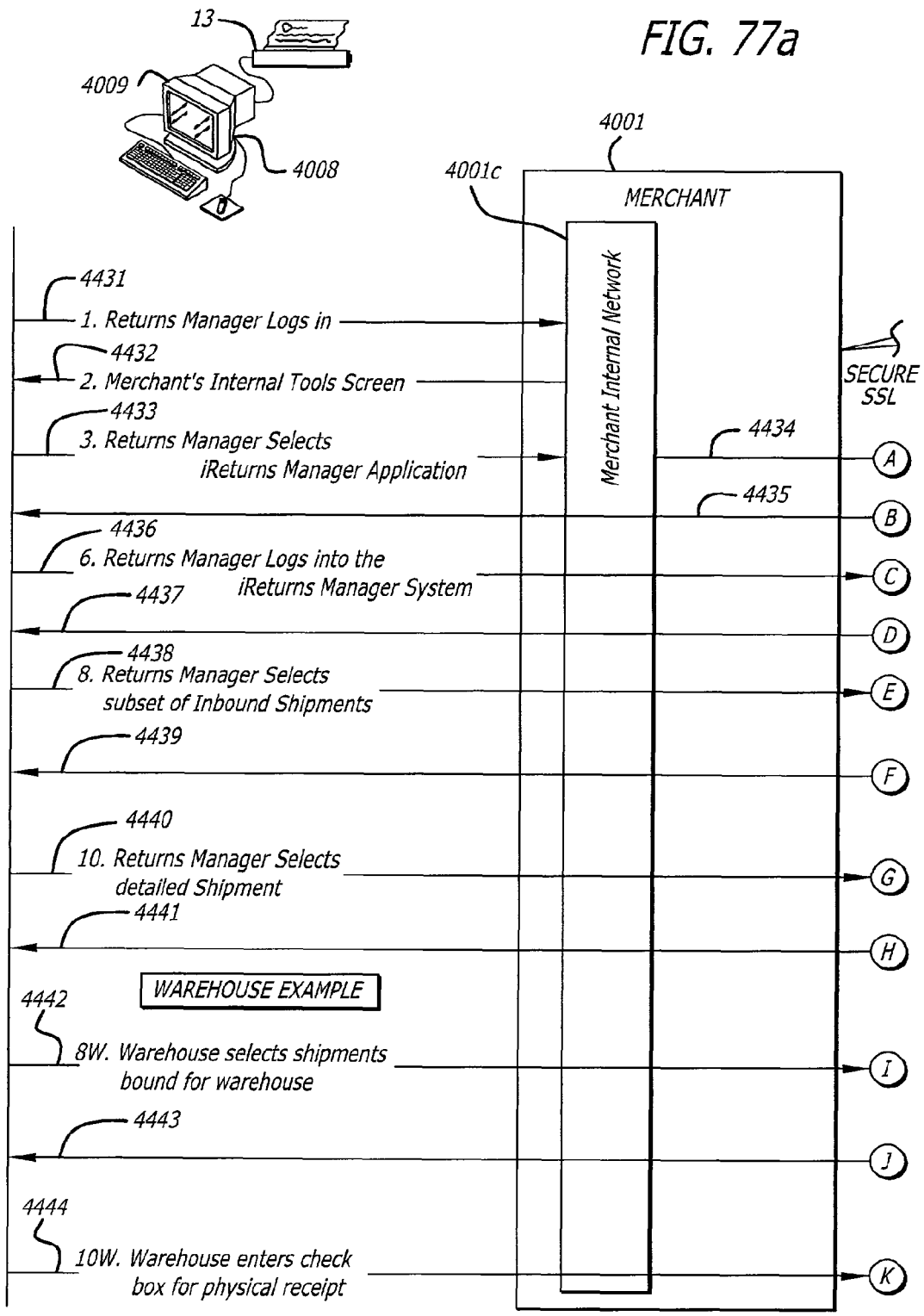

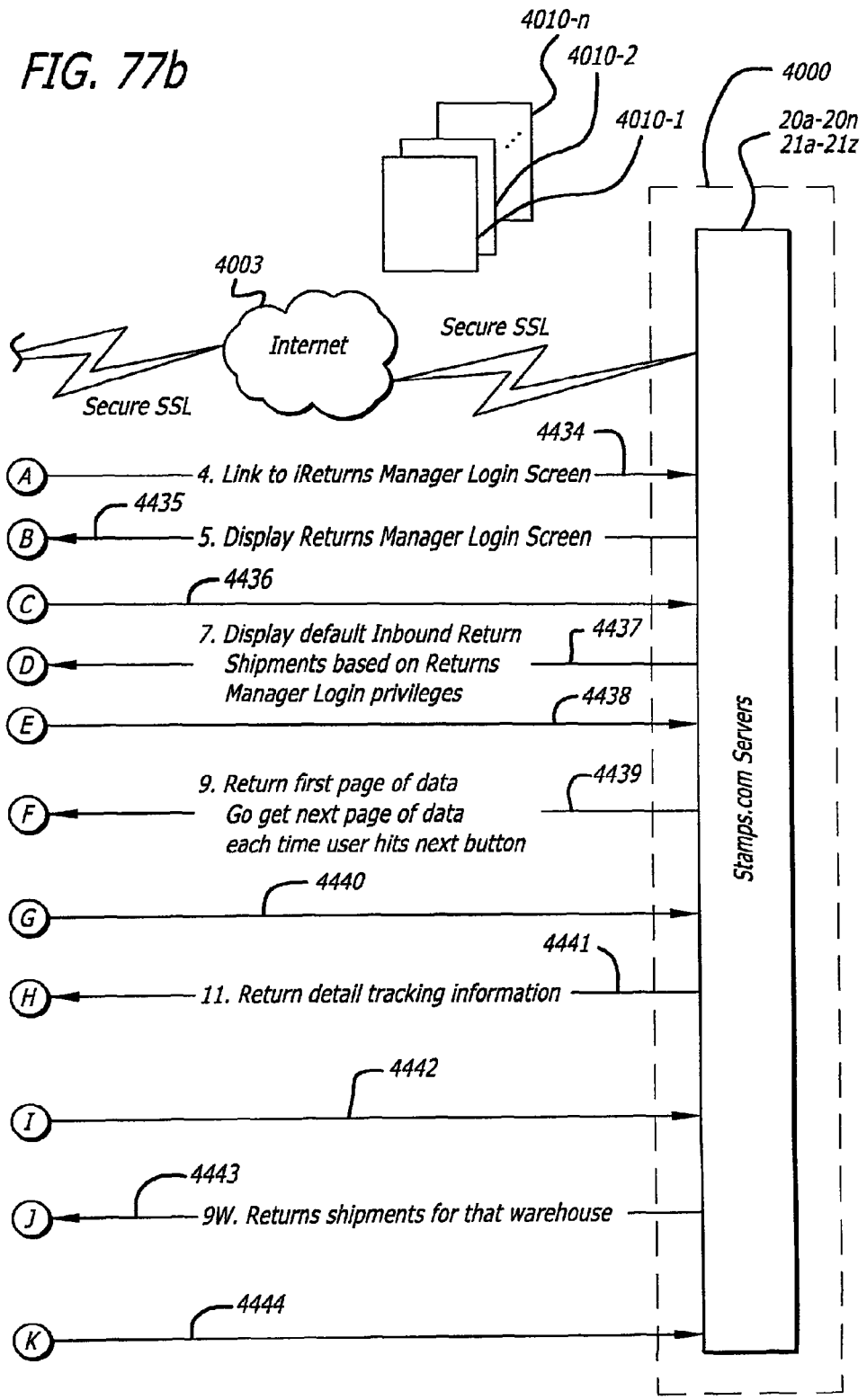

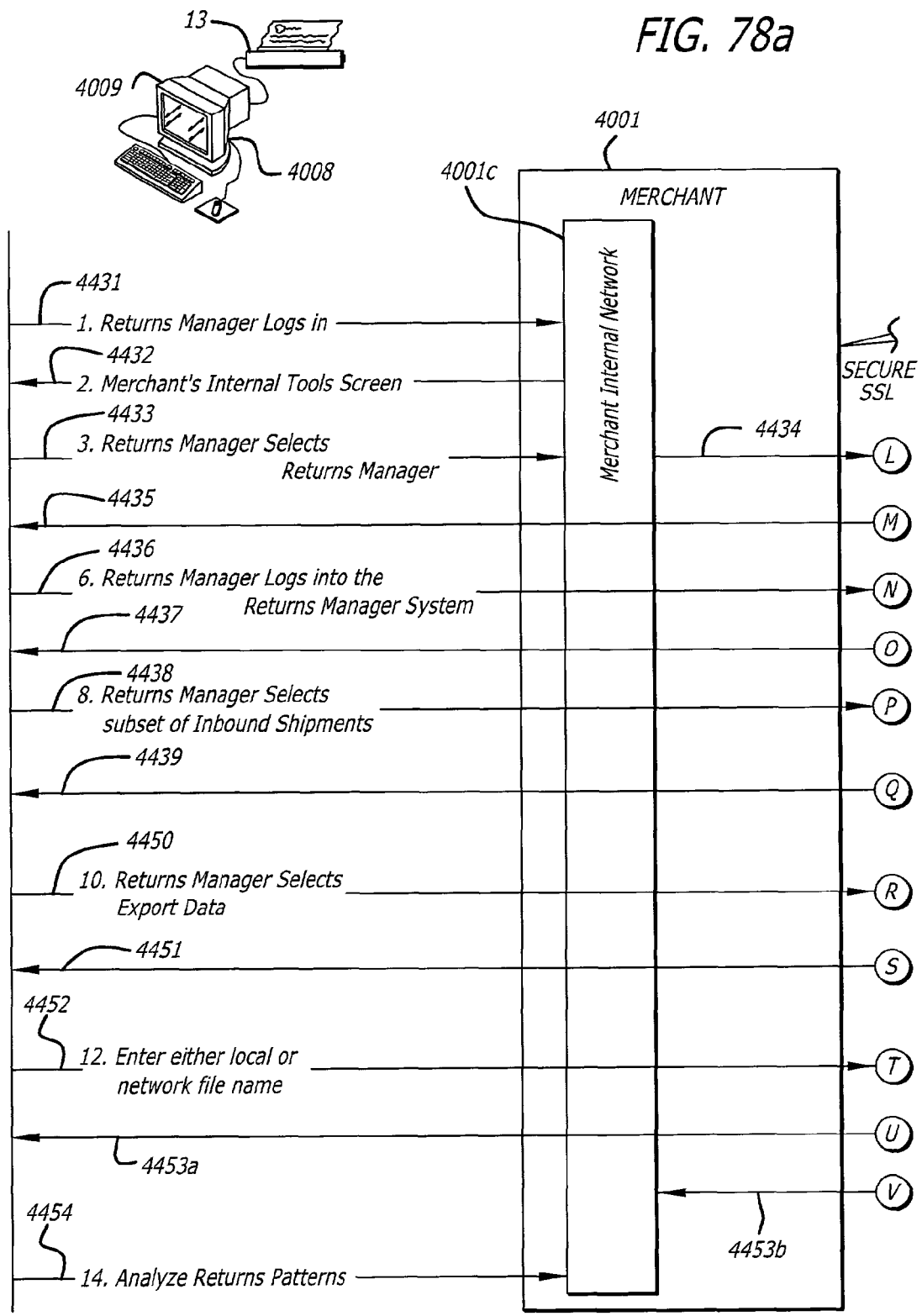

APPARATUS, SYSTEMS AND METHODS FOR ONLINE, MULTI-PARCEL, MULTI-CARRIER, MULTI-SERVICE PARCEL RETURNS SHIPPING MANAGEMENT

CROSS REFERENCE TO RELATED APPLICATIONS

This is a divisional application of U.S. application Ser. No. 09/820,292, which was filed Mar. 27, 2001 now U.S. Pat. No. 7,660,721, and which claims priority to U.S. Provisional Patent Application Ser. No. 60/192,692 filed Mar. 28, 2000, U.S. Provisional Patent Application Ser. No. 60/195,748 filed Apr. 6, 2000, and U.S. Provisional Patent Application Ser. No. 60/232,103 filed Sep. 12, 2000 the disclosures of which are incorporated for all purposes herein by reference as if fully stated here.

Reference is further made to U.S. patent application Ser. No. 09/684,010 (Online, Multi-Carrier, Multi-Service Parcel Shipping Management Functional Alignment of Computer Devices), Ser. No. 09/684,871 (Apparatus, Systems and Methods for Online, Multi-Carrier, Multi-Service Parcel Shipping Management Featuring Shipping Location Comparison Across Multiple Carriers), Ser. No. 09/684,870 (Apparatus, Systems and Methods for Online, Multi-Carrier, Multi-Service Parcel Shipping Management Featuring Parcel Handling Rules Comparison Across Multiple Carriers), Ser. No. 09/684,808 (Apparatus, Systems and Methods for Interfacing with Digital Scales Configured with Remote Client Computer Devices; now U.S. Pat. No. 7,359,887 B1; Issued: Apr. 15, 2008), Ser. No. 09/684,869 (Reporting Shipping Rates and Delivery Schedules for Multiple Service and Multiple Carriers), Ser. No. 09/685,078 (Apparatus, Systems and Methods for Online, Multi-Carrier, Multi-Service Parcel Shipping Management Featuring Notification Service Option Comparison for Multiple Carriers), Ser. No. 09/680,649 (Apparatus, Systems and Methods for Online, Multi-Carrier, Multi-Service Parcel Shipping Management Featuring Delivery Service Option Comparison for Multiple Carriers), Ser. No. 09/680,654 (Apparatus, Systems and Methods for Online, Multi-Carrier, Multi-Service Parcel Shipping Management featuring Shipping Rate and Delivery Schedule Comparison for Multiple Carriers), Ser. No. 09/684,865 (Apparatus, Systems and Methods for Applying Billing Options for Multiple Carriers for Online, Multi-Carrier, Multi-Service Parcel Shipping Management; now U.S. Pat. No. 7,117,170; Issued Oct. 3, 2006), Ser. No. 09/685,077 (Apparatus, Systems and Methods for Online, Multi-Carrier, Multi-Service Parcel Shipping Management Determination of Ratable Weight for Multiple Carriers), Ser. No. 09/684,014 (Apparatus, Systems and Methods for Zone Level Rating for each of Multiple Carriers), Ser. No. 09/684,861 (Apparatus, Systems and Methods for Determining Delivery Time Schedules for each of Multiple Carriers), Ser. No. 09/684,152 (Apparatus, Systems and Methods for Printing Dimensionally Accurate Symbologies on Laser Printers Configured with Remote Client Computer Devices; now U.S. Pat. No. 7,197,465; Issued Mar. 27, 2007), Ser. No. 09/684,866 (Apparatus, Systems and Methods for Online, Multi-Carrier, Multi-Service Parcel Shipping Management), all of which were filed Oct. 6, 2000 the disclosures of all of which are incorporated for all purposes herein by reference as if fully stated here, U.S. patent application Ser. No. 09/651,390 (Virtualized Printing of Indicia, Logos and Graphics) filed Aug. 29, 2000, U.S. patent application Ser. No. 09/651,389 (Method and Apparatus for Printing Indicia Logos and Graphics Onto Print Media) filed Aug. 29, 2000, and U.S. patent application Ser. No. 09/820,377 filed on Mar. 27, 2001.

FIELD OF THE INVENTION

The field of the present invention is computer systems for shipping management, and specifically online computer systems for parcel returns shipping management.

BACKGROUND OF THE INVENTION

Electronic commerce (sometimes referred to herein as "eCommerce") is a growing sector of the U.S. and world economy. As with traditional brick and mortar purchases, eCommerce purchasers sometimes desire to return one or more of the items purchased. eCommerce purchasers are sometimes dissatisfied with the procedure with which eCommerce merchants provide for returning eCommerce-purchased merchandise.

Electronic Commerce returns and exchange processing has been inefficient for both the consumer and the online merchant. Electronic Commerce consumers have experienced slow, inconvenient, clumsy returns and exchange processes online. The experience contrasts sharply with consumer expectations that returning a product online should be as easy as ordering it online.

Many eCommerce merchandisers use a return authorization system for processing eCommerce-purchased merchandise returns. Unfortunately, return authorizations can often be difficult for the consumer to obtain and can take a long time to receive. In some cases, online stores require customers to call a customer service center to request a return authorization. Calling customer service for a return authorization is inconsistent with an online shopper's preference for doing business online.

Some online merchants, on the other hand, require shoppers to compose a return email request. As yet another alternative, some online merchants provide return instructions on the back of a packing slip, but may not accept return of every item in the shipped order.

After authorizing a return, the online merchant mails out an Authorized Return Service label, such as a UPS Authorized Return Service label. This return authorization process results in a slow return and refund or exchange.

Refunds for returned items are often cumbersome and can take weeks to appear in the returning shopper's payment card accounts. Exchange requests can take even longer, especially if the exchange item is out of stock.

Once a return is authorized and the customer has all of the necessary paper work, returning the item is not necessarily an easy matter for the consumer. Even if the returning customer has retained the box and packing materials for the item to be returned, most online stores do not provide an easy way for customers to pass the return package to a carrier. Some merchants provide UPS call tags inside each box they ship.

It would sometimes be more convenient for customers to return or exchange merchandise at a brick and mortar store. However, physical brick and mortar stores may not accept returns from their online siblings.

eCommerce-purchased merchandise returns can also be a problem for online merchants. An inefficient returns and exchange process that causes individual customer dissatisfaction may result in online shopper defection to online stores that provide higher-quality return and exchange services.

The various methods mentioned above of providing returns and exchange services are inefficient for both the merchant and the returning consumer. Processing return and exchange requests by telephone requires the online merchant to provide expensive facilities, staff, and training. Furthermore, a customer service call center cannot match the convenience of the Internet for an online shopper. Return requests by email, telephone, and paper forms are collected with manual processes and/or in non-standard formats. This makes generating returns reports an expensive data-collection chore which is subject to the judgment of individual customer service reps.

Further, the manual returns and exchange processes described above do not necessarily provide online merchants with returns information in a timely manner. For example, merchants may not know a return is coming until the returned package arrives. The return might be due to defective merchandise or poor packaging that caused breakage. While the first return shipment is in transit, the merchant continues to ship defective or poorly-packaged merchandise.

Each online merchant has its own policy regarding returns and exchange processing. For example, many merchants are willing to pay for all return shipping to provide high-quality service. Other merchants are willing to pay for some return shipments, but not for expensive or ill-justified returns. Still other merchants want to accept all or some returns but are not willing to pay for their return shipment.

According to one commentator, "[t]here's no easy way to solve the problem [of returns]. Internet companies fall apart on this." (Melissa Barnes, The Yankee Group, in *Internet World*, Aug. 15, 1999.) Therefore, in order for eCommerce to prosper, a solution to managing eCommerce returns must be provided.

SUMMARY OF THE INVENTION

The present invention provides a computer system (the "System", or the "Return System") that is configured and programmed to provide online stores with a fast, simple, convenient way for eCommerce customers of an online store to return merchandise purchased from that store from within that online store.

In an exemplary embodiment described herein, the Return System has three major components: 1.) A Returns Manager Subsystem that provides a user interface to each Merchant to setup the Merchant's account, setup the Merchant's return policy and rules, and to monitor the status and movement of return shipments; 2.) A Consumer Returns Subsystem (also sometimes referred to herein as a "Customer Returns Subsystem") that provides each consumer using the Returns System with an online user interface that leads the consumer through the returns process, displays the return policies and rules to the consumer, provides shipping document to ship the return package if appropriate, and permits the consumer to track their return shipments; and 3.) a Returns Processing Subsystem that, in the exemplary embodiment, provides background shipping and tracking functionality. In one exemplary embodiment of the present invention, the Online Merchant integrates the Merchant's online system with the Returns Processing Subsystem.

In another exemplary embodiment, as described herein below, the Returns Processing Subsystem is provided as an independent web-based application service (referred to below as a "Return Merchant Service System") operated by a common provider, sometimes referred to herein as "iShip.com".

The above-described components are sometimes collectively and/or separately referred to herein as the System, and/or as the Return System. References to the Return System should be understood by someone with ordinary skill in the art to refer to the appropriate component and/or components of the system. It should be understood by someone with ordinary skill in the art that reference herein to Merchant setup, monitoring, tracking and other Merchant functions and interactions with the Return System are provided through the Returns Manager Subsystem of the Return System; and that reference to Consumer input, monitoring, tracking, and other Consumer functions and interactions with the Return System are provided through the Consumer Returns Subsystem of the Return System.

It should be further understood by someone with ordinary skill in the art that use of the System component terms described above is for illustrative purposes only and is not a limitation of the invention. Each of the above-described components can be integrated with the other as a single system without departing from the spirit of the present invention. Further, functions from each of the above-described Returns Manager and Consumer Returns components can be separately provided by a processing subsystem, such as the Returns Processing System, with communication interfaces with each of the other subsystems and with the system databases without departing from the spirit of the present invention. Without departing from the spirit of the invention, it should be understood by someone with ordinary skill in the art that in an alternative embodiment of the invention, the main components of the Return System can perform various levels of processing.

Each Merchant that wants to offer its customers with in-store access to the Return System 1 first accesses the Returns Manager Subsystem User Interface of the System to set up the Merchant's Account, and to establish rules governing the Merchant's returns, exchanges and refunds policy. The Return System 1 then provides a Customer Returns Subsystem and User Interface in the Merchant's online store to the Merchant's customers with which to facilitate the return shipping of merchandise.

The System provides each online store (sometimes referred to herein as eCommerce Provider or Merchant) with the capability to specify the store's individualized returns, exchange, and refund policies. The System enforces a consistent, standardized, and automated returns policy for each online store.

Among the returns policy options available through the System, customers can be issued an immediate, automated return authorization. Other returns policy options allow each online store to specify whether or not shipping charges are to be paid by the store or by the customer. The System further provides customers with the ability to print a return shipping label on a printer attached to the customer's personal computer directly from the online store.

The System provides for the return of items to different locations, including the online store's main warehouse, to secondary facilities, or to sibling retail locations.

The System further provides for the return of items through multiple carriers or through retail shippers, such as Mail Boxes Etc., thereby offering customers choices and insulating the online store from carrier labor strikes.

In the Merchant's online store, a customer makes a purchase, which is subsequently shipped to the customer (the "Consumer"). The Consumer if dissatisfied with the ordered item, wants to return it. To do so, the Consumer returns to the Merchant's online store, accesses the Consumer's order history for that Merchant, and arranges to return the item or items from the Merchant's online store.

The System collects, according to each online store's specification, consumer reasons for returning items and stores this information in a centralized database of return information. The System analyzes and reports the return data, and issues refunds to customers in accordance with the online store's refund policy.

The Return System 1 provides each participating Merchant with tracking capabilities for returned parcels. The Return System provides notification and tracking reports for inbound returns, allowing the store to prepare its receiving dock, and to respond to the return reason if appropriate such as by adjusting inventory or shipping practices to avoid continued potential for returns.

Because return shipping is arranged from within the online store, the System provides the returning consumer with the ability to immediately convert a return to an exchange, or into an additional order.

A Return Merchant Service System component of the computer System embodying the present invention interfaces and interacts with a Merchant's system to provide each subscribing eCommerce Merchant with various shipment management functions through Application Program Interfaces ("API") and web-based user Merchant interfaces, including but not limited to: shipment rating, shipment labeling, shipment tracking, shipment tracking management reports, returns analysis and returns management reporting. The present invention provides each Merchant's customers with pricing of shipping rates for various shipping options, processing of returns requests, printing of shipping, returns, or traveler labels at the customer's own laser printer, and tracking of each return shipment.

DESCRIPTION OF THE DRAWINGS

These and other features of the present invention are more fully set forth in the following description of exemplary embodiments of the invention. The description is presented with reference to the accompanying drawings in which:

FIG. 5c is high level interactivity diagram depicting an exemplary embodiment of the interactivity of the Returns Manager Subsystem between a Merchant's Client Machine and the Return System servers in an exemplary embodiment of the invention;

FIG. 5e is high level interactivity diagram depicting an exemplary embodiment of the interactivity of the Returns Monitor Page between a Merchant's Client Machine, the View Inbound Shipments and View Selected Details features of the Returns Manager Subsystem, and the Return System servers in an exemplary embodiment of the invention;

FIG. 8 is a graphic representation of an exemplary Company Information Screen in an exemplary embodiment of the invention;

FIG. 9 is a graphic representation of an exemplary User Administration Screen in an exemplary embodiment of the invention;

FIG. 10 is a graphic representation of an exemplary User Administration Screen in an exemplary embodiment of the invention;

FIG. 11 is a graphic representation of an exemplary Standard Policy Screen in an exemplary embodiment of the invention;

FIG. 12 is a graphic representation of an exemplary Return Shipping Options Screen in an exemplary embodiment of the invention;

FIGS. 13a through 13d are graphic representations of an exemplary Return Questions/Responses Page in an exemplary embodiment of the invention;

FIG. 13e is a graphic representation depicting an exemplary configuration of a three dimensional Situation Response Matrix in an exemplary embodiment of the invention;

FIG. 13f is a graphic representation depicting an exemplary configuration of a Question Table in an exemplary embodiment of the invention;

FIG. 13g is a graphic representation depicting an exemplary configuration of an Instruction Table in an exemplary embodiment of the invention;

FIG. 13h is a graphic representation depicting an exemplary configuration of a Response Table in an exemplary embodiment of the invention;

FIGS. 13i-1 and 13i-2 are high level flow diagrams depicting the flow of logic for applying a merchant's pre-established return policy logic in an exemplary embodiment of the invention;

FIG. 16 is a graphic representation depicting an exemplary first screen of the Exception Categories Page in an exemplary embodiment of the invention;

FIGS. 17a and 17b are graphic representations of exemplary Store Categories Screens in an exemplary embodiment of the invention;

FIGS. 18a and 18b are graphic representations of exemplary Web Page Configuration Screen in an exemplary embodiment of the invention;

FIG. 22 is a graphic representation of an exemplary Order Summary Screen for a particular Order Number for a particular Consumer from within a particular Merchant's Online store in an exemplary embodiment of the invention;

FIG. 23a is a graphic representation depicting an exemplary Returns Service Screen in an exemplary Merchant's Online store in an exemplary embodiment of the invention;

FIG. 24 is a graphic representation of an exemplary Returns Service Return Reason Screen in an exemplary embodiment of the invention;

FIG. 31 is a graphic representation depicting an exemplary Returns Service Screen in an exemplary Merchant's Online store in an exemplary embodiment of the invention;

FIG. 32 is a graphic representation of an exemplary Returns Service Return Reason Screen in an exemplary embodiment of the invention;

FIGS. 33-35 are graphic representations depicting exemplary Consumer Shipping Preferences Specification Screens in an exemplary embodiment of the invention;

FIG. 37 is a graphic representation depicting an alternative exemplary Dynamically Dimensioned Multi-Carrier, Multi-Service Graphic Array online display in an exemplary embodiment of the invention;

FIG. 38 is a graphic representation depicting an exemplary Shipping Summary Screen in an exemplary embodiment of invention;

FIGS. 39a through 39c are simplified flow diagrams depicting the initial Timing and Rating procedure to generate a Graphic Array in an exemplary embodiment of the invention;

FIG. 41 is a graphic representation depicting an exemplary Tracking Information Screen in an exemplary embodiment of the invention;

FIG. 42 is a graphic representation depicting an exemplary Items Ordered Screen in an exemplary embodiment of the invention;

FIG. 45 is a graphic representation depicting an exemplary alternative Tracking Information Screen in an exemplary embodiment of the invention;

FIG. 46 is a graphic representation depicting an exemplary View Inbound Return Shipments Screen in an exemplary embodiment of the invention;

FIG. 47 is a table depicting exemplary menus for each of the tracking criteria in an exemplary embodiment of the invention;

FIG. 48 is a graphic representation of an exemplary View Inbound Return Shipments Detail Screen in an exemplary embodiment of the invention;

FIG. 51 depicts an exemplary XML formatted request for submitting a tracking request to a Carrier in an exemplary embodiment of the invention;

FIG. 52 depicts an exemplary successful tracking response, also in XML format, returned by the Carrier in an exemplary embodiment of the invention;

FIG. 58 is a graphic representation depicting an exemplary Detail Tracking display for an exemplary Detail Tracking request in an exemplary embodiment of the invention;

FIG. 61 is a graphic representation depicting an alternative exemplary "Returns by SKU" Report in Plain Text style in an exemplary embodiment of the invention;

FIG. 63 is a graphic representation depicting an alternative exemplary "Returns by Product Category" Report in Plain Text style in an exemplary embodiment of the invention;

FIG. 65 is a graphic representation depicting an alternative exemplary "Expected Return Volume" Report in Plain Text style in an exemplary embodiment of the invention;

FIGS. 67a and 67b are graphic representations depicting alternative exemplary "Return Reasons" reports in Plain Text style in an exemplary embodiment of the invention;

FIG. 68 is a graphic representation that depicts an exemplary "Packages With No Scan" report in Plain Text style in an exemplary embodiment of the invention;

FIG. 69 is a graphic representation that depicts an exemplary "Late Packages" report in Plain Text style in an exemplary embodiment of the invention;

FIG. 75b is a graphic representation depicting exemplary instructions describing how to print and use an exemplary United States Parcel Service Electronic Merchandise Return label in an exemplary embodiment of the invention;

FIG. 77 is a high level interactivity diagram depicting exemplary interactivity between a Merchant and the iReturn Merchant Service Servers to request Tracking information in an exemplary embodiment of the invention.

DETAILED DESCRIPTION OF THE INVENTION

Figure 1:
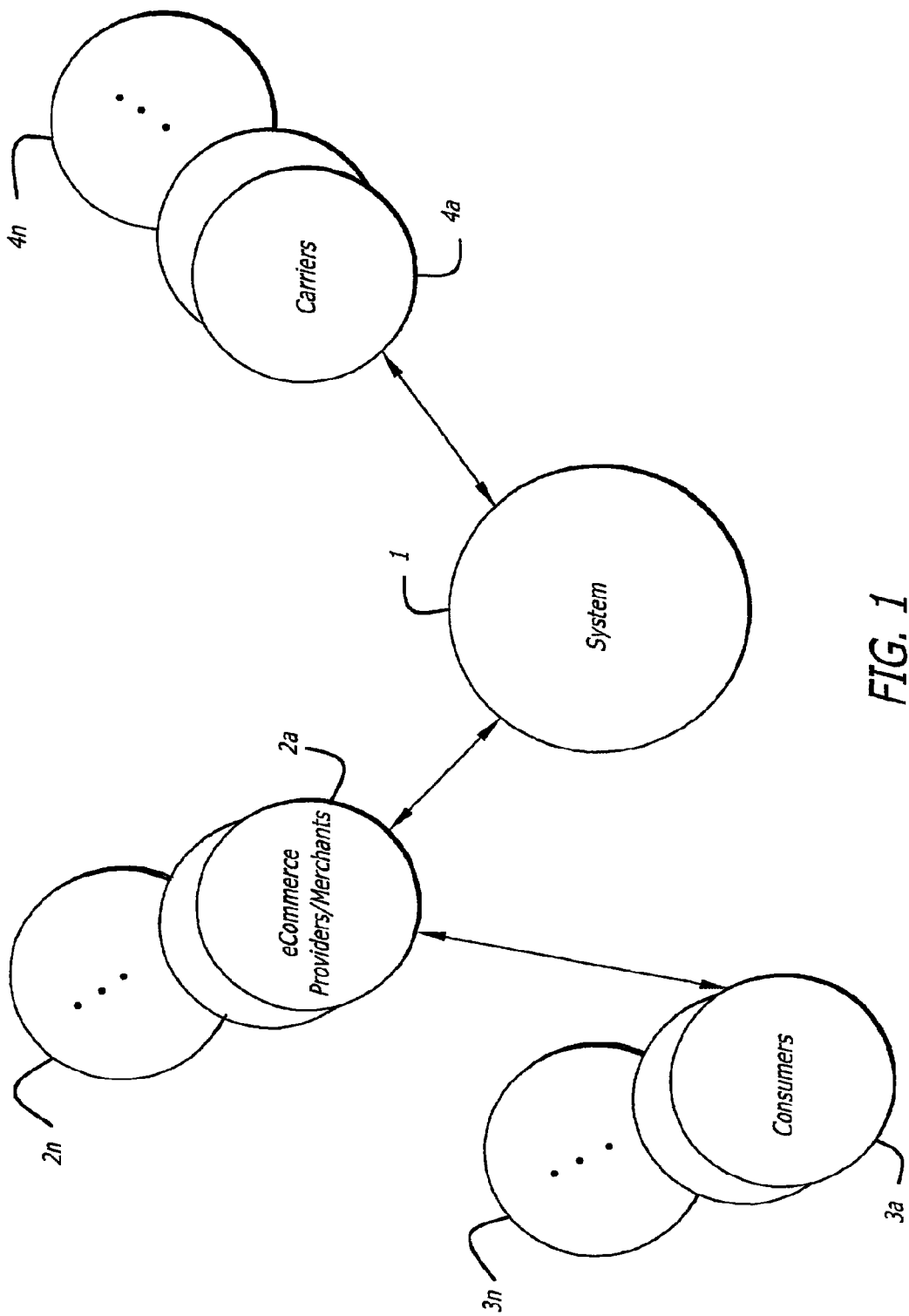
FIG. 1 is a graphic representation depicting the interface relationships provided by the System of the present invention between electronic Commerce providers, Consumers, and Carriers.

A portion of the disclosure of this patent document, including but not limited to the renderings of graphic user interface displays in the FIGURES, contains material which is subject to copyright protection by Stamps.com, Inc. Stamps.com, Inc. has no objection to the facsimile reproduction by anyone of the patent document or the patent disclosure, as it appears in the Patent and Trademark Office patent file or records, but otherwise reserves all copyright rights whatsoever.

"iShip.com", "iShip", "The Internet Package Shipper", "Price It", "Sell It", "Track It", "Ship It", "Shipping Tools", "My iShip" and associated logos are trademarks of Stamps.com, Inc. The names of actual companies and products mentioned herein may be the trademarks of their respective owners.

The computer System of the present invention provides a plurality of online eCommerce Merchants with a single User Interface ("UI") with which each eCommerce Merchant can provide the Merchant's Consumers with an automated return parcel management system for a plurality of supported Carriers.

There are two primary User Interface aspects of the invention, a Returns Manager Subsystem User Interface for the Merchant's "Back Office" (sometimes referred to herein as a "Return Policy Engine"), and a Consumer Returns Subsystem User Interface available to the Consumer through the Merchant's online store.

The Return Policy Engine component of the computer System embodying the present invention provides each of a plurality of online eCommerce Merchants with a User Interface ("UI") with which each eCommerce Merchant can, among other things: 1.) establish parameters for, and describe, the Merchant's return and exchange policy, including exception processing; 2.) authorize return shipping options, selected by the Merchant from a plurality of services offered by a plurality of carriers, to which the Merchant's consumers will be given access by the System; 3.) build a question dialog for consumers with which the System will determine why each customer is returning merchandise; and 4.) construct automated e-mail response formats with which to communicate with consumers.

The Returns Policy Engine/Returns Manager Subsystem User Interface for the Merchant's Back Office is an integrated set of tools with which the Merchant can: 1.) View inbound returning merchandise shipments in summary or in detail; 2.) Track shipments for multiple carriers with only one tracking number; 3.) Analyze return patterns and trends; 4.) Administer the returns process; 5.) Setup account names and access privileges; 6.) Establish the parameters for automatic enforcement of their store's return policy; 7.) Build return shipping options; 8.) Build questions to determine why customer is returning merchandise; 9.) Build return policy exceptions; 10.) Build automated Email responses; 11.) Build integration links between the merchant's site and the Returns Manager Subsystem.

A Customer Returns User Interface component of the computer System embodying the present invention provides each customer of an eCommerce Merchant (for which the Return Policy Engine has been installed and the necessary parameters established) with a User Interface with the relevant eCommerce Merchant's online store with which the customer interacts to return or exchange an item of merchandise.

Different types of embodiments for the Customer Returns Subsystem and User Interface features of this invention include, among others: 1.) a Customer Returns Desktop application with a Returns Back Office application; 2.) Customer Returns Integrated—a web enabled application and user interface integrated into the Merchant's site; and 3.) Customer Returns API—Application Programming Interfaces written, e.g., in XML designed to pass data for integration into the Merchant's site.

Each of the different types of embodiments of the invention give the Merchant an automated returns functionality including such features, among others, as: 1.) a step-by-step "wizard" (user interface software) that leads each customer through the merchandise return process; 2.) a return policy established with the Returns Manager Subsystem for the Back Office application; 3.) automatic enforcement of return policy rules; 4.) supports both merchant and customer paid return shipping scenarios; 5.) customer (Consumer) tracking of returned merchandise via multiple carriers; and 6.) automatic feed of shipment data to the Returns Manager Subsystem for the Back Office application.

FIG. 1 is a graphic representation depicting the interface relationships provided by the System 1 of the present invention between a plurality of electronic Commerce providers ("Merchants") 2a-2n, Consumers 3a-3n, and Carriers 4a-4n.

It should be noted that the use of suffixes such as "a" through "n" in connection with numbered elements of the FIGURES herein are exemplary and are not a limitation of the invention. Rather, the suffixes "a" through "n" are used to represent a plurality, but unknown number, of similar elements.

As conceptually depicted in FIG. 1, a Consumer, e.g., 3a that has purchased merchandise from an online Merchant, e.g., 2a, can visit the online Merchant's store, e.g., 2a, to arrange to return an item of merchandise. The online Merchant's store 2a provides the Consumer 3a with access to the Return System 1 through which the Consumer interfaces with supported Carriers 4a through 4n. Carriers supported by the System include Carriers such as Airborne, FedEx, United Parcel Service, USPS, and Yellow Freight. The System 1 is completely expandable and scalable to include additional Carriers.

Figure 13:
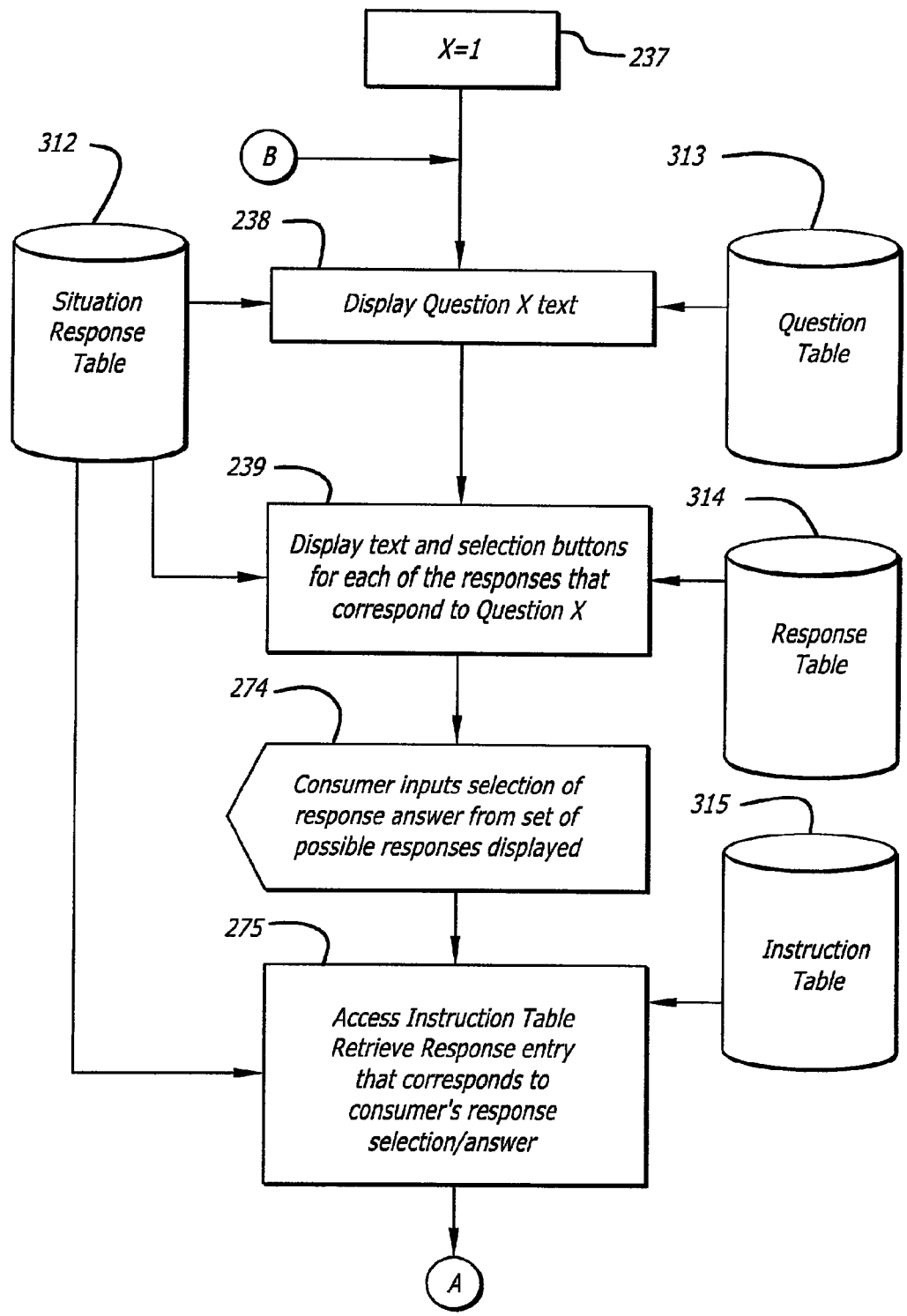
Figures 2, 13I:
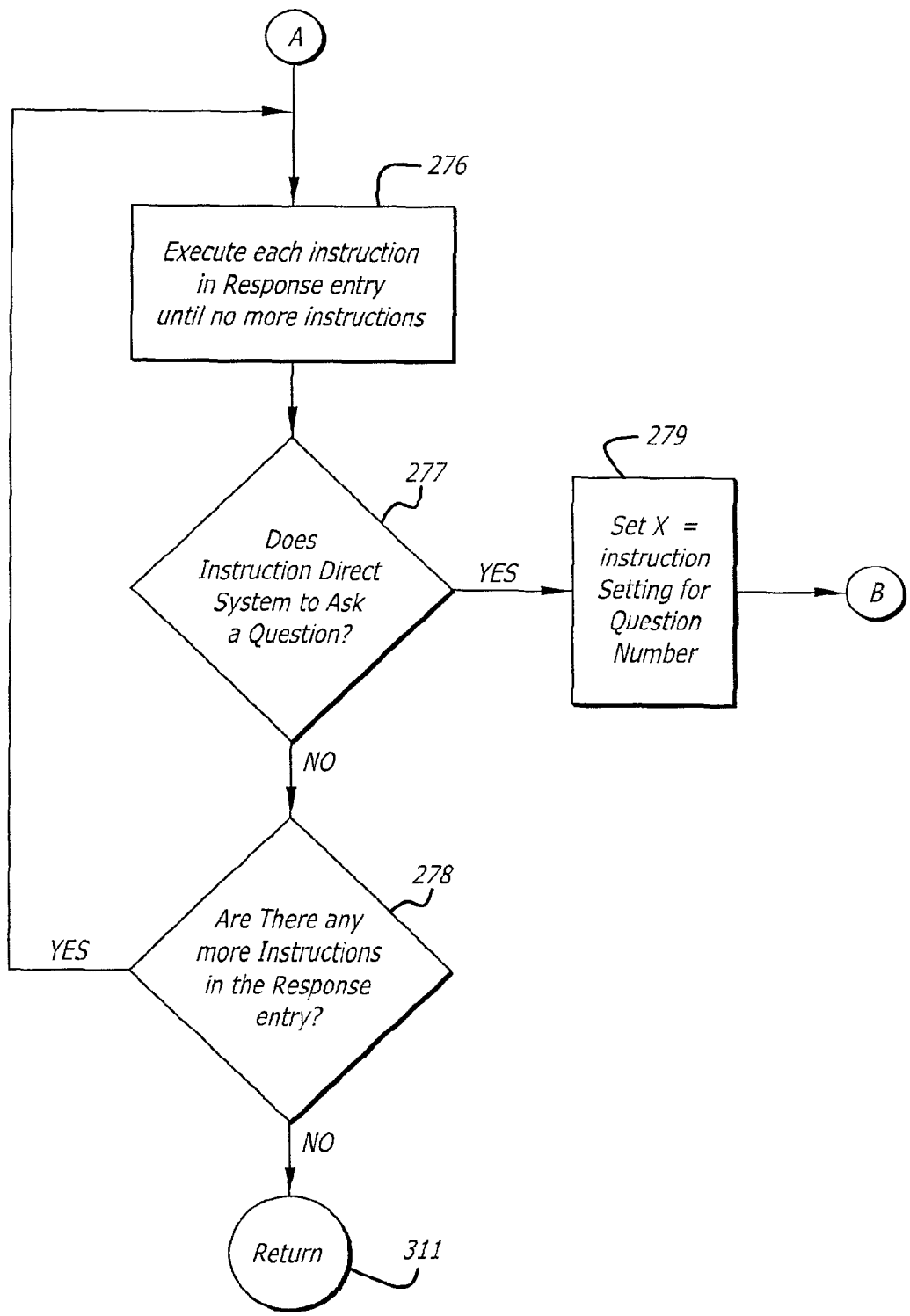

As depicted in FIG. 2, each User 7 (which may be either a Merchant or a Consumer) has access to a computer 8, for instance a personal computer ("PC"). The computer 8 is configured with a display device 9 that provides a display screen 10. The computer 8 is further configured with one or more user input devices, such as, for example, a keyboard 11 and a mouse 12. The computer 8 is also configured with a printing device 13, such as a laser printer. If the computer device 8 serves as a Shipping Station, the computer 8 may be further configured with a weighing device such as a scale 1024 and a bar code reader 1027.

Users access and browse the Internet 15 using a web browser 14 that generally resides and is executed on the user's PC 8. The web browser 14 allows the Shipper/User 7 to retrieve and render hyper-media content from one or more of a Merchant's Server computers, e.g., 16. Commercially available web browsers include, e.g., Netscape's Navigator™ and Microsoft Internet Explorer™. The Merchant's Server computer 16 is linked to the Return Shipping System Server 17.

Figure 3A:
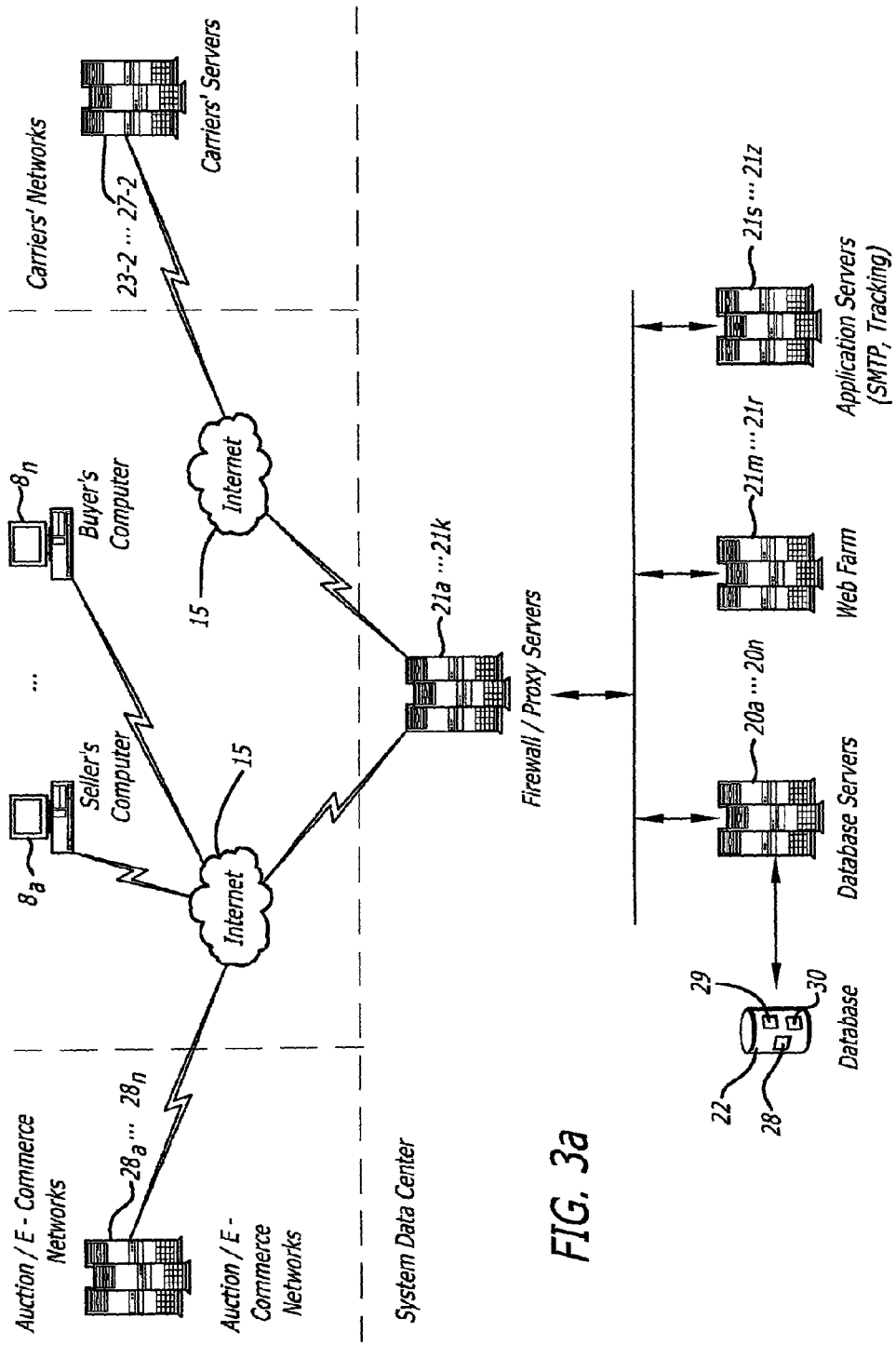
FIG. 3a is a graphic representation of an exemplary configuration of the System, and relationships with Carriers and eCommerce Providers.

FIG. 3a is a graphic representation depicting an exemplary view of the System Data Center and its interfaces with Consumer computers 8a-8n, Carrier Server computers 23-2 through 27-2, and eCommerce/eAuction Providers/Merchants 28a-28n, via the Internet 15.

As depicted in FIG. 3a, the System provides a plurality of server computers 20a-21z ("servers" or "server computers"). Some of the server computers are configured as Web servers, e.g., 21m-21r. The Web servers 21m-21r are configured to perform multi-parcel, multi-carrier, multi-service parcel shipping management functions. The Web servers 21m-21r are sometimes referred to herein as "shipping servers" or "shipping Web servers".

Other servers are configured as Database Servers. In an exemplary embodiment of the invention, the Database Servers are SQL Servers. Some of the Database Servers are configured to access Rating Database Data. The Database Servers that are configured to access Rating Database Data are referred to as the Rating Servers.

The Web server computers communicate through the Internet with client computers or with server computers, e.g., 16, of a calling Merchant's system.

In the exemplary embodiment of the invention, the system further provides at least one server computer that acts as a scheduler or "Load Balancer". The Load Balancer selects one of the plurality of shipping Web servers 21m-21r based on the load of work performed by that selected shipping Web server as compared to the other shipping Web servers. The Load Balancer directs incoming data to the selected shipping Web server for processing.

Figure 3B:
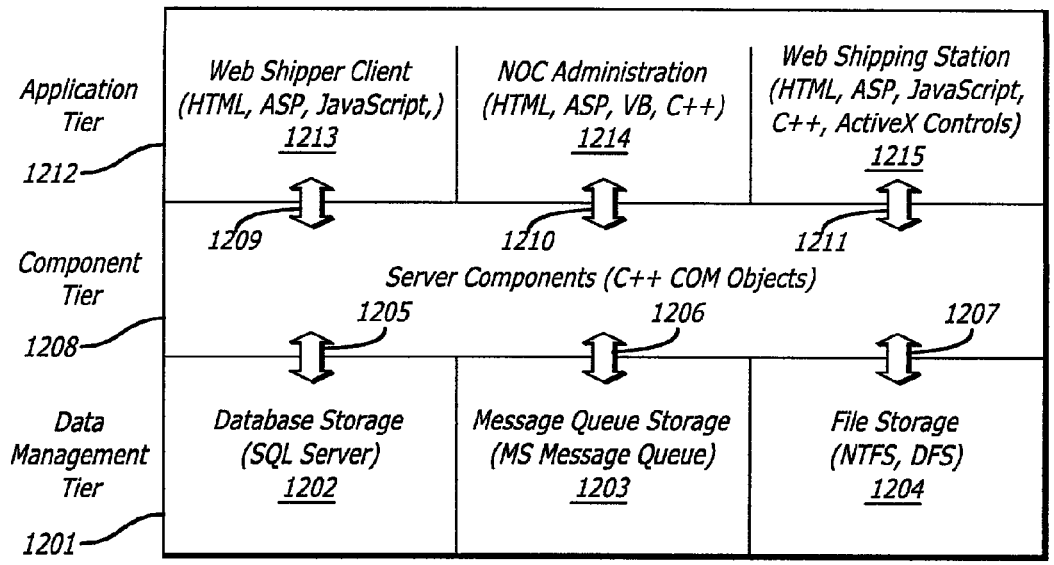
FIG. 3b is a high level System component diagram depicting an exemplary System Architecture in an exemplary embodiment of the System in an Internet environment.

An overview of an exemplary System architecture is depicted in FIG. 3b. The overview depicted is exemplary and meant to be illustrative; it is not a limitation of the invention. As depicted in FIG. 3b, one embodiment of the invention uses a three-tiered architecture.

The Data Management Tier 1201 is comprised of a Database Storage component 1202 that in the embodiment depicted uses an SQL Server; a Message Queue Storage component 1203 that in the embodiment depicted uses MS Message Queue; and a File Storage component 1204 that in the embodiment depicted uses NTFS, and DFS. Each of the Database Storage component 1202, the Message Queue Storage component 1203, and the File Storage component 1204, communicate with the Component Tier 1208 of the System architecture, communications by each component with the Component Tier 1208 represented by elements 1205, 1206 and 1207 respectively. According to the embodiment depicted in FIG. 3b, the Server Components of the Component Tier 1208 use C++ programming language and COM Objects.

The Application Tier 1212 of the System Architecture is comprised of a Web Shipper Client component 1213 (which uses HTML, ASP and JavaScript), the NOC Administration component 1214 (which uses HTML, ASP, VB, and C++), and the Web Shipping Station component 1215 (which uses HTML, ASP, JavaScript, C++, and ActiveX Controls). Each of the Web Shipper Client component 1213, the NOC Administration component 1214, and the Web Shipping Station component 1215 communicate with the Server Components of the Component Tier 1208 as represented by the communication elements 1209, 1210 and 1211 respectively.

In one embodiment, the System is implemented in an NT environment. The description of the System as being implemented in an NT environment is exemplary and is not a limitation of the invention.

Returning to FIG. 3*a*, the System Database Servers 20*a*-20*n* maintain System Database(s) 22. The System Database(s) 22 contain many types of information. For example, when a Consumer returns a package using the System 1, one or more of the System's Database Servers, e.g., 20*a*-20*n*, create a new System tracking number. When a new System tracking number is created, one of the System's Database Servers, e.g., 20*a*-20*n*, adds a new package record with the newly created System tracking number to a Package Table 28 that resides in the System database 22 and contains package records for System processed packages.

An exemplary embodiment of the Package Table 28 contains the following information for each package: 1) Package Tracking State ID; 2) Package Shipping State ID; 3) Actual Delivery Time; 4) Delivered To information; 5) Shipping Date; 6) Carrier Tracking Number; 7) System Tracking Number; 8) Carrier ID; 9) Actual Package Weight; 10) Service Description; and 11) Package OID. The content of these fields are described further below.

The System's Database Servers 20*a*-20*n* maintain a Product Table 30. An exemplary embodiment of a Product Table 30 contains the following information for each Product: 1) Product Code—such as the product SKU; 2) Product Category—often a merchant specified grouping mechanism; 3) Merchant's Return Merchandise Authorization ("RMA") Number (In the exemplary embodiment, each product has a corresponding RMA); 3) Product Description; 5) Product Manufacturer; 6) Product Quantity; 7) Product Price; and 8) Product Tax.

The System's Database Servers 20*a*-20*n* also maintain a Package History Table 28, described in more detail below.

In the exemplary embodiment of the invention, tracking is performed whenever possible using carrier-specific Tracking API's (Application Program Interface). For a Tracking API, a Carrier predefines a layout for tracking requests and predefines a layout for tracking request responses. The System 1 then provides tracking request data according to the layout predefined by the particular carrier. When the System 1 receives tracking request response data from the particular Carrier, the System 1 parses the response data according to the tracking request response layout predefined by the particular Carrier. In order to communicate with each Carrier's system, the System 1 uses the particular Carrier's Internet URL for the particular Carrier's web server system with which to make an HTTP connection to the Carrier's web server, e.g., 23-2, Depending upon the Carrier, the System's 1 tracking request and response interface with the Carrier's web server may be formatted and programmed using HyperText Markup Language ("HTML"), Extensible Markup Language ("XML"), both HTML and XML, or any requirement specified by a Carrier.

In the exemplary embodiment of the invention, in cases in which a particular Carrier does not support an API, the System performs tracking using an alternative approach sometimes referred to as "web scraping". In order to track using the web scraping approach, the System 1 communicates with a Carrier by formatting HTML queries to the Carrier's Internet Website. The System 1 is programmed to receive and parse HTML responses from that Carrier's Website. The web scraping process simulates the presence and interactivity of a user at the particular Carrier's Website.

In one embodiment, the Returns Manager Subsystem for the Back Office product requires Microsoft's Internet Explorer version 5.01 or higher; the Customer Returns software requires either Netscape version 4.0 or Internet Explorer version 4.0 or higher.

A. Returns Manager Subsystem and User Interface-Merchant Administration

Figure 4A:
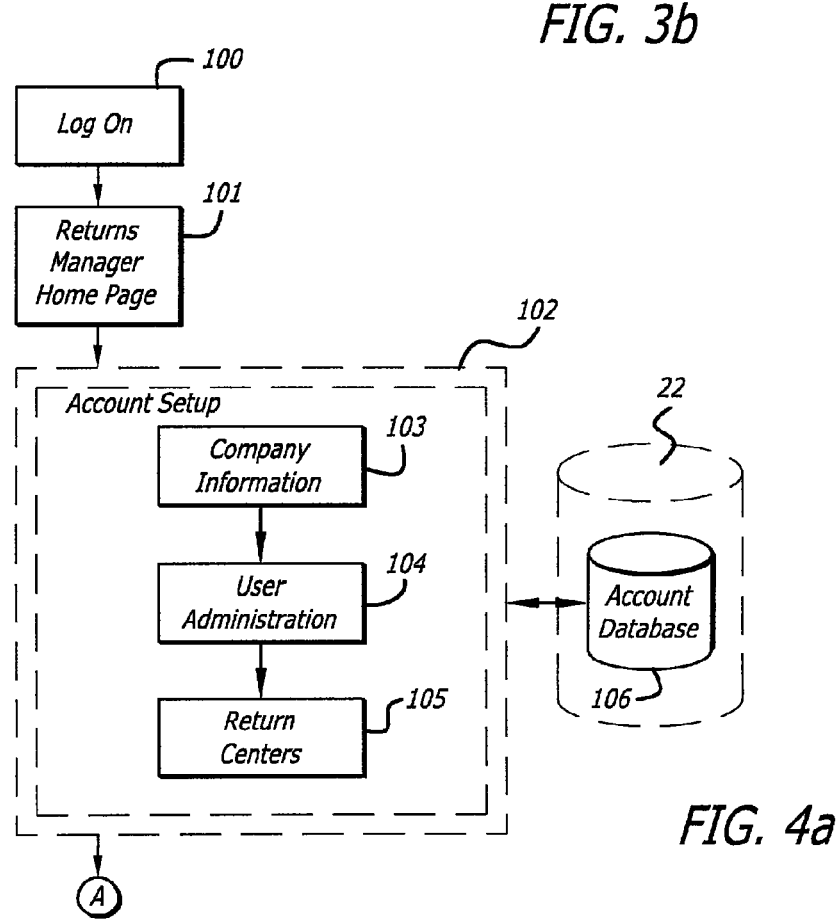
FIGS. 4a through 4c are high level logic flow diagrams depicting an exemplary Merchant experience within an exemplary embodiment of the Return System.
Figure 4B:
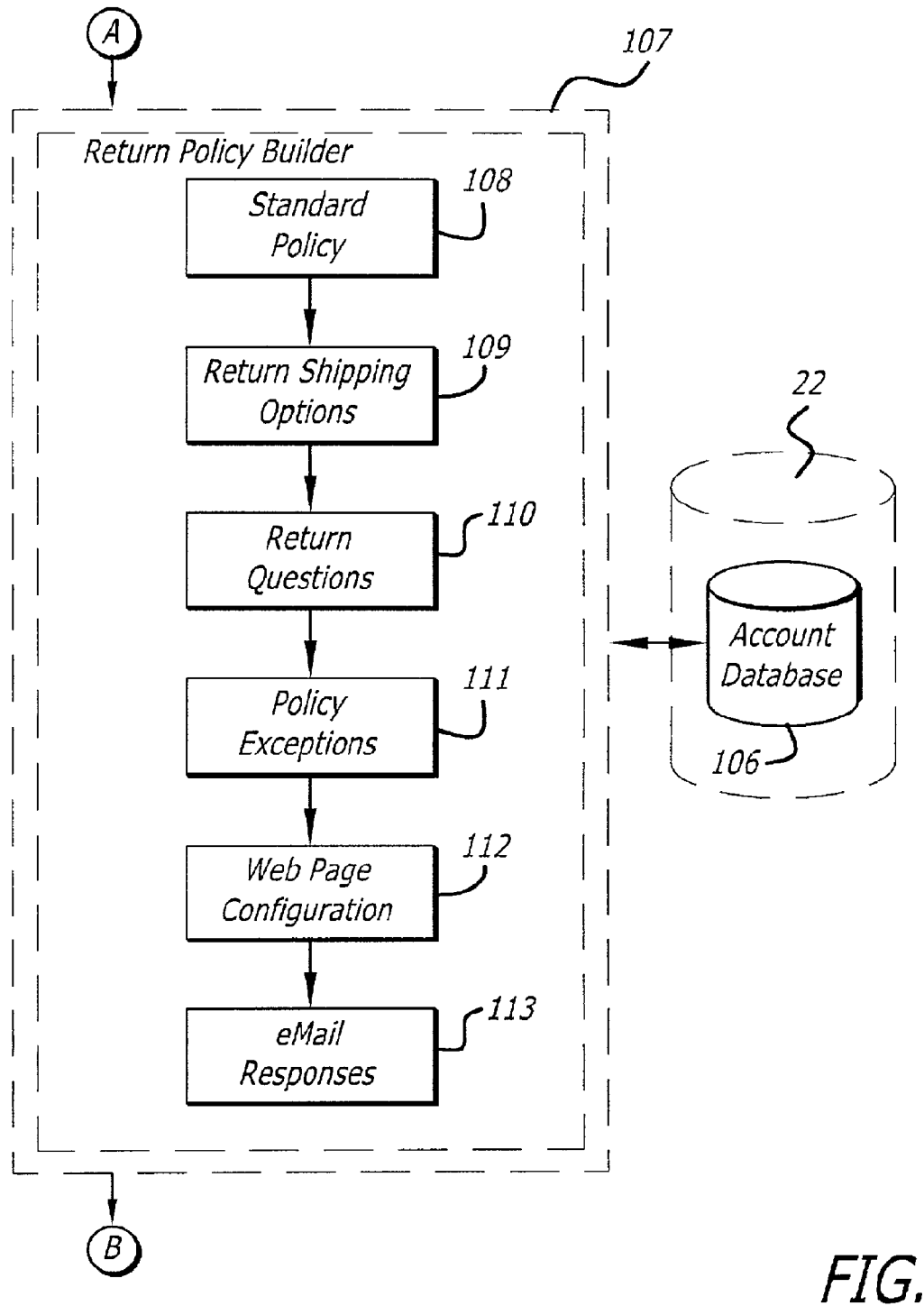
Figure 4C:
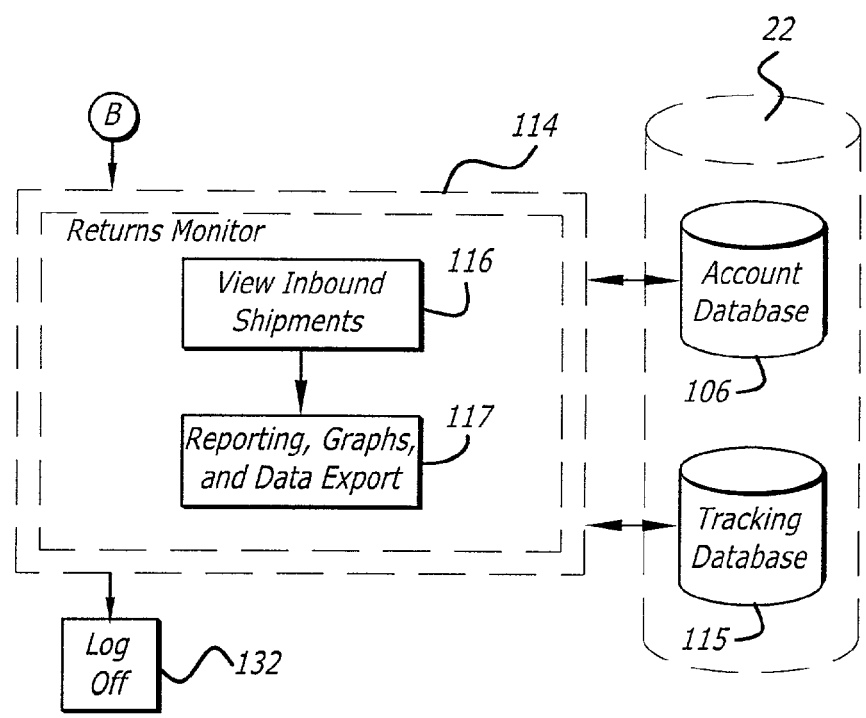

FIGS. 4*a* through 4*c* are high level logic flow diagrams depicting an exemplary Merchant experience within an exemplary embodiment of the Returns Manager Subsystem provided by the Return System. An exemplary embodiment of the Returns Manager Subsystem User Interface provided by the Return System provides a high level menu from which each Merchant can access the Return System.

Figure 5A:
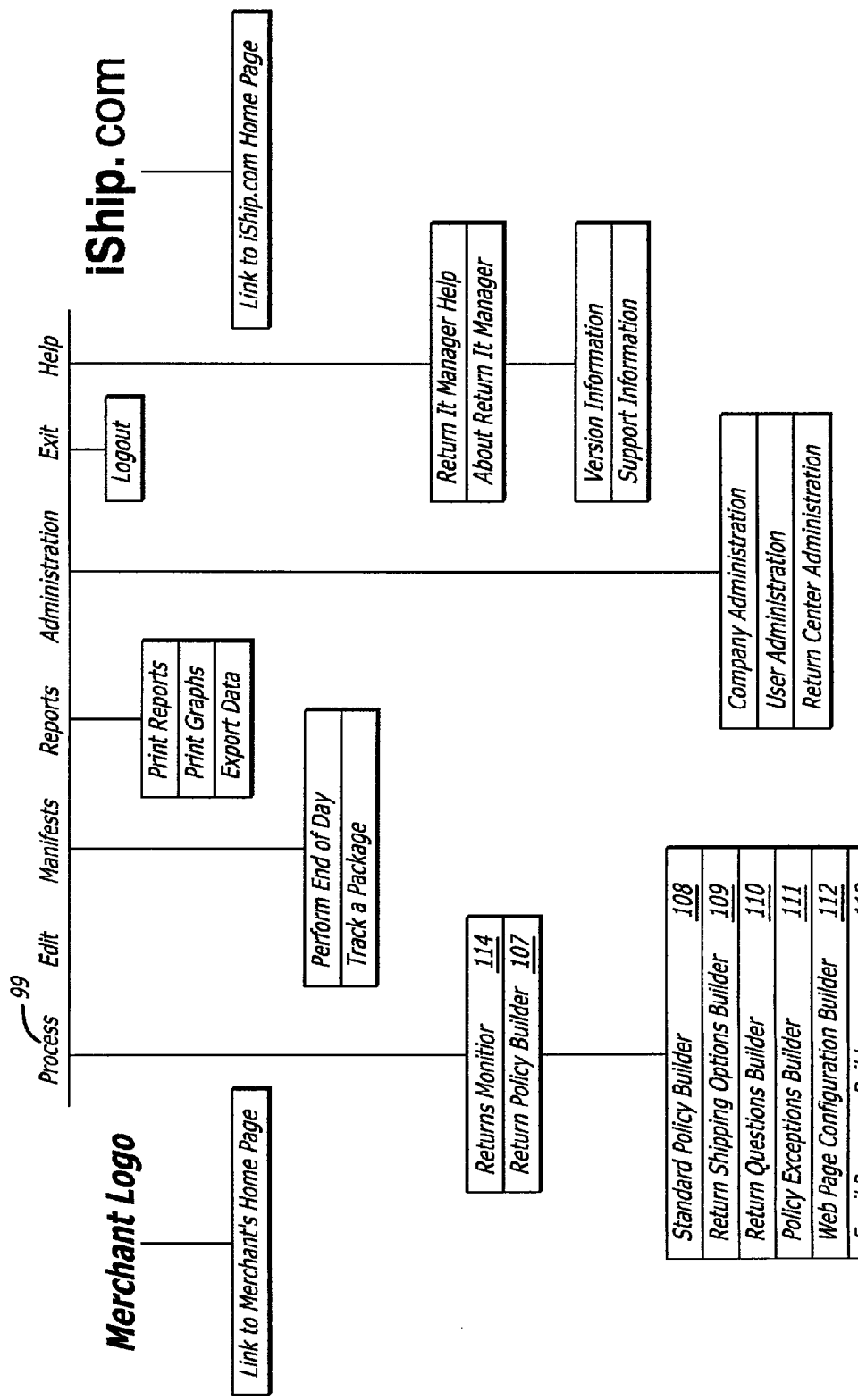
FIG. 5a is a graphic representation depicting an exemplary main menu and an exemplary submenu hierarchy in an exemplary embodiment of the invention.

FIG. 5*a* is a graphic representation depicting an exemplary main menu and an exemplary submenu hierarchy in an exemplary embodiment of the invention. It will be understood by one with ordinary skill in the art that menus such as the one depicted in FIG. 5*a* provide the Merchant/User with direct, as opposed to serial, access to the available functions. It will be further understood by one with ordinary skill in the art, therefore, that the high level logic flow depicted in FIGS. 4*a* through 4*c* is illustrative, is not a limitation of the invention, and does not impose serial access to the Merchant functions described.

Figure 5B:
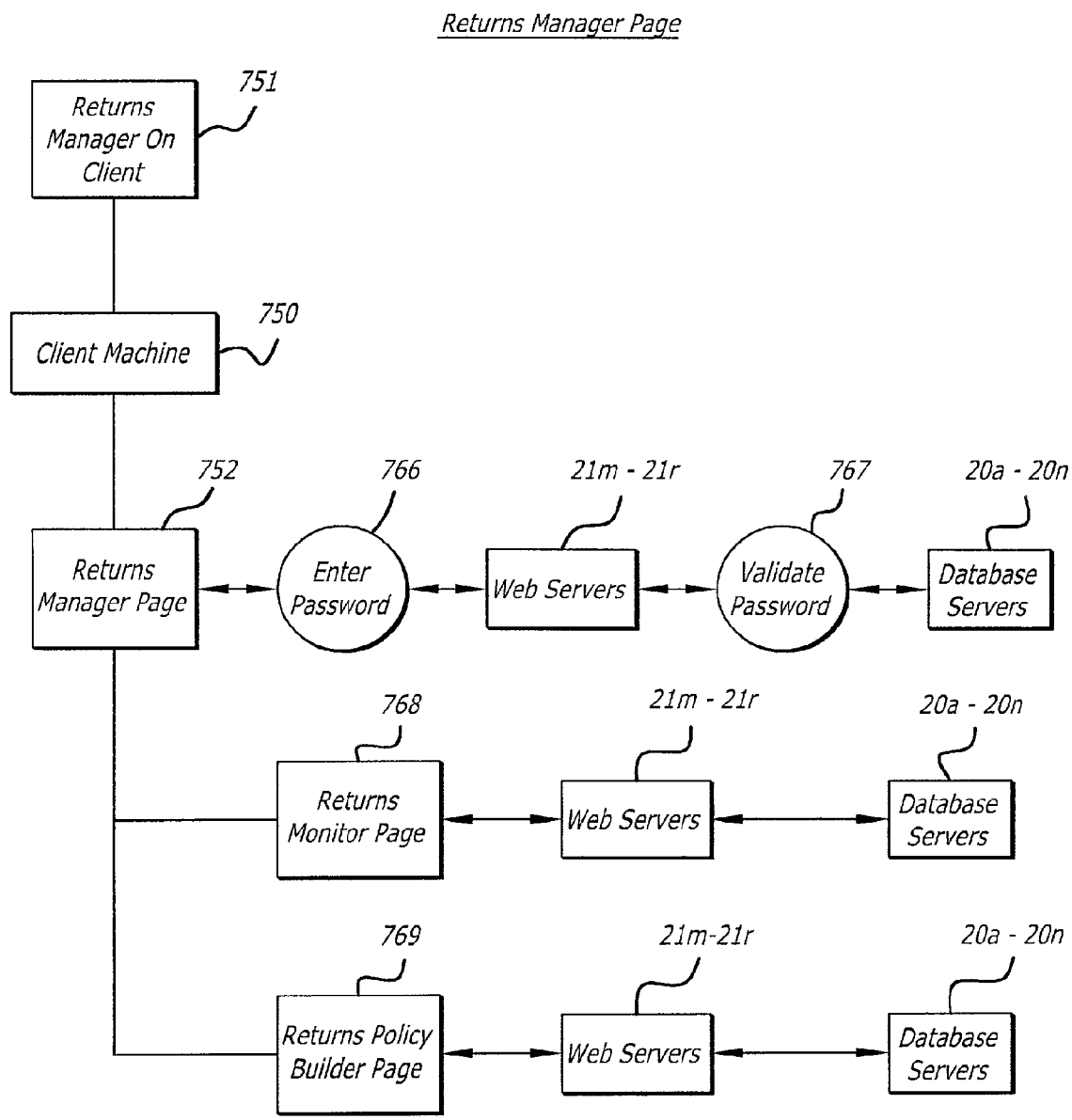
FIG. 5b is high level interactivity diagram depicting an exemplary embodiment of the interactivity of the Returns Manager Subsystem between a Merchant's Client Machine, Returns Manager Page, various Returns Manager Subsystem functions, and the Return System servers in an exemplary embodiment of the invention.

FIG. 5*b* is high level interactivity diagram depicting an exemplary embodiment of the interactivity of the Returns Manager Subsystem between a Merchant's Client Machine, Returns Manager Page, various Returns Manager Subsystem functions, and the Return System servers in an exemplary embodiment of the invention. As depicted in FIG. 5*b*, a portion of the Returns Manager 751 operates on the Merchant's client machine 750. The Merchant accesses the Returns Manager Page 752 through the Merchant's client machine 750 to select one of the Returns Manager Subsystem functions from the Returns Process option 99 (FIG. 52) from the main menu.

As depicted in FIG. 5*b*, if the Merchant enters a password 766 through the Returns Manager Page 752 uses the System's Web Servers 21*m*-21*r*, which in turn use the System's Database Servers 20*a*-20*n* to validate the password 767.

From the Returns Manager Page 752, the Merchant can select the Returns Monitor Option 114 (FIG. 5*a*) or the Return Policy Builder Option 107 (FIG. 5*a*). If the Merchant selects the Returns Policy Builder Option 107 (FIG. 5*a*), the System uses the Returns Policy Builder Page 769 to use the System's Web Servers 21*m*-21*r* and the System's Database Servers 20*a*-20*n* to provide the Merchant with the Returns Monitor functionality as will be described below with regard to FIGS. 5*c* and 5*d*. If the Merchant selects the Returns Monitor Option 114 (FIG. 5*a*), the System uses the Returns Monitor Page 768 to use the System's Web Servers 21*m*-21*r* and the System's Database Servers 20*a*-20*n* to provide the Merchant with the Returns Monitor functionality as will be described below with regard to FIG. 5*e*.

As depicted in FIG. 5*b*, from the Returns Manager Page 752, the Merchant can select the Return Policy Builder Option 107. FIG. 5*c* is high level interactivity diagram depicting an exemplary embodiment of the interactivity of the Returns Manager Subsystem between a Merchant's Client Machine and the Return System servers in an exemplary embodiment of the invention once the Merchant has selected the Return Policy Builder Option 107.

If the Merchant selects the Standard Policy Builder option 108, the Returns Manager Page accesses the Standard Policy Builder function 753 using the System's Web Servers 21m-21r, which in turn use the System's Database Servers 20a-20n to access the Standard Policy Data 754.

If the Merchant selects the Return Shipping Options Builder option 109, the Returns Manager Page accesses the Return Shipping Options Builder function 755 using the System's Web Servers 21m-21r, which in turn use the System's Database Servers 20a-20n to access the Return Shipping Options Data 756.

If the Merchant selects the Return Questions Builder option 110, the Returns Manager Page accesses the Return Questions Builder function 757 using the System's Web Servers 21m-21r, which in turn use the System's Database Servers 20a-20n to access the Return Questions Data 758.

If the Merchant selects the Policy Exceptions Builder option 111, the Returns Manager Page accesses the Policy Exceptions Builder function 759 using the System's Web Servers 21m-21r, which in turn use the System's Database Servers 20a-20n to access the Policy Exceptions Data 760.

If the Merchant selects the Web Page Configuration Builder option 112, the Returns Manager Page accesses the Web Page Configuration Builder function 761 using the System's Web Servers 21m-21r, which in turn use the System's Database Servers 20a-20n to access the Web Page Configuration Data 762.

If the Merchant selects the E-Mail Response Builder option 113, the Returns Manager Page accesses the E-Mail Response Builder function 763 using the System's Web Servers 21m-21r, which in turn use the System's Database Servers 20a-20n to access the E-Mail Response Data 764.

Figure 5D:
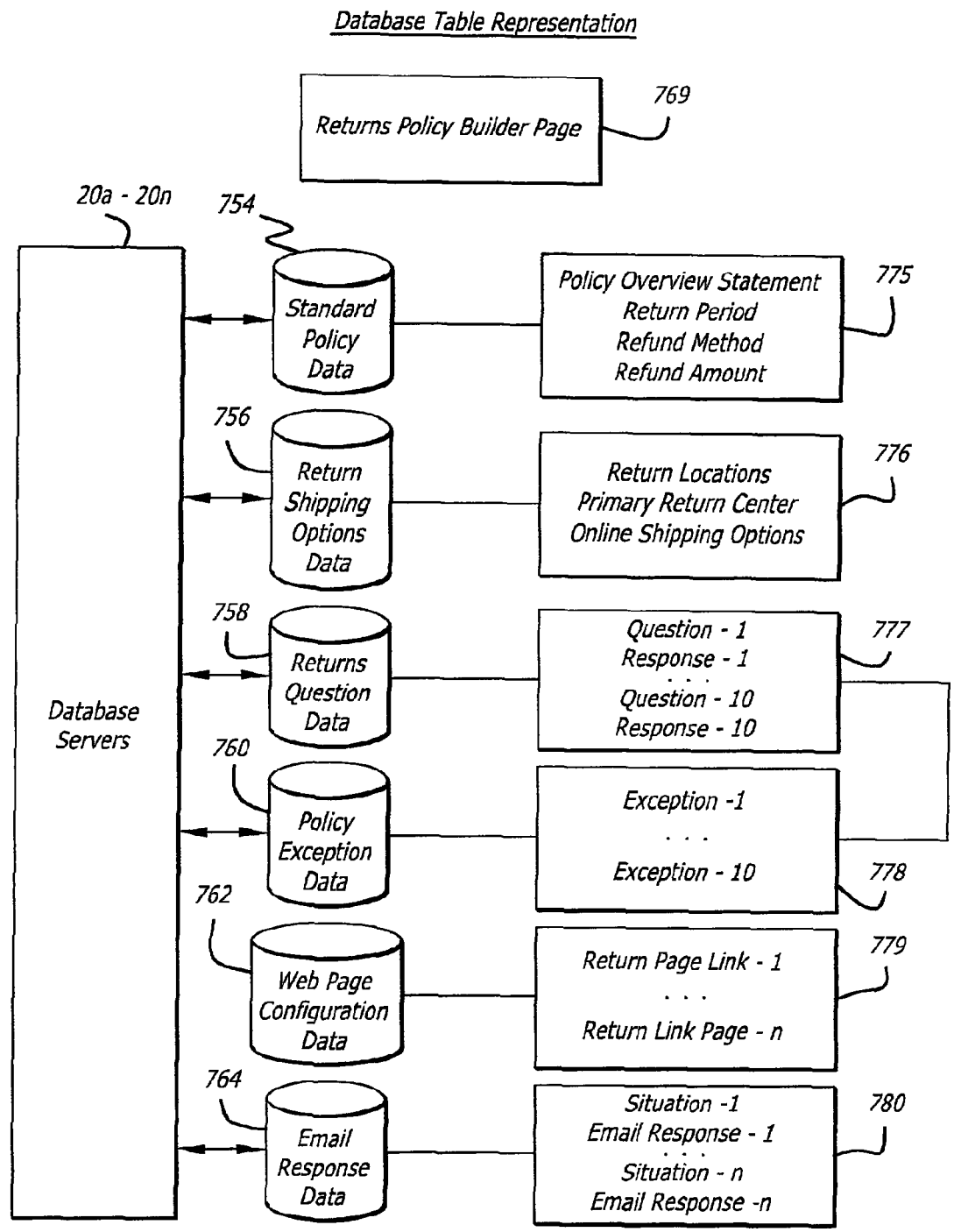
FIG. 5d is high level interactivity diagram depicting an exemplary embodiment of the interactivity for the Returns Policy Builder Page function of the Returns Manager Subsystem between the Return System database servers and certain databases in an exemplary embodiment of the invention.

FIG. 5d is high level interactivity diagram depicting an exemplary embodiment of the interactivity for the Returns Policy Builder Page function of the Returns Manager Subsystem between the Return System database servers 20a-20n and Return Policy databases 754, 756, 758, 760, 762, and 764 in an exemplary embodiment of the invention. FIG. 5d further depicts the type of data stored in each database. For example, as depicted in FIG. 5d, the Merchant's Policy Overview Statement, the Merchant's Return Period, Refund Method, and Refund Amount policies 775 are stored in the Standard Policy Data database 754. Return Locations, Primary Return Center, and Online Shipping Options 776 are stored in the Return Shipping Options Data database 756. Return Questions and Responses 777 are stored in the Returns Question Data database 758. Exception definitions 778 are stored in the Policy Exception Data database 760. Return Page Links 779 are stored in the Web Page Configuration Data database 763. Situation definitions and corresponding e-mail responses 780 are saved in the E-Mail Response Data database 764.

From the Returns Manager Page 752, the Merchant can select the Returns Monitor Option 114. FIG. 5e is high level interactivity diagram depicting an exemplary embodiment of the interactivity of the Returns Monitor Page between a Merchant's Client Machine, the View Inbound Shipments and View Selected Details features of the Returns Manager Subsystem, and the Return System servers in an exemplary embodiment of the invention once the Merchant has selected the Returns Monitor Option 114.

Figure 7:
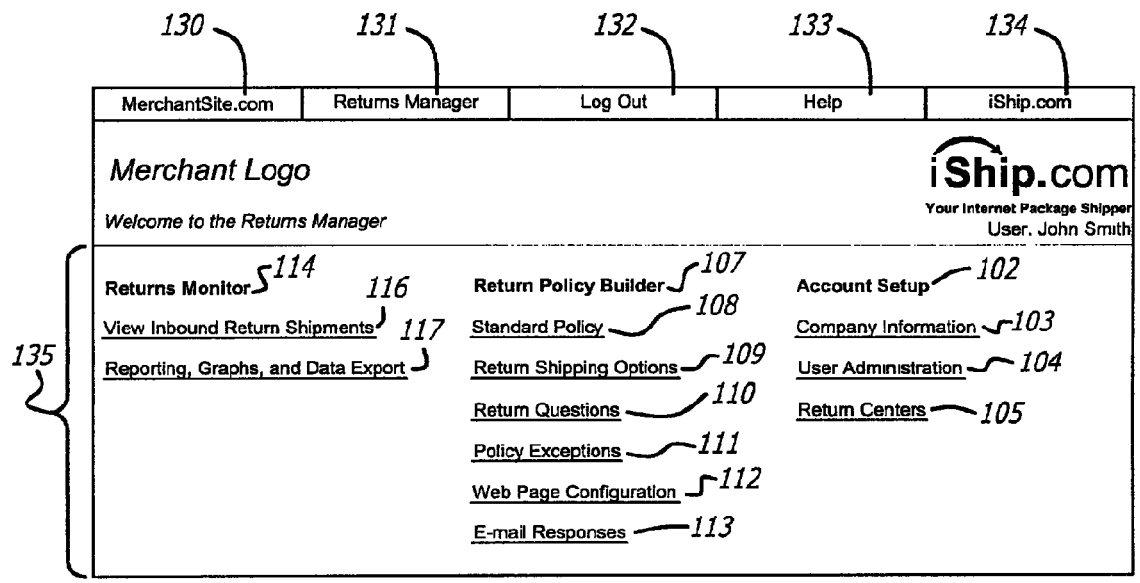
FIG. 7 is a graphic representation depicting an exemplary Return System home page in an embodiment of the Return System.

As depicted in FIG. 5e, if the Merchant selects the View Inbound Shipments option 116 as depicted in FIG. 7, the Returns Monitor Page accesses the View Inbound Shipments function 770 using the System's Web Servers 21m-21r, which in turn use the System's Database Servers 20a-20n to access the Inbound Shipments Data 771.

As depicted in FIG. 5e, if the Merchant selects the Details option, e.g., 640 as depicted in FIG. 46, the Returns Monitor Page accesses the View Details function 772 using the System's Web Servers 21m-21r, which in turn use the System's Database Servers 20a-20n to access the Shipment Details Data 773.

Continuing with the description of the Merchant's experience in the Returns System, as depicted in FIG. 4a, the Merchant logs on 100 to the Return System. As previously mentioned, it should be understood by someone with ordinary skill in the art that reference herein to Merchant setup, monitoring, tracking and other Merchant functions and interactions with the Return System are provided through the Returns Manager Subsystem and User Interface.

Figure 6:
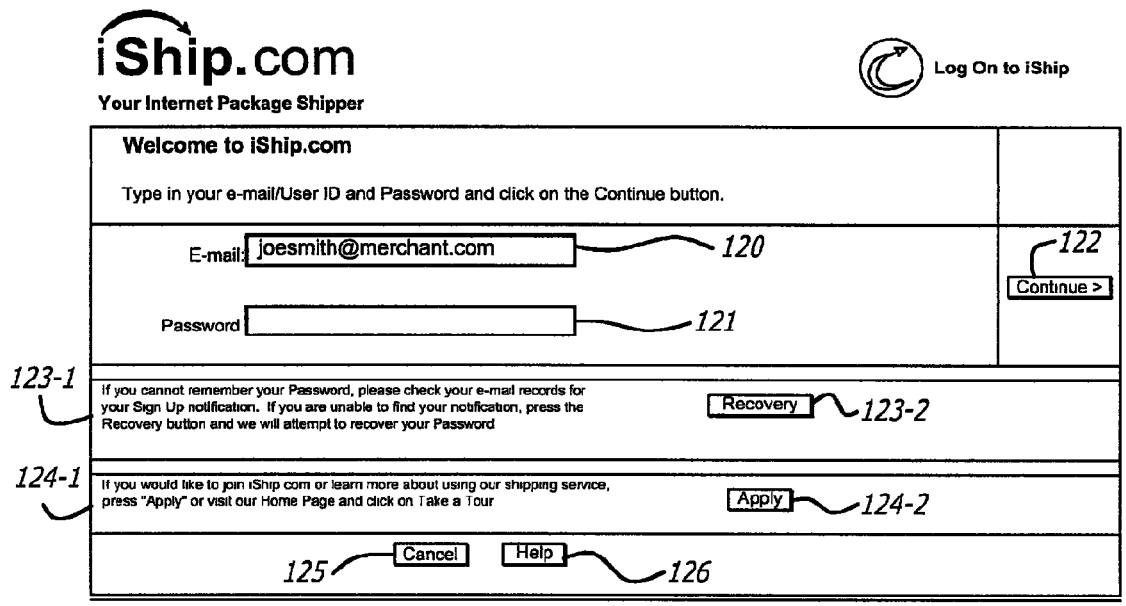
FIG. 6 is a graphic representation depicting an exemplary Log On Screen in an exemplary embodiment of the Return System.

FIG. 6 is a graphic representation depicting an exemplary Log On Screen in an exemplary embodiment of the Return System. The Merchant/User is asked to provide an e-mail/User ID 120 and Password 121 and to click on the onscreen Continue button 122. If the Merchant/User enters an e-mail/User ID 120 and a Password 121, the Return System validates the security information against security information contained in the System databases 22. If the Merchant-supplied security information is valid, the Return System displays the Return System home page and main menu; otherwise, the Return System notifies the Merchant/User that the security information supplied is incorrect.

The Merchant/User is instructed how to locate a forgotten password 123-1 or to otherwise recover a forgotten password by pressing the onscreen Recovery button 123-2. If the Merchant/User presses the onscreen Recovery button 123-2, the Return System searches the Return System's databases 22 for the Merchant-supplied e-mail/User ID; if found, the Return System pulls the password associated with the e-mail/User ID and e-mails the designated e-mail address with the password and notifies the Merchant/User to check its e-mail for the password. If the Return System does not locate the Merchant-supplied e-mail/User ID, then it notifies the Merchant accordingly.

If the Merchant/User is altogether new to the Return System, the Merchant/User is instructed to apply 124-1 by clicking on the onscreen Apply button 124-2. In the Application procedure, the Merchant/User is required to identify the Merchant's company name, web site URL, credit information, payment information, such as credit card number and expiration date, "online store" return locations, physical retail store return locations. Once the application information is verified, a password is assigned to the Merchant and the Return System composes and sends an e-mail to the Merchant containing notification of the assigned password. Once the Merchant/User has a valid password, the Merchant/User can Log On to the Return System to set up the Merchant's Account.

Returning to FIG. 4a, once the Merchant has logged on, the Return System displays a home page with a main menu. FIG. 7 is a graphic representation depicting an exemplary Return System home page in an embodiment of the Return System. The main menu provides a menu selection for returning the Merchant to the Merchant's own web site 130. The Return System supplies the Merchant web site menu selection with the web site URL provided by the Merchant User during the Application procedure described above.

The main menu provides a menu selection for the Returns Manager 131. The submenu selections for the Returns Manager are depicted in the body 135 of the home page depicted in FIG. 7. The submenu selections for the Returns Manager are the default display for the Return System home page; they are also displayed when the Returns Manager menu item 131 has been selected.

The main menu further provides menu selections to Log Out 132, to request Help text 133, and to link to a main shipping system web site 134.

Returning to FIG. 4a, once a Merchant/User has successfully logged in to the Return System, the home page 101 is displayed as depicted in FIG. 7. A newly accepted Merchant/User must complete Account Setup 102 by supplying such information as Company Information 103, User Administration information 104, and Return Center information 105. Account Setup information is saved in the Systems Databases 22 such as in an Account Database 106 (FIGS. 4a-4c).

Returning to FIG. 7, if the Merchant/User selects the Company Information selection item 103, the Return System displays a Company Information Screen. FIG. 8 is a graphic representation of an exemplary Company Information Screen in an exemplary embodiment of the invention. In the Company Information Screen, the Merchant/User is prompted to supply the Company Name 140, Logo URL 141, color preference 142, and Customer Service contact information 143.

Returning to FIG. 7, if the Merchant/User selects the User Administration selection item 104, the Return System displays a User Administration Screen. FIG. 9 is a graphic representation of an exemplary User Administration Screen in an exemplary embodiment of the invention. In the User Administration Screen, the Merchant/User is prompted to identify User Names and associate those names with User ID's 145. The Merchant/User is also prompted to define User Names for those who should be allowed each access privilege level 150. For example, the Merchant/User is prompted to define one or more User Names authorized to perform Return Monitor privileges 146; one or more User Names authorized to perform Return Policy Builder privileges 147; and one or more User Names authorized to perform Account Setup privileges 148. The Merchant/User is also prompted to identify eMail contacts and telephone numbers for User Names 149.

Returning to FIG. 7, if the Merchant/User selects the Return Centers selection item 105, the Return System displays a Return Centers Screen. FIG. 10 is a graphic representation of an exemplary User Administration Screen in an exemplary embodiment of the invention. The Return System prompts the Merchant User to enter information concerning one or more Return Centers. Return Center information includes, for example, the Center Name 151, an Attention name 152, one or more Address lines 153, city state and zip code 154, country 155, and telephone number 156.

As depicted in FIG. 4b, once the Merchant/User has provided Account Setup information, the Merchant/User can define to the Return System the Merchant's Return Policy 107. In the Return Policy Builder 107, the Merchant/User provides Standard Policy information 108, Return Shipping Options 109, Return Questions 110, Policy Exceptions 111, Web Page Configuration information 112 and eMail Responses 113. Return Policy information is saved in the System Databases 22 such as in the Account Database 106.

Returning to FIG. 7, if the Merchant/User selects the Standard Policy menu item 108, the Return System displays a Standard Policy Screen. FIG. 11 is a graphic representation of an exemplary Standard Policy Screen in an exemplary embodiment of the invention. The Return System provides the Merchant/User with a Policy Overview Statement window 160 in which to describe the Merchant's overall return policy. The Return System will display the text from the Merchant's Policy Overview Statement at the beginning of each customer's returns processing. The Policy Overview Statement window 160 can accept text, e.g., 160-3 only, or can process HTML commands imbedded within the text, e.g., 160-1 and 160-2, to format the text for eventual presentation to the Merchant's online customers. The Merchant/User can navigate through the Policy Overview Statement window 160 using up 161-1 and down 161-2 scroll buttons. The Merchant/User can preview the formatted text of the Policy Overview Statement by pressing an onscreen Preview button 162.

The Merchant/User defines the window of time in which the Merchant will accept a return ("Return Window") 167 by entering a time frame 163 and a reference event 165. The Return System provides a scroll down menu of time frames which the Merchant/User accesses by pressing the time frame scroll down menu button 164. The Return System also provides a scroll down menu of acceptable reference events which the Merchant/User accesses by pressing the reference event scroll down menu button 166. The Merchant/User selects a time frame and/or a reference event by placing the cursor on the desired choice and clicking. With respect to a time frame, if none of the time frames listed in the time frame scroll down menu match the Merchant's refund window policy, then the Merchant/User can enter the appropriate number in days. The Return Window 167 selections described above are exemplary and are not a limitation of the invention. In an alternative embodiment, the Return System provides for the definition of a Return Window scale from which a partial refund can be calculated. For example, an item returned within 30 days results in a full refund; an item returned after 30 days but prior to the expiration of 60 days results in a 75% refund; an item returned after 60 days but prior to the expiration of 90 days results in store credit only.

The Merchant/User defines the Merchant's Refund Method 168 by selecting one of the Refund Method choices: Refund 169; Store Credit Only 170; or Choice of Refund or Store Credit 171. The Refund Method choices described above are illustrative and not a limitation of the invention. Some alternative embodiments of the Return System provide additional choices, including a partial refund choice the calculation for which (Refund Amount 172) can be defined by the Merchant to be dependent upon factors such as the actual return time frame as compared to a Return Window scale.

The Merchant/User defines the Merchant's Refund Amount calculation method 172 by identifying the components of the original charges that will be included in the refund: Price of Item 173; Tax on Item 174; and/or Original Shipping Charge 175. The Refund Amount calculation method 172 described above is illustrative and not a limitation of the invention. In an alternative embodiment, the Return System provides additional components that can be defined by the Merchant/User to modify the amount refunded. For example, a percentage can be chosen and entered with which to reduce refunds made for returns made after 30 days. Further, the above described Refund Policy components pertain to the Merchant's standard general policy. In an alternative embodiment, the Merchant/User can additionally define Return, Refund and Exchange policies at lower levels, such as at a product category definition level. Additionally, in an alternative embodiment of the invention, the Return System provides the ability to recognize "Sale" items and override standard general and/or product category level policies with a "Sales" policy (such as one that requires no refund for final sale items).

Once the Merchant/User defines the Merchant's Return Policy, the Merchant/User can save the Policy definition by clicking the onscreen Save button 177. The Merchant/User can cancel the definition by clicking the onscreen Cancel button 176.

Returning to FIG. 7, if the Merchant/User selects the Return Shipping Options menu item 109, the Return System displays a Return Shipping Options Screen. FIG. 12 is a graphic representation of an exemplary Return Shipping Options Screen in an exemplary embodiment of the invention.

Using the Return Shipping Options Screen, the Merchant/User defines the Return Locations 180 to which items can be returned. The Merchant can allow returns to the online store by checking the Online Only item 181 and by selecting a primary return center 182 from a scroll down menu of return centers accessible by clicking a scroll down menu button 183. The Return System builds the menu of return centers from information supplied by the Merchant/User as part of the earlier described application process.

The Merchant can allow returns to its physical retail store locations by checking the Any Retail Store item 184. In an alternative embodiment, the Return System provides the Merchant/User with a choice of Some Retail Locations accompanied by a pull down menu from which the Merchant/User can select the retail locations at which returns for online-purchase merchandise will be accepted.

In one embodiment of the invention, the Merchant defines return policies for merchandise purchased at physical retail store locations, as well as or instead of merchandise purchased through the Merchant's online store, so that all of the Merchant's customers can enjoy the convenience of returning unwanted merchandise with the ease of online services.

Using the Return Shipping Options Screen as depicted in FIG. 12, the Merchant/User defines Online Shipping Options 185. If the Merchant agrees to pay for shipping returns, the Merchant/User checks the Merchant Pays option 186 and selects the shipping carriers and service options 187-1 through 190 for which the Merchant will agree to pay. If the Merchant does not want to pay for shipping returns, then the Merchant checks the Customer Pays option 191 and selects the carriers, e.g., 192-195, with which the Consumer may chose to ship the return. If the Merchant checks both the Merchant Pays option 186 and the Customer Pays option 191, then the Return System applies the Merchant Pays option 186 to "justified" returns, and the Customer Pays option 191 to "unjustified" returns.

The Merchant/User saves its Return Shipping Options by clicking the onscreen Save button 177 or cancels its Return Shipping Option selections by clicking the onscreen Cancel button 176.

Returning to FIG. 7, if the Merchant/User selects the Return Questions menu item 110, the Return System displays a Return Questions/Responses Page. FIGS. 13a through 13d are graphic representations of an exemplary Return Questions/Responses Page in an exemplary embodiment of the invention.

The Return Questions Builder is where the Merchant defines questions to determine why the customer is returning the merchandise. The Return Questions Builder sets up a response tree. For each answer to each question, a different action can be indicated. The Customer Returns application wizard will present the questions in serial fashion to the customer and automatically enforce the programming rules set by the response tree.

Each question is enabled or disabled (can only be in one or the other state) by clicking the check box. The question's text is entered into the question text box. The Merchant has the option of asking each question for every item returned or just once per return session.

For each question, there is a corresponding answer. The answer heading text is entered into the answer heading text box. The merchant then sets up a response tree in the form of: Answer→Response→Next Action(s). The Merchant has the option of displaying response text.

The System further provides actions control of the flow of the Customer Returns application. There is a button to allow editing of the next action list. Each entry in the "next action" list is selected via a list box of possible next actions, including for example: 1.) Ask Question number "n", where n is one of the Merchant's Return questions; 2.) Issue Refund; 3.) Do not issue Refund; 4.) Pay Return Shipping; 5.) Do not Pay Return Shipping; 6.) Pay Replacement Shipping; and 7.) Do not Pay Replacement Shipping. Further, there is also a button for editing and deletion of the answer. These features are described in more detail below.

Using the Return Questions/Responses Page, the Merchant/User defines return policy questions, circumstances in which the questions should be asked, possible answer choices, and corresponding responses. The Merchant/User defines a plurality of Questions, e.g., Question 1 200 (FIG. 13a), Question 2 230 (FIG. 13b), Question 3 231 (FIG. 13c), Question 4 232 (FIG. 13c), Question 5 233 (FIG. 13d). For each question, the Merchant/User defines a number of criteria, as illustrated as follows for Question 1 200.

As depicted in FIG. 13a, the Merchant/User defines the first Question 200 as On 201 or Off 202. The Merchant/User enters the text of the first Question 203 and instructs the Return System to either ask the first Question for each item to be returned 204 or Once per return 205. The Merchant/User enters an Answer Heading 206 with which to instruct the consumer making a return. The Merchant/User enters one or more Answer Choices, e.g., 207, 212, 216, 220. For each Answer Choice, e.g., 207, the Merchant/User enters Response text 208 (through which the Merchant/User can navigate using up and down scroll buttons, e.g., 209-1 and 209-2); indicates whether the Response text should be displayed 210 (checked: display; blank: do not display); identify Follow Up Instructions, e.g., 211-1, 211-2, 211-3 (FIG. 13a). Follow Up Instructions are pre-established key word instructions which are described below with respect to FIG. 14. The Merchant/User clicks on the Edit Follow Up link e.g., 211-4 (FIG. 13a) to display a Follow Up Actions Screen, described below with respect to FIG. 14, through which the Merchant/User defines the Follow Up Actions appropriate for the particular Return Response for the particular Answer Choice for the particular Question. The Follow Up Instructions, e.g., 211-1, 211-2, and 211-3, depicted in FIG. 13a are pulled from the Merchant/User's input of Follow Up Actions to the Follow Up Action Screen described below with respect to FIG. 14.

As depicted in FIG. 13b, the Merchant/User can click the onscreen Add/Remove Answer Choices button 224 to add or remove particular Answer Choices. The Merchant/User can check the Add Customer Comments Field 225 to display a window in which the Customer can enter text comments.

As depicted in FIG. 13d, the Merchant/User saves the Return Questions and Responses by clicking the onscreen Save button 177 and cancels the Return Questions and Responses settings by clicking the onscreen Cancel button 176.

Figure 14:
FIG. 14 is a graphic representation depicting an exemplary configuration of Follow Up Actions corresponding to a particular Return Response for a particular Answer Choice for a particular Question in an exemplary embodiment of the invention.

The Merchant/User defines Follow Up Actions for each Return Response by clicking the Edit Follow Up link, e.g., 211-4 (FIG. 13a), that corresponds to a particular Return Response, e.g., 208. FIG. 14 is a graphic representation depicting an exemplary configuration of Follow Up Actions corresponding to a particular Return Response for a particular Answer Choice for a particular Question in an exemplary embodiment of the invention. As depicted in FIG. 14, for a particular Return Response for a particular Answer Choice for a particular Question, The Merchant/User chooses: whether to Issue a Refund 240 by clicking Yes 241, No 242, or Undetermined 243; whether to Pay for Return Shipping 244 by clicking Yes 245, No 246, or Undetermined 247; whether to Pay for Replacement Shipping 248 by clicking Yes 249, No 250 or Undetermined 251; whether to Notify the Merchant's Customer Service Rep 252 by clicking Yes 253, No 254 or Other 255; and whether to Ask Additional Questions 257 and if so, which ones, e.g., Q1 258 through Q10 267. In the embodiment depicted, questions with a Question number that numerically precedes or is equal to the Question Number of the Question from which the Follow Up Action Screen is entered can not be selected as next questions.

The Merchant/User Adds Follow Up Actions by clicking the onscreen Add Follow Up Actions button 268. The Merchant/User saves the Follow Up Actions entered by clicking the onscreen Save button 177 or cancels the Follow Up Actions entered by clicking the onscreen Cancel button 176.

Figure 15:
FIG. 15 is a graphic representation of an exemplary Policy Exceptions Screen in an exemplary embodiment of the invention.

Returning to FIG. 7, if the Merchant/User selects the Policy Exceptions menu item 111, the Return System displays a Policy Exceptions Screen. FIG. 15 is a graphic representation of an exemplary Policy Exceptions Screen in an exemplary embodiment of the invention. The Policy Exceptions Screen displays explanatory text 270 for the Merchant/User describing the uses of the Policy Exceptions function. The Merchant/User can choose to establish Policy Exception Categories 271, Items 272 or Customers 273.

If the Merchant/User clicks on the Policy Exception Categories link 271, the Return System displays an Exception Categories Page. FIG. 16 is a graphic representation depicting an exemplary first screen of the Exception Categories Page in an exemplary embodiment of the invention. As depicted in FIG. 16, the Return System displays explanatory text 280 describing how the Merchant/User can define special return processing for certain groups of items. The Merchant/User can enter a plurality of product categories 281-300. To cancel the Exception Category entries, the Merchant/User clicks the onscreen Cancel button 176. To proceed with Exception Category definitions, the Merchant/User clicks the onscreen Next Step >> button 301.

If the Merchant/User clicks the onscreen "Next Step >>" button 301, the Return System displays Store Categories Screens such as depicted in FIGS. 17a and 17b. As depicted in FIG. 17a, each Store Category defined in the Exception Categories 281-300 described above is presented so that the Merchant/User can identify the Subcategories, e.g., 302-309. If appropriate, the Merchant/User can further subcategorize the products by clicking on the Second-Level Subcategories link, e.g., 310, for the particular Category, e.g., 281. The Merchant/User can then use these Exception Categories and/or Subcategories to further tailor the Return Questions and Responses.

To save the Categories and/or Subcategories, the Merchant/User clicks the onscreen Save button 177 (FIG. 17b). To cancel the Categories and/or Subcategories, the Merchant/User clicks the onscreen Cancel button 176 (FIG. 17b).

In a similar way, the Merchant/User can define Exception Policies with respect to particular Items and/or Customers. If the Merchant/User clicks the Exception Items option 272 (FIG. 15), an Exception Item Screen is displayed that prompts the Merchant/User for a plurality of Item Names, IDs or Descriptions, for example, an SKU. If the Merchant/User clicks the Customer Exceptions option 273 (FIG. 15), a Customer Exception Screen is displayed that prompts the Merchant/User for a plurality of Exception Customer IDs.

Returning to FIG. 7, if the Merchant/User selects the Web Page Configuration menu item 112, the Return System displays a Web Page Configuration Screen. FIGS. 18a and 18b are graphic representations of exemplary Web Page Configuration Screen in an exemplary embodiment of the invention. With the Web Page Configuration Screens, the Merchant/User can define the URL 320, Cancel URL 321, Done URL 322, Title Font Face 323, Font Face 324, Page Background Color 325, Shade Color 326, Title Bar Color 327, Title Font Color 328, Hover Text 329, Image Name 330, Image Text 331, Site Text 332, User ID 333, Password 334, Header HTML text 335 (with navigation up and down scroll buttons 336-1 and 336-2), Footer HTML text 337 (with navigation up and down scroll buttons 338-1 (FIG. 18a) and 338-2 (FIG. 18b)) and Integration Notes 339 (with navigation up and down scroll buttons 340-1 and 340-2). The Merchant/User cancels the Web Page Configuration settings by clicking the onscreen Cancel button 176 or saves the Web Page Configuration settings by clicking the onscreen Save button 177.

In one embodiment of the invention, the Merchant/User is also prompted to supply a "mapping" of the Merchant's Online system tag names to data names for data required by the Returns System. The Merchant supplies the data tag names for particular data in the Merchant's Order Management System. For each data item required by the Return System to process a return request, the Return System presents the name and description of the required data and prompts the Merchant/User to supply a corresponding data tag name. In one such embodiment, the Return System will access the Merchant's Online store system according to information supplied by the Merchant in the Web Page Configuration Screen to validate the mapping information and will notify the Merchant/User if the mapping information supplied is not correct.

In the exemplary embodiment of the invention depicted in FIGS. 18a through 18b, the Merchant's mapping information is supplied off-line as part of the application process and is hard-coded into the system before assigning the Merchant/User a password for the Return System.

Figure 19:
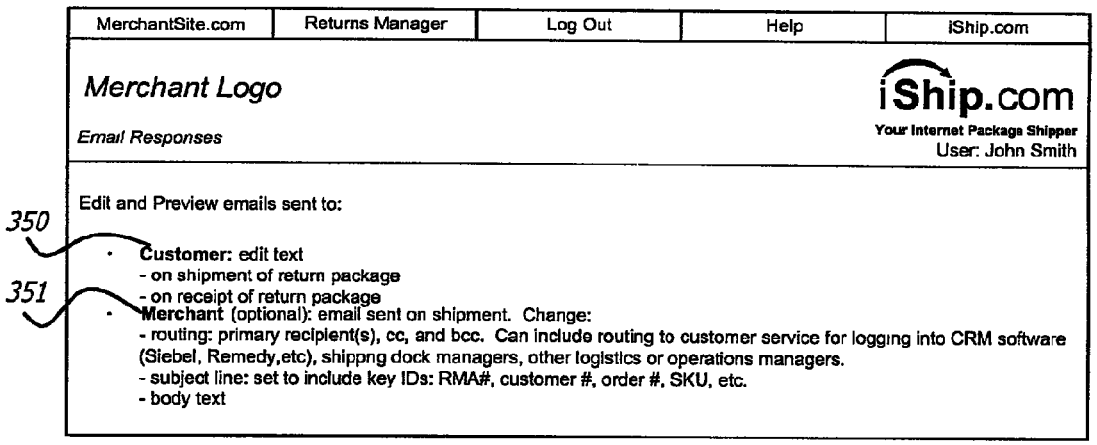
FIG. 19 is a graphic representation of an exemplary Email Responses Screen in an exemplary embodiment of the invention.

Returning to FIG. 7, if the Merchant/User selects the Email Responses menu item 113, the Return System displays Email Responses Screen. FIG. 19 is a graphic representation of an exemplary Email Responses Screen in an exemplary embodiment of the invention. If the Merchant/User wants to have the opportunity to edit the text of e-mails sent to Customers, the Merchant/User clicks the Customer option 350. If the Merchant/User wants to have the opportunity to edit the text or other fields of e-mails sent to Merchant, the Merchant/User clicks the Merchant option 351.

A component for the Returns Policy Builder function is the situation response table which acts like a traffic cop to direct the logic flow in the Customer Return application. The table consists of the following elements:

A.) Situation Table—contains a list of all possible circumstances that might need a response. For example: 1.) Merchant pays for return shipping; 2.) Customer pays for return shipping; 3.) Customer X makes a return request; 4.) Product Z is selected for a return; 5.) Product category y is selected for a return; and 6.) Wrong item received.

B.) Response Table—contains a list of all possible actions the system can take. For example: 1.) Issue Refund; 2.) Reply with Email format N; 3.) Pay Return Shipping; 4.) Ask question N; and 5.) Reply with response Z.

C.) Situation-Response Table—contains a list all of the valid situation-response pairings.

In one embodiment of the invention, the situation response table is a three-dimensional matrix an exemplary embodiment of which is depicting in FIG. 13e. FIG. 13e is a graphic representation depicting an exemplary configuration of a three dimensional Situation Response Matrix in an exemplary embodiment of the invention. FIG. 13f is a graphic representation depicting an exemplary configuration of a Question Table in an exemplary embodiment of the invention. FIG. 13g is a graphic representation depicting an exemplary configuration of an Instruction Table in an exemplary embodiment of the invention. FIG. 13h is a graphic representation depicting an exemplary configuration of a Response Table in an exemplary embodiment of the invention. The configuration of questions, responses and instructions depicted in FIGS. 13e-13h are illustrative and are not a limitation of the invention.

As depicted in the exemplary embodiment in FIG. 13e, the three-dimensional Situation Response Matrix comprises:
1.) a first dimension defining a set of return questions, e.g., 234-1-a, 234-2-a, . . . 234-xx-a;
2.) a second dimension defining, for each return question, a set of return question responses corresponding to the return question, e.g., responses 235-1-a and 235-2-a corresponding to question 234-1-a; return question responses 235-3-a, 235-4-a, and 235-5-a corresponding to question 234-2-a; and responses 235-6-a and 235-7-a corresponding to question 234-xx-a; and
3.) a third dimension defining, for each return question response for each return question, a set of instructions to the computer system corresponding to the return question response corresponding to the return question, for example, instructions 236-1-a and 236-2-a corresponding to response 235-1-a for question 234-1-a.

The System populates the Situation Response Matrix using the merchant's input to the Policy Builder function screens, e.g., as depicted in FIGS. 13a-13d.

In the exemplary embodiment depicted in FIGS. 13e-13h, each Question, e.g., 234-1-a, corresponds to an entry in a Question Table as depicted in FIG. 13f. The Question entry 234-1-a has a corresponding text entry, e.g., 234-1-b, which the System uses to display the referenced question, e.g., 234-1-a, to the consumer.

In the exemplary embodiment depicted in FIGS. 13e-13h, each Response, e.g., 235-1-a, corresponds to an entry in a Response Table as depicted in FIG. 13h. The Response entry 235-1-a has a corresponding text entry, e.g., 235-1-b, which the System uses to display to the consumer the text 235-1-b and 235-2-b for the possible responses, e.g., 235-1-a and 235-2-a for referenced question, e.g., 234-1-a.

When a consumer inputs a merchandise return request to return at least one item of merchandise, the system receives the request and uses the situation response table to script an interactive exchange with the consumer.

The System applies the merchant's pre-established return policy by scripting an interactive exchange with the consumer. The System scripts the interactive exchange with the consumer by displaying in logical sequence, according to the consumer's responses and according to the logical relationships defined in the situation response table, the questions defined by the merchant during the merchant's completion of the Returns Policy Builder function.

In the illustrative example for the exemplary embodiment depicted in FIGS. 13e-13h, the System displays the text 234-1-b of the first question 234-1-a from the set of return questions established by the merchant. The System receives the consumer's answer in response to that first question. The System then compares the consumer's answer to the first question with the set of return question responses corresponding to the first question until a match is found. The System then directs the computer system to execute each instruction in the set of instructions corresponding to the matching return question response.

FIGS. 13i-1 and 13i-2 are high level flow diagrams depicting the flow of logic for applying a merchant's pre-established return policy logic in an exemplary embodiment of the invention. As depicted in FIGS. 13i-1 and 13i-2, the System initializes a Question number variable, e.g., "X" to "1" 237. The System accesses the Situation Response Table 312 to retrieve the submatrix for Question X; using the Question X submatrix, the System then displays the text corresponding to Question X 238 from the Question Table 313 along with the text and selection buttons for each response that corresponds to Question X 239 retrieved from the Response Table 314.

The Consumer answers the Question X displayed by making a selection from the responses displayed 274. The System then uses the selected response answer to access the corresponding response entry in the Situation Response Matrix; the System consecutively uses each of the instruction entries in the Situation Response Matrix for the selected response answer to access the Instruction Table 315 to retrieve the appropriate instructions 275.

As depicted in FIG. 13i-2, the System executes each instruction for the particular response entry 276. The System tests to determine whether the instruction directs the System to ask a question 277. If so, the System sets the Question variable "X" to the Question number setting indicated by the instruction entry in the Instruction Table 279, accesses the Situation Response Matrix for the indicated Question, and displays the Question and Response selections for the indicated Question 238. If the instruction does not direct the System to ask a Question, then the System checks to determine whether there are further instructions to be executed 278. If so, the System continues to execute the next instruction 276. Otherwise, the System recognizes that it has completed the application of the merchant's Return Policy 311.

In one embodiment of the invention, the System provides for Policy Exception Categories and Subcategories at the Policy level (that is, exceptions apply to all Return Questions). At a Policy level, the System provides the merchant with the capability to specify exception Questions, Responses and instructions for the excepted product categories and/or subcategories that differ from the Questions, Responses and instructions for non-excepted product categories and subcategories.

In an alternative embodiment of the invention, the System provides for Policy Exception Categories and Subcategories at a Question level. At a Question level, the System provides the merchant with the capability to specify exception Responses and instructions for the excepted product categories and/or subcategories that differ from the Responses and instructions for non-excepted product categories and subcategories.

In still another alternative embodiment, the System provides for Policy Exception Categories and Subcategories at a Response level. At a Response level, the System provides the merchant with the capability to specify exception instructions for the excepted product categories and/or subcategories that differ from the instructions for a particular response for non-excepted product categories and subcategories.

Figures 1, 13J:
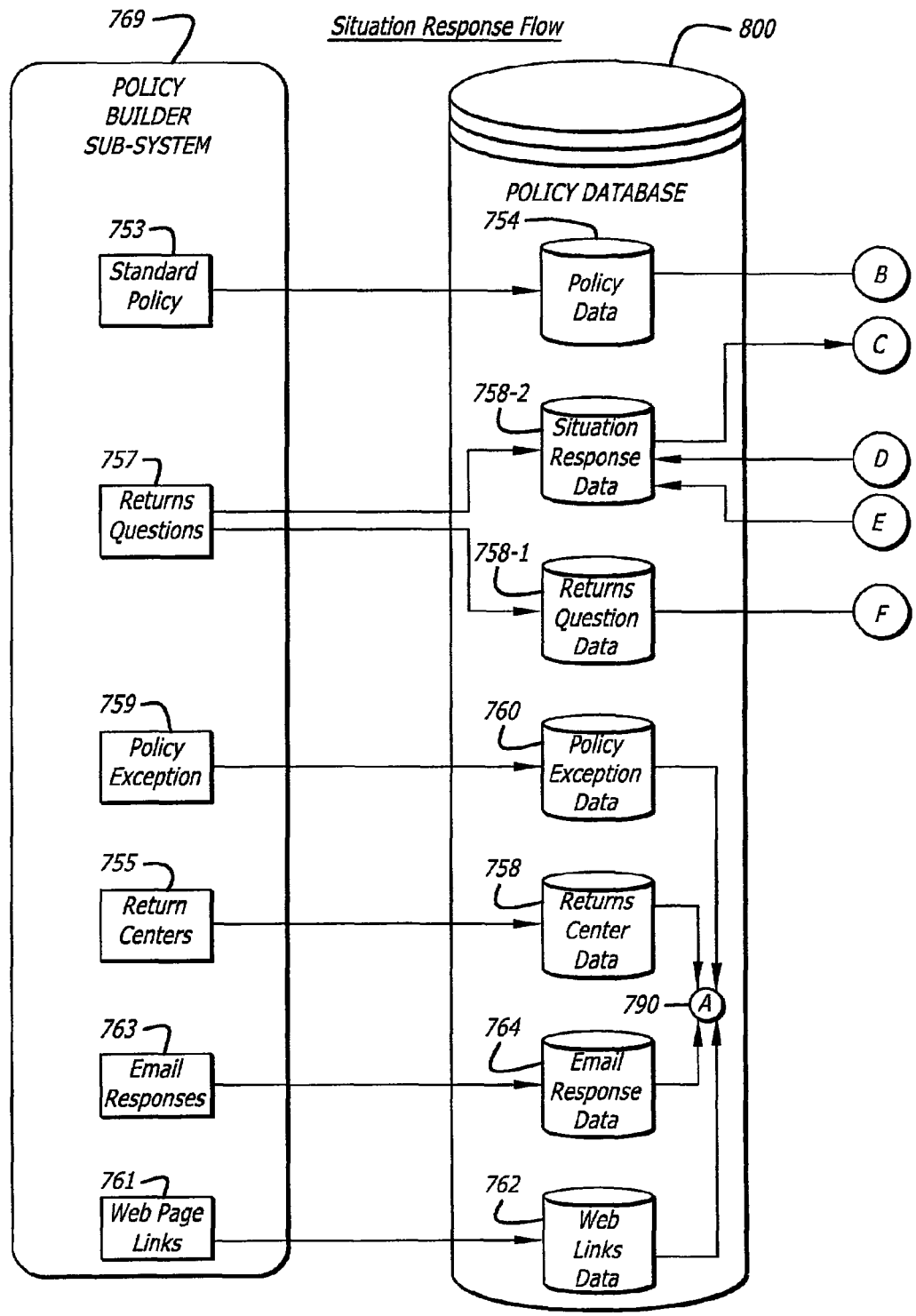
FIG. 13j is a high level data and logic relationship diagram depicting an exemplary Situation Response flow in an exemplary embodiment of the invention.
Figures 2, 13J:
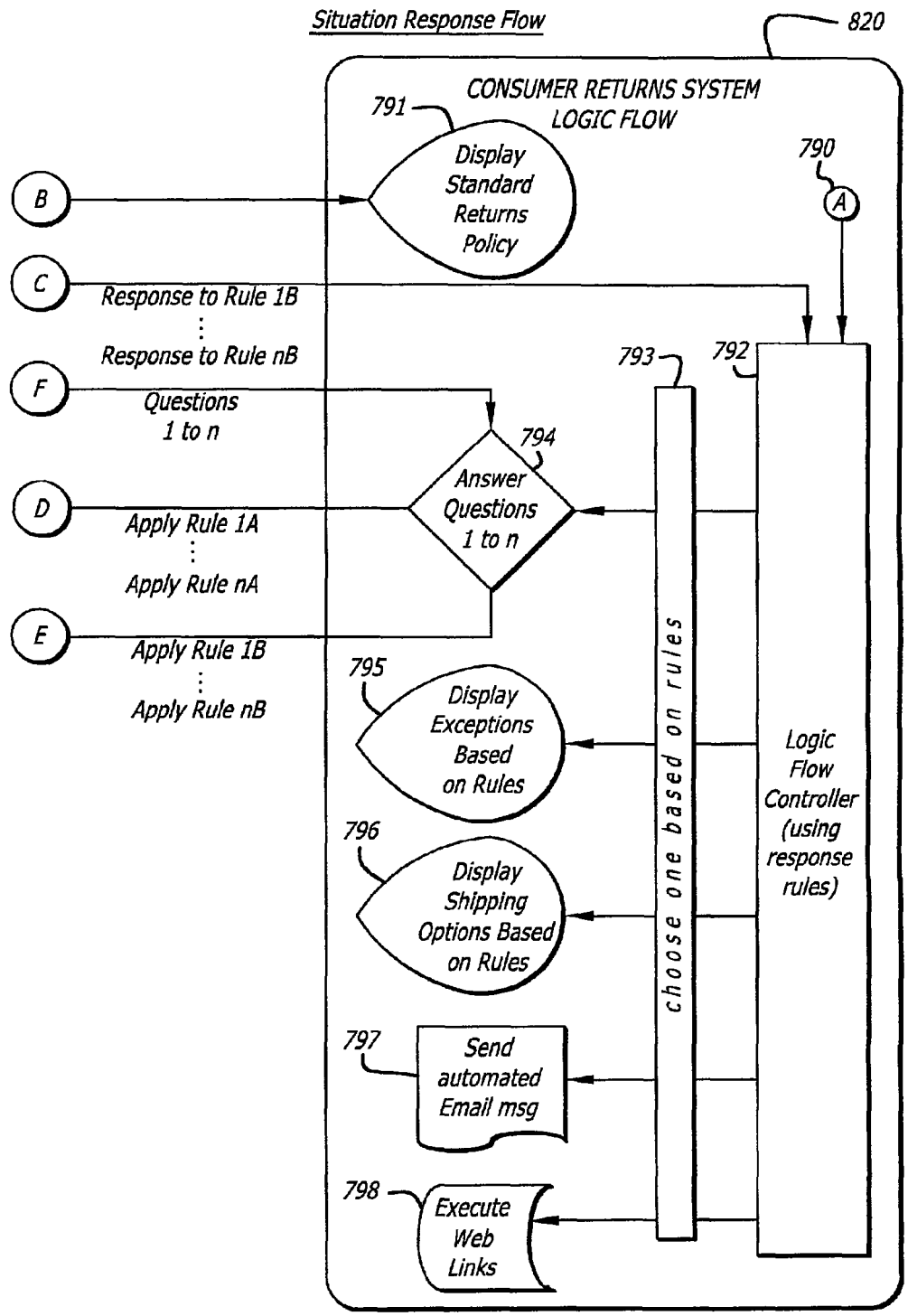
FIG. 2 is a graphic representation depicting an exemplary user computer configuration and the computer's interface with an eCommerce Provider and the System.

FIG. 13j is a high level data and logic relationship diagram depicting an exemplary Situation Response flow in an exemplary embodiment of the invention. As depicted in FIG. 13j, a Policy Database 800 contains Policy Data 754 maintained by a Merchant through the Standard Policy function 753 of the Policy Builder Subsystem 769. The Policy Database 800 contains Situation Response Data 758-2 and Returns Question Data 758-1 which are maintained by the Merchant through the Returns Question function 757. The Policy Database 800 contains Policy Exception Data 760 which is maintained by the Merchant through the Policy Exception function 759. The Policy Database 800 contains Returns Center Data 758 which is maintained by the Merchant through the Returns Centers function 755. The Policy Database 800 contains E-Mail Response data 764 which is maintained by the Merchant through the E-Mail Response function 763. The Policy Database 800 contains Web Links data 762 which is maintained by the Merchant through the Web Page Links function 761.

As depicted in FIG. 13*j*, the Consumer Returns Subsystem 820 displays the Merchant's Standard Returns Policy 791. Then, according to the Merchant's Returns Policies, as provided in the Policy Database 800, the Consumer Returns Subsystem 820 controller 792 selects the appropriate rules 793 from the appropriate databases 754, 758-1, 758-2, 760, 758, 764, and 762, to ask the Consumer questions and apply the appropriate rules based on the rules and the consumer's responses and actions 794, display exceptions based on the rules and the consumer's responses and actions 795, display shipping options based on the rules and the consumer's responses and actions 796, send automated email messages based on the rules and the consumer's responses and actions 797, and execute the appropriate web links according to the rules and the consumer's responses and actions 798.

Once the Merchant/User has set up the Merchant's Account and Return Policy, the Merchant is ready for Customers to use the Return System from within the Merchant's online store web site.

B. Consumer Returns

Figure 20A:
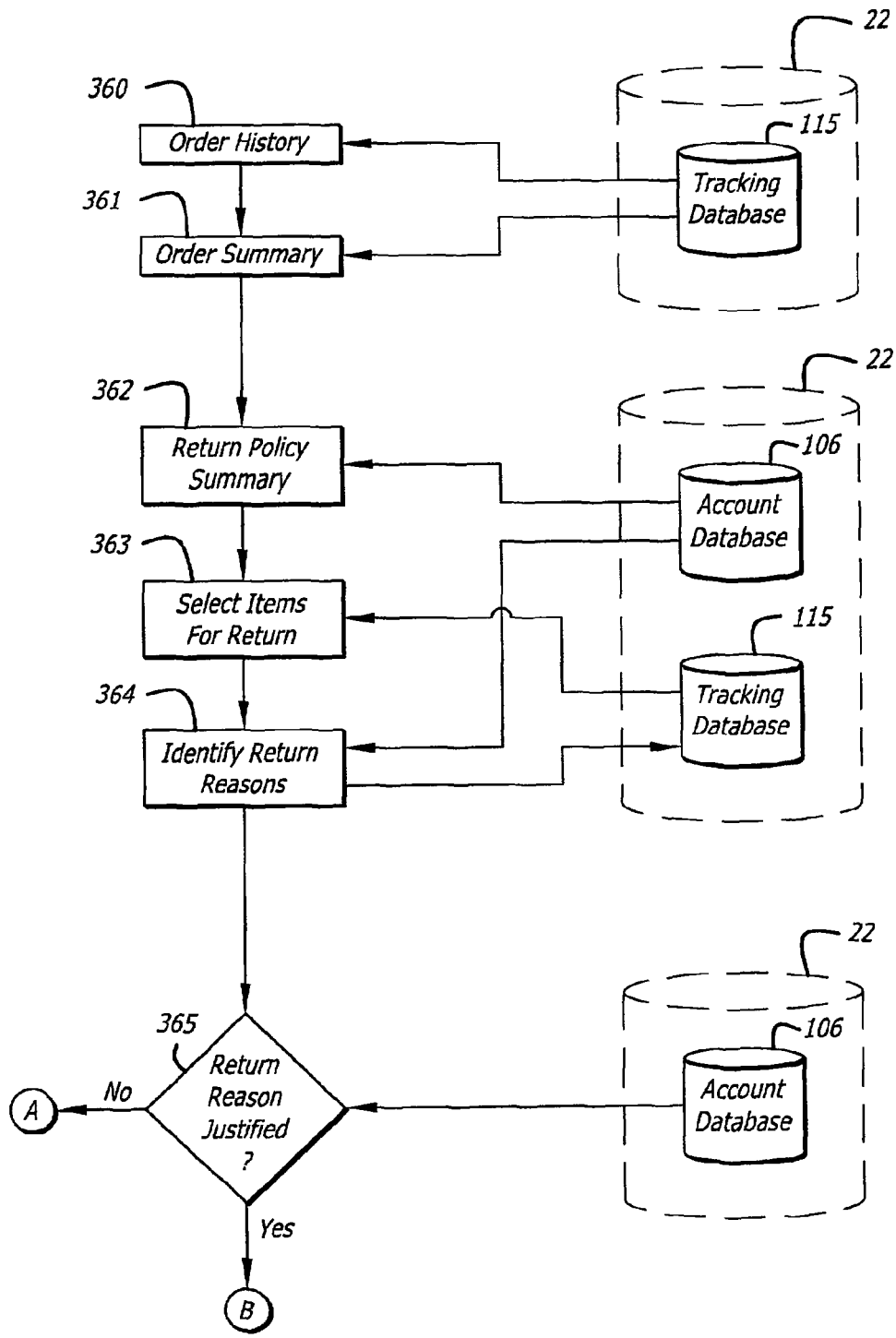
FIGS. 20a through 20c are logic flow diagrams depicting an exemplary high level logic flow for a Consumer's experience with an exemplary embodiment of the Returns System of the present invention from within a Merchant's Online store.
Figure 20B:
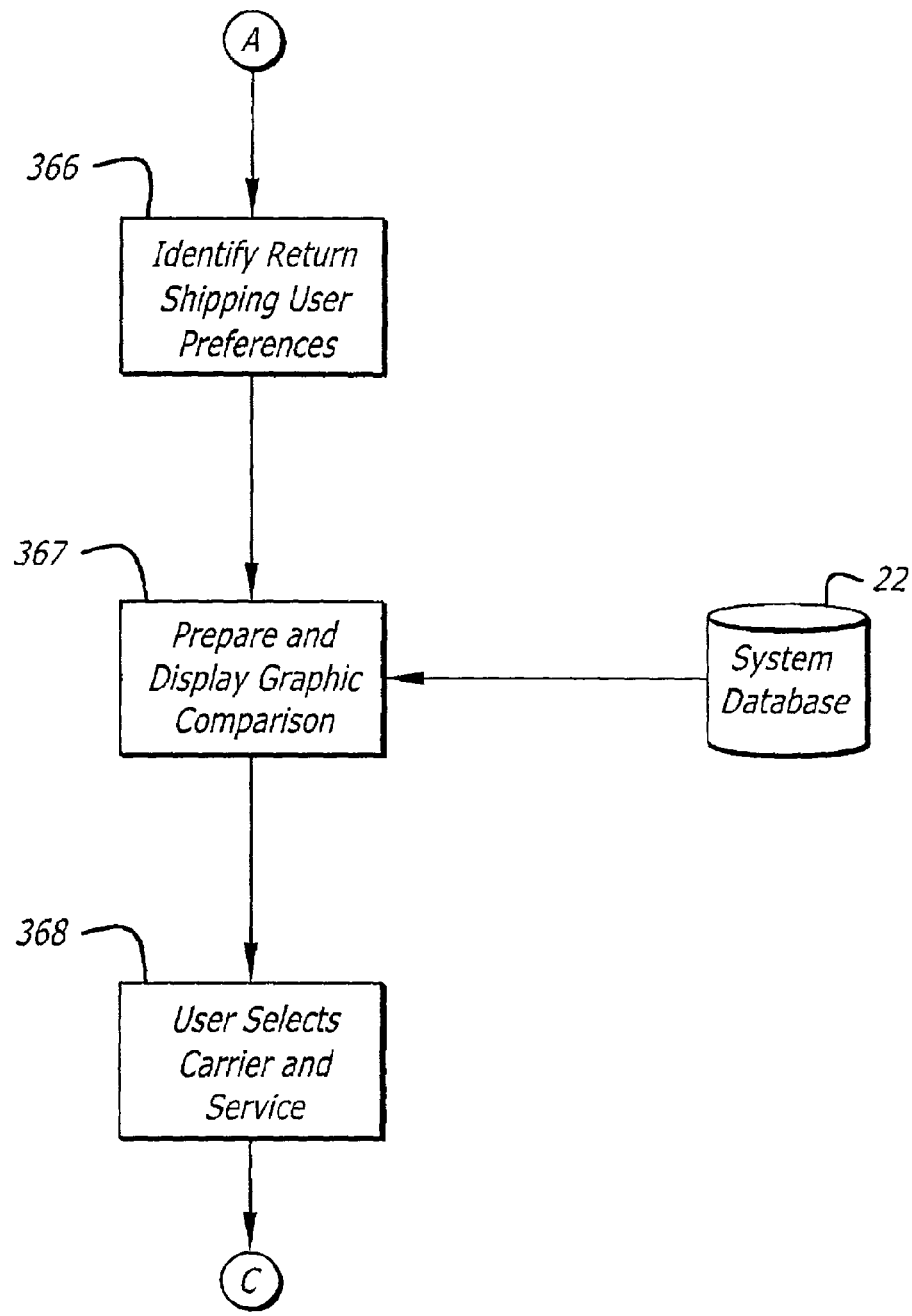
Figure 20C:
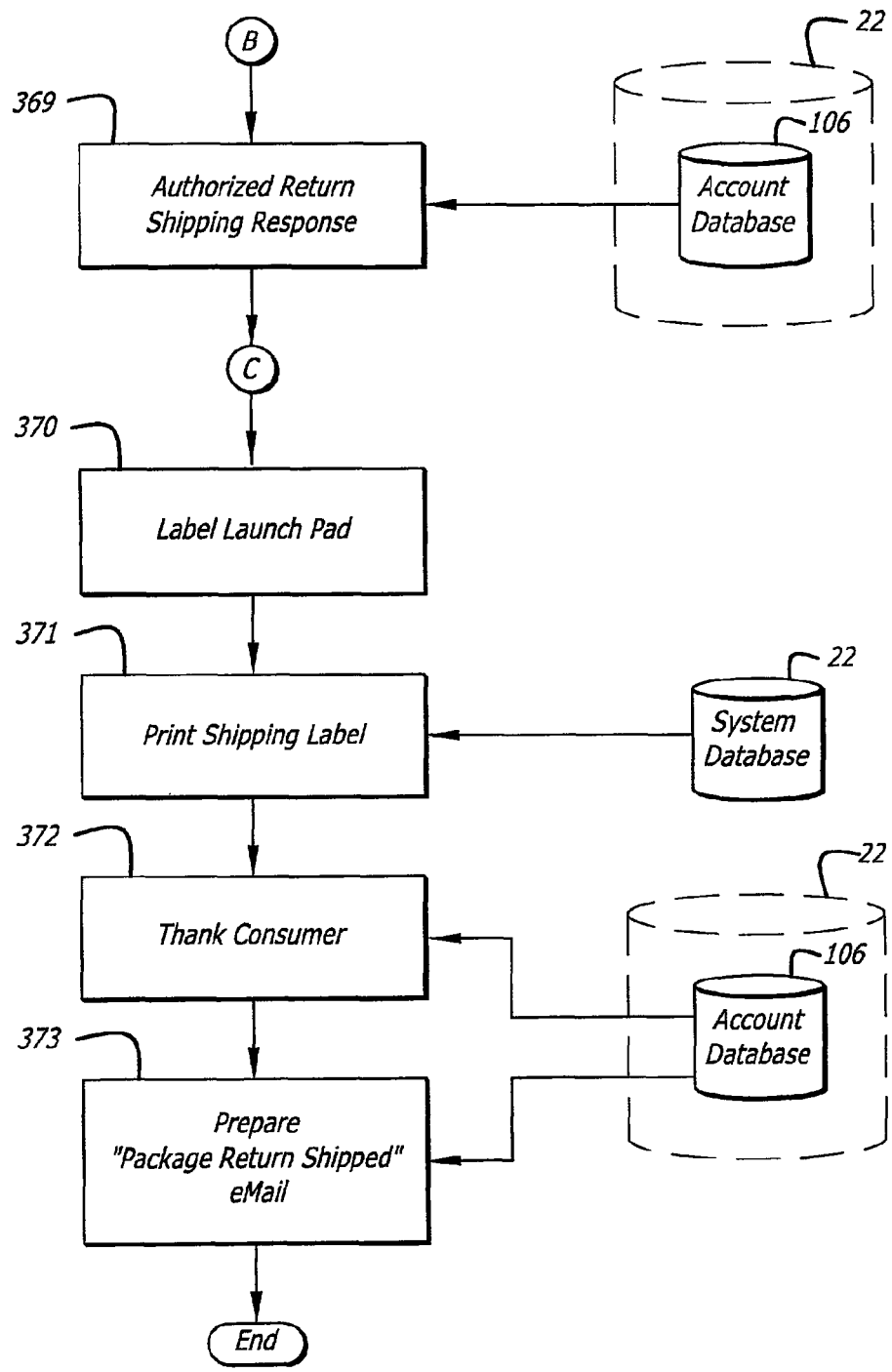

FIGS. 20*a* through 20*c* are logic flow diagrams depicting an exemplary high level logic flow for a Consumer's experience with an exemplary embodiment of the Returns System of the present invention from within a Merchant's Online store. Each of the functions described below with regard to FIGS. 20*a* through 20*c* are described in context of exemplary online screens as depicted in subsequent FIGURES.

From within a particular Merchant's Online store, the Consumer (also sometimes referred to herein as the "Shipper" or "Customer") accesses the Consumer's Order History 360. As was mentioned above, the Consumer Returns Subsystem is accessed by the Consumer from within the Merchant's Online Store. As previously mentioned, it should be understood by someone with ordinary skill in the art that reference herein to Consumer interaction with the Return System is provided through the Consumer Returns Subsystem provided by the Return System.

Figure 21:
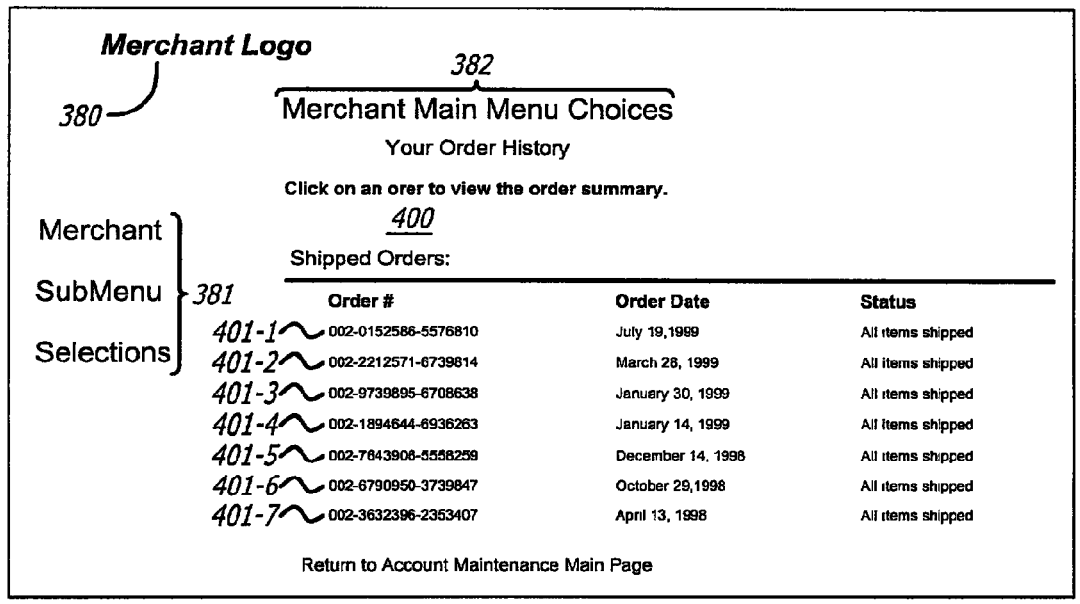
FIG. 21 is a graphic representation of an exemplary Order History display for a particular Customer in a particular Merchant's Online store.

FIG. 21 is a graphic representation of an exemplary Order History display for a particular Customer in a particular Merchant's Online store. In an exemplary Merchant's Online Store, as depicted in FIG. 21, the Merchant displays the Merchant's Logo 380. The exemplary Merchant's Online Store provides a main menu of options 382, for example, "Welcome", "Online Merchandise", "Catalog Merchandise", "Place Orders", "Return Merchandise", etc. Further, in the exemplary Merchant's Online Store, each Page provides a Submenu of options 381 that provide functionality appropriate for the selected main menu option. In the illustrative FIGURES described below, the Consumer has entered the Merchant's Online Store, and has entered, for example, the Return Merchandise page. With the Return Merchandise page, the Merchant's Online Store provides appropriate Submenu selections 381 that allow the Consumer to view the Consumer's Order History and access the Consumer Returns Subsystem to return merchandise.

In the exemplary Order History display depicted in FIG. 21, the particular Consumer's Shipped Orders 400 are listed, e.g., 401-1 through 401-7. From the Order History as depicted in FIG. 21, the Consumer can select a particular order number, e.g., 401-1, by, for example, clicking the cursor on the order number 401-1.

To return an order, or an item from within a particular order, the Consumer selects a particular order number, e.g., 400. Selecting a the order number 400, causes the Merchant's Online store system to display an Order Summary 361 as depicted in FIG. 20*a*. FIG. 22 is a graphic representation of an exemplary Order Summary Screen for a particular Order Number for a particular Consumer from within a particular Merchant's Online store in an exemplary embodiment of the invention.

The exemplary embodiment of the invention depicted in FIG. 20*a* shows that the Merchant's Online store system accesses the Return System's Tracking Database 115 (which is part of the Return System's databases 22) to provide the Consumer's Order History and Order Summary information. In an alternative embodiment, the information necessary to populate the Consumer's Order History and Order Summary information is contained within the Merchant's store's own databases.

As depicted in FIG. 22, the Return System icon, e.g., 402, is displayed on the Order Summary Screen. To return a particular item or set of times, the Consumer must click on the Return System icon 402. As depicted in the Consumer clicks on the Return System icon 402 which causes the display of a Returns Service Screen. FIG. 23*a* is a graphic representation depicting an exemplary Returns Service Screen provided by the Consumer Returns Subsystem in an exemplary Merchant's Online store in an exemplary embodiment of the invention.

In a Returns Service Screen, such as the exemplary one depicted in FIG. 23*a*, the Merchant's Standard Policy Overview Statement 420 (e.g., 160 as depicted in FIG. 11) is displayed by retrieving the Merchant's Policy Overview statement 362 from the Return System Account Database 106 as depicted in FIG. 20*a*. As depicted in FIG. 23*a*, a check box, e.g., 421-1 through 421-7, is displayed next to each ordered item, e.g., 404-1 through 404-7. To return a particular item or set of times, the Consumer must select the items to be returned 363 as depicted in FIG. 20*a*. As depicted in FIG. 23*a*, a Consumer that wants to return a particular item, e.g., 404-7, checks the check box 421-7 associated with that item (multiple boxes for multiple items can be checked) and then clicks the onscreen "Next Step >>" button 422.

Figure 23B:
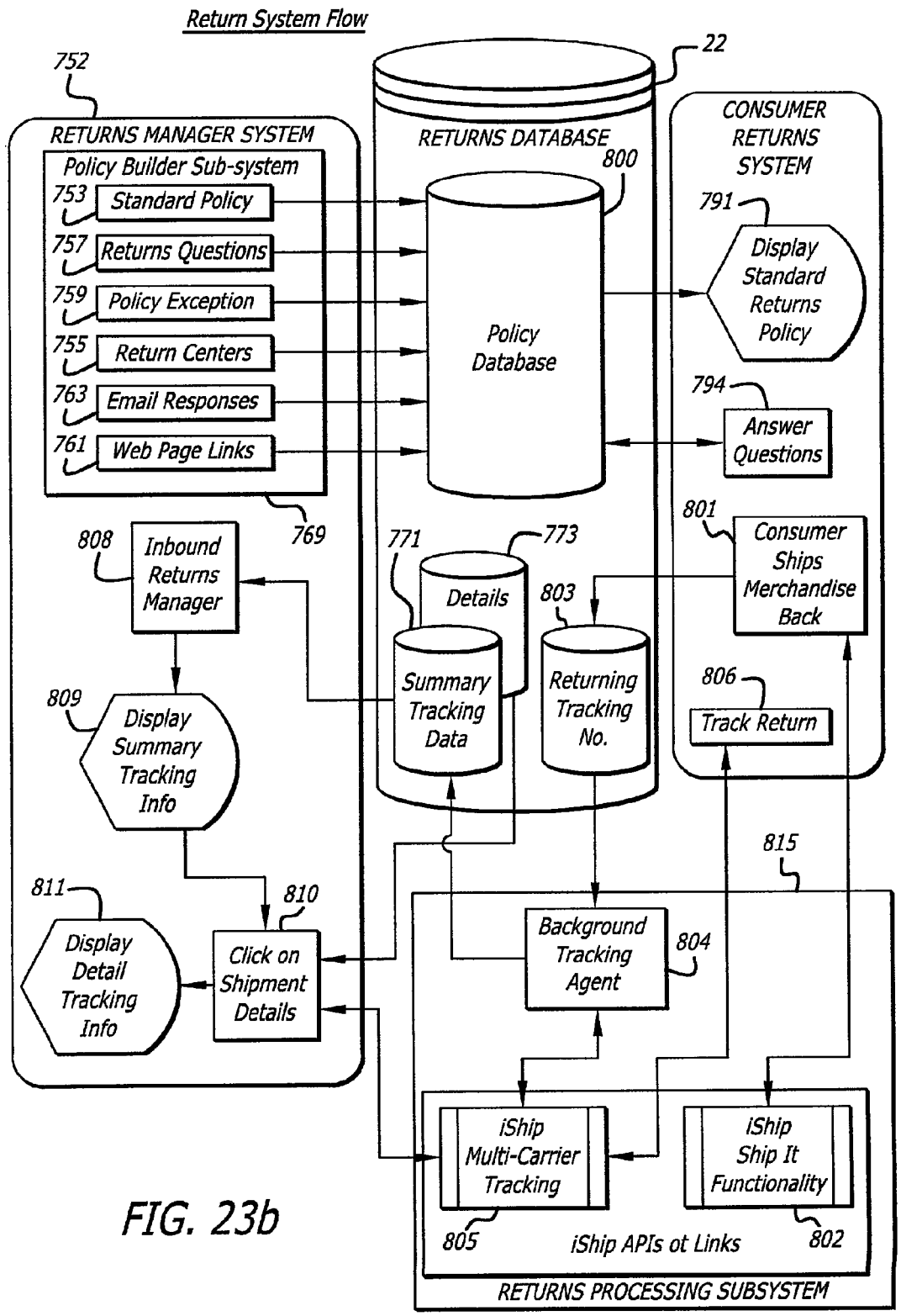
FIG. 23b is a high level data and logic flow diagram depicting an overview flow of the Returns System flow in an exemplary embodiment of the invention.

FIG. 23*b* is a high level data and logic flow diagram depicting an overview flow of the Returns System flow in an exemplary embodiment of the invention. As depicted in FIG. 23*b*, the Merchant establishes the Merchant's returns policy in the Returns Policy Database 800 using the Returns Manager Subsystem 752. The Consumer Returns Subsystem displays the Merchant's standard returns policy 791 and walks the Consumer through the appropriate return questions, applying the appropriate return rules, including exceptions 794 as was previously discussed in detail with regard to FIG. 13*j*. The Consumer then uses the System's shipping functionality 802 provided by the Returns Processing Subsystem 815 in the exemplary embodiment of the invention to return ship the merchandise 801. Returns shipping processing assigns the returned package a return tracking number 803. The Return Processing Subsystem provides a Background Tracking Agent 804 that periodically accesses the list of return tracking numbers and in an asynchronous manner uses the System's multi-carrier tracking function 805 to access the System's tracking servers, e.g., 21s-21z (as depicted in FIG. 3a) and populate's the return tracking databases 771, 773. The System provides Consumer tracking of a return shipment 806 through a Consumer Returns Subsystem access to the Returns Processing Subsystem's Multi-Carrier tracking function 805. The Multi-Carrier Tracking function is described further below.

Once the Background Tracking Agent 804 populates the Tracking Data 771, 773, the Merchant can view Inbound Shipments through the Inbound Returns Manager 808 which displays 809 Summary Tracking information (Summary Tracking information is depicted in FIG. 46 and discussed further below). The Merchant can request Shipment Details 810 and as depicted in, e.g., 640 in FIG. 46, in which case the Returns Manager Subsystem will display 811 Inbound Tracking Detail (Inbound Tracking Detail is depicted in e.g., FIG. 48 and discussed further below).

Continuing with the Consumer's experience in the System, once the Consumer clicks the onscreen Next Step >> button 422, then as depicted in FIG. 20a, the Return System then prompts the Consumer, through the Consumer Returns Subsystem in the Merchant's Online Store system, to answer the Merchant's Return Questions and provide the requested Return Reasons 364.

Figure 23C:
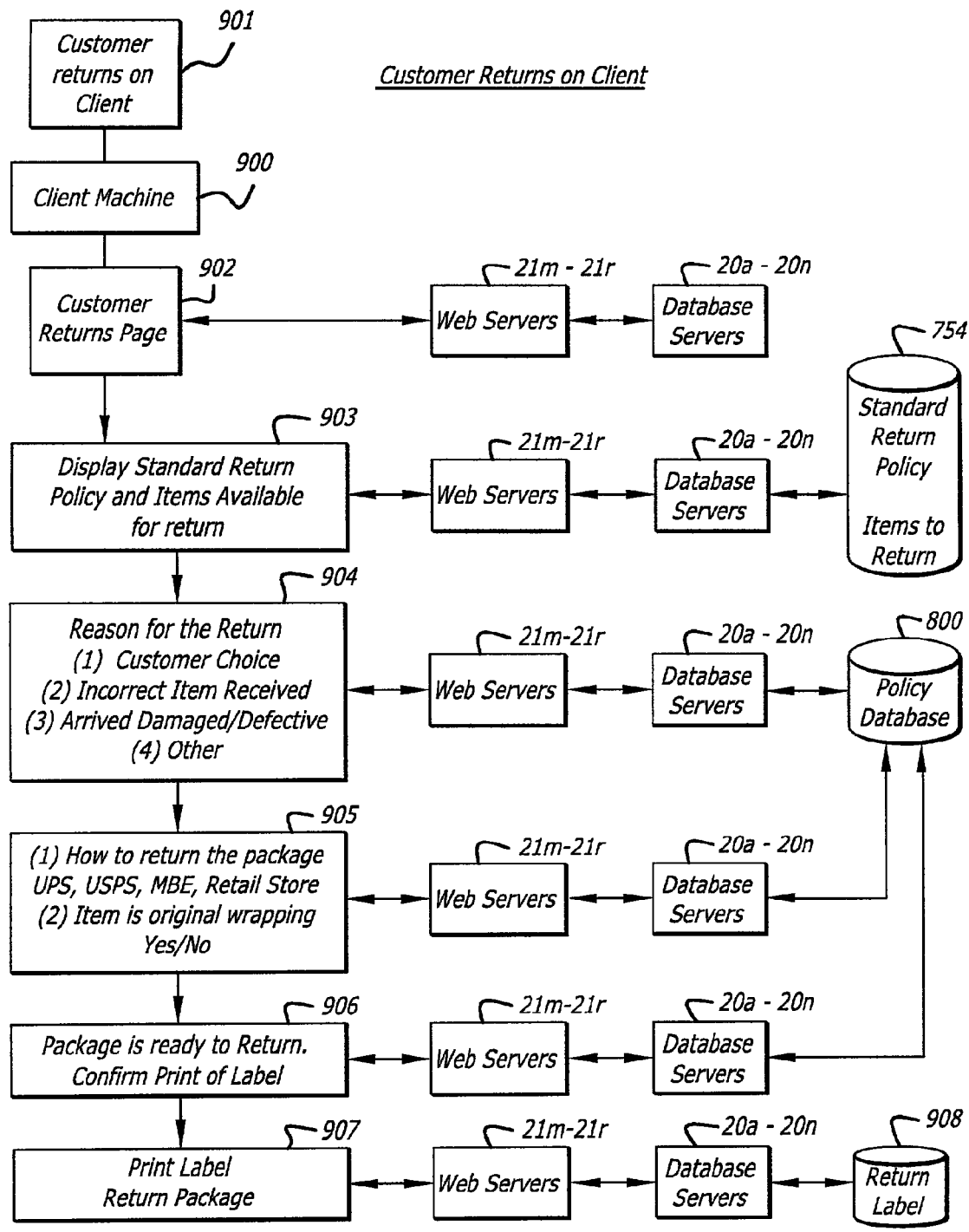
FIG. 23c is a high level interactivity diagram depicting an exemplary embodiment of the interactivity of the Customer Returns Subsystem between a Consumer's Client Machine, Customer Returns Page, various Customer Returns Subsystem functions, and the Return System servers in an exemplary embodiment of the invention.

FIG. 23c is a high level interactivity diagram depicting an exemplary embodiment of the interactivity of the Customer Returns Subsystem between a Consumer's Client Machine, Customer Returns Page, various Customer Returns Subsystem functions, and the Return System servers in an exemplary embodiment of the invention. As depicted in FIG. 23c, a portion of the Consumer Returns Subsystem 901 operates on the Consumer's (also referred to here as the Customer) Client Machine 900. When the Consumer accesses the Merchant's online store, the Merchant's menu options allow the Consumer to access the Consumer Returns Page 902 from within the Merchant's online store. From the Consumer Returns Page, the Consumer can access the Consumer Returns functions such as, for example: Display of the Merchant's Standard Policy and display items available for return 903 from the Standard Policy data 754; prompt the Consumer for the reason for the return 904; prompt the Consumer for shipping information such as the carrier with which the package will be returned and the packaging of the item 905; finalize shipping of package 906; and print a shipping label 907 saving the shipping label information, such as the tracking number, in a Return Label database 908. As with the Returns Manager Subsystem, the Consumer Returns Subsystem uses the Return System's web servers 21m-21r to interact with the Consumer, and uses the Return System's Database servers 20a-20n to access the various databases in the Policy Database 800 that are needed to supply the information for the interactivity FIG. 24 is a graphic representation of an exemplary Returns Service Return Reason Screen in an exemplary embodiment of the invention. As depicted in FIG. 24, for the Order selected 401-1, for the item 404-7 selected to be returned 421-7, the Merchant's Question 206 is asked, prompting the Consumer with acceptable answers 216, 207, 212, and 220 for selection 427-1 through 427-4. A Consumer Comments window 425 is provided with up and down scroll buttons 426-1 and 426-2 in which the Consumer can specify a narrative description. As depicted in FIG. 20a, the Return System compares the Consumer's Return Reason with the Merchant's Return Policy 365.

As depicted in FIG. 20c, according to the Merchant's Return Policy, if the Consumer's Return Reason is "justified", then the Return System authorizes the return 369 (and according to the Merchant's Return Policy, pays for the Return Shipping), calculating a Refund Amount and allowing the Consumer to Launch a Label 370, Print a Shipping Label 371; the Return System thanks the Consumer 372 and Prepares a Package Return Shipped e-mail 373.

As depicted in FIG. 24, a Refund Amount 172 is calculated based upon the standard policy choices made by the Merchant (Refund Amount 172=Item Price 173+Item Tax 174, as depicted in FIG. 11). When the Consumer has completed the Return Reasons for the particular item, the Consumer clicks the onscreen "Next Step >>" button 422.

Figure 25:
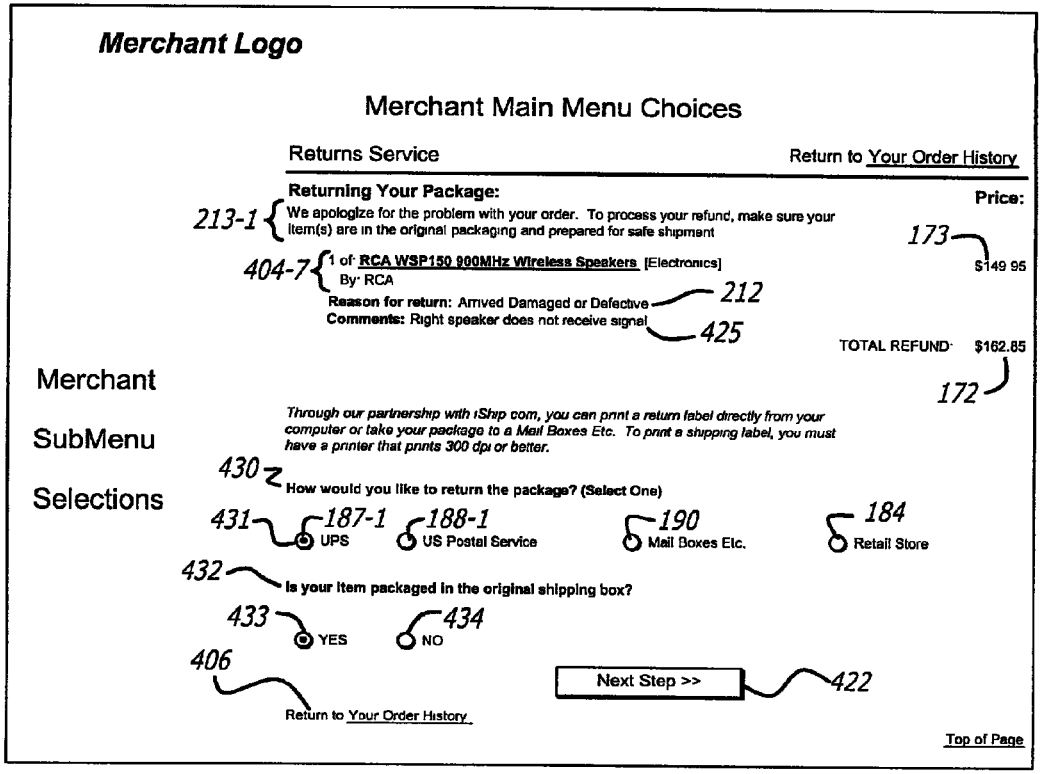
FIG. 25 is a graphic representation of an exemplary Return Summary Screen in an exemplary embodiment of the invention.

FIG. 25 is a graphic representation of an exemplary Return Summary Screen in an exemplary embodiment of the invention. The Return Summary Screen displays the Merchant's Response 213-1 (FIG. 25) appropriate for the Consumer's Return Reason 427-3 (FIG. 24) in response to the Merchant's Return Question 206 (FIG. 24) and possible Return Answers 216, 207, 212 and 220 (FIG. 24). The Return Summary Screen displays the item description of the item being returned 404-7, the Reason for Return 212, and the Consumer's comments 425. The Return Summary Screen also displays the item price 173 and the calculated Refund Amount 172.

Continuing with FIG. 25, the Return Summary Screen prompts the Consumer to select one of the Merchant's choices of Carriers 187-1, 188-1, 190 and 184. The Return Summary Screen also prompts the Consumer to indicate whether 433 or not 434 the returned item is in its original packaging 432. By pressing the onscreen "Next Step >>" button 422, the Return System displays a Label Create Screen.

Figure 26:
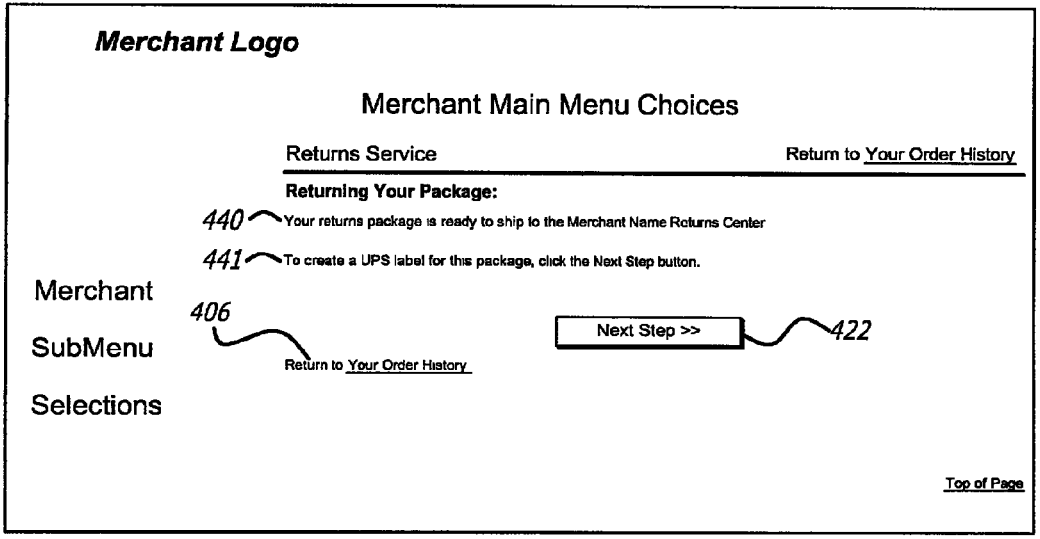
FIG. 26 is a graphic representation depicting an exemplary Label Create Screen in an exemplary embodiment of the invention.

FIG. 26 is a graphic representation depicting an exemplary Label Create Screen in an exemplary embodiment of the invention. The exemplary Label Create Screen depicted in FIG. 26 notifies the Consumer that the Return Package is ready to be shipped 440 and instructs the Consumer how to create a shipping label for the package 441 according to the Carrier selected by the Consumer (431 in FIG. 25).

Figure 27A:
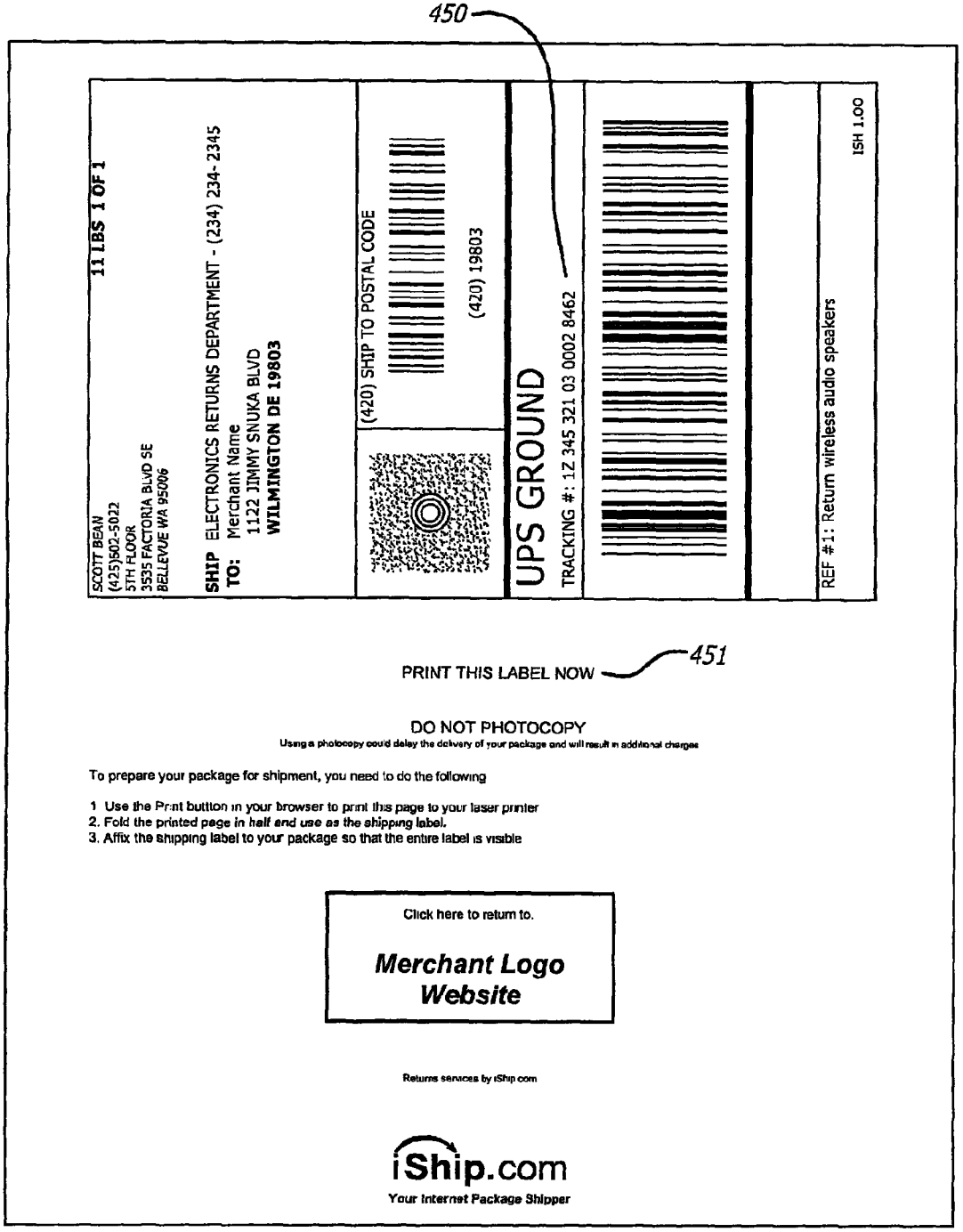
FIG. 27a is a graphic representation of an exemplary shipping label for a package for an item to be returned in an exemplary embodiment of the invention.

If the Consumer presses the onscreen "Next Step >>" button 422 on the Label Create Screen, the Return System prepares a Carrier shipping tracking number 450 and an internal Return System tracking number (see 803, FIG. 23b) for the item package. The Return System prepares a shipping label for the item package an exemplary embodiment of which is depicted in FIG. 27a.

A System tracking number is a unique number generated internally by the System to identify a particular package shipped using the System. The Shipper inputs the Shipper's Parcel Specifications for the Subject Parcel. Using each Shipper's Parcel Specifications, the System is programmed to access databases containing information about each supported Carrier. Each supported Carrier has a unique rating schedule, delivery and pickup rules and schedules, and certification requirements (the "Carrier Rules"). The System is further programmed to apply each supported Carrier's Rules to each Shipper's Parcel Specifications for the corresponding Subject Parcel.

As a result of the Consumer creating a shipping label, the System assigns the package a System package tracking number and adds a record containing all of the pertinent information about the package to the System database 22. Following are exemplary Shipping tracking numbers: MAGGY841VRY50; MAGGY84B496RF; MAGGY84X0FJ45.

In one embodiment, the System Tracking Number is based on a Base-33 number system. The characters available are: Zero (0) through nine (9) and A through Z excluding "I" (i), "L" (l), and "O" (o). Each letter represents a value, as depicted in the table below:

| |
|---|
| A = 10 |
| B = 11 |
| C = 12 |
| D = 13 |
| E = 14 |
| F = 15 |
| G = 16 |
| H = 17 |
| J = 18 |
| K = 19 |
| M = 20 |
| N = 21 |
| P = 22 |
| Q = 23 |
| R = 24 |
| S = 25 |
| T = 26 |
| U = 27 |
| V = 28 |
| W = 29 |
| X = 30 |
| Y = 31 |
| Z = 32 |

Each System Tracking Number is 13 alphanumeric characters. Position 1 is the letter 'M'. Positions 2-7 are a System Account number. Positions 8-12 are a five-digit ID. Position 13 is a Check Digit.

To calculate the Check Digit, the System performs the following steps: 1) Consecutively multiply the numeric value of each of positions 2-7; 2) Consecutively multiply the numeric value of each of positions 8-12; 3) Add both results; 4) Divide by 31; 5) Convert the remainder value to a Base-33 number. The converted value is the Check Digit.

If the Consumer decides to print the label, the Consumer clicks the "Print This Label Now" link 451 on the Print Label Screen as depicted in FIG. 27*a*.

As mentioned above, in some embodiments, the Shipper can use the System to locally print on the Shipper's printer device a bar-coded shipping label according to the Selected Carrier's certification standards. In some embodiments, the bar-coded shipping label, including two dimensional bar code labels, and other types of shipping labels, can be printed on either a thermal label printer or on a laser printer. The Shipper specifies the type of printer to the system during initial setup procedures. Thereafter, the System uses, as appropriate, the thermal printer or laser printer module to prepare the label image for printing on the Shipper's printer.

Figure 27B:
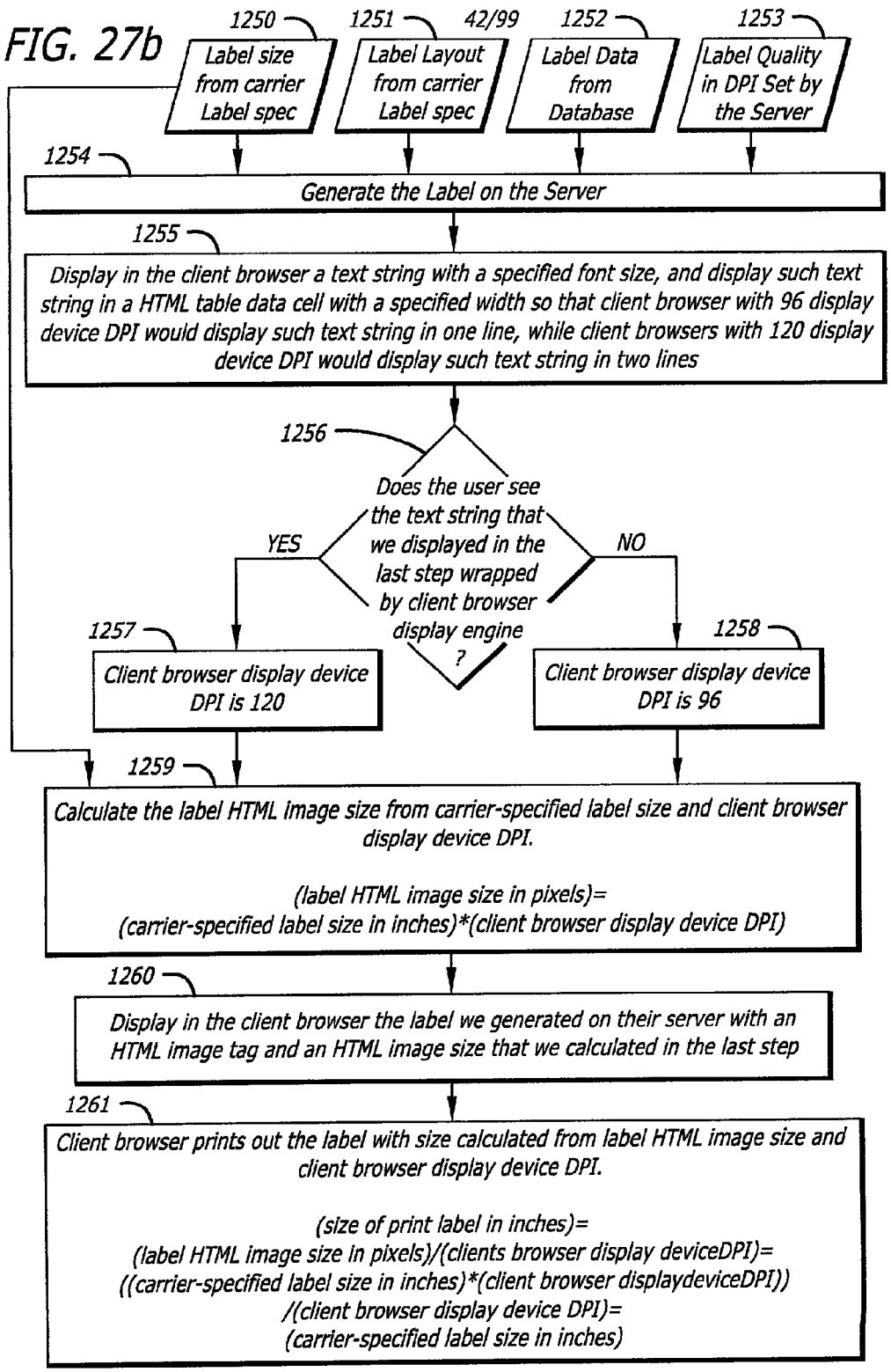
FIG. 27b is a flow diagram depicting an exemplary logic flow for printing of bar-coded shipping labels in an exemplary embodiment of the invention.

FIG. 27*b* depicts a flow diagram of one exemplary embodiment of the aspect of the invention that provides printing of bar-coded shipping labels on printer devices which are compatible with the client system on which the web browser is running, such as an HP-compatible laser printer. As depicted in FIG. 27*b*, one of the System Servers, for instance, a Shipping Server, e.g., 21*s* (FIG. 3*a*), gets the Label Size from the Carrier Label Specification 1250, the Label Layout from the Carrier Label Specification 1251, Label Data from the Shipper Database 1252, and the Label Quality in Dots Per Inch ("DPI") as set by the Server 1253, and uses this information to Generate the Label 1254.

The Server then creates, and causes the display on the client browser's display device of, a text string with a specified font face and in a specified font size in an HTML table data cell with a specified width 1255. If the client browser is using a 96 display device DPI, the display device will display said text string in the HTML table data cell in a single line. If on the other hand, the client browser is using a 120 display device DPI, the display device will display said text string in the HTML table data cell in two lines.

In creating the display of the text string, the Server also sends a message to the Shipper asking the Shipper to answer the following question: do you see the text string displayed on your screen as a single line or as wrapped text in multiple lines? The Server receives the Shipper's response and determines from the response whether the Shipper's display device has displayed the text as a single line or as wrapped text in multiple lines 1256. If the text is displayed as a single line, then the client browser 1257 display device DPI is 120. Otherwise, the client browser 1258 display device DPI is 96.

Next, the Server calculates the shipping label HTML image size in pixels 1259 by multiplying the Carrier-specified label size from the Carrier Label Specification times the client browser display device DPI as determined by the previous step.

Next, the System displays the generated label image in the client browser 1260 with an HTML image tag and an HTML image size in pixels as calculated in the prior step.

The client browser calculates the size of the label to be printed in inches by dividing the label HTML image size in pixels as calculated in a prior step by the client browser display device DPI 1261; the client browser then prints out the label with the size calculated 1261.

Figure 27C:
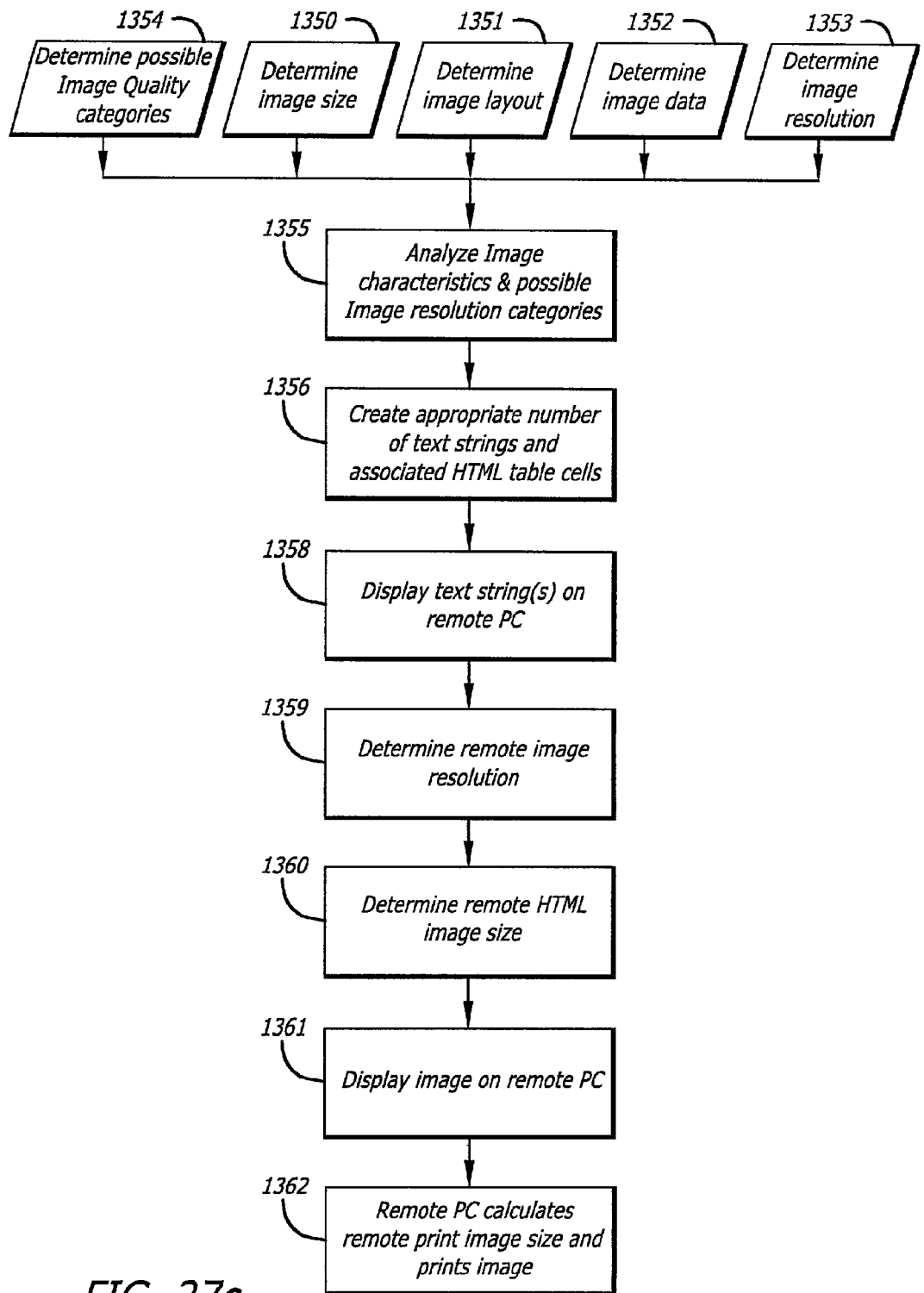
FIG. 27c is a flow diagram depicting an exemplary logic flow for printing of dimensionally accurate images in an exemplary embodiment of the invention.

FIG. 27*c* depicts a flow diagram of an exemplary embodiment of the aspect of the invention that provides printing of dimensionally accurate images, such as dimensionally sensitive symbologies including two-dimensional bar codes and other two-dimensional machine readable symbologies. This aspect of the invention provides the printing of such dimensionally accurate images on various types of printer devices including among others HP-compatible laser printers. The printer devices can be configured with remote computers, such as PC's, that will receive signals to print the dimensionally accurate image over a communications network such as the Internet. Each PC having a client browser or executing like software, and each PC being configured with a pre-established Image Resolution that applies to the display device and the printer device configured with the PC.

As depicted in FIG. 27*c*, a computer, such as a Shipping Server 22*s* (FIG. 3*a*), determines the Image Size 1350, the Image Layout 1351, any relevant Image Data 1352, and the Image Resolution in Dots Per Inch ("DPI") or in any other measure of Image Resolution 1353. The Server 1014 uses this information to Generate the Image 1354.

Alternatively, the Image has previously been created; the Server determines from the Image, the Image Size 1350, the Image Layout 1351, any relevant Image Data 1352, and the Image Resolution in DPI or in any other measure of Image Resolution 1353 (collectively referred to hereinafter as the "Image Characteristics").

The Server determines the possible Image Resolution Categories and associated values of client PC's 1354. Image Resolution Categories and associated values include information such as the number of text strings, and the length of and characteristics (font face, font size, and HTML table cell width) of each of the identified number of, text strings that must be used to determine the Image Resolution of client display devices 1356.

An HTML table cell width is fixed in that the physical width of the display of the HTML table cell does not change depending upon the resolution of the client device; a text string comprised of characters having a particular font and font size has a scalable width, depending upon the resolution of the client device resolution. Use of an HTML table cell to measure the resolution of client devices is not a limitation of the invention. In an alternative embodiment, a graphic element other than an HTML table cell, having a fixed width, is used to measure the resolution of client devices.

The possible Image Resolution Categories and values are stored in the memory of the Server and updated on some basis. In an alternative embodiment, the possible Image Resolution Categories and values are input into the Server computer.

The Server then analyzes the Image Characteristics, and the possible Image Resolution categories and/or values 1355, and creates the appropriate number of text strings and associated HTML table cells 1356. Each text string is created to have a specified font face, a specified font size, and an associated HTML table cell with a specified width 1357. The computer then causes the display of the text strings in the associated HTML table cells on the remote client PC's display device 1358.

In creating the display of the text string, the Server also sends a message to the recipient PC asking the user to answer the following question: is the first text string displayed on your screen as a single line or as wrapped text in multiple lines? The Server receives the remote user's response and determines from the response whether the remote user's PC's display device has displayed each of the text strings as a single line or as wrapped text in multiple lines in a manner similar to that depicted in FIG. 27*b*, 1256-1258. The Server then sets the PC's Remote Image Resolution for printing the Image 1359 according to the results of the user's PC's display of the text strings.

Next, the Server calculates the Remote HTML Image Size in pixels 1360 by multiplying the Image Size times the PC's Remote Image Resolution as determined by the previous step.

Next, the Server displays the generated image on the display device of the remote PC 1361 with an HTML image tag and the Remote HTML Image Size in pixels as calculated in the prior step.

The client browser of the remote PC calculates the size of the Image to be printed ("Remote Print Image Size") in inches by dividing the Remote HTML Image Size in pixels by the Remote Image Resolution 1362; the client browser then prints out the Image with the Remote Print Image Size 1362.

In one embodiment of the invention, instead of printing a shipping label at the Shipper's printer, a Package Number is displayed online on a Package Number Screen with notification that the label will be printed at a shipping location previously designated by the Shipper.

Figure 28:
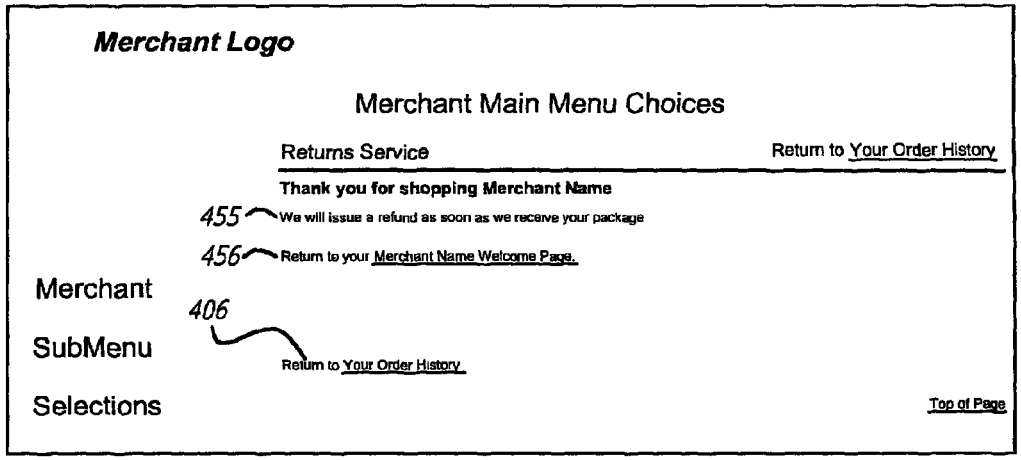
FIG. 28 is a graphic representation of an exemplary shipping label displayed as a Shipping Label Screen in an exemplary embodiment of the invention.

After the Consumer has printed a shipping label, as depicted in FIG. 28, the Return System then thanks the Consumer 455 and allows the Consumer to either return to the Merchant's Home Page, e.g., 456, or return to the Consumer's Order History 406. The option to return to the Consumer's Order History 406 is an option on most of the Consumer Return System Screens described above (FIGS. 22-26, 28).

Figure 29:
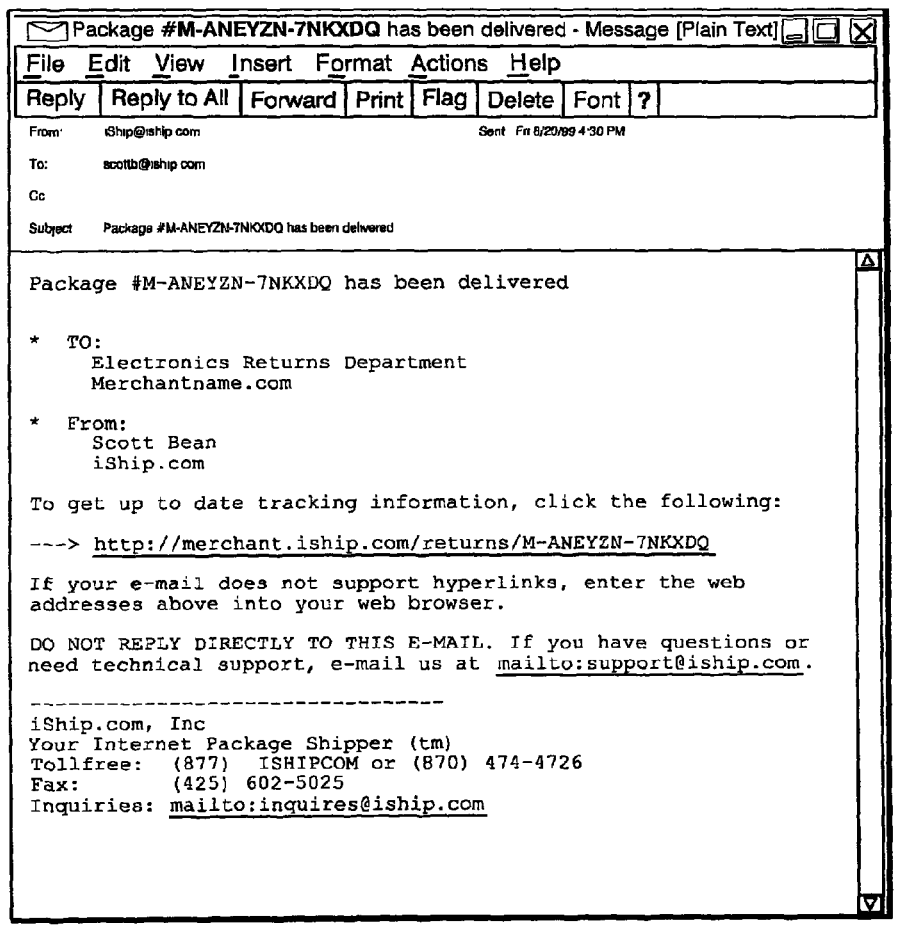
FIG. 29 is a graphic representation of an exemplary Return Shipped e-mail to a Merchant in an exemplary embodiment of the invention.
Figure 30:
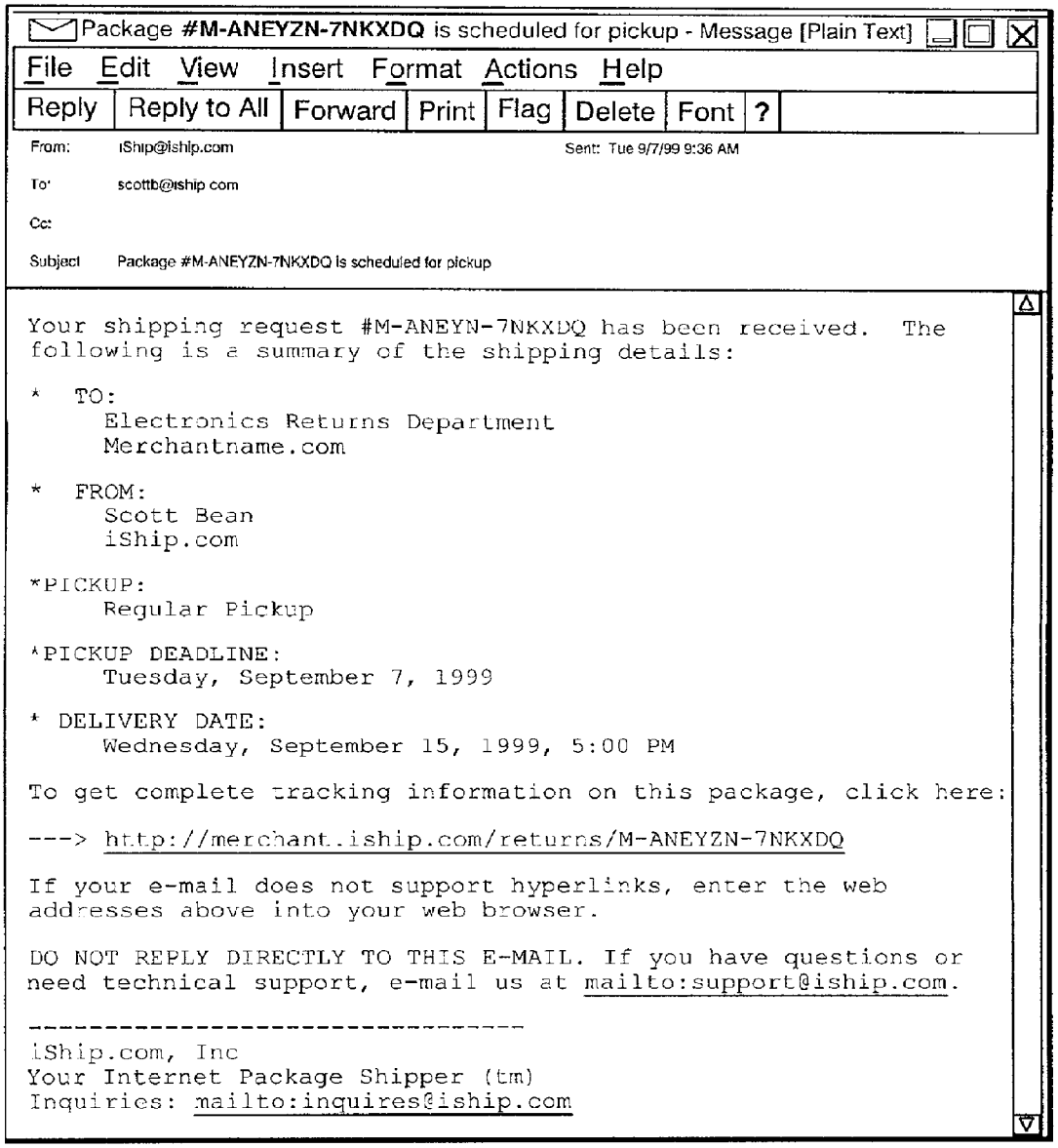
FIG. 30 is a graphic representation of an exemplary Return Shipped e-mail to a Consumer in an exemplary embodiment of the invention.

Once the Consumer has printed a shipping label, the Return System generates a Return Shipped e-mails, one to the Merchant, an exemplary embodiment of which is depicted in FIG. 29, and one to the Consumer, an exemplary embodiment of which is depicted in FIG. 30.

Returning to FIG. 20*a*, if the Consumer provides a Return Reason that is not considered "justified" by the Merchant, then a different set of functions is performed by the Return System. In FIG. 31, the Consumer requests 421-5 to return an item 404-5. In FIG. 32, the Consumer indicates as a Return Reason a reason 427-1/216. The Return System compares the reason 216 to the Merchant's Return Policy 365, as depicted in FIG. 20*a*. In this case, the Return System determines that the reason is not justified. Accordingly, the Return System, as instructed by the Merchant's Return Policy, requires that the Consumer pay for return shipping.

As depicted in FIGS. 20*a* through 20*c*, in order to pay for return shipping, the Return System prompts the Consumer to specify Return Shipping Preferences 366, prepares and displays a Graphic Comparison of the costs of shipping the item with a plurality of Carriers and Services 367, and prompts the Consumer to select and pay for shipping the package according to the Carrier and Service selected 368, before allowing the Consumer to create and print a return shipping label 370-371.

Accordingly, when the Consumer then clicks the onscreen "Next Step >>" button 422, as depicted in FIG. 32, the Return System displays a series of Consumer Shipping Preferences Specification Screens, exemplary embodiments of which are depicted in FIGS. 33-35. In the Consumer Shipping Preferences Specifications Screen depicted in FIG. 33, the Return System prompts the Consumer to identify a Carrier 469 from a selection of Carriers and Return Locations 470-474 that were allowed by the Merchant (FIG. 12, 192-195, 181, 184); specify item packaging 475 as original 476 or not 477; and specify payment information 478-487. Once the Consumer has completed the necessary information, the Return System validates the Consumer supplied information. If the Consumer clicks the onscreen "Next Step >>" button 422, the Return System displays a subsequent Consumer Shipping Preferences Specification Screen, as depicted in FIG. 34.

In the Consumer Shipping Preferences Specification Screens depicted in FIG. 34, the Return System prompts the Consumer to specify the package weight 500, packaging type information 501-505, package dimensions 506-507, origination postal code 510, destination postal code 511, the destination address city 512, the destination address country 513, the destination delivery address type 514-515, and loss protection coverage 516. Once the Consumer completes this information, if the Consumer clicks the onscreen Continue button 422, the Return System displays a subsequent Consumer Shipping Preferences Specification Screen, as depicted in FIG. 35.

In the Consumer Shipping Preferences Specification Screens depicted in FIG. 35, the Return System prompts the Consumer to specify the Carriers that the Consumer is willing to use, e.g. 520-523; the Consumer's ship from location 524 (a pull down menu of which is available by clicking the pull down menu button 525) and 526 (Advanced options); the shipping date 530 (with scroll down button 531); and tracking capabilities 532-533. If the Consumer needs additional information, the Consumer clicks the Learn More button 527 which is contextually sensitive as to which shipping specifications are involved. Once the Consumer completes the information, the Return System validates the information. The Consumer can return to a previous specification screen by clicking the onscreen "<<Back" button 540, or can go to the next step by clicking the onscreen "Continue >>" button 422.

Figure 36A:
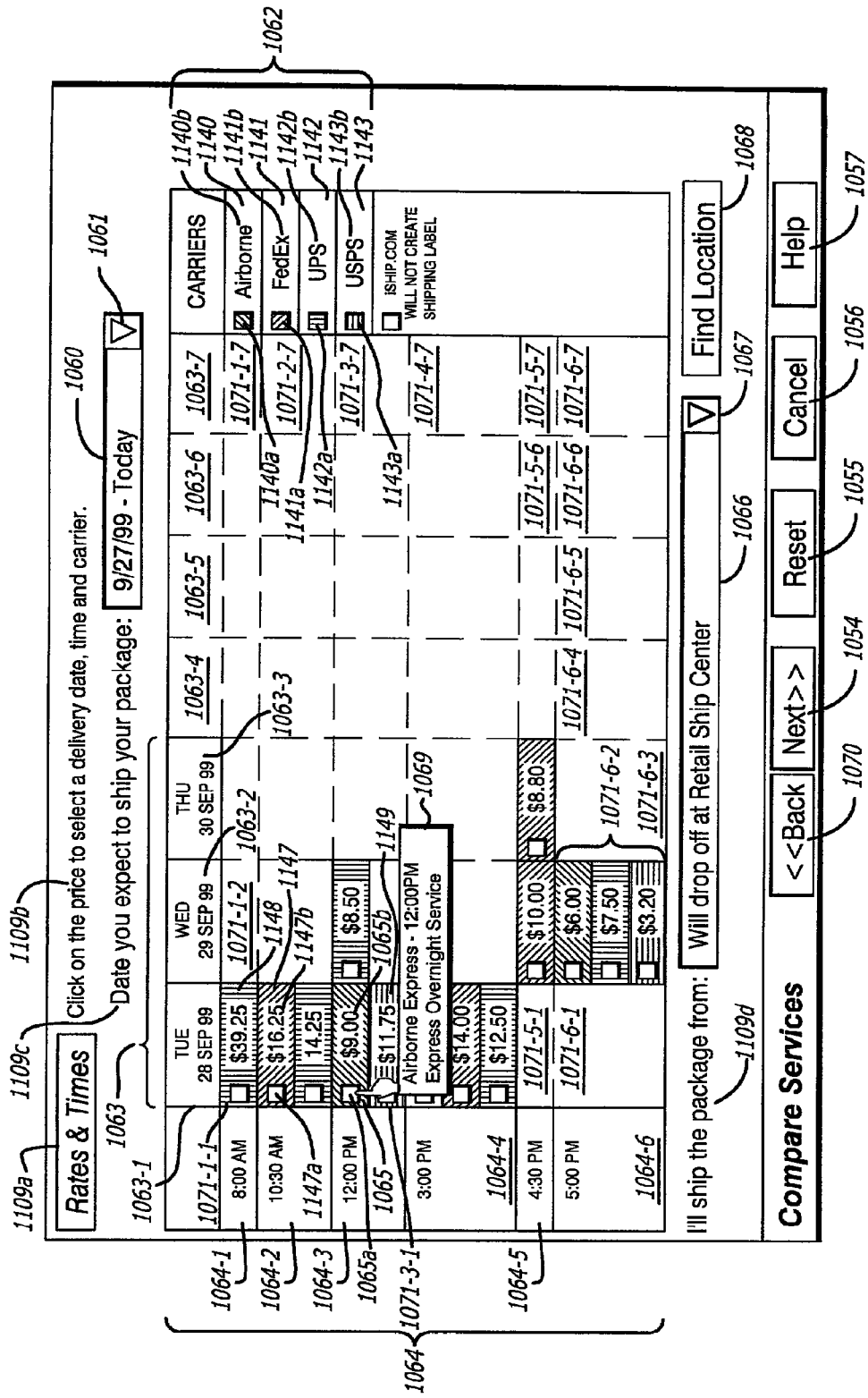
FIG. 36a is a graphic representation depicting an exemplary Dynamically Dimensioned Multi-Carrier, Multi-Service Graphic Array online display in an exemplary embodiment of the invention.

If the Consumer has completed all of the necessary specification information and clicks the onscreen "Continue >>" button 422, the Return System generates and displays a Graphic Cost Comparison of the selected Carriers and available Carrier Services, exemplary embodiments of which are depicted in FIGS. 36*a* and 37.

In an exemplary embodiment of the invention, the System uses MTX.exe as a transaction server. MTX.exe is an executable program that is part of the Microsoft suite of Internet web solution products.

In the exemplary embodiment of the System, Web pages are grouped in organization units referred to as "virtual directories." For example, in the exemplary embodiment, all of the user interface Web pages that prompt a user to input registration data, and that provide interactive feedback to the registering user, would be grouped into a virtual directory. When a request for a particular Web page is received by a particular shipping Web server, the shipping Web server determines which virtual directory is needed. Depending on the virtual directory to be accessed, MTX.exe loads one of a plurality of COM objects, which are DLL's (Dynamic Link Libraries), for the System. One of the COM objects for the exemplary embodiment of the system is referred to as the Rating.DLL.

Each Enterprise user is enabled to process one or more Carriers from a plurality of Carriers supported by the system. In the exemplary embodiment of the invention, when a user, through the user's client PC, issues a rating request, the System passes a list of carrier identifiers for the carriers enabled for that user to the Rating.DLL operating on the shipping Web server to which the rating request is directed.

The Rating.DLL consists of various rating-related functions, one of which is referred to as "Get_Rate_Function". Get_Rate_Function receives as input the carrier IDs for the carriers enabled for the particular user, package information, shipping information, including origin and destination postal codes, and other information. Get_Rate_Function parses the received input information. Get_Rate_Function tests the carrier ID to determine the name of one of a plurality of Carrier-specific shipment rating routines that is to be performed in order to rate shipments for the particular carrier ID. In the exemplary embodiment of the invention, the Carrier-specific shipment rating routines are SQL Stored Procedures that are executed by the appropriate SQL Database Server. Get_Rate_Function then causes the appropriate Carrier-specific shipment rating routine to be performed to rate the User-specified shipment according to the relevant Carrier's business rules.

FIG. 36a depicts an exemplary Dynamically Dimensioned Multi-Carrier, Multi-Service Graphic Array online display as part of an exemplary supplemental Shipper Parcel Specification Input Screen. In the embodiment of the Graphic Array depicted in FIG. 36a, the particular screen is titled the Rates and Times Screen.

As depicted in FIG. 36a, the exemplary Graphic Array contains the following information and display elements: 1) valid delivery dates 1063 (1063-1 through 1063-3) across the top of the graphic display for the selected Ship Date; 2) sorted, valid delivery times 1064 (1064-1 through 1064-6) for all valid dates down the left side of the graphic display; and 3) color coded by Carrier, Carrier cell entries, e.g., 1065, for each available rate, by date and time.

In the exemplary embodiment depicted in FIG. 36a the Graphic Array comprises an array of intersecting rows and columns. Each column corresponds to a day and date of parcel delivery. In FIG. 36a, the days and dates of delivery shown are "TUE 28 SEP 99" (1063-1), "WED 29 SEP 99" (1063-2) and "THU 30 SEP 99" (1063-3). As depicted in FIG. 36a, space for other columns (1063-4 through 1063-7) are available for display; in the case of the example depicted in FIG. 36a however, no dates are displayed in those columns.

Each row of the Graphic Array corresponds to a time of delivery. In FIG. 36a, the times of delivery are shown as "8:00 AM" (1064-1), "10:30 AM" (1064-2), "12:00 PM" (1064-3), "3:00 PM" (1064-4), "4:30 PM" (1064-5), and "5:00 PM" (1064-6).

At the intersection of each row (1064-1 through 1064-6) and column (1063-1 through 1063-7) of the Graphic Array is a "cell." In FIG. 36a, cells will be referred to by the element 1071, and by the intersecting row (1 through 6) and column (1 through 7) the intersection of which forms the space for each cell (1071-1-1, 1071-1-2, . . . 1071-6-7). Some of the cells depicted in FIG. 36a are empty, e.g., 1071-5-1, 1071-6-1, 1071-6-3, 1071-6-4. Empty cells represent the circumstances that none of the Carriers supported by the System (the "supported Carriers") support delivery of the Subject Parcel for the time and date for which that cell represents the intersection.

Some cells depicted in FIG. 36a have one or more cell entries. In FIG. 36a, each cell entry represents a particular Carrier. Each Carrier cell entry is color coded with a unique color, the unique color corresponding to a particular Carrier as is discussed in more detail below; each Carrier cell entry contains a graphic element, e.g., 1147a, and a monetary amount, e.g., 1147b, which represents the price for which the corresponding Carrier would deliver the subject parcel. For instance, cell 1071-1-1 contains a single Carrier cell entry 1148. Cell 1071-3-1 contains two Carrier cell entries 1065 and 1149.

A color-coding legend 1062 is displayed on the Screen to identify by a name (1140b, 1141b, 1142b, and 1143b) and a color-coding symbol (1140a, 1141a, 1142a, and 1143a), each of the supported Carriers that provide the service according to the particular Shipper's Parcel Specifications for the particular Subject Parcel.

For purposes of this application, unique colors are depicted with graphic symbols. For example, a right-diagonal hash mark symbol 1140a is used herein to represent the color red; a left-diagonal hash mark symbol 1141a is used herein to represent the color purple; a vertical hash mark symbol 1142a is used to represent the color amber; and a horizontal hash mark symbol 1143a is used to represent the color blue. The particular hash mark symbols used herein and the colors mentioned herein are exemplary and are not a limitation of the invention.

Each cell of the Graphic Array that is not empty contains one or more color-coded Carrier cell entries. For example, in FIG. 36a, cell 1071-3-1 contains two Carrier cell entries, 1065 and 1149. Carrier cell entry 1065 is color-coded with the right-diagonal hash mark symbol (representing the color red) which, according to the color-coding legend 1062, corresponds 1140a with the Carrier identified as "Airborne" 1140b. Carrier cell entry 1149 is color coded with the horizontal hash mark symbol (representing the color purple) which, according to the color-coding legend 1062, corresponds 1143a with the Carrier identified as "USPS" 1143b.

Each Carrier cell entry, e.g., 1065, contains a graphic element, e.g., 1065a, which contains what is known as "ALT text". As depicted in FIG. 36a, a Shipper viewing the Graphic Array online can place the PC's cursor on the graphic element, e.g., 1065a of a particular Carrier cell entry, e.g., 1065, to display a pop-up screen 1069 that displays the ALT text for that particular Carrier cell entry. In some embodiments, the ALT text will be displayed by merely placing the cursor over the graphic element for a particular Carrier cell entry and leaving the cursor in that position for a certain time interval. In alternative embodiments, the Shipper must click on the graphic element for a particular Carrier cell entry in order to display the ALT text. In the exemplary embodiment depicted in FIG. 36a, the displayed ALT text, e.g., the text displayed in pop-up screen 1069, contains the full Carrier name (in the depicted case, "Airborne Express") and the full Carrier service name (in the depicted case, "Express Overnight Service") for the Carrier 1140*b* (in this case, Airborne) to which that Carrier cell entry corresponds.

As depicted in FIG. 36*a*, the color for the Carrier identified as "Airborne" 1140*b* is depicted in the color coding legend 1062 with a right-diagonal cross-hatch symbol 1140*a*. Accordingly, each Carrier cell entry contained within the Graphic Array with the right-diagonal cross-hatch symbol, e.g., 1065, corresponds to a delivery of the Subject Parcel supported by the Carrier "Airborne." Appearing in each of the color-coded Carrier cell entries, e.g., 1065 is a graphic element, e.g., 1065*a*, and a monetary value, e.g., 1065*b*. The monetary value, e.g., 1065*b* corresponds to the price that the corresponding Carrier would charge to deliver the Subject Parcel according to the time 1064-3 and date 1063-1 specified according to the row and column of which the intersection (which, in the case described is cell 1071-3-1) contains the Carrier cell entry 1065. For example, as depicted in FIG. 36*a*, the Carrier cell entry 1065, depicted with the right-diagonal cross-hatch symbol, contains the monetary amount "$9.00." Accordingly, the amount $9.00 is the price that the Carrier Airborne would charge to deliver the Subject Parcel at the identified time of 12:00 p.m. 1064-3 on the identified date of Tuesday, Sep. 28, 1999 1063-1.

Similarly, as depicted in FIG. 36*a*, the color for the Carrier identified as "FedEx" 1141*b* is depicted in the color coding legend 1062 with a left-diagonal cross-hatch symbol 1141*a*. Accordingly, each Carrier cell entry contained within the Graphic Array with the left-diagonal cross-hatch symbol, e.g., 1147, corresponds to a delivery of the Subject Parcel supported by the Carrier "FedEx."

Further, as depicted in FIG. 36*a*, the color for the Carrier identified as "UPS" is depicted in the color coding legend 1062 with a vertical cross-hatch symbol 1142. Accordingly, each Carrier cell entry contained within the Graphic Array with the vertical cross-hatch symbol, e.g., 1148, corresponds to a delivery of the Subject Parcel supported by the Carrier "UPS."

Similarly, as depicted in FIG. 36*a*, the color for the Carrier identified as "USPS" is depicted in the color coding legend 1062 with a horizontal cross-hatch symbol 1143. Accordingly, each Carrier cell entry contained within the Graphic Array with the horizontal cross-hatch symbol, e.g., 1149, corresponds to a delivery of the Subject Parcel supported by the Carrier "UPS."

In the embodiment of the Graphic Array depicted in FIG. 36*a*, the Graphic Array is dynamically dimensioned. For instance, only the dates and days (1063-1 through 1063-3) for which delivery that conforms to the particular Shipper's Parcel Specifications for the particular Subject Parcel are displayed across the top of the graphic. For example, for the date Tuesday, Sep. 28, 1999 (1063-1), at the time 5:00 p.m. (1064-6), no Carrier supports delivery of the Subject Parcel.

Further, as depicted in FIG. 36*a*, only the times (1064-1 through 1064-6) during which at least one of the Carrier/Services identified as supporting the delivery are displayed along the viewer's left side of the Dynamically Dimensioned Multi-Carrier Graphic Array online display.

Still further, as depicted in FIG. 36*a*, a Carrier cell entry, e.g., 1065, is displayed for each of, but only for each of, the Carriers/Services that support delivery for a particular day and time in the cell of the Graphic Array that represents delivery on a particular day and at a particular time. When the circumstances require, the System displays one or more Carrier cell entries in a single cell. For instance, cell 1071-3-1 contains two entries, 1065 and 1149; whereas cell 1071-1-1 contains only a single cell 1148. Accordingly, as depicted in FIG. 36*a*, the cell size expands vertically to accommodate multiple Carrier cell entries.

In the exemplary embodiment depicted in FIG. 36*a*, the color-coding legend 1062 for each of the Carriers/Services represented in the Graphic Array is displayed with color-coding graphic elements (1140*a* through 1143*a*) and identification labels (1140*b* through 1143*b*) for each relevant Carrier/Service along the viewer's right side of the rating and timing graphic. Alternatively, instead of the printed name, the logo for the particular Carrier/Service can be displayed. As another alternative, the Carrier/Service logo can be displayed in color in the color-coding legend 1062.

The particular arrangement of the color legend 1062 depicted in FIG. 36*a* and the particular colors used in the color legend depicted therein are exemplary and are not a limitation of the invention. In an alternative embodiment, instead of using color, other visually distinctive methods are used to differentiate between different Carriers/Services. For instance, other visually distinctive methods of Carrier/Service differentiation include but are not limited to: three-dimensional texture effects, other three-dimensional effects, two-dimensional markings (for instance, dots, cross-hatching, and the like), lighting effects, graphic symbols (for instance, the logos of the Carriers/Services) and any combination of the aforementioned features with color.

In the embodiment of the Graphic Array depicted in FIG. 36*a*, the exemplary Graphic Array is depicted as horizontally wide enough to accommodate seven delivery days (1063-1 through 1063-7) within a particular delivery timespan. The depiction in FIG. 36*a* of the Graphic Array as a fixed size accommodating up to seven delivery days is exemplary and is not a limitation of the invention. In alternative embodiments, the Graphic Array online display collapses or expands in total size to reflect the actual number of rows and columns that need to be present in order to display the Carrier cell entries for the Carriers/Services that support delivery of the Subject Parcel according to the Shipper's Parcel Specifications.

The arrangement as depicted in FIG. 36*a* of the parcel delivery days and dates (1063-1 through 1063-7) across the top and the parcel delivery times (1064-1 through 1064-6) along the left side of the Graphic Array is exemplary and is not a limitation of the invention. In one alternative embodiment, the parcel delivery days and dates are displayed across the bottom, and the parcel delivery times are displayed on the viewer's right side, of the Graphic Array. In other alternative embodiments, the parcel delivery days are arranged on one of the two sides of the Graphic Array and the parcel delivery times are arranged along the top or the bottom of the Graphic Array. In such an alternative embodiment, the cells of the Graphic Array are expandable horizontally to accommodate the appropriate number of relevant Carriers/Services.

As depicted in FIG. 36*a*, the Shipper is asked to input the Expected Ship Date 1060. In the exemplary embodiment depicted, a drop down menu activation mechanism 1061 provides the Shipper the ability to activate a pull down menu (not shown) of seven entries beginning with the current date and includes the six days immediately following the current date. The format used is "M/D/YY-Day name". "Today" and "Tomorrow" are displayed appropriately. The number of entries provided by the selection mechanism, the format of the Expected Ship Date, and other features described herein are exemplary and are not a limitation of the invention.

In the exemplary embodiment depicted in FIG. 36*a*, once the Shipper selects the Expected Ship Date, the System uses the Expected Ship date and the other information provided by the Shipper, as in the screens depicted in FIGS. 25, 34, and 35 described above, to access the Carrier Rules, apply the Carrier Rules, and prepare the Graphic Array containing the delivery prices and delivery times for the Subject Parcel according to the Shipper's Parcel Specifications. The System will then generate the signals necessary to display the Graphic Array and cause the Graphic Array to be displayed on the Shipper's PC.

Once the Graphic Array is displayed, the Shipper can change previously input information and the System will automatically regenerate the Graphic Array with the delivery rates and delivery times that have been updated to reflect the new information. For instance, if the Shipper selects a new shipping date, the System will regenerate the Graphic Array with the appropriate new rates and times. The logic for regenerating the Graphic Array is described in more detail below.

In the exemplary embodiment depicted in FIG. 36a, a Ship Location Type drop down menu activator 1067 is located below the Graphic Array. The particular location of the Ship Location Type selection mechanism as described herein is exemplary and is not a limitation of the invention. If the Shipping Location class is a "ship center", a "Find Location" button 1068 is displayed next to the drop down menu. In order to open the Drop Off Locator in a pop-up window, the Shipper places the Shipper's PC cursor on the "Find Location" button 1068 and clicking the Shipper's user input device. The Origin Zip Code and Ship Location type values supplied by the Shipper are used as parameters for the Drop Off Locator to locate a list possible Drop Off Location choices. The Shipper can select a Drop Off Location from the Drop Off Locator menu. The system dynamically responds to changes by the Shipper to Origin Zip Code and Ship Location type to present choices of Drop Off Location choices.

Navigational buttons appear at the bottom of the Rates and Times Screen depicted in FIG. 36a. Clicking the "Back" button 1070 will return the Shipper to the previously displayed screen. Clicking the "Next" button 1054 will cause the System to display the next screen.

If a user returns to the Rates and Times Screen (FIG. 36a) from any of the Specification Screens, e.g., FIGS. 33-35, any Specification changes will effect the displayed rates.

Using the subject parcel's Parcel Specifications, the System is programmed to access databases containing information about each supported Carrier. Each supported Carrier has a unique rating schedule, delivery and pickup rules and schedules, and certification requirements (the "Carrier Rules"). The System is further programmed to apply each supported Carrier's Rules to each Shipper's Parcel Specifications for the corresponding Subject Parcel. The System calculates the Shipping Charges based on zip-to-zip pricing where the Seller has provided the origin zip code and the Buyer has provided the destination zip code.

To develop the rates for display in the Graphic Array, the System rating component is instantiated in the server-side script. The rating component's rate information method is invoked with the rate parameters embedded in the URL. Based on Carriers' business rules, the rates and their service option charges for all Carriers/Services are calculated from each respective Carrier's zone data, service/delivery time data and rate data.

The System keeps the Carrier data up-to-date in the System database 22. The application does not use any carriers' Application Program Interface (API) functions to get the rate information. All of carrier rate data is stored in the System database 22 and all business rules to calculate the rates are implemented within the System.

Figure 36B:
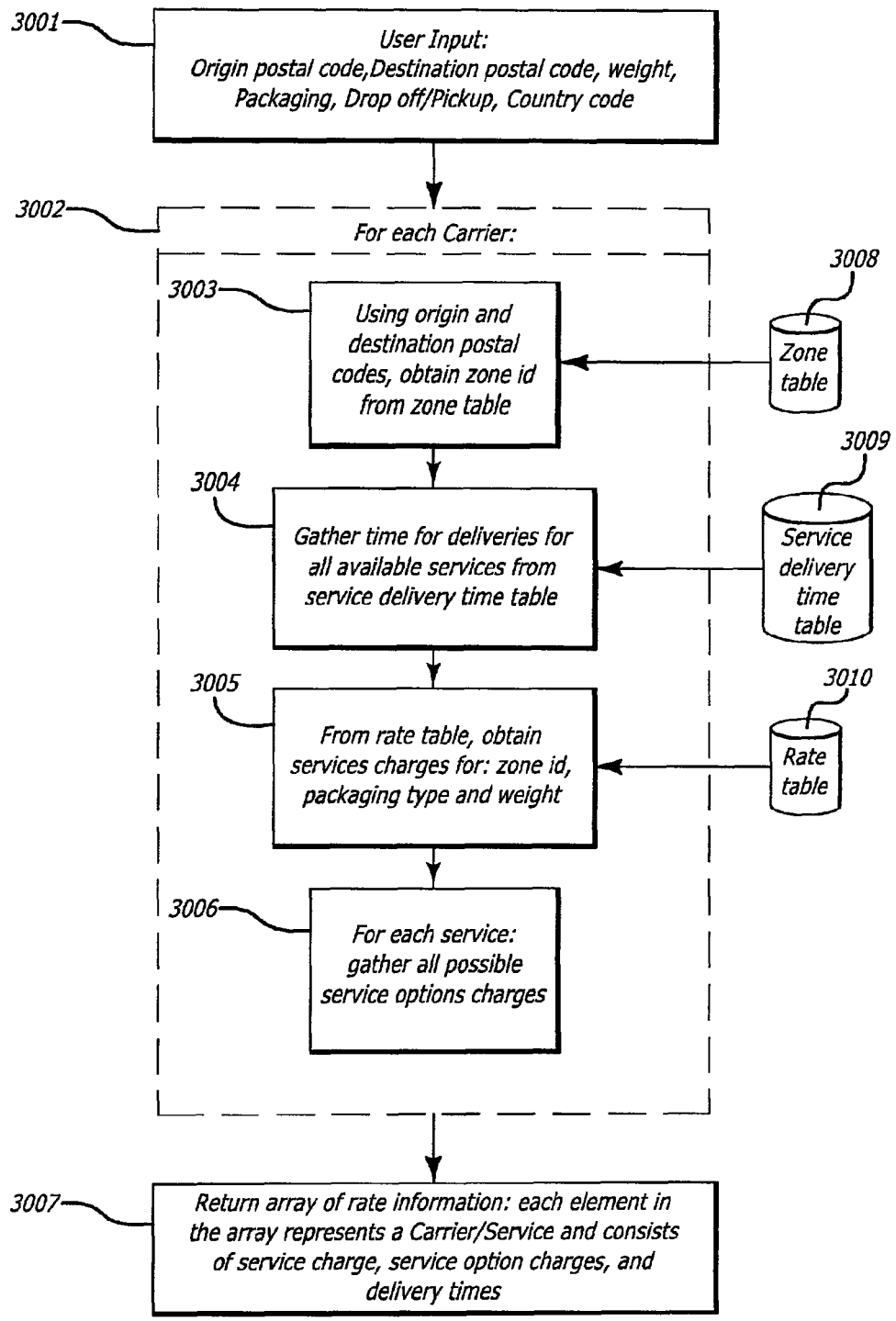
FIGS. 36b through 36e are high level data retrieval and logic flow diagrams depicting the data and high level logic that the system uses to calculate a shipping rate in an exemplary embodiment of the invention.

FIGS. 36b through 36e are high level data retrieval and logic flow diagrams depicting the data and high level logic that the system uses to calculate a shipping rate. As depicted in FIG. 36b, the following shipping information is used to calculate a shipping rate: Origin postal code, Destination postal code, Weight, Packaging, Drop off/Pickup, Country code 3001. For each Carrier 3002, the rating component of the System uses the origin and destination postal codes 3003. The rating component of the System obtains 3003 the zone id from the zone table 3008 and gathers 3004 the time for deliveries for all available services from the service delivery time table 3009. From the rate table 3010, the rating component obtains services charges for the zone id, packaging type and weight 3005. For each service, the rating component gathers all possible service options charges 3006. After gathering necessary information, the rating component returns an array of rate information 3007. Each element in the array represents a Carrier/Service and consists of service charge, service option charges, and delivery times.

Figure 36C:
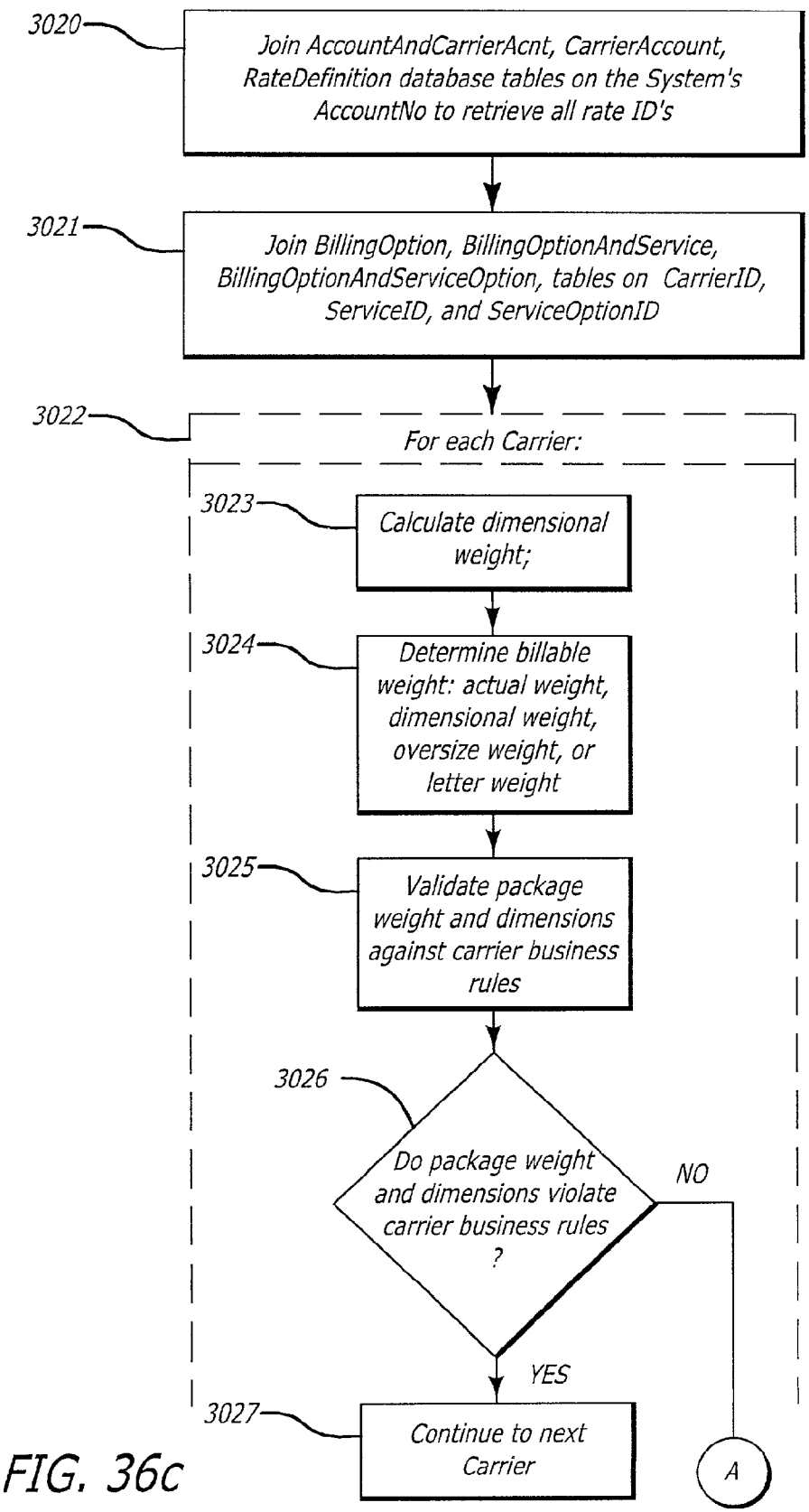
Figure 36D:
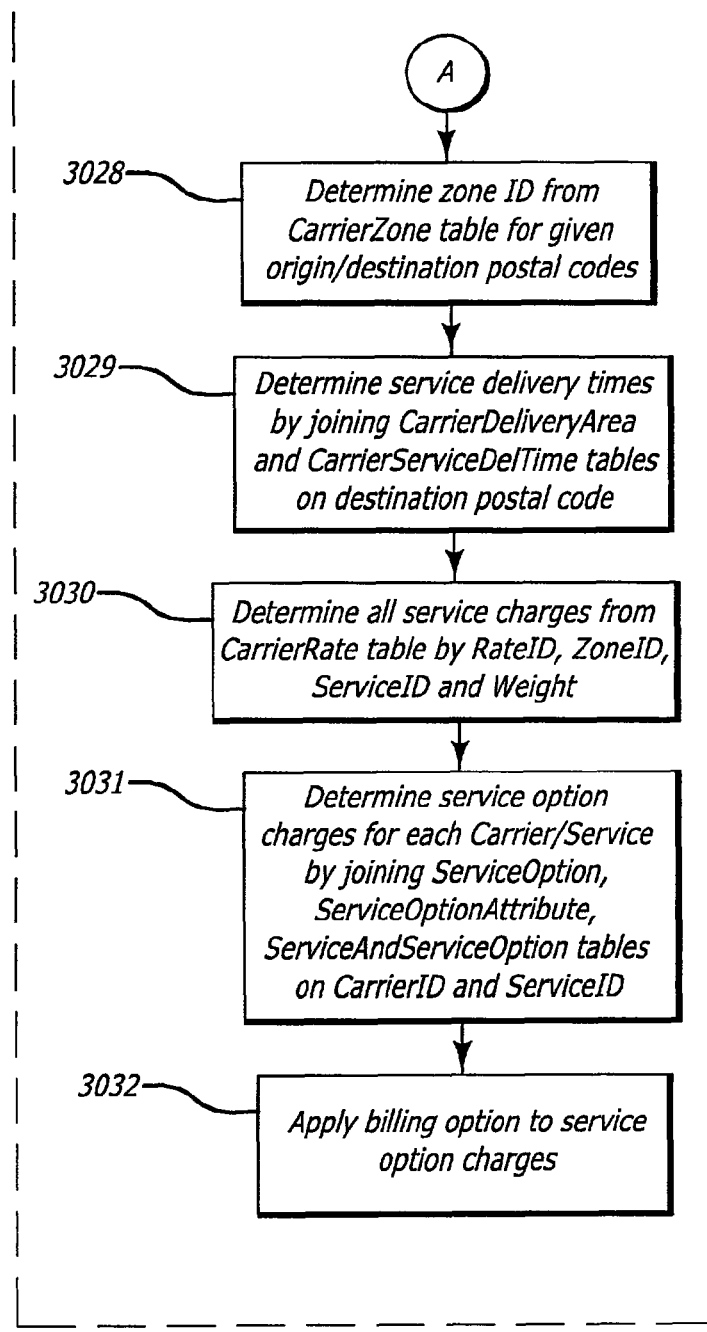

The System calculates the rates according to the following overview logic as depicted in FIGS. 36c-36d. The System retrieves all rate IDs (published, net, and retail) by joining the following database tables on the System's AccountNo: AccountAndCarrierAcnt; CarrierAccount; RateDefinition 3020.

The System then determines the billing rules for all of the Carrier/Service combinations and their service options by joining the following tables on CarrierID, ServiceID, and ServiceOptionID: BillingOption; BillingOptionAndService; BillingOptionAndServiceOption 3021.

For each carrier 3022, the System performs the following procedures: 1) determine if the particular carrier supports the given billing option based on step 2 3026. If not, continue with the next carrier 3027; 2) Apply carrier business rules, including: a) Calculate dimensional weight 3023; b) Determine billable weight 3024: actual weight, dimensional weight, oversize weight or letter weight; c) Validate package weight and dimensions 3025; (If the rate input violate carrier business rules 3026, continue to next carrier 3027); 3) Determine the zone ID from CarrierZone table for the given origin/destination postal codes 3028; 4) Determine service delivery times 3029 (including Saturday/Sunday delivery times) by joining the following tables on destination postal code: a) CarrierDeliveryArea; b) CarrierServiceDelTime; 5) Determine all service charges from CarrierRate table by RateID, ZoneID, ServiceID and Weight 3030; 6) Determine the service option charges for each Carrier/Service 3031 by joining the following tables on CarrierID and ServiceID: ServiceOption; ServiceOptionAtttribute ServiceAndServiceOption; and 7) Apply billing option to service option charges 3032 (different service option charges could be billed to different parties for various billing options).

Figure 36E:
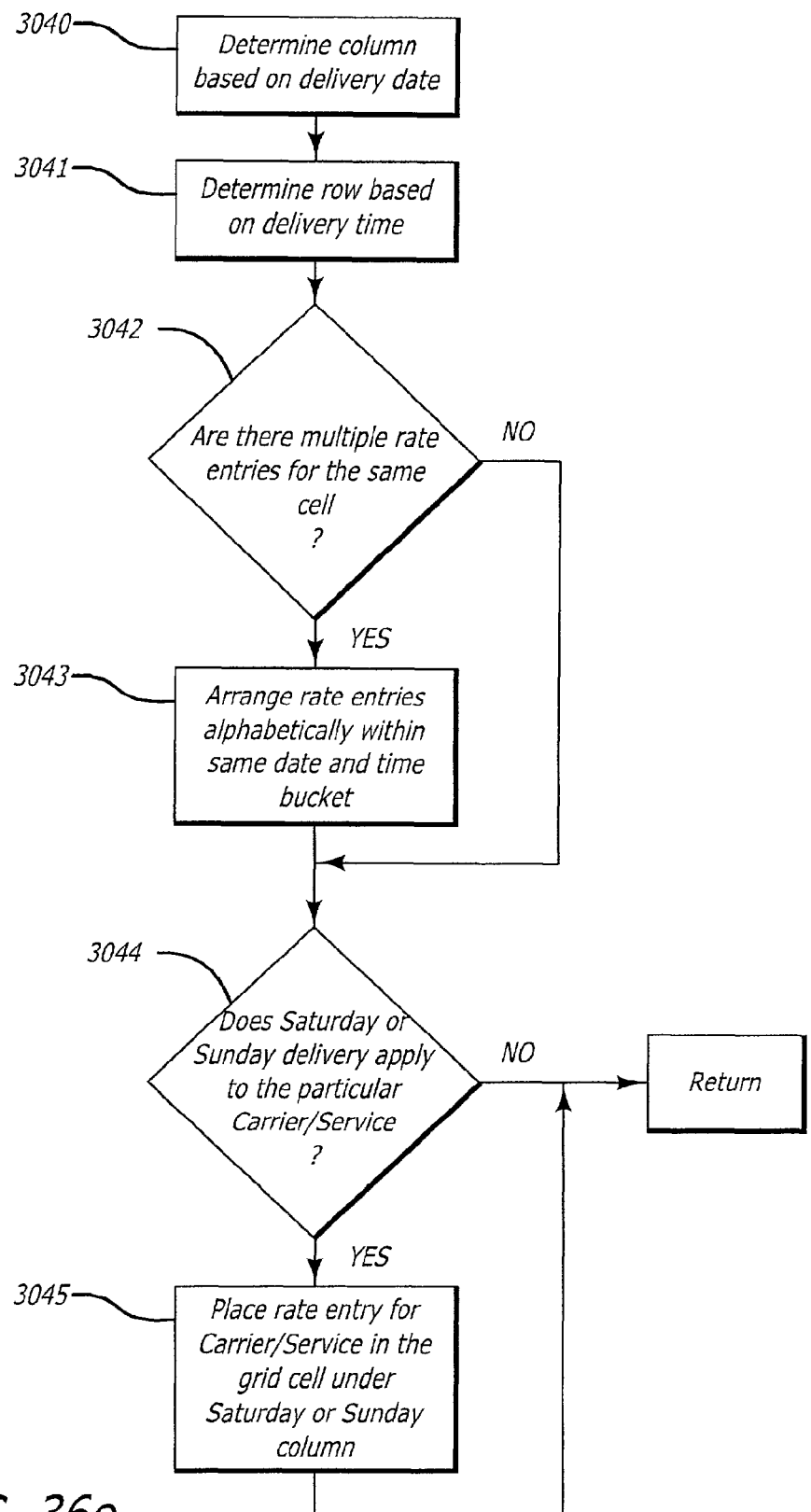

As depicted in FIG. 36e, the expected delivery times for each Carrier/Service returned in the rate information determine the placement of the rate grid for the particular Carrier/Service cell: the delivery date determines the columns 3040 while the delivery time resolves the rows 3041. In the event that multiple rate entries collide 3042, the alphabetical order of the particular Carrier's name is further used to determine the Graphic Array entry order within the same date and time bucket 3043. The same Carrier/Service can be placed in a second time slot in the grid under Saturday or Sunday column 3045 if the Saturday or Sunday delivery is applicable to the particular Carrier/Service 3044.

As depicted in FIG. 37, the Consumer can indicate a preference for a guaranteed delivery time 550-552. If the Consumer is satisfied with the Comparison, the Consumer can choose a particular Carrier and Service by clicking on the corresponding cell, e.g., 549, in the Graphic Comparison Array. If the Consumer is not satisfied with the Comparison, the Consumer clicks the onscreen <<Back button 540. If the Consumer wants to only change the Consumer's indication of the guarantee of delivery time 550-552, the Consumer clicks the onscreen Update button 560. If the Consumer is satisfied, has chosen a particular Carrier cell entry, e.g., 549, then the Consumer clicks the onscreen Done button 561.

Once the Consumer clicks the onscreen Done button 561, the Return System displays a Shipping Summary Screen, an exemplary embodiment of which is depicted in FIG. 38.

From the Shipping Summary Screen, the Consumer can create and print a shipping label, as is described elsewhere herein, and the Return System will generate and send thank you messages and e-mails.

Figure 39A:
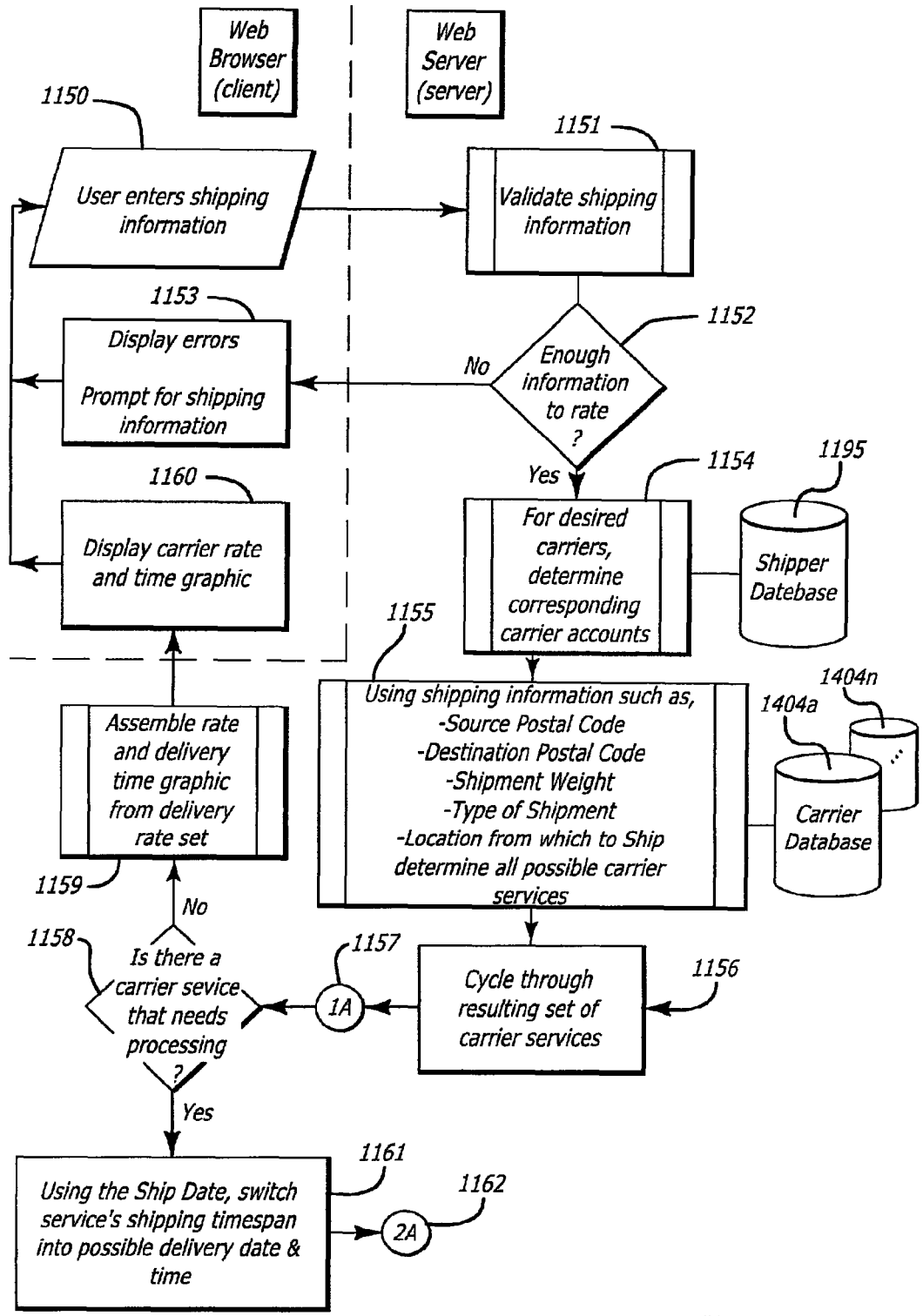
Figure 39B:
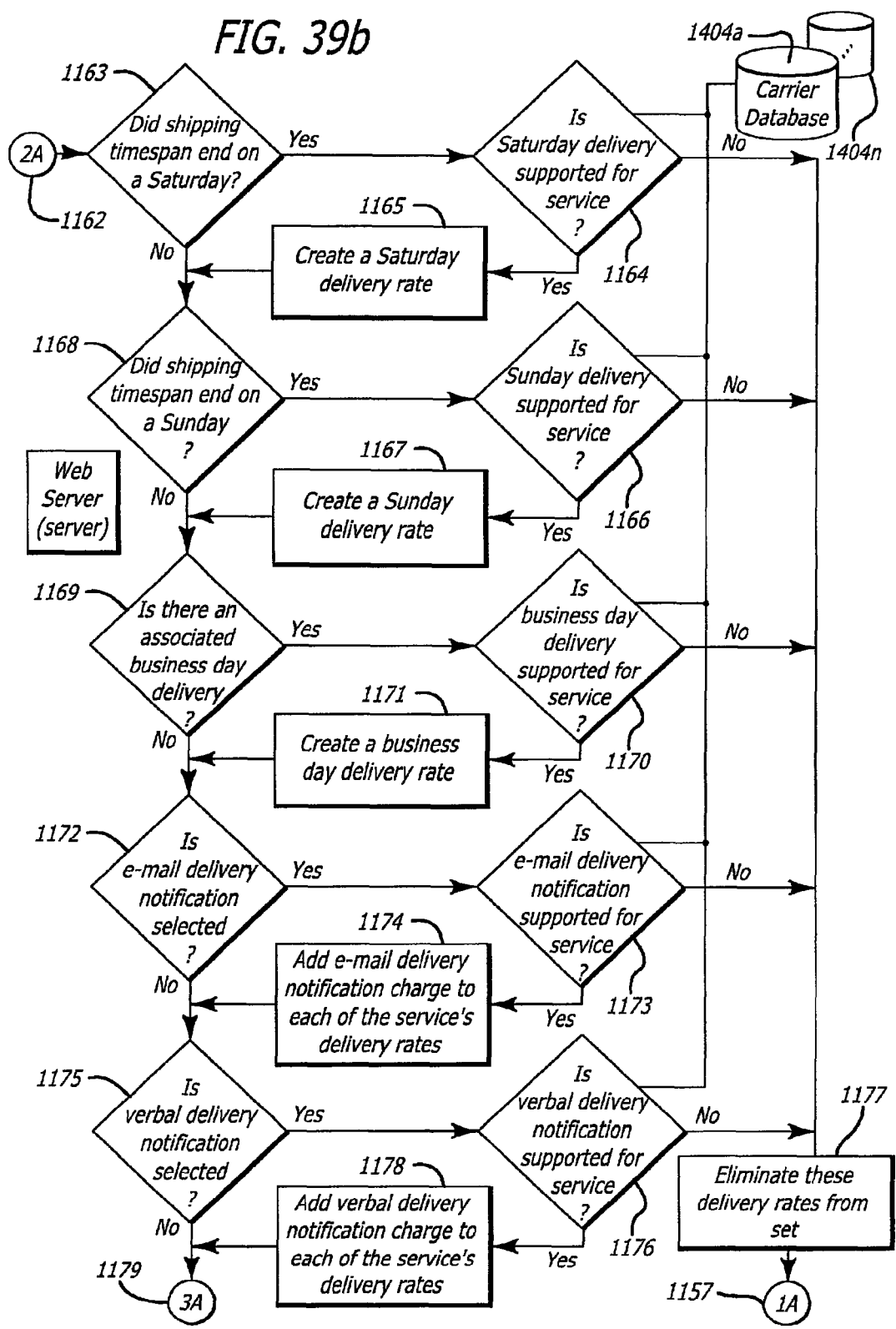

FIGS. 39a through 39c are simplified flow diagrams depicting the initial Timing and Rating procedure to generate a Graphic Array in an exemplary embodiment of the invention. In the embodiment of the invention depicted in FIGS. 39a through 39c, the functions of the Shipper entering shipping information 1150, displaying errors to the Shipper that insufficient shipping information has been provided and prompting the Shipper for additional information 1153, and displaying the Carrier/Service rate and time graphic 1160, are all processed by the Web Browser at the Client. In the embodiment depicted, all other functions and processes depicted in FIGS. 39a through 39c are performed by one or more of the System Servers.

It should be noted that the depicted separation of functions between the Web Browser at the Client on the one hand and the Return System Servers on the other hand represents an initial procedure to construct the Graphic Array in response to initial Shipper input of Shipper Parcel Specifications. As is explained in more detail below, after the initial construction of the Graphic Array, the System can distribute certain of the functions for supplemental regeneration of the Graphic Array to the Web Browser Client.

As depicted in FIG. 39a, the Shipper (User) enters shipping information (Shipper Parcel Specifications) 1150. The System validates the shipping information 1151.

In the embodiment depicted, at a minimum, the System requires Source Postal Code, Destination Postal Code, Parcel Weight, Type of Shipment, and the Shipping Location in order to determine a timing schedule and rates for each supported Carrier. If the Shipper has not provided at least these minimum specifications, then the System displays error messages 1153 prompting the Shipper to input further Shipper Parcel Specifications 1150.

If the Shipper has supplied the minimum required specifications, then the System accesses the Shipper Database 1195 to identify any user-specified Carrier designations and to determine the Carrier accounts for the appropriate Shipper 1154. Using the Shipper Parcel Specifications, the System then accesses the Carrier Databases (1404a through 1404n) and determines all possible Carrier/Services that support shipping of the subject parcel 1155.

It should be noted that in some embodiments, the Shipper can restrict the identity of Carriers to be used in the construction of the Graphic Array. A Shipper may choose to restrict the System to certain Carriers, for instance, if the Shipper prefers to work only with certain Carriers.

The System then examines each Carrier/Service in the set of supporting Carrier/Services 1156. The next step 1157 is a juncture for return of control from a number of points in the System logic and is performed for each Carrier/Service in the set of supporting Carrier/Services.

If the System has examined all possible supporting Carrier/Services 1158, the System assembles the Graphic Array from the delivery rate set 1159 and displays the Graphic Array to the user 1160. As was previously explained, the dimensions of the Graphic Array are dynamic.

As long as there are further Carrier/Services that remain to be examined in the set of supporting Carrier Services, the System continues to perform the process described below.

Using the Expected Shipping Date, the System switches the Carrier/Service's shipping timespan into possible delivery dates and times 1161. Next 1162, the System determines whether the shipping timespan ends on a Saturday 1163. If so, the System accesses the Carrier Database (1404a through 1404n) to determine whether the particular Carrier/Service supports Saturday Delivery 1164. If the particular Carrier/Service does not support Saturday Delivery, then the particular Carrier/Service is eliminated 1177 from the delivery rate set and the System proceeds with the next Carrier/Service in the delivery rate set 1157.

If the particular Carrier/Service supports Saturday Delivery, the System determines the appropriate Saturday delivery rate for the particular Carrier/Service 1165.

Next, the System determines whether the shipping timespan ends on a Sunday 1168. If the shipping timespan ends on a Sunday, the System accesses the Carrier Database (1404a through 1404n) to determine whether the particular Carrier/Service supports Sunday delivery 1166. If the particular Carrier/Service does not support Sunday delivery, then the particular Carrier/Service is eliminated from the delivery rate set 1177 and the System proceeds with the next Carrier/Service in the delivery rate set 1157.

If the particular Carrier/Service supports Sunday Delivery, the System determines the appropriate Sunday delivery rate for the particular Carrier/Service 1167.

The System then determines whether there is a business day delivery within the shipping timespan 1169. If so, the System accesses the Carrier Database (1404a through 1404n) to determine whether the particular Carrier/Service supports business day delivery 1170. If the particular Carrier/Service does not support business day delivery, then the particular Carrier/Service is eliminated from the delivery rate set 1177 and the System proceeds with the next Carrier/Service in the delivery rate set 1157.

If the particular Carrier/Service supports business day delivery, the System determines the appropriate business day delivery rate for the particular Carrier/Service 1171.

The System next determines whether the Shipper has requested E-Mail delivery notification 1172. If so, the System accesses the Carrier Database (1404a through 1404n) to determine whether the particular Carrier/Service supports E-Mail delivery notification 1173. If the particular Carrier/Service does not support E-Mail delivery notification, then the particular Carrier/Service is eliminated from the delivery rate set 1177 and the System proceeds with the next Carrier/Service in the delivery rate set 1157.

If the particular Carrier/Service supports E-Mail delivery notification, the System adds the appropriate charge for the E-Mail delivery notification service to each of the particular Carrier/Service's delivery rates 1174.

The System then determines whether the Shipper has requested verbal delivery notification 1175. If so, the System accesses the Carrier Database (1404a through 1404n) to determine whether the particular Carrier/Service supports verbal delivery notification 1176. If the particular Carrier/Service does not support verbal delivery notification, then the particular Carrier/Service is eliminated from the delivery rate set 1177 and the System proceeds with the next Carrier/Service in the delivery rate set 1157.

If the particular Carrier/Service supports verbal delivery notification, the System adds the appropriate charge for the verbal delivery notification service to each of the particular Carrier/Service's delivery rates 1178.

Next 1179, the System determines whether the Shipper has requested that the Carrier/Service guarantee delivery time 1180. If so, the System accesses the Carrier Database (1404a through 1404n) to determine whether the particular Carrier/Service supports guaranteed delivery times 1181. If the particular Carrier/Service does not support guaranteed delivery times, then the particular Carrier/Service is eliminated from the delivery rate set 1177 and the System proceeds with the next Carrier/Service in the delivery rate set 1157.

If the particular Carrier/Service supports guaranteed delivery times, the System adds the appropriate charge for the guaranteed delivery times service to each of the particular Carrier/Service's delivery rates 1182.

The System then determines whether the Shipper has requested a "Call for Pickup" shipping location 1184. If so, the System accesses the Carrier Database (1404a through 1404n) to determine whether the particular Carrier/Service supports "Call for Pickup" services 1185. If the particular Carrier/Service does not support "Call for Pickup" services, then the particular Carrier/Service is eliminated from the delivery rate set 1177 and the System proceeds with the next Carrier/Service in the delivery rate set 1157.

If the particular Carrier/Service supports "Call for Pickup" services, the System adds the appropriate charge for the "Call for Pickup" service to each of the particular Carrier/Service's delivery rates 1186.

The System next determines whether the Shipper has requested a "Residential Delivery" 1187. If so, the System accesses the Carrier Database (1404a through 1404n) to determine whether the particular Carrier/Service supports "Residential Delivery" services 1188. If the particular Carrier/Service does not support "Residential Delivery" services, then the particular Carrier/Service is eliminated from the delivery rate set 1177 and the System proceeds with the next Carrier/Service in the delivery rate set 1157.

If the particular Carrier/Service supports "Residential Delivery" services, the System adds the appropriate charge for the "Residential Delivery" service to each of the particular Carrier/Service's delivery rates 1189.

The System then determines whether the Shipper has requested a "Loss Protection" services 1190. If so, the System accesses the Carrier Database (1404a through 1404n) to determine whether the particular Carrier/Service supports "Loss Protection" services 1191. If the particular Carrier/Service does not support "Loss Protection" services, then the particular Carrier/Service is eliminated from the delivery rate set 1177 and the System proceeds with the next Carrier/Service in the delivery rate set 1157.

If the particular Carrier/Service supports "Loss Protection" services, the System calculates the appropriate charge for the "Loss Protection" service and adds the appropriate charge to each of the particular Carrier/Service's delivery rates 1193 before proceeding with the next Carrier/Service in the delivery rate set 1157.

In the exemplary embodiments of the invention described here, the System automatically and dynamically regenerates the display of the Graphic Array and certain portions of other screens when the Shipper makes online changes to Shipper input. To do this, the System generates executable code which it distributes with certain displayable frames to the Web Browser Client. This distribution of code for purposes of regenerating the Graphic Array differs from the initial generation of the Graphic Array as was described above. For example, in the embodiment of the invention depicted in FIGS. 39a through 39c, in the initial development of the Graphic Array, the System distributes the functions that initially generate the Graphic Array as follows: the Shipper entering shipping information 1150, displaying errors to the Shipper that insufficient shipping information has been provided and prompting the Shipper for additional information 1153, and displaying the Graphic Array 1160, are all processed by the Web Browser at the Client; all other functions and processes depicted in FIGS. 39a through 39c are performed by one or more of the System Servers.

Distribution to the Web Browser Client by the System of executable code that regenerates the Graphic Array provides the capability to dynamically reflect in the Graphic Array any changes that the Shipper may enter to the various Shipper Parcel Specifications; the Graphic Array immediately displays the new information without requiring the Shipper to request a recalculation, such as by clicking on a "Regenerate" button or the like.

To facilitate regeneration of the Graphic Array, the System generates executable code which it distributes with the frame, such as the frame that is displayed to the user for collecting the Parcel Specifications, to the Web Browser Client. A displayable frame is a set of information for display on the client display device. For example, in FIG. 36a, in one embodiment of the invention, a first frame of the screen depicted in FIG. 36a comprises the Title "Rates & Times" 1109a, the instruction "Click on the price to select a delivery date, time and carrier." 1109b, the legend "Date you expect to ship your package:" 1109c, the input field for the Expected Shipping Date 1060, the legend "I'll ship the package from:" 1109d and the input field for the Shipping Location 1066; a second frame of the screen depicted in FIG. 36a comprises the Graphic Array.

As the System generates the display of each frame, the System generates executable code which it distributes with, e.g., the Rate & Times frame, to the Web Browser Client. Thereafter, the Web Browser Client uses the executable code to automatically regenerate the display of the Graphic Array each time the Shipper makes changes to the Shipper Parcel Specifications. In one embodiment of the dynamic regeneration aspect of the invention, the executable code distributed to the Web Browser Client uses JavaScript.

In some cases, the executable code sent to the Web Browser Client provides the information and the capability to regenerate the Graphic Array without any further communication with the Server. In other cases, the Web Client Browser must return control to the Server so that the Server can access data maintained by or accessible by the Server; the Server then regenerates the Graphic Array or otherwise provides the Web Browser Client with the information necessary to regenerate the Graphic Array.

In an exemplary embodiment of the automatic dynamic regeneration aspect of the invention, the executable code distributed to the Web Browser Client contains the logic to apply Carrier Rules to Shipper Parcel Specification changes. For instance, Shipper changes to certain Service Options, e.g., 550-552 as depicted in FIG. 37, would be automatically processed by the Web Client Browser and the Web Client Browser would regenerate the Single Day Rate Graphic Array depicted therein to reflect the Shipper changes. In one such automatic dynamic regeneration embodiment, only those functions that do not require further access to the relevant Carrier's database are distributed to the Web Browser Client.

It should be noted that, according to the automatic dynamic regeneration aspect of the invention, if after the Shipper views the Graphic Array the Shipper enters changes to any of the factors with which the System calculates the rates and develops the Graphic Array, the System uses a similar logic flow to regenerate the Graphic Array as was explained above in relation to FIGS. 39a through 39c.

The dynamic regeneration capability is used to automatically regenerate response screens in many places throughout the System. For instance, as was mentioned above, as in the case of FIG. 36a, if the Shipper changes Origin Zip Code and/or Ship Location Type, the System will automatically regenerate a list of possible Drop Off Location choices.

C. Tracking

1. Consumer Tracking

Figure 40:
FIG. 40 is a graphic representation depicting an exemplary Items Ordered Screen in an exemplary embodiment of the invention.

Once the Consumer has shipped a return package, the Consumer can track the shipment through the Merchant's online store. FIG. 40 depicts an Items Ordered Screen. By clicking on the Track your package link 405, the Consumer can track the package associated with the described item. FIG. 41 is a graphic representation of a Tracking Information Screen depicting status information about the tracked package.

Figure 43:
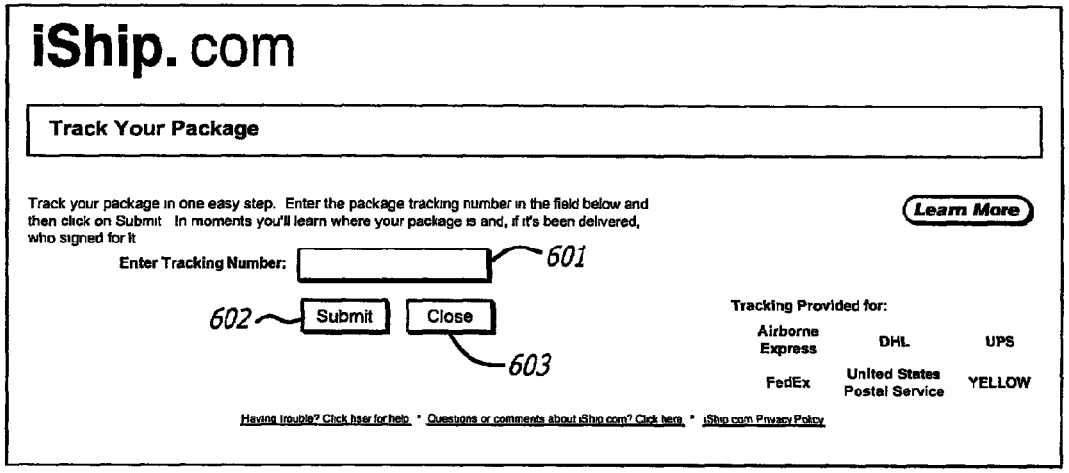
FIG. 43 is a graphic representation depicting an exemplary Track Your Package screen in an exemplary embodiment of the invention.
Figure 44:
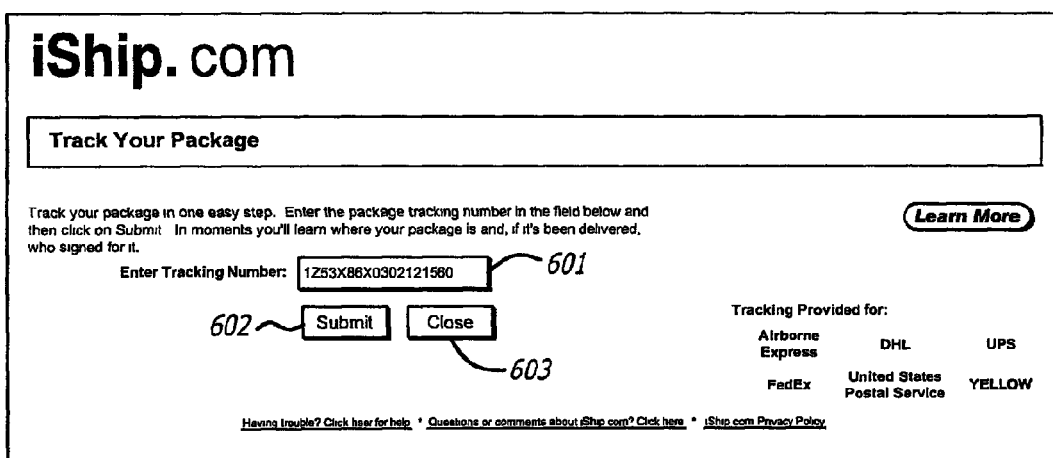
FIG. 44 is a graphic representation depicting an exemplary completed Track Your Package screen in an exemplary embodiment of the invention.

FIGS. 42-45 depict an alternative Consumer Tracking embodiment in which clicking the Track your package link 405 as depicted in FIG. 42 generates a Track Your Package screen as depicted in FIG. 43. The Track Your Package Screen provides a window in which to collect a Tracking Number 601. As depicted in FIG. 44, the Consumer enters a Tracking Number 601 and clicks the onscreen Submit button 602 to track the package. Clicking the onscreen Close button 603 closes the Track Your package screen. Clicking the submit button 602 generates the display of a Tracking Information Screen as depicted in FIG. 45. The Tracking Information Screen as depicted in FIG. 45 provides a further Tracking Number collection window 601 and a Submit button 602 for tracking additional packages.

2. Merchant Tracking

Returning to FIG. 7, if the Merchant clicks the View Inbound Return Shipments 116, the Return System displays a View Inbound Return Shipments Screen, an exemplary embodiment of which is depicted in FIG. 46. As depicted in FIG. 46, the Inbound Return Shipments Screen provides the Merchant/User with the ability to select the Display format 620, the Date range for the report 622, and Sorting criteria 624. Each of the tracking criteria, 620, 622, and 624, provides a pull down menu button, e.g., 621, 623 and 625 respectively, with which the Merchant/User can view a pull down menu of choices. An exemplary menu for each of the choice types is depicted in FIG. 47 and is discussed further below.

Continuing with FIG. 46, the Inbound Return Shipments Screen reports all inbound shipments that meet the Merchant/User's specified tracking criteria in the order specified by the Merchant/User. Each entry in the report identifies the person from whom the item is being returned 627, the Service and Carrier with which the item is being shipped 628, the ship date 629, the delivered or expected delivery date 630, the destination 631, a Status 632, a Tracking number 633 and a link with which the Merchant/User can view Details 640. The Merchant/User can refresh the Screen by clicking an onscreen Update View button 626.

FIG. 47 is a table representing exemplary menus for each of the tracking criteria. As depicted in FIG. 47, the Display format tracking criteria menu 620 provides the Merchant/User with the ability to request reporting of All Returns 620-1, or to limit the report to items that have the status of: Delivered 620-2, Exceptions 620-3, In-transit 620-4, or Return Requested 620-5.

The Expected Delivery Date criteria menu 622 provides for selections of Today 622-1, in 2 days 622-2, in 3 days 622-3, in 4 days 622-4, in 5 days 622-5, in 6 days 622-6, in 7 days 622-7, this week 622-8, in the next 7 days 622-9, and in the next 14 days 622-10.

The Merchant/User can choose to sort the reported items 624, by Attention 624-1, Carrier 624-2, Company 624-3, Service 624-4, Ship Date 624-5, and Status 624-6.

FIG. 48 is a graphic representation of a View Inbound Return Shipments Detail Screen. The Detail Screen reports Tracking Information 650, Return Information 660, and Original Order Information 670. The Merchant/User clicks the View Inbound Return Shipments link 680 to return to the View Inbound Return Shipments Screen.

Figure 49:
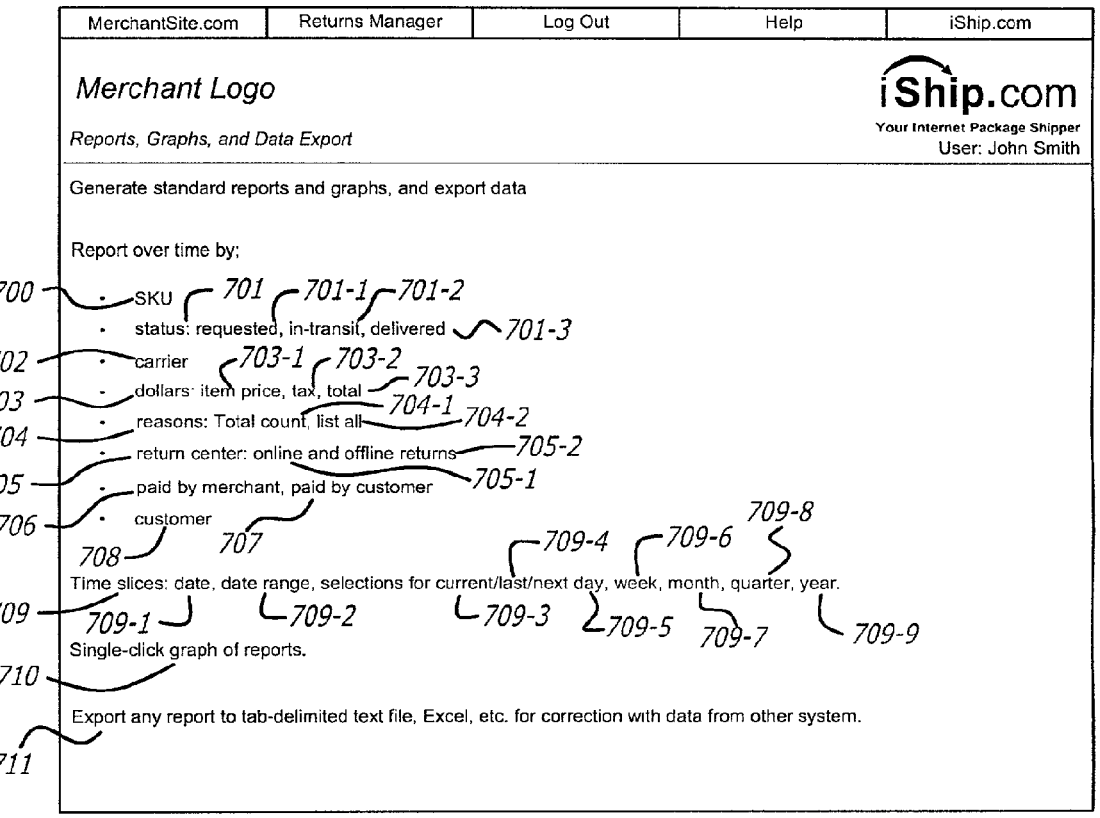
FIG. 49 is a graphic representation depicting an exemplary Reporting, Graphs and Data Export Generation Screen in an exemplary embodiment of the invention.

Returning to FIG. 7, if the Merchant/User clicks the Reporting, Graphs, and Data Export link 117, the Return System displays a Reporting, Graphs and Data Export Generation Screen, an exemplary embodiment of which is depicted in FIG. 49. The Merchant/User can choose by clicking on the appropriate keywords on the screen to report by SKU 700; status 701 (such as Requested 701-1, in-transit 701-2, or delivered 701-3); Carrier 702; dollars 703 (item price 703-1, tax 703-2, or total 703-3); return reasons 704 (total count 704-1, or list all 704-2); return center 705 (online 705-1, or offline 705-2); paid by merchant 706; paid by customer 707; or customer ID 708.

The Merchant/User can define reporting time slices 709, such as, for example, a particular date 709-1, a date range 709-2, current day 709-3, last day 709-4, next day 709-5, current week 709-6, current month 709-7, a quarter 709-8, or a year 709-9. The time slices 709 described are illustrative and are not a limitation of the invention. Other time slices can be provided without departing from the spirit of the invention.

The Merchant/User can click on graph of reports 710 to display graphs of the returns that match the criteria selected. The Merchant/User can click on Export 711 to export a report to a file, other systems, etc.

Figure 50:
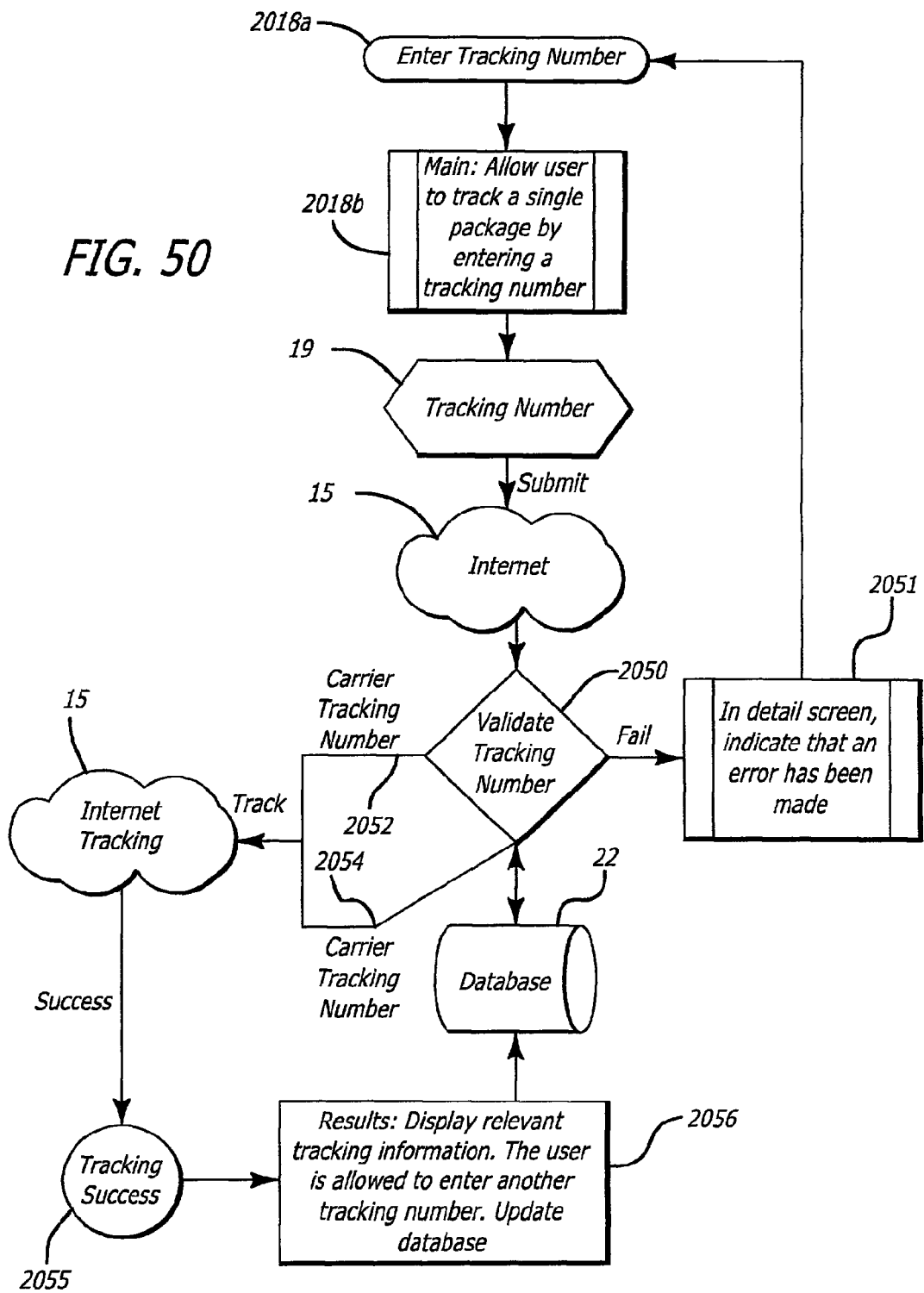
FIG. 50 is a logic flow diagram that depicts the high level logic for tracking the status of a particular package in an exemplary embodiment of the invention.

FIG. 50 is a logic flow diagram that depicts the high level logic for tracking the status of a particular package. The Return System provides tracking of packages across multiple carriers. That is, each package may have been shipped with one of several supported carriers. Even so, the Returns System provides tracking of all packages shipped using the System.

As depicted in FIG. 50, the User enters 18a and 18b a tracking number 19. The System first validates 2050 the tracking number 19. The System performs the validation process by attempting to access the record on the System database 22 that is associated with the tracking number 19. To do this, the System requests that a System database server, e.g., 20a (as depicted in FIG. 3a) locate and retrieve the package record that is associated with the tracking number 19. The System database server, e.g., 20a, uses the entered tracking number 19 to search the System database 22 to locate and retrieve the specified package record. In one embodiment, the System database server, e.g., 20a, is programmed to perform database accesses using Sequel 7.0.

Through the validation process, the System determines whether the tracking number 19 is a System tracking number or a Carrier tracking number. Below are examples of Carrier tracking numbers.

UPS—1Z8595610344113190

Airborne—3918984344

FedEx—811152682326

USPS—EJ585489546US
Yellow Freight—2100003475

If a user enters a Carrier tracking number as the tracking number 19, then depending upon the status of the package, or the number of times that the package was tracked, there may be no information in the System database 22 for the Carrier tracking number. In such a case, the System then uses algorithms provided by each Carrier to determine the Carrier identification.

If the System determines that there is information about the package on the System database 22, then the System analyzes the Package Shipping State. If the Package Shipping State of the retrieved record is "Manifested" or "In Transit" and the Package Tracking State is not "Delivered", then the System prepares to track the package using the appropriate Carrier system. If the Package Shipping State of the retrieved record is "Delivered", or other final status, then the System reports the status of the package to the user.

If the tracking number 19 is a valid System tracking number, then the System extracts the Carrier's tracking number and Carrier's ID from the package record retrieved from the System database 22 before issuing a request 2054. Otherwise, if the tracking number 19 is a Carrier tracking number, then the System extracts the Carrier's ID from the package record before issuing a request 2052 to the Carrier's Internet system. The System uses the Carrier's ID to retrieve from the System database 22 the Internet URL for the Carrier's Internet web site. The URL information is configurable.

Returning for a moment to FIG. 3a, using the Carrier's Internet URL, the System then makes an HTTP connection to the Carrier's web server, e.g., 23-2 through 27-2, using the URL information for the particular Carrier's web server. Depending upon the Carrier, the System's 1 request and report interface with the Carrier's web server is programmed in HyperText Markup Language ("HTML"), Extensible Markup Language ("XML"), both HTML and XML or other form as defined by the Carrier. FIG. 51 depicts an exemplary XML formatted request for submitting a tracking request to a Carrier. FIG. 52 depicts an exemplary successful tracking response, also in XML format, returned by the Carrier.

Then, as depicted in FIG. 50, the System transmits the Carrier's tracking number over the HTTP connection (2052 or 2054). The System instructs the Carrier's web server as to what information is requested based on the connection made using the URL.

If the Carrier's web server successfully responds 2055 to the System's 1 tracking request, the System disconnects from the Carrier's web server and parses the response data. Some Carriers' response data contains unnecessary text information. The System strips out all of the unnecessary text in order to parse the relevant information.

If the System database 22 does not have any previous record of the package, such as would be the case if the package had not been shipped using the System shipping application, then the System does not store any data about the package in the Package Table or the Package History Table.

Otherwise, the System then updates the System database 22 and reports the information to the User 2056. If the package is reported as delivered, the System populates the Package History Table 29 in the System database. As was previously mentioned, in an exemplary embodiment, Package History Table 29 (FIG. 3a) records contain the same data fields as described above regarding Package Table 28 (FIG. 3a) records.

If the Carrier's Internet web server returns an unsuccessful report, the System reports the failure to the User. If the Carrier's system successfully returns tracking information, then the System displays the package's current status.

In an alternative embodiment, if the tracking number 19 is a Carrier tracking number, the Server will validate the Carrier tracking number is a valid tracking number. If the Carrier tracking number is not a valid number, the Server will return an invalid tracking number error. If the Carrier tracking number is a valid number, the Server will not attempt to match the number to a manifested package; the Server will track the package using the particular Carrier's Internet tracking routine; and will return the tracking response to the Web Client of the requesting User.

In an alternative embodiment, if the tracking number 19 is a System tracking number, then the System validates the System tracking number to ensure that it is a valid System tracking number. If the System tracking number is not a valid tracking number, the Server will return an invalid tracking number error. If the System tracking number is a valid tracking number the Server queries the System database 22 to find the Carrier tracking number which corresponds to the System tracking number. If no package record is found for the System tracking number, then the Server will return an error to the Web Client of the requesting User. The error message will indicate that no package record was found; it will request the user to verify that the tracking number was from a package which had been dropped off notify the user that a package be tracked on the same day it shipped. If the package record is found and the actual ship date is the same as the current date, the Server will return an error to the Web Client of the requesting User indicating that the User cannot track the package on the same day it is shipped.

In this alternative embodiment, once the Server has identified the Carrier tracking number, the Server will track the package using the Carrier's Internet tracking routine. If the tracking response from the Carrier's Internet tracking routing indicates an error, the Server will make another attempt to track the package through the Carrier's Internet tracking routine. If the second tracking request results in an error, the Server will notify the Web Client of the requesting User that the Carrier is unable to track the package, and will log a tracking request error containing the Error Log number, the System tracking number, the Carrier tracking number, the time and date the tracking request occurred, the error response reported by the Carrier, and the Account Name of the User making the tracking request, if that information is available.

If, on the other hand, the Carrier returns a valid tracking response, the Server will update the package status in the Server Database with the tracking response and will return the detailed package information to the Web Client of the requesting User from the System Database as described below.

If the user supplied a Carrier tracking number, the Web Client will display the basic tracking information provided by the particular Carrier's Internet tracking function. In one embodiment of the invention, when the user provides a Carrier tracking number to track a package, the User's Web Client requires the User to identify the Carrier.

If the User provides a System tracking number, then if the User is logged on to the account, or otherwise enters valid logon information, that information must correspond to the Account which shipped the package. In that case, the User's Web Client will display the following information: System tracking number; recipient address; drop off location; Carrier and service; Carrier tracking number if available; actual ship date if available; delivery address if available; delivery location if available; delivery date if available; delivery time if available; signed for by information if available; package rate; package weight; package dimensions; packaging; customer reference information; all scan activity.

If on the other hand, the User is not logged on to the account, fails to enter valid logon information, or is logged on to an Account which does not correspond to the Account which shipped the package, the User's Web Client will display the following information: System tracking number; recipient contact name; recipient company name; Carrier and service; Carrier tracking number if available; actual ship date if available; delivery address if available; delivery location if available; delivery date if available; delivery time if available; signed for by information if available; package weight; customer reference information; all scan activity.

D. Return Merchant Services System

The Return Merchant Service System (sometimes referred to herein as the "iReturn" system) component of the present invention provides a merchandise return computer system that is programmed to, among other things: receive from a second computer system a request to rate shipment of a particular package by a plurality of carriers; calculate a plurality of shipment rates for shipping a particular package in response to a request to rate shipment received from a second computer system; receive from a second computer system a request to process return shipment of a particular package by one of a plurality of carriers and generate a response to the second computer system comprising a status of the request; calculate a shipment rate for shipping a particular package in response to a request received from a second computer system to process return shipment of a particular package by one of a plurality of carriers; generate as a response to a second computer system a shipping label for shipping a particular package in response to a request received from the second computer system to prepare a shipping label for shipping a particular package by one of a plurality of carriers and send the shipping label response to the second computer system; generate as a response to a second computer system a merchandise return label for return shipping of a particular package in response to a request received from the second computer system to prepare a merchandise return label for return shipping a particular package by one of a plurality of carriers and send the merchandise return label response to the second computer system; designate as received a status of a particular return record in a database in response to a request received from a second computer system to identify as received a particular package, wherein the particular return record corresponds to the particular package; obtain in response to a request received from a second computer system to process return shipment of a particular package a shipping status for the particular package from a carrier computer system; store in a database a return record corresponding to a particular package in response to a request received from a second computer system to process return shipment of the particular package by one of a plurality of carriers; generate a request to rate shipment of a particular package by a plurality of carriers and digitally address the request through a global communications system to a second computer; generate a request to process return shipment of a particular package by one of a plurality of carriers and digitally address the request through a global communications system to a second computer; generate a request to prepare a return shipping label for shipping a particular package by one of a plurality of carriers and digitally address the request through a global communications system to a second computer; generate a request to prepare a merchandise return label for processing shipment of a particular package and digitally address the request through a global communications system to a second computer.

1. User and External System Interfaces.

Figure 53A:
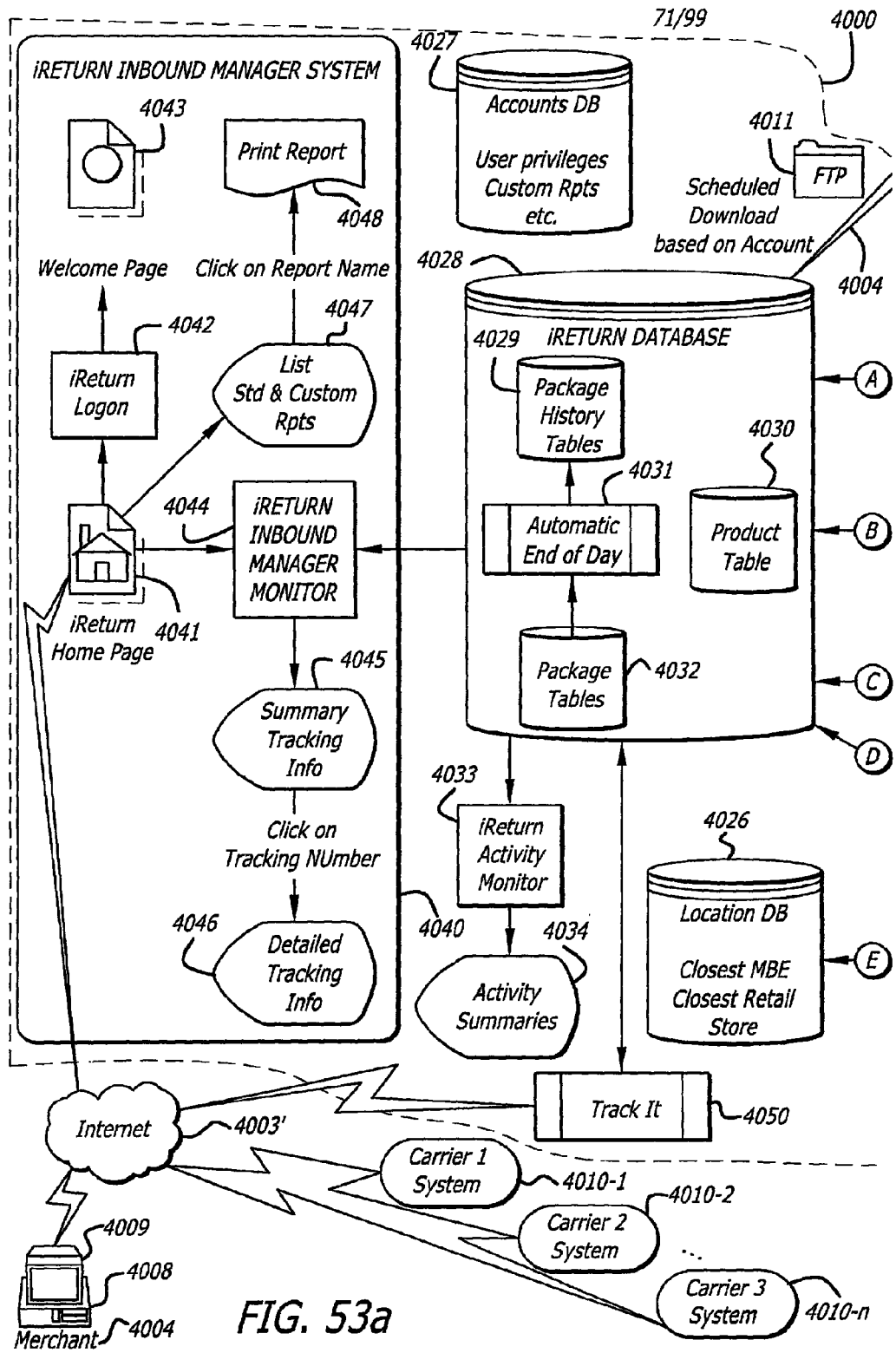
FIG. 53 is a graphic representation of an overview of functional components of an exemplary embodiment of the present invention and certain exemplary interfaces between the functional components and entities external to the system.
Figure 53B:
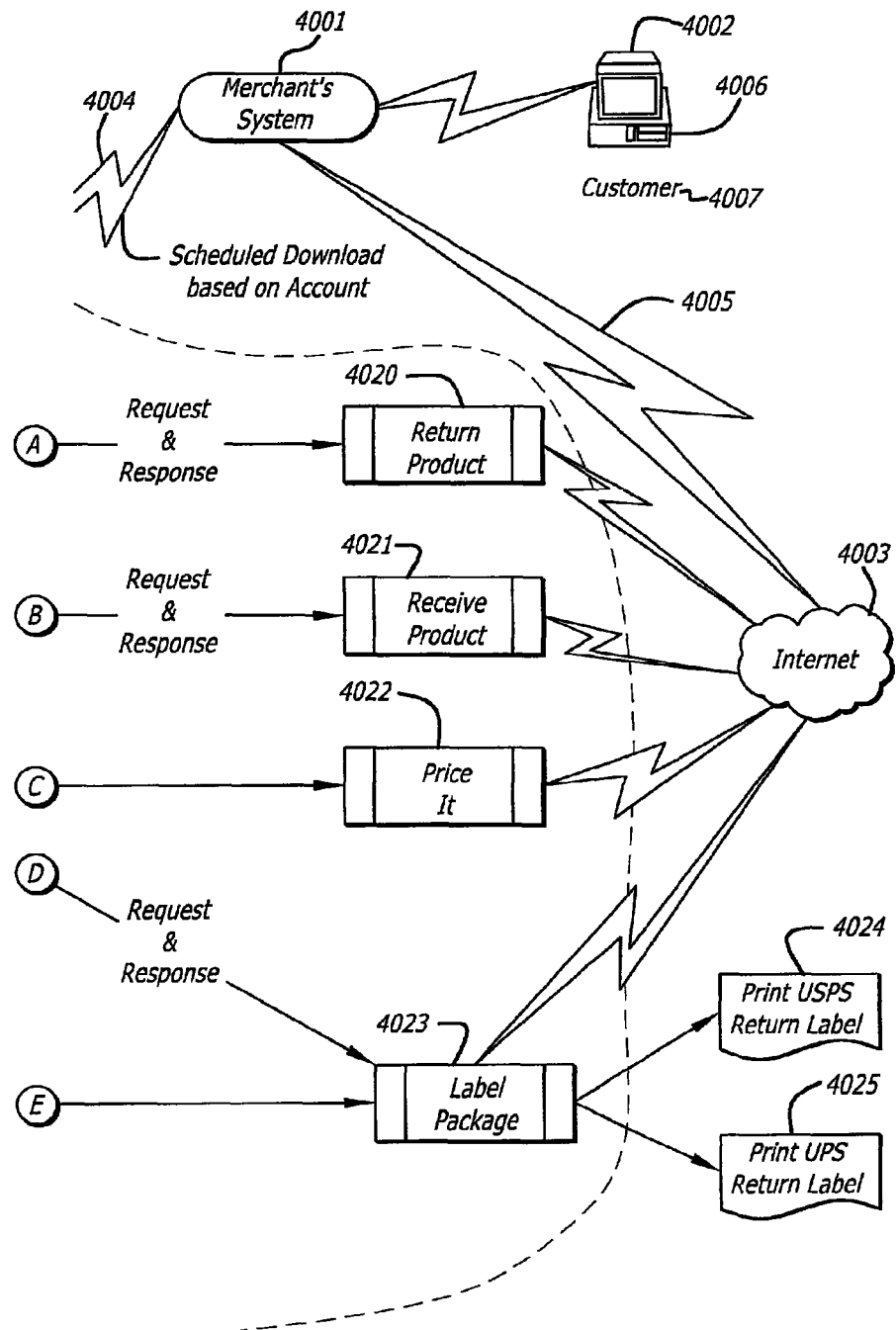

FIG. 53 is a graphic representation of an overview of functional components of an exemplary embodiment of the present invention and certain interfaces between the functional components and entities external to the system. As depicted in FIG. 53, one of a plurality of Merchant systems, e.g., 4001, communicates with the iReturn Merchant Service System (which is sometimes referred to herein simply as the "System") 4000 either directly 4004, such as for the purpose of downloading data 4011 for the Merchant's account, or through Application Program Interface instructions 4005 that are communicated to the System 4000 through the Internet 4003.

Each Merchant's online Customers, e.g., 4007, view results of the particular Merchant's system's 4001 interface with the System 4000 on a display device, e.g., 4002, configured with the customer's computer, e.g., 4006.

Each of a plurality of Merchants, e.g., 4004, accesses various tracking and management reporting features of the System 4000, using a computer, e.g., 4008, configured with, among other things, a display device, e.g., 4009, connected to the Internet, e.g., 4003'. The tracking and management reporting features are available as selections through the System's 4000 Home Page. The System 4000 is sometimes referred to herein as "iReturn".

The System 4000 communicates through the Internet 4003' with a plurality of Carrier systems, e.g., 4010-1 through 4010-n to track shipment and delivery status of shipped parcels.

The System 4000 is provided through at least one Server. Servers are computer devices that are connected to the Internet through communication links. Each server computer may be dedicated to a particular function, such as performing database accesses. Alternatively, each server may perform multiple functions.

2. Accounts Database.

The exemplary embodiment of the invention retrieves and uses information about each subscribing Merchant from an Account Database. Types of data captured and stored in an exemplary embodiment of the Account Database, and exemplary embodiments of user interface screens with which a subscribing Merchant inputs the Account Database information, are disclosed above. The information maintained at an Account level includes:

User Id and password for use with each authorized API request.

How often Returns records will be downloaded to this Account's computer

Address (URL) where data downloads are to be sent.

Web-page co-branding information

Location of merchant's logo

The information maintained about a User of an Account includes:

Identification of Returns records to which the User has access to for viewing or printing.

Identification of Access class: Administrator class has access to all records for this Account; Customer Service class has access to all records for this Account; Warehouse class has access only to records bound for their warehouse A List of warehouses is maintained.

For a district warehouse manager logon, several warehouses may be listed.

Identifies which Custom Returns Reports this User logon has access to. For each report:

The Customer Returns Report ID

Points to a reporting procedure developed by Stamps.com Professional Services Group.

Parameters values for this report.

Any parameter value that the report requires that can be determined ahead of time for this account and user logon.

Is this a scheduled or ad hoc report.

For scheduled reports:

When the report is to be run

Identification of user/location to which the report is to be directed.

3. iReturn Database.

Continuing with FIG. 53, the System 4000 maintains data in an iReturn Database 4028 for each parcel shipped using the System and Merchant information about each product or products that are returned in a shipped parcel. The System maintains in the iReturn Database 4028, among other things, a Product Table 4030, Package Table 4032, and Package History Table 4029. The System updates the Package History Table 4029 by running an Automatic End of Day process 4031 that selects information from the Package Table 4032 and transfers that information to the Package History Tables 4029. Exemplary embodiments of types of information stored on the Product Table 4030, Package Table 4032, and Package History Tables 4029 were disclosed above as being stored on the Product Table 30, Package Table 28 and Package History Table 29 as depicted in FIG. 3a.

4. iReturn Inbound Manager.

Continuing with FIG. 53, the System 4000 provides a web-based user interface, sometimes referred to herein as an "iReturn Inbound Manager" 4040, with which subscribing Merchants view tracking and management information and reports. The Merchant 4004 accesses an iReturn Home Page 4041 through a computer, e.g., 4008, with a display monitor, e.g., 4009, wherein the computer 4008 is connected to the Internet 4003'.

The iReturn Inbound Manager 4040 provides an iReturn Home Page 4041 which presents an iReturn Logon process 4042. If the Merchant successfully logs on, the iReturn Inbound Manager 4040 presents a Welcome Page 4043.

From the iReturn Home Page 4041, after having successfully logged on, the Merchant can select from a variety of Report Lists 4047. From the Report Lists 4047, the Merchant can view or print Reports 4048, according to the particular Merchant's authority to view particular types of reports.

From the iReturn Home Page 4041, after having successfully logged on, the Merchant can also interact with an iReturn Inbound Manager Monitor 4044. Using the iReturn Inbound Manager Monitor 4044, the Merchant can request Summary Tracking Information 4045. If a Merchant clicks on a particular parcel's tracking number displayed on Summary Tracking Information 4045, the iReturn Inbound Manager 4040 reports Detail Tracking information 4046 for the clicked (selected) parcel(s).

5. iReturn Merchant Service APIs.

Continuing with FIG. 53, iReturn Merchant Service Application Program Interfaces (APIs), 4020 through 4023, are provided on one or more API servers. iReturn Merchant Service Application Program Interfaces (APIs), 4500, 4020 through 4023, and 4050 are program interfaces that receive and process API requests comprising electronic objects of a particular type. Herein, reference to an API Server or to API Servers, refers to one or more server computers that are programmed to perform various activities comprising iReturn Merchant Service API functions, including but not limited to receiving and translating various types of API requests and composing and transmitting various types of API responses to the appropriate party's system.

In an exemplary embodiment of the invention, the iReturn Merchant Service APIs retrieve and process API requests in the form of XML (Extensible Markup Language) documents. XML is a markup language for electronic documents. A mark up language such as XML uses certain defined delimiters and tag names to designate meaning and/or organization of marked text within an electronic document.

The iReturn Merchant Service APIs, 4500, 4020 through 4023, and 4050, access the iReturn Database 4028 in response to received API requests, and prepare API responses according to a set of rules specific to each API, and with information retrieved from the iReturn Database 4028. The iReturn Merchant Service System 4000 provides, for example, four APIs, each of which will be described in more detail below: Return Product 4020, Receive Product 4021, Label Package 4023, and Price It 4022. The Label Package API 4023 processes requests to print shipping labels and in response to such requests, accesses a Location Database 4026 and the iReturn Database 4028 to obtain information with which to print shipping labels, e.g., USPS Return labels 4024, and UPS Return Labels 4025.

The iReturn Merchant Service System 4000 further provides a Track It API 4050 that issues tracking requests through the Internet 4003' to each of a plurality of Carrier Systems, e.g., 4010-1 through 4010-n. Each tracking request corresponds to a particular package that has been shipped using the System 4000. Exemplary embodiments of tracking features and tracking user interface features were disclosed above.

The iReturn Merchant Service System 4000 further provides an iReturn Account Activity Monitor 4033 that monitors, on a Merchant account level and other levels, API requests into and API responses out of the System 4000. The iReturn Account Activity Monitor produces Activity Reports and Summaries 4034 from the information that it collects.

Figure 54:
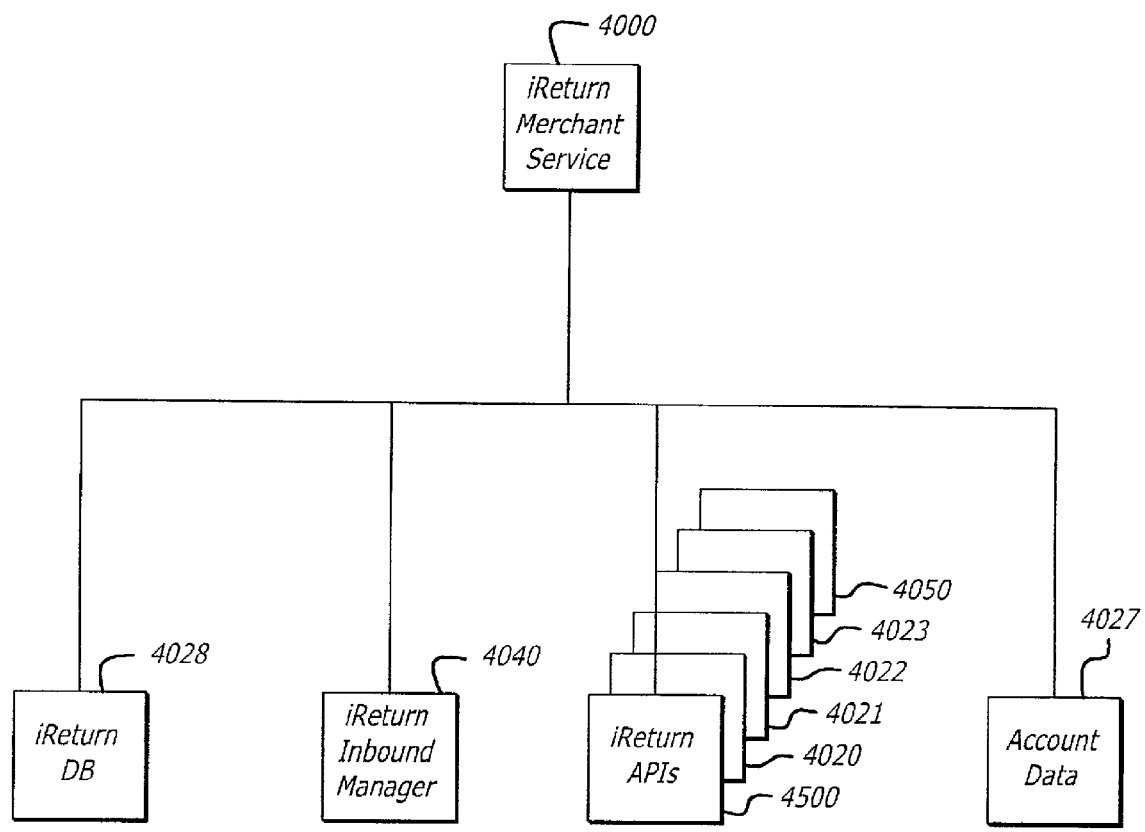
FIG. 54 is a high level block diagram that provides an alternative view of the functional components of the iReturn Merchant Service System in an exemplary embodiment of the invention.

FIG. 54 is a high level block diagram that provides an alternative view of the above described functional components of the iReturn Merchant Service System 4000. As depicted in FIG. 54, the iReturn Merchant Service System 4000 is comprised of the iReturn Database 4028, the Account Database 4027, the iReturn Inbound Manager 4040, and a plurality of APIs 4500, 4020-4023, 4050.

6. Package Table.

In the Return Service System, the Package Table comprises, among other things, the following information: 1) Package Tracking State ID; 2) Package Shipping State ID; 3) Actual Delivery Time; 4) Delivered To information; 5) Shipping Date; 6) Carrier Tracking Number; 7) System Tracking Number; 8) Carrier ID; 9) Actual Package Weight; 10) Service Description; 11) Package OID (also sometimes referred to as the Returns record key—an internally generated number; 12) Authorized—means the merchant has authorized this return. The record is active; 13) Received—means the merchant has received the product or products. The record in no longer active; 14) History—means the record (package and product) has been archived; 15) Purged—means the record has been deleted (voided); 16) The following information is repeated for every product returned in the package (The definition of each field is Merchant-specified and optional except as noted):

a) Merchant Cross Reference Number—this is the value that each Merchant's system uses to reference the product or products in the particular package;

b) Product Code—typically the product SKU;

c) Product Category is a merchant specified grouping mechanism;
d) Reason code for the return is a code to indicate why that product is being returned—short description as to why the product is being returned
e) Merchant's Return Merchandise Authorization ("RMA") Number—is tied to each product. In one exemplary embodiment, when the merchant authorizes each individual item, each product has a corresponding RMA; otherwise, when the merchant authorizes an entire return, a single RMA number applies to the entire return;
f) Product Description;
g) Product Manufacturer;
h) Product Quantity;
i) Product Price;
j) Product Tax;
k) Product Refund amount;
l) Product Shipping Paid by (indicator or identifier);
m) Original Order number;
n) Original Order date;
o) Original Order status;
p) Original Order customer name;
q) Original Order customer identifier.

7. iReturn Inbound Manager Monitor.

The iReturn Inbound Manager 4040 is a Web-based application hosted on one or more iReturn System servers. It provides Merchant personnel, for example, a Merchant's Returns Administrator, Returns Manager, Warehouse Manager, Customer Service, and the like, with a tool with which to view, among other things, the products and product categories that have been returned, the reasons for returns, the return destinations, estimated return shipping arrival schedules, and return shipping status.

Figure 55:
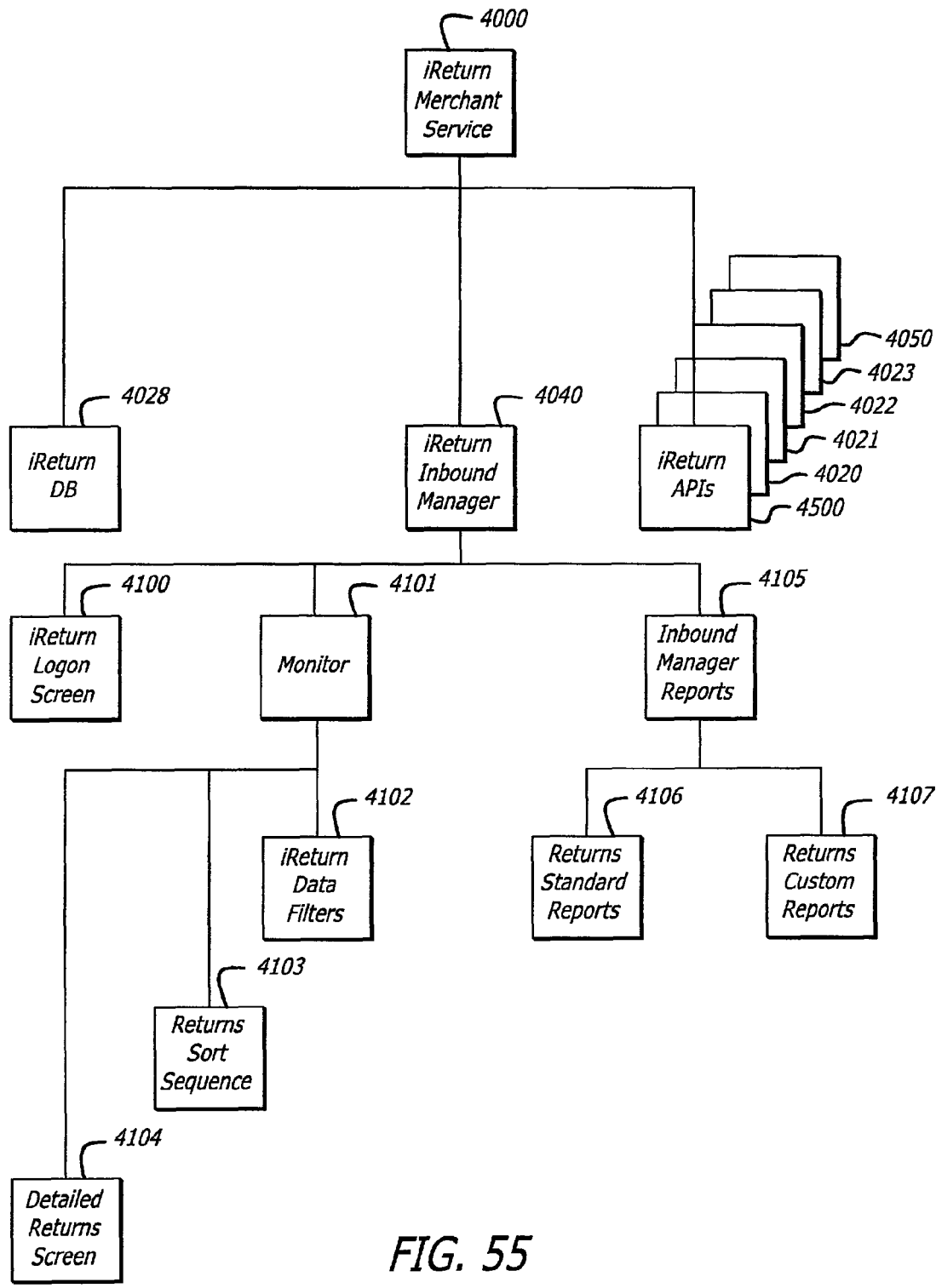
FIG. 55 is a high level block diagram that graphically depicts certain functional components of the iReturn Inbound Manager in an exemplary embodiment of the invention.

FIG. 55 is a high level block diagram that graphically depicts certain functional components of the iReturn Inbound Manager 4040. The block diagram pictured in FIG. 55 depicts the functions available for selection by each Merchant from a main selection options page available to each Merchant. Authorization is provided by the iReturn Inbound Manager 4040 at an Account level. When a Merchant logs on to the iReturn Inbound Manager 4040 through an iReturn Logon Screen 4100, the Manager 4040 retrieves the Merchant's account information from the Account Database 4027 (as depicted in FIG. 53) and determines the particular Merchant's authorization to access the System and view reports.

Figure 56:
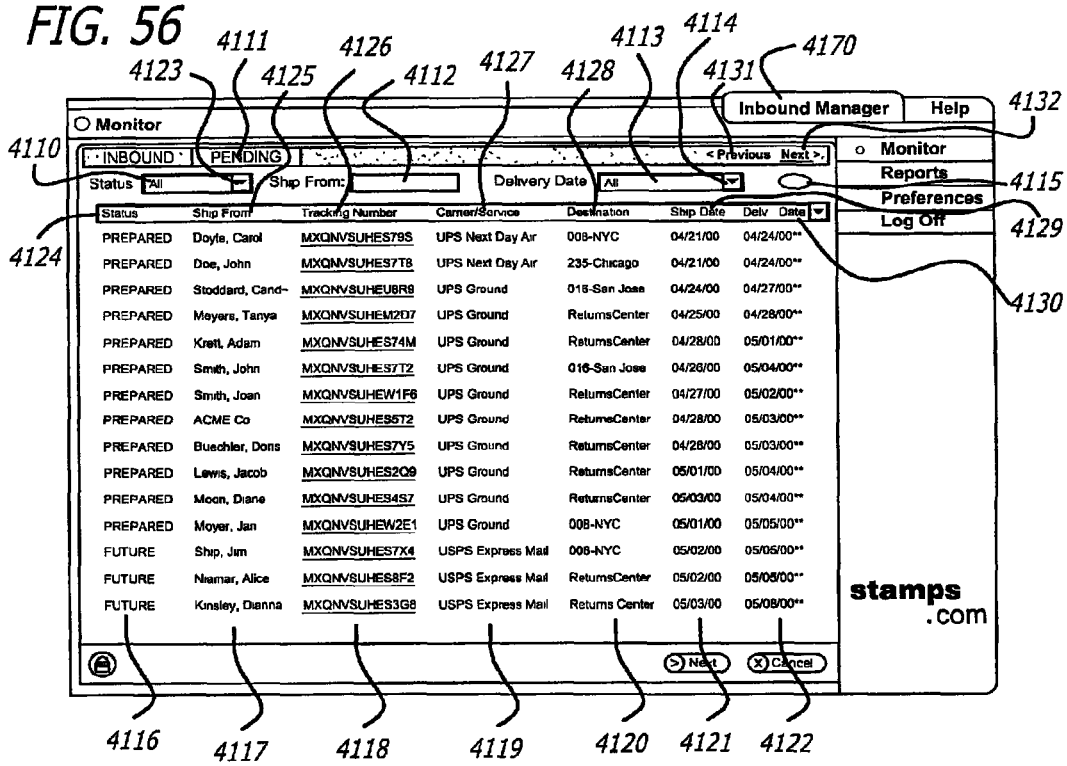
FIG. 56 is a graphic representation of an exemplary iReturn Inbound Monitor display of a Pending Log that reports packages for a particular Merchant that are Pending in an exemplary embodiment of the invention.
Figure 57:
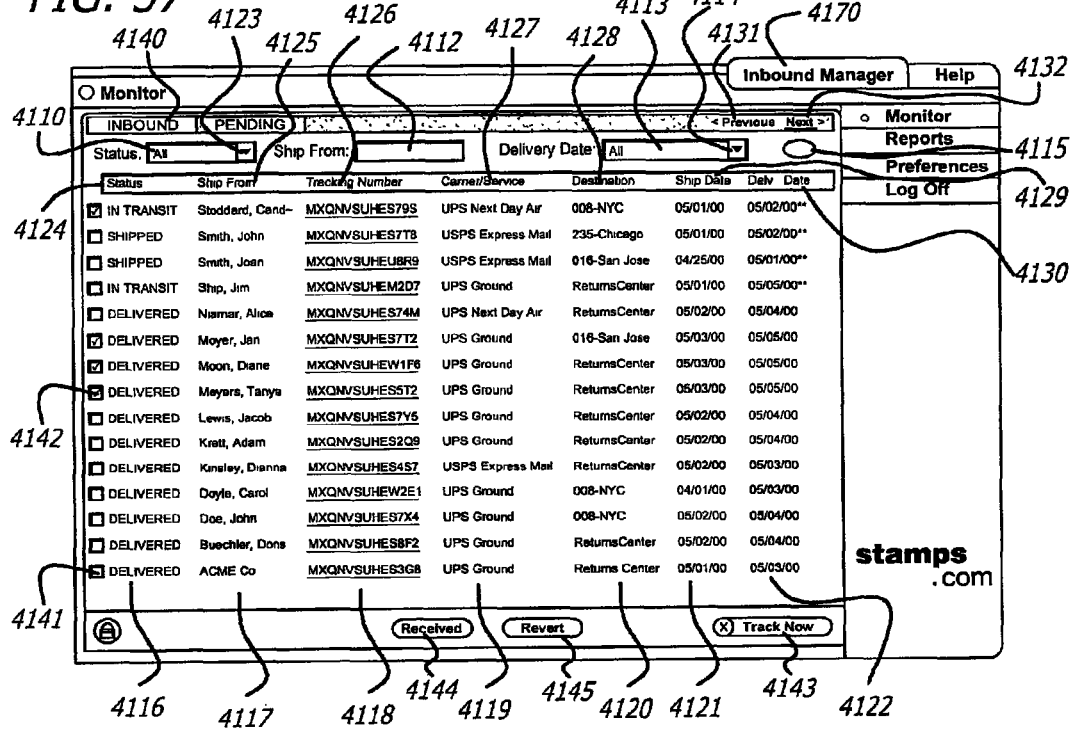
FIG. 57 is a graphic representation of an exemplary iReturn Inbound Monitor display of an Inbound Log that reports packages for a particular Merchant that are Inbound in an exemplary embodiment of the invention.

The iReturn Inbound Monitor 4101 displays information concerning Returns for a particular Merchant that are Pending Shipment, as depicted in FIG. 56, or that are inbound, as depicted in FIG. 57. The iReturn Inbound Monitor 4101 provides user input fields with which it captures user input of display filters 4102. The iReturn Inbound Monitor 4101 further responds to user selection of display headings with which to sort Returns displays 4103. In response to a Merchant checking a selection mechanism for one or more particular display line items, the iReturn Inbound Monitor 4101 retrieves detail for each of the selected items from the iReturn Database and displays the detail onscreen.

The iReturn Inbound Manager Reports function 4105 provides standard Returns reports 4106 that are available to all Merchants. The iReturn Inbound Manager Reports function 4105 also provides custom Returns reports 4107 that are only available to Merchants that have been authorized to view them.

FIG. 56 is a graphic representation of an exemplary iReturn Inbound Monitor 4101 display of packages for a particular Merchant that are Pending 4111 shipment (sometimes referred to herein as the "Pending Log"). As depicted in FIG. 56, the exemplary iReturn Inbound Monitor display for Pending 4111 packages provides various display reporting filters. The display reporting filters include providing the Merchant with a Status selection 4110 accompanied by a pull-down menu button 4123 that, when clicked, causes the onscreen display of a list of statuses in the Pending status category from which to choose, including: a.) Future; b.) Saved; c.) Prepared; and d.) "All". The Filter also displays "All" as a status selection. The Merchant can select one of the statuses in order to limit the displayed status items reported to only those items with the particular status or status category specified by the Merchant.

In the exemplary embodiment, each Pending status has a meaning as follows: a.) Future: label is printed for a particular package, but package will not be shipped until the following day or beyond; b.) Saved: incomplete information has been input for a particular package of group of packages and no label has been printed; c.) Prepared: a shipping label has been printed for a particular package, the package is scheduled to be shipped by the end of the current date, but end of day processing has not yet been performed; and d.) All: reports all records regardless of status.

The exemplary iReturn Inbound Monitor also provides the Merchant with an input selection field display reporting filter with which the Merchant can limit the displayed status items to a particular "Ship From" 4112 location or location category. If the Merchant enters text in the "Ship From" 4112 entry field, then the exemplary iReturn Inbound Monitor will report all shipping records for which the Contact Name begins with the Merchant-specified text The exemplary iReturn Inbound Monitor also provides the Merchant with an input selection field display reporting filter with which the Merchant can limit the displayed status items to a particular "Delivery Date" 4113. The Delivery Date filter 4113 is accompanied by a pull-down menu button 4114 that, when clicked, causes the onscreen display of a list of Delivery Date choices and categories, including: a.) "All" (reports all packages); b.) Today (reports all packages with the current day's date); c.) Yesterday (reports all packages with a date preceding the current date by one day); d.) Last 2 days (reports all packages with either the current day's date or with a date preceding the current date by one day); e.) Last 3 days (reports all packages with either the current day's date or with a date preceding the current date by two days); f.) Last 4 days (reports all packages with either the current day's date or with a date preceding the current date by three days); g.) Last 5 days (reports all packages with either the current day's date or with a date preceding the current date by four days); h.) Last 6 days (reports all packages with either the current day's date or with a date preceding the current date by five days); i.) Last week (reports all packages with either the current day's date or with a date preceding the current date by six days); j.) Last two weeks (reports all packages with either the current day's date or with a date preceding the current date by thirteen days); and k.) Last month (reports all packages with either the current day's date or with a date proceeding the current date by twenty-nine days). In the Pending display 4111, if the Merchant selects the Future status filter, then the Delivery Date drop down list button 4114 is inactive.

The exemplary iReturn Inbound Monitor is programmed to display a "GO" button. When the "GO" button is clicked by a Merchant, the exemplary iReturn Inbound Monitor is further programmed to select and report only those records that meet all of the criteria specified by the Merchant's display filter designations.

When an iReturn Inbound Monitor applies one or more Merchant-specified filters to a display (also sometimes referred to herein as a "log"), then the iReturn Inbound Monitor is programmed to respond to a Merchant's clicking of the "Next" 4132 or "Previous" 4131 buttons by displaying the next or previous filter query results, as the case may be.

The exemplary iReturn Inbound Monitor displays reported packages as a list on a display screen with the following headings: Status 4124; Ship From 4125; Tracking Number 4126; Carrier/Service 4127; Destination 4128; Ship Date 4129; and Delivery Date 4130. The iReturn Inbound Monitor is programmed to respond to a single click on a particular heading by sorting all of the packages to be reported in ascending order according to the contents of the field corresponding to the clicked heading. The iReturn Inbound Monitor is further programmed to respond to a double click on a particular heading by sorting all of the packages to be reported in descending order according to the contents of the field corresponding to the clicked heading.

The exemplary iReturn Inbound Monitor displays the following fields for each reported package: Package Status 4116; Ship From Contact Name 4117; System Tracking Number if available, or if not available, carrier tracking number 4118; Carrier/Service 4119; Destination 4120; Ship Date 4121; and Delivery Date 4122.

FIG. 57 is a graphic representation of an exemplary iReturn Inbound Monitor display of packages for a particular Merchant that are Inbound 4140 shipment (the "Inbound log"). The reporting features of the Inbound log are similar to reporting features of the Pending log with a few exceptions, which are further, explained below.

As depicted in FIG. 57, the exemplary iReturn Inbound Monitor Inbound 4140 display provides display reporting filters as were described above regarding FIG. 56. The iReturn Inbound Monitor Inbound log provides the Merchant with a Status selection 4110 accompanied by a pull-down menu button 4123 that, when clicked, causes the onscreen display of a list of statuses from the Inbound Status Category from which to choose, including: a.) Shipped; b.) In-Transit; c.) Delivered; d.) Received; e.) Exception; and f.) All. The Filter also displays "All" as a status selection. The Merchant can select one of the statuses in order to limit the displayed status items reported to only those items with the particular status or status category specified by the Merchant.

In the exemplary embodiment, each Inbound status has a meaning as follows: a.) Shipped; a shipping label has been printed, and end of day processing has been performed for the package; b.) In-Transit: the relevant carrier has picked up the particular package and scan data is available; c.) Delivered: the carrier has reported that the package has been delivered; d.) Received: the destination point has reported physical receipt of the particular package; e.) Exception: the relevant carrier reports delivery problems for the particular package; and f.) All: reports all records, regardless of status.

As depicted in FIG. 57, the Inbound Log provides an input box, e.g. 4141, associated with each item package listed in the Inbound Log. A Merchant can click one or any number of input boxes, and then click a Function button, such as the Track Now button 4143, or the Received button 4144. If a Merchant clicks an input box for one or more particular packages, the iReturn Inbound Monitor marks the particular package as selected, as shown, e.g., for 4142.

If a Merchant clicks an input box for one or more particular packages, and then clicks the Received button 4144, the iReturn Inbound Monitor responds as depicted in FIG. 53 by updating the Return Status of the record corresponding to the package(s) selected to reflect a "Received" status, moves the package record from the Package Table 4032 to the Package History Table 4029, reflects the new status for the package in the Inbound Log, and records the Merchant user's identification as an override in the Returns record audit fields for the particular package.

If the Merchant has made a mistake in marking a particular package as Received, the Merchant can click the input box for the particular package(s), and then click the "Revert" button 4145. The iReturn Inbound Monitor will again update, as depicted in FIG. 53, the Return Status of the record corresponding to the package(s) selected to be Reverted to its previous status, moves the package record(s) from the Package History Table 4029 back to the Package Table 4032 (in one embodiment, this is only done after requiring the Merchant to first confirm the instruction to revert a particular package), reflect the reverted status for the package in the Inbound Log, and record the Merchant user's identification as an override in the Returns record audit fields for the particular package.

In one embodiment, the Pending Log also provides an input box. In such an embodiment, the Merchant user can request that the status of a Pending packages be updated to "Received." In such an embodiment, the Merchant user can also request Detail Tracking information about Pending packages as is described for Inbound packages with respect to FIG. 58 below.

Continuing with FIG. 57, if a Merchant clicks an input box for one or more particular packages, the iReturn Inbound Monitor marks the particular package as selected, as shown, e.g., for 4142. If the Merchant then clicks the "Track Now" button 4143, the iReturn Inbound Monitor is programmed to respond by reporting Detail Tracking information for each of the selected packages. Detail tracking information is discussed below with regard to FIG. 58.

FIG. 58 is a graphic representation depicting an exemplary Detail Tracking display for an exemplary Detail Tracking request in an exemplary embodiment of the invention. As depicted in FIG. 58, the iReturn Inbound Monitor prepares and displays Detail Tracking information for a Merchant-selected package.

In one embodiment, Detailed Tracking information is collected on a periodic basis for all packages for which an API request has been received. In an alternative embodiment, the iReturn Inbound Manager also collects Detailed Tracking information for each package for which a Merchant clicks the "Track Now" button 4143 (FIG. 57). Tracking Information is obtained by the iReturn Inbound Monitor from Carrier systems as disclosed above.

The Detail Tracking information displayed as depicted in FIG. 58 includes: Origin location/address 4150, Destination location/address 4151, Package dimensions 506, Package weight 500, the number of Products Included 4161, the Carrier and Service 4119, Shipment Options, e.g., Loss Protection 516, Shipping Payment Type, e.g., Merchant's Carrier Account 4160, Shipping Service Charges 4152, Shipping Option Charges 4153, Tracking report Status date and time 4162, Tracking Status 4116, Carrier 4119-1, Service 4119-2, SystemTracking Number 633, Carrier Tracking Number 450, Reference Number 4155, Ship Date 4121, Destination 4156, Expected Delivery Date 4122, Expected Delivery Time 4157, Name of Person who signed for delivery if status is Delivered 4158, Original Order Information 4163, and Information for each Product returned in the package, e.g., 4164-1 and 4164-2. The iReturn Inbound Monitor is scalable and provides for products 1 through n, where "n" is an unknown number. In one exemplary embodiment, "n" is limited to 20 products in a package. The limitation of one embodiment to 20 products per package is illustrative and is not a limitation of the invention.

Original Order information 4163 in the exemplary embodiment comprises, for example, Order Number 401, Order Date 407, Order Status 673, Customer Name 627, and Customer ID 675. The Original Order information 4163 displayed in the exemplary embodiment of the Detail Tracking display is illustrative and is not a limitation of the invention. The invention provides for display of any Original Order information supplied to it by an API request or which can be obtained using information obtained from an API request as a key to access the Accounts Database or the iReturn Database or from a particular carrier system. If multiple products from a single Original Order are being returned in the same package, then the Original Order Information is displayed only once preceding all Product Information. If, on the other hand, multiple products are being returned from multiple Original Orders, then the Original Order Information is displayed with the Product Information for each Product being returned.

Detailed Tracking Product Information for each product returned in the package displayed in the exemplary embodiment, comprises, for example: a Record Key 4159-1, an Authorization Number 662-1, a Product Category 662-1, an SKU 700-1, a product Description 404a-1, the name of the Manufacturer 404b-1, the Quantity of the product being returned 404c-1, the Price 173-1, Tax charged on the original purchase 174-1, the Refund Amount 172-1, an identification of the party that pays for the shipping 707-1, e.g., the Customer, a Reason for the Return 427-1, and Customer Comments 425-1. The Product Information displayed in the exemplary embodiment of the Detail Tracking display is illustrative and is not a limitation of the invention. The invention provides for display of any Product information supplied to it by an API request or which can be obtained using information obtained from an API request as a key to access the Accounts Database or the iReturn Database or from a particular carrier system.

The Detail Tracking display provides an "Inbound Manager" tab 4170, that, when clicked, returns the Merchant to the main iReturn Inbound Manager option selection page. The Detail Tracking display also provides a "Back" button 4171 and a "Done" button 4172. If a Merchant clicks the Back button 4171, the iReturn Inbound Manager will return the Merchant to the immediately previous screen which the Merchant was viewing, such as, for example, another Detail Tracking display. If the Merchant clicks the Done button 4172, the iReturn Inbound Manager returns the Merchant to the iReturn Inbound Manager Tracking Log from which the Merchant entered the Detail Tracking display.

Returning to FIG. 55, in which a block diagram depicts the main selection options available to a Merchant, the iReturn Inbound Manager provides the Merchant with the opportunity to select Reports 4105.

Figure 59:
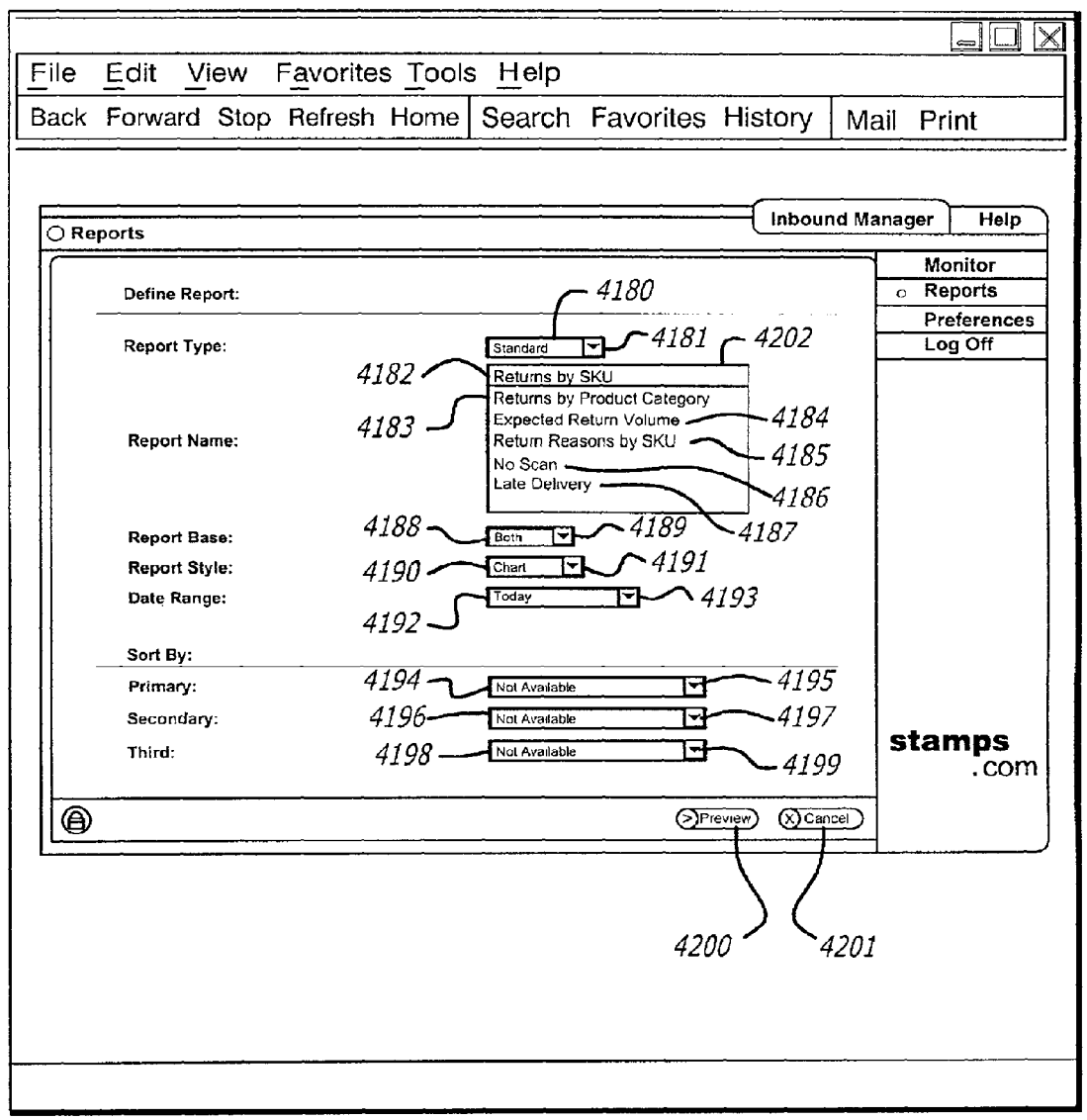
FIG. 59 is a graphic representation of an exemplary user interface screen that the iReturn Inbound Manager presents Merchants with which to request reports in an exemplary embodiment of the invention.

As depicted in FIG. 55, the iReturn Inbound Manager Reports function 4105 provides standard Returns reports 4106 that are available to all Merchants. FIG. 59 is a graphic representation of a user interface screen that the iReturn Inbound Manager presents Merchants with which to request reports. As depicted in FIG. 59, the iReturn Inbound Manager provides the Merchant with a Report Type input field 4180 in which to specify whether the Merchant wants Standard or Custom reports. A drop down menu button 4181 is provided so that a Merchant can click the drop down menu button 4181 and cause the iReturn Inbound Manager to display a drop down menu of report types with which to input the information for the Report Type input field 4180.

As depicted in FIG. 59, depending on the Report Type 4180 input by the Merchant, the iReturn Inbound Manager displays for Merchant selection a list 4202 of the particular report categories from which the Merchant can select. In the exemplary embodiment, the iReturn Inbound Manager provides a selection of the following standard reports: Returns by SKU 4182, Returns by Product Category 4183, Expected Return Volume 4184, Return Reasons by SKU 4185, No Scan 4186, and Late Delivery 4187.

The iReturn Inbound Manager provides for the customization by each Merchant of each of the Standard Reports through Merchant input of customization specifications as provided for by input fields 4188-4199. For each Standard Report, the Merchant can specify a Report Base 4188, using a Report Base drop down menu button 4189 to cause a display of the available options ("Both" for both the Inbound and Pending logs; "Inbound"; and "Pending").

For each Standard Report, the Merchant can specify a Report Style 4190, using a Report Style drop down menu button 4191 to cause a display of the available options ("Graph" or "Chart" for a graphical representation of the requested report; "Plain Text" requests a tabular or matrix form of the requested report.

For each Standard Report, the Merchant can specify a Date Range filter 4192, using a Date Range filter drop down menu button 4193 to cause a display of the available options, which in the exemplary embodiment include: Today (the current date on which the report is run), Current Week (with reference to the current date on which the report is run), Current Month (with reference to the current date on which the report is run), Current Quarter (with reference to the current date on which the report is run), First Quarter (January-March of the year in which the report is run), Second Quarter (April-June of the year in which the report is run), Third Quarter (July-September of the year in which the report is run), and Fourth Quarter (October-December of the year in which the report is run), Current Year (the year in which the report is run), Last 2 days, Last 3 days, Last 4 days, Last 5 days, Last 6 days, Last week, Last 2 weeks, Next 2 days, Next 3 days, Next 4 days, Next 5 days, Next 6 days, Next week, and Next 2 weeks.

For each Standard Report in Plain Text form, the Merchant can further customize the report using one or more of three sort keys 4194-4199. The sort keys available are the column headings of each report—that is, the sort keys are report specific. For example, if the Merchant selects the No Scan Report, then the available sort keys for each of the Primary 4194, Secondary 4196 and Third 4198 sort keys are: Tracking Number, Carrier/Service, Expected Ship Date, Customer ID, and Merchant Record Number. As another example, if the Merchant selects the Late Delivery Report, then the available sort keys for each of the Primary 4194, Secondary 4196 and Third 4198 sort keys are: Tracking Number, Carrier/Service, Status, Expected Delivery Date, Customer ID, and Merchant Record Number. Because the sort keys are report specific, clicking the drop down menu buttons, 4195, 4197 and 4199, causes the display of different options depending on the selected Report Name 4202, and the selected Report Style 4190. If the Report Style selected is Chart or Graph, then the three available sort fields are inactive ("grayed out").

Once the Merchant has made reporting and customization selections, the Merchant can click a Preview button 4200 which will cause the iReturn Inbound Monitor to prepare a display preview of the requested report. From the preview report screen, the Merchant can print using the browser Print icon or option. In an alternative embodiment, the Merchant can click a Print button on the Preview Report screen to print the displayed report. If the Merchant clicks the Cancel button

4201, the iReturn Inbound Monitor quits the Reports menu without showing any further data.

Figure 60:
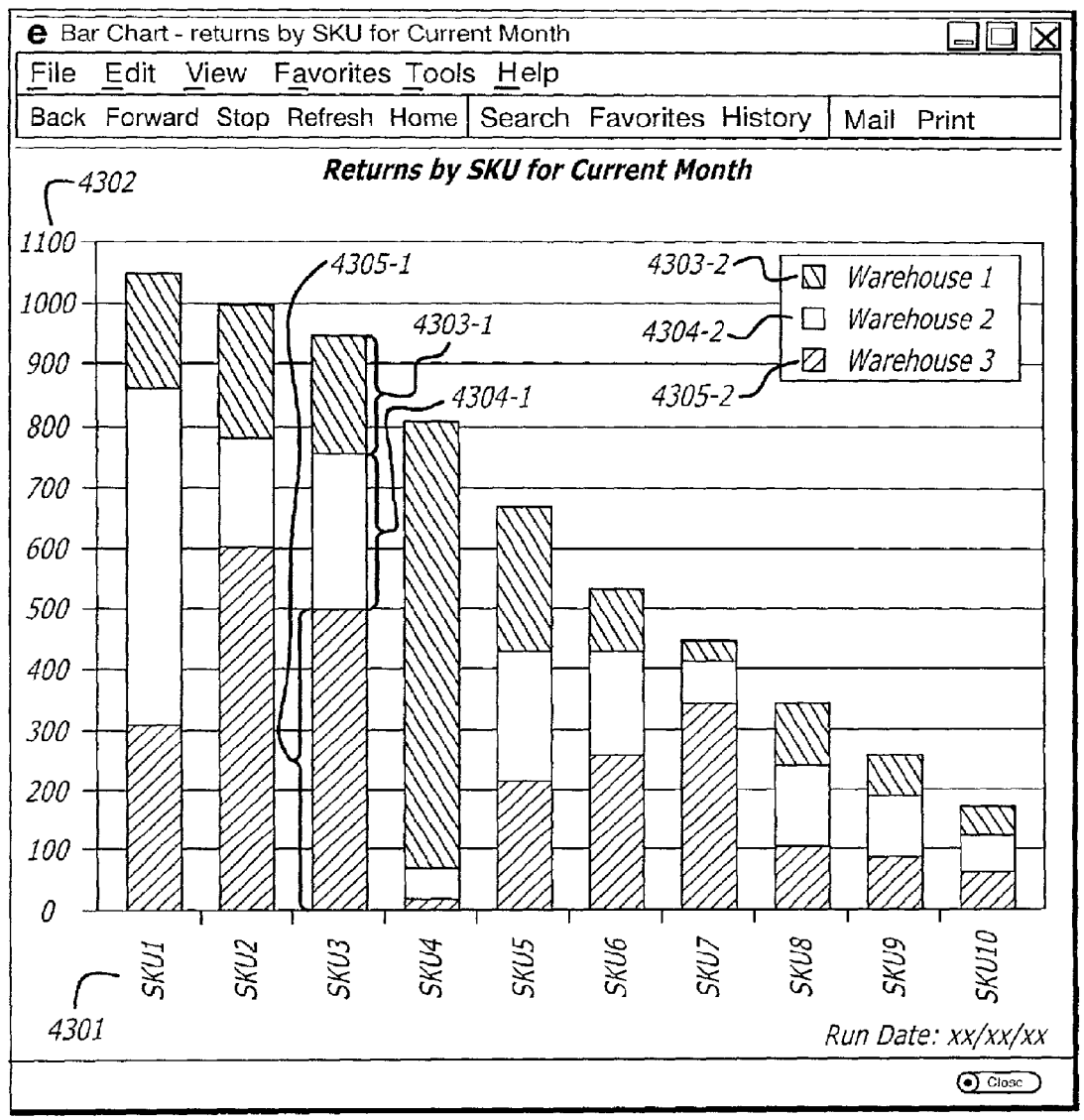
FIG. 60 is a graphic representation depicting an exemplary "Returns by SKU" Report in Chart style in an exemplary embodiment of the invention.

FIG. 60 is a graphic representation depicting an exemplary "Returns by SKU" Report. A Merchant can use a "Returns by SKU" to spot a problem with a particular product. The example "Returns by SKU" report depicted in FIG. 60 has been customized to report Returns by SKU in Chart style for the Current Month. If the number of reportable returned SKU's exceeds a given number "n", for example, "10", then in the exemplary embodiment, the Monitor reports the top "n" SKU's returned during the requested time frame. The X-Axis 4301 of the exemplary "Returns by SKU" report identifies the various SKU's reported; the Y-Axis 4302 identifies a scale for the number of returns. Each bar in the bar chart format is color coded, a portion of each bar corresponding to a particular Destination—e.g., 4303-1 is in a color that corresponds to a legend entry 4303-2 for Warehouse 1; 4304-1 is in a color that corresponds to a legend entry 4304-2 for Warehouse 2; 4305-1 is in a color that corresponds to a legend entry 4305-2 for Warehouse 3;

In one embodiment, the Merchant can group the Destinations in the Merchant's organization in a logon setup procedure for all iReturns reporting. Alternatively, the Merchant can filter each report to select only certain of the Destinations for a particular report. Still further, the Merchant can choose to select "All Returns" rather than show any breakdown by Destination.

FIG. 61 is a graphic representation depicting an alternative exemplary "Returns by SKU" Report. Plain Text style reports provide totals for each SKU returned 4307, totals for all SKU's returned 4308, and percentages of total of all SKU's Returned for each SKU returned 4309. The example "Returns by SKU" report depicted in FIG. 61 has been customized to report Returns by SKU in Plain Text style for the Current Month, sorted by "most frequently returned item".

Figure 62:
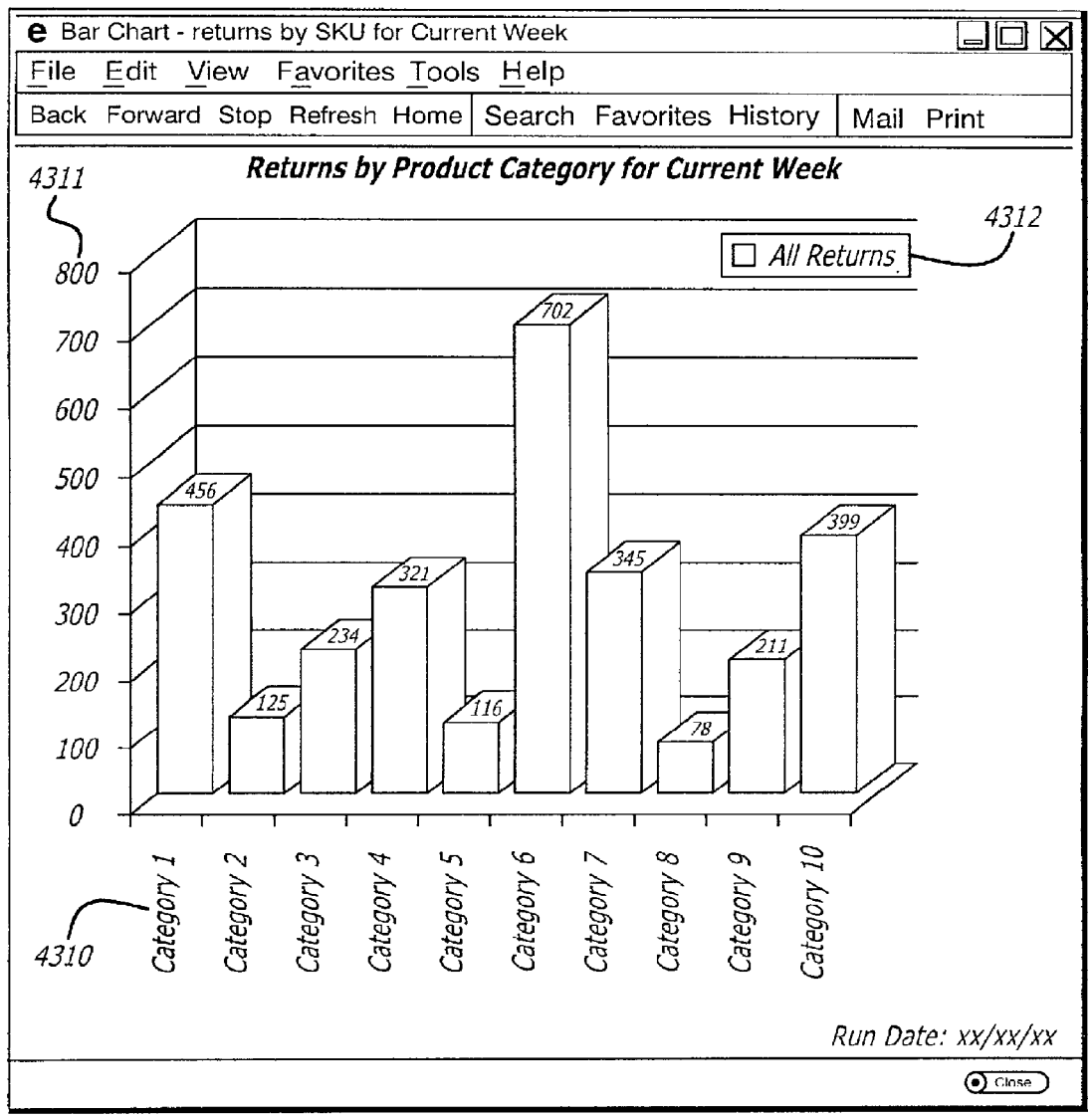
FIG. 62 is a graphic representation depicting an exemplary "Returns by Product Category" Report in Chart style in an exemplary embodiment of the invention.

FIG. 62 is a graphic representation depicting an exemplary "Returns by Product Category" Report. A Merchant can use a "Returns by Product Category" report to spot a type of product experiencing high rates of returns. The example "Returns by Product Category" report depicted in FIG. 62 has been customized to report Returns by Product Category in Chart style for the Current Week. If the number of reportable returned Product Categories exceeds a given number "n", for example, "10", then in the exemplary embodiment, the Monitor reports the top "n" Product Categories returned during the requested time frame. The X-Axis 4310 of the exemplary "Returns by Product Category" report identifies the particular product categories for products returned; the Y-Axis 4311 identifies the number of products returned in each product category. The exemplary "Returns by Product Category" report depicted in FIG. 62 shows "All Returns" 4312 as opposed to a Destination breakdown.

FIG. 63 is a graphic representation depicting an alternative exemplary "Returns by Product Category" Report. PlainText style reports provide totals by product category 4313, totals of all product categories returned 4314, and percentages of each product category as compared to the total of all product categories returned 4315. The example "Returns by Product Category" report depicted in FIG. 63 has been customized to report Returns by Product Category in Plain Text style for the Current Week, sorted by the most frequently returned product category.

Figure 64:
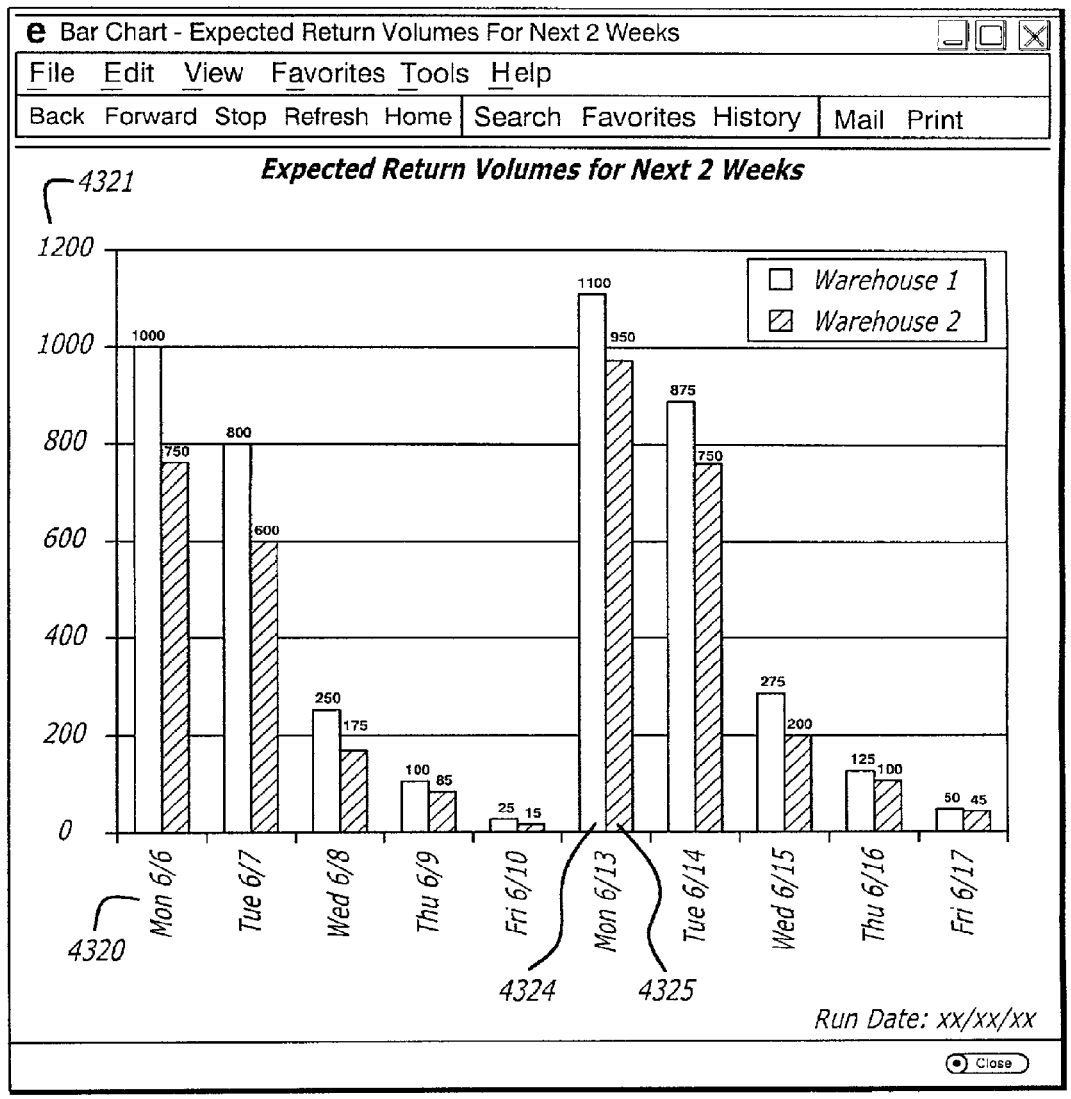
FIG. 64 is a graphic representation depicting an exemplary "Expected Return Volumes" Report in Chart style in an exemplary embodiment of the invention.

FIG. 64 is a graphic representation depicting an exemplary "Expected Return Volumes" Report. A Merchant can use "Expected Return Volumes" to set labor levels to handle expected return volumes at each Destination. The exemplary "Expected Return Volumes" Report depicted in FIG. 64 has been customized to report Expected Return Volumes in Chart style for the next two weeks. The X-Axis 4320 identifies the days of the week; the Y-Axis 4321 identifies the number of returns expected. Each color-coded bar, e.g., 4324, 4325 on the exemplary "Expected Return Volumes" Report in Chart style depicts an individual Destination.

FIG. 65 is a graphic representation depicting an alternative exemplary "Expected Return Volume" Report. Plain Text style "Expected Return Volumes" reports provide totals for each Destination 4322, totals for all Destinations 4323, and in one embodiment, percentages of totals for each Destination as compared to the total for all Destinations (not shown). The alternative exemplary "Expected Return Volume" Report has been customized to report in Plain Text style for the Next Two Weeks, and is sorted by date.

Figure 66:
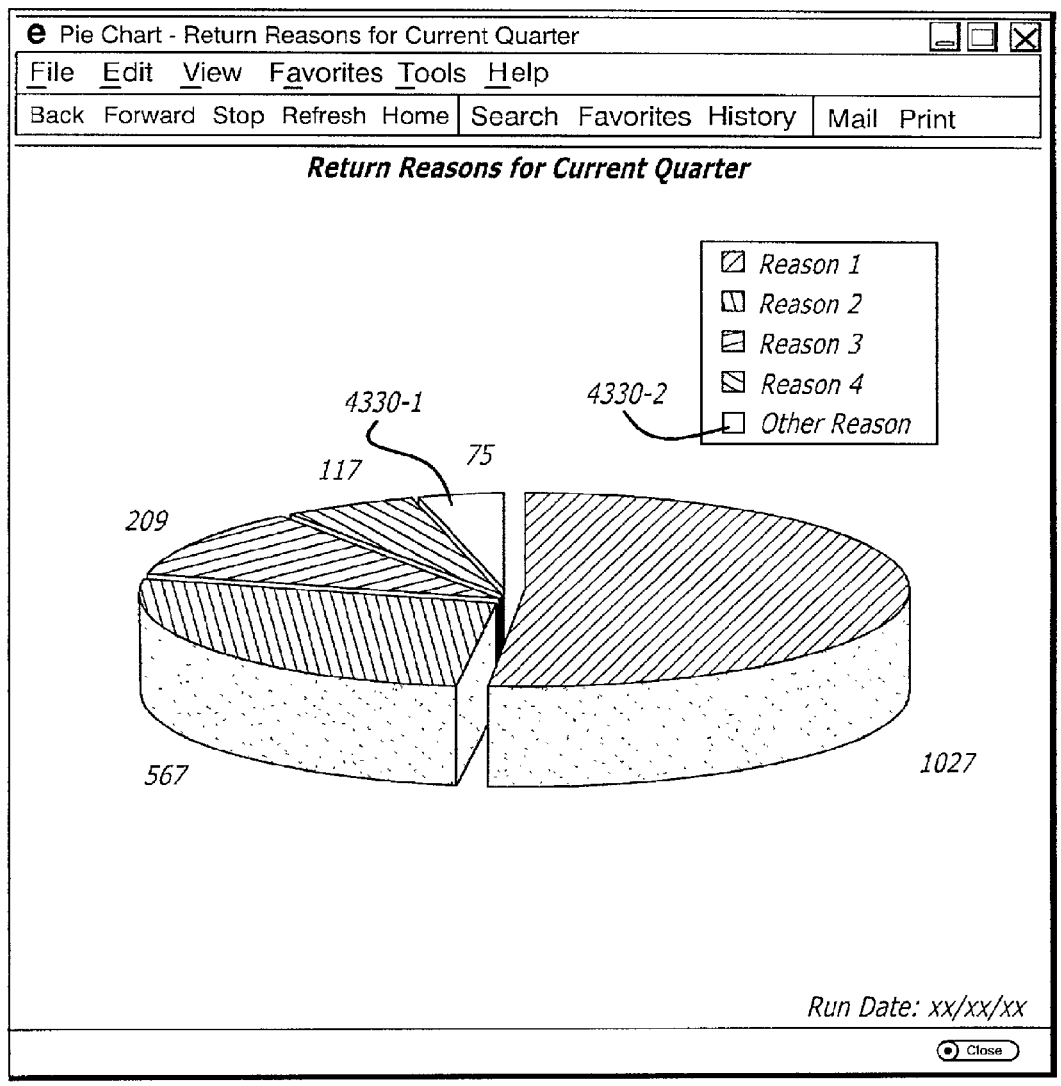
FIG. 66 is a graphic representation depicting an exemplary "Return Reasons" Report in Chart style in an exemplary embodiment of the invention.

FIG. 66 is a graphic representation depicting an exemplary "Return Reasons" Report. The exemplary "Return Reasons" report depicted in FIG. 66 has been customized to report return reasons for the Current Quarter in a Pie Chart style. The iReturn Inbound Monitor Reporting assigns a color, e.g., 4330-1, to each reason given and provides a color legend that identifies the color as being associated with a particular reason description, e.g., 4330-2.

FIGS. 67a and 67b are graphic representations depicting alternative exemplary "Return Reasons" reports. FIG. 67a depicts a Return Reasons report that has been customized to report in Plain Text style only a single Product Category for the Current Quarter, and is sorted by most frequently returned reason. FIG. 67b depicts a Return Reasons report that has been customized to report in Plain Text style a second Product Category for the Current Quarter, and is sorted by most frequently returned reason. Plain Text style Return Reason reports provide totals for each reason 4331, totals for all return reasons (in the cases shown in FIGS. 67a and 67b, for return reasons for a particular product category) 4332, and percentages for each return reason of the total return reasons 4333.

FIG. 68 is a graphic representation that depicts an exemplary "Packages With No Scan" report that has been customized to report in Plain Text style, during the current week, and sorted by Expected Ship Date. A Merchant can use a "Packages With No Scan" report to identify packages that should have been shipped but for which no carrier scan information is available. Each package that should have been scanned is reported. For each package reported, the exemplary "Packages With No Scan" report shows the System tracking number 653, the Carrier and Service 4119, the Expected Ship Date 4121, the Customer Name 675, and the Merchant Reference Number 4155.

FIG. 69 is a graphic representation that depicts an exemplary "Late Packages" report that has been customized to report in Plain Text style, during the current week, and sorted by Expected Delivery Date. A Merchant can use a "Late Packages" report to identify packages that should have been received at a Merchant Destination but for which no receipt has yet been recognized in the System. For each package reported, the exemplary "Late Packages" report shows the System tracking number 653, the Carrier and Service 4119, the Expected Ship Date 4121, the Status 4116, the Customer Name 675, and the Merchant Reference Number 4155.

As depicted in FIG. 55, the iReturn Inbound Manager Reports function 4105 also provides custom Returns reports 4107 that are only available to Merchants that have been authorized to view them.

8. iReturn Merchant Service Application Program Interfaces ("API").

Before describing details concerning the content and format of API requests and responses, an overview of Customer interactions with a Merchant's system and concomitant API requests and responses between the Merchant's system and the iReturn Merchant Service Servers are provided. Also described below are Merchant interactions with the Merchant's system and concomitant interactions between the Merchant's system and the iReturn Merchant Service Servers.

Figure 70B:
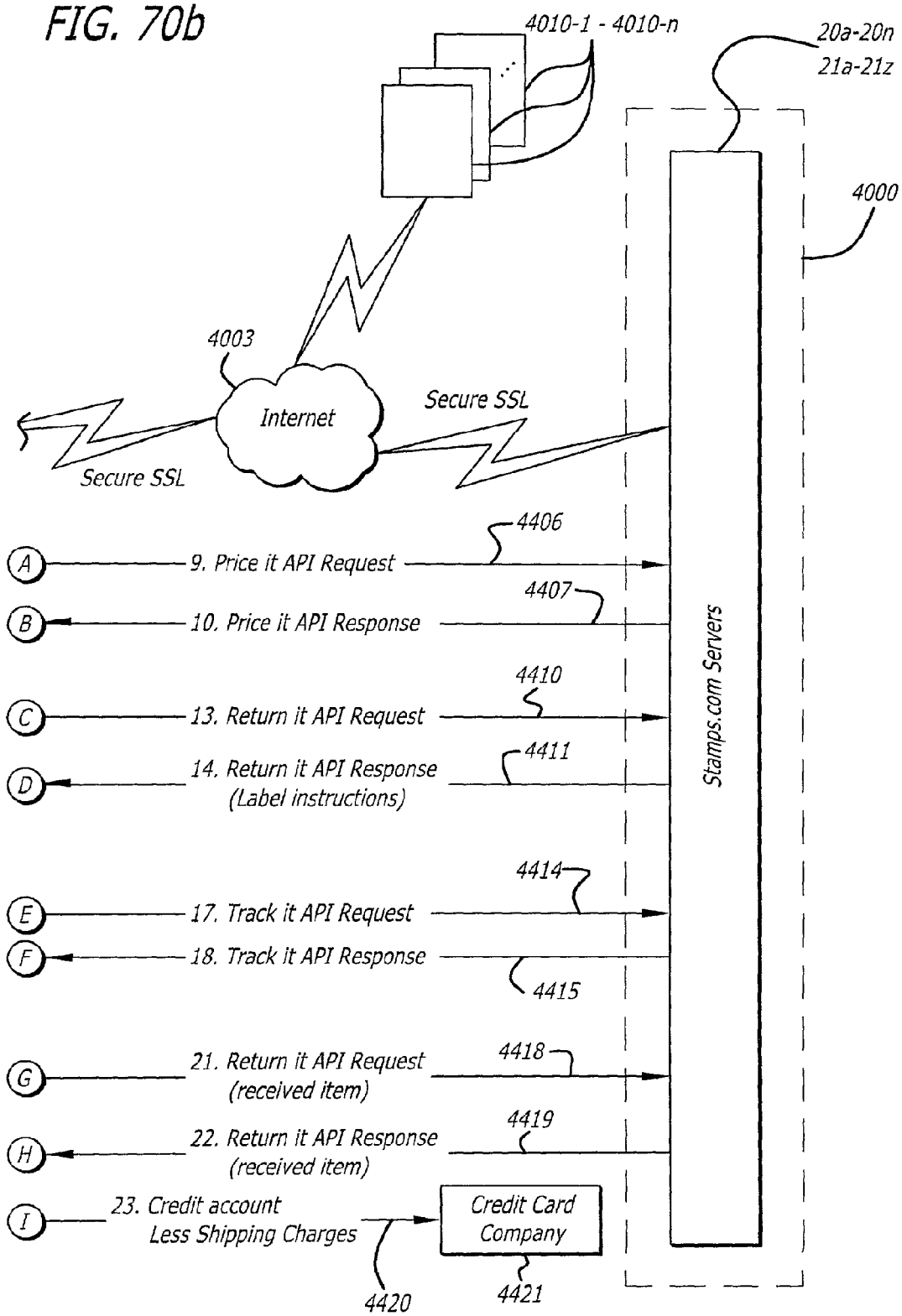
FIG. 70 is a high level interactivity diagram depicting exemplary interactivity by a Customer with a Merchant's system and between the Merchant's system and the iReturn Merchant Service Servers in a situation where the Customer pays shipping charges in an exemplary embodiment of the invention.

FIG. 70 is a high level interactivity diagram depicting exemplary interactivity by a Customer with a Merchant's system and between the Merchant's system and the iReturn Merchant Service Servers in a situation where the Customer pays shipping charges in an exemplary embodiment of the invention. As depicted in FIG. 70, a Customer of a Merchant logs in 4400 to the Merchant's system 4001 and requests to see the Customer's order history. In response to the Customer's log in and request to see the Customer's order history, the Merchant's Order Processing System component 4001a of the Merchant's system 4001 displays to the Customer on a display device 4002 configured with the Customer's computer 4006 the Customer's order history 4401. The Customer's computer 4006 is further configured with a printer device 13, such as a laser printer.

Using the Returns System 4001b features disclosed above, the Customer identifies one or more items from the Customer's previous order that the Customer wants to return to the Merchant 4402.

In the embodiment of the invention depicted in FIG. 70, the Return Policy Engine 4001b of the Returns System is installed on the Merchant's System Servers 4001. As was described in the Returns Applications, the Merchant establishes a set of returns policy rules and preferences prior to Customer's using the Returns System, and the Returns System observes the Merchant's policy and preferences.

As depicted in FIG. 70, the Return Policy Engine 4001b responds to the Customer's request to return one or more items from a previous order by interactively displaying the Merchant's Return Policy and requesting that the Customer complete a Return Questionnaire composed by the Return Policy Engine 4001b according to the Merchant's previously established Returns Policy and Preferences 4403. The Customer completes the questionnaire 4404 which is provided to the Return Policy Engine 4001b. The Return Policy Engine 4001b evaluates the completed questionnaire according to the Merchant's Return Policy and Preferences. If the Merchant's Return Policy and Preferences require that the Customer pay for shipping a returned item, then the Return Policy Engine 4001b composes a message notifying the Customer that the Customer must pay for shipping an item to be returned 4405 and prepares and transmits to the iReturn Merchant Service System 4000 Servers 20a-20n and 21a-21z a Price It API request 4406 requesting rating for shipping the item to be returned. The structure and content of an exemplary Price It API request is similar to the Ship Package Request Node disclosed in detail below. As part of the information communicated by a Price It API request is Shipping and Package Specifications.

The iReturn Merchant Service System 4000 receives the Price It API request 4406 and uses the data contained in the request to develop shipping rates for each supported carrier and each service offered by each supported carrier. In one exemplary embodiment, the API request contains information about the particular Merchant's Returns Rules and Preferences; if the Merchant has indicated that only certain carriers and services be allowed for returns, then the iReturn Merchant Service System 4000 only prepares shipping rates for allowed carriers and services. In an alternative exemplary embodiment, the iReturn Merchant Service System 4000 prepares shipping rates for all carriers and services; the Merchant's System 4001 receives the shipping rates and filters the rates displayed for the Customer according to the Merchant's Return Policy and Preferences. The iReturn Merchant Service System 4000 prepares a Price It API Response 4407 and sends it to the Merchant Return Policy Engine.

The way in which the Price It API 4022 (FIG. 53) of the iReturn Merchant Service System 4000 calculates shipping rates is similar to the shipping rate calculation described above. The System 4000 calculates a shipping rate for each carrier and for each service that supports shipping of the particular parcel and prepares a Price It API Response that contains the calculated shipping rates. The iReturn Merchant Service System 4000 returns the prepared Price It API Response to the Merchant's System 4001. In the exemplary embodiment, the Returns Policy Engine 4001b of the Merchant's system 4001 is programmed to display the shipping rates to the Customer in a way similar to that disclosed in FIG. 36a to the Returns Applications.

The Merchant's Return Policy Engine displays the appropriate shipping rates and shipping options to the Customer 4408. The Customer selects a particular shipping option that designates both carrier and service 4409 to the Merchant's Return Policy Engine 4001b. The Merchant's Return Policy Engine 4001b uses the Customer-selected shipping option for a particular carrier and a particular service with which to prepare a Return It API request. The Merchant's Return Policy Engine 4001b communicates the Return It API request 4410 to the iReturn Merchant Service System 4000.

The iReturn Merchant Service System 4000 receives the Return It API request 4410. The Return It API request contains information similar to that described above with regard to the Price It API request. The iReturn Merchant Service System 4000 uses the information contained in the Return It API request to create a new Return Product record and adds the record to the Return Database 4028 (as depicted in FIG. 53).

The iReturn Merchant Service System 4000 then uses the information contained in the Return It API request to prepare a Return It API Response which contains labeling instructions 4411 with which the Customer can print an appropriate type of label with which to facilitate the shipping of the item to be returned using the Customer-selected carrier and service; the iReturn Merchant Service System 4000 sends the Return It API Response to the Merchant's Return Policy Engine which in turn displays information provided in the Return It API Response to the customer 4412.

After printing the shipping label for the item to be returned, the Customer can request tracking information 4413. From the Customer's tracking request, the Merchant's System 4001 prepares a Track It API Request 4414 which it sends to the iReturn Merchant Service System 4000.

The iReturn Merchant Service System 4000 obtains tracking status information for the requested package from the appropriate carrier's system as was disclosed above. Once the iReturn Merchant Service System 4000 has obtained tracking status information for the requested package from the appropriate carrier's system, the iReturn Merchant Service System 4000 prepares and communicates 4415 to the Merchant's System 4001a a Track It API Response. The Merchant's System 4001a reports the information contained in the Track It API Response to the Customer 4416.

Once the Merchant, such as one of the Merchant's Warehouses, has received the returned package, the Merchant acknowledges 4417 to the Merchant's System 4001*a*, which in turn acknowledges in the form of a Return Received API request 4418 to the iReturn Merchant Service System 4000, receipt of the returned package. In the exemplary embodiment depicted in FIG. 70, the iReturn Merchant Service System 4000 acknowledges receipt of the returned item 4419 at which point, the Merchant's System 4001*a* credits the Customer's Credit Card Company 4421 account for the returned item (less the shipping charges) 4420. The Merchant's System 4001*a* then displays for the Customer a credit for the returned item less shipping charges 4422.

Figure 71A:
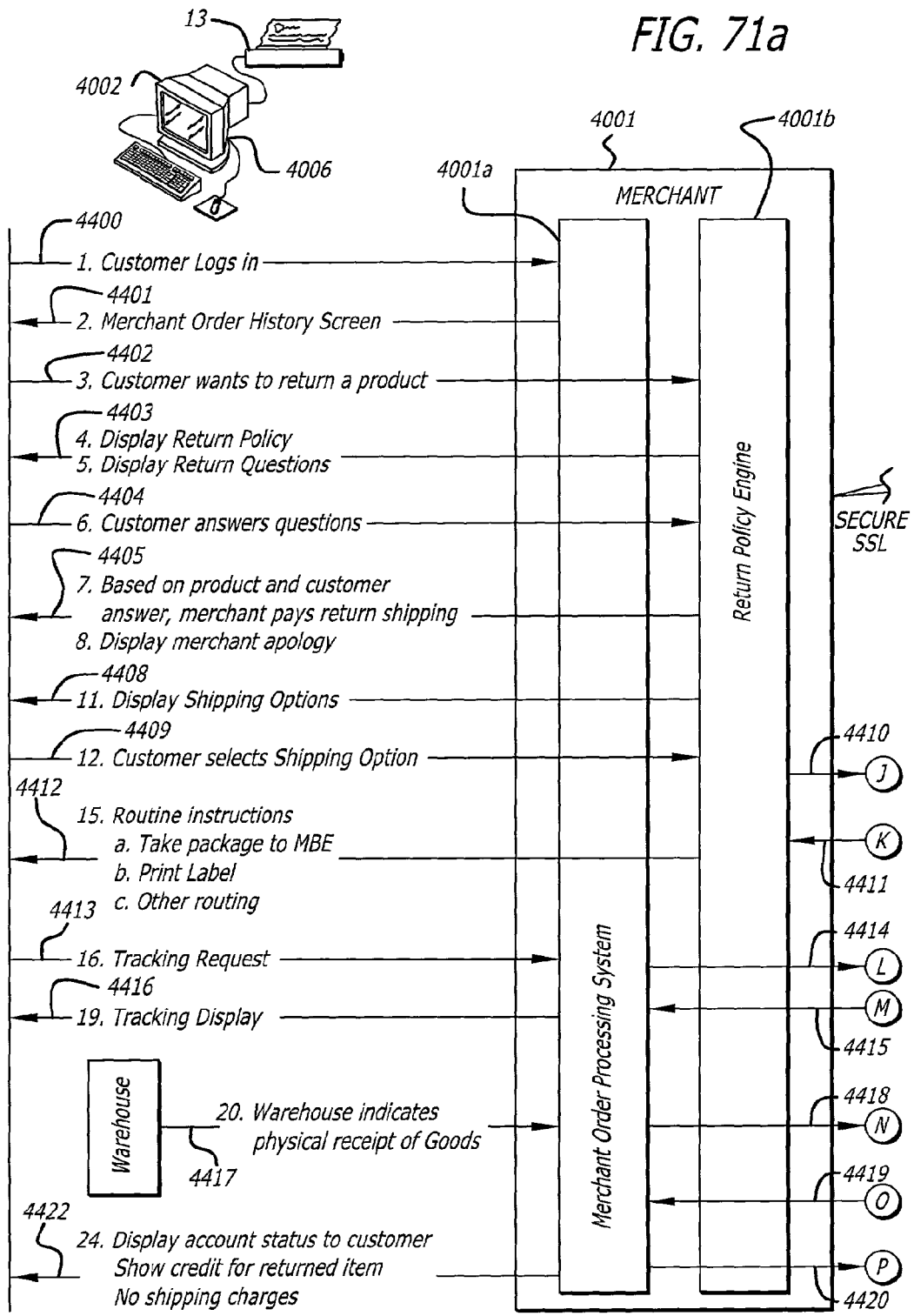
FIG. 71 is a high level interactivity diagram depicting exemplary interactivity by a Customer with a Merchant's system and between the Merchant's system and the iReturn Merchant Service Servers in a situation where the Merchant pays shipping charges in an exemplary embodiment of the invention.

FIG. 71 is a high level interactivity diagram depicting exemplary interactivity by a Customer with a Merchant's system and between the Merchant's system 4001 and the iReturn Merchant Service Servers 20*a*-20*n* and 21*a*-21*z* in the iReturn System 4000 in a situation where the Merchant pays shipping charges in an exemplary embodiment of the invention. The interactivity depicted in FIG. 71 is similar to that depicted in FIG. 70 except that because the Customer does not pay for shipping charges, the Merchant's system 4001 does not send the iReturn Merchant Service System 4000 Price It API Requests 4406 (FIG. 70) and the iReturn Merchant Service System 4000 does not send the Merchant's system 4001 Price It API Responses 4007. As depicted in FIG. 71, once the Merchant, such as one of the Merchant's Warehouses, has received the returned package, the Merchant acknowledges 4417 to the Merchant's System 4001*a*, which in turn acknowledges in the form of a Return Received API request 4418 to the iReturn Merchant Service System 4000, receipt of the returned package. In the exemplary embodiment depicted in FIG. 71, the iReturn Merchant Service System 4000 acknowledges receipt of the returned item 4419 at which point, the Merchant's System 4001*a* credits the Customer's Credit Card Company 4421 account for the returned item 4420. The Merchant's System 4001*a* then displays for the Customer a credit for the returned item 4422.

Figure 72:
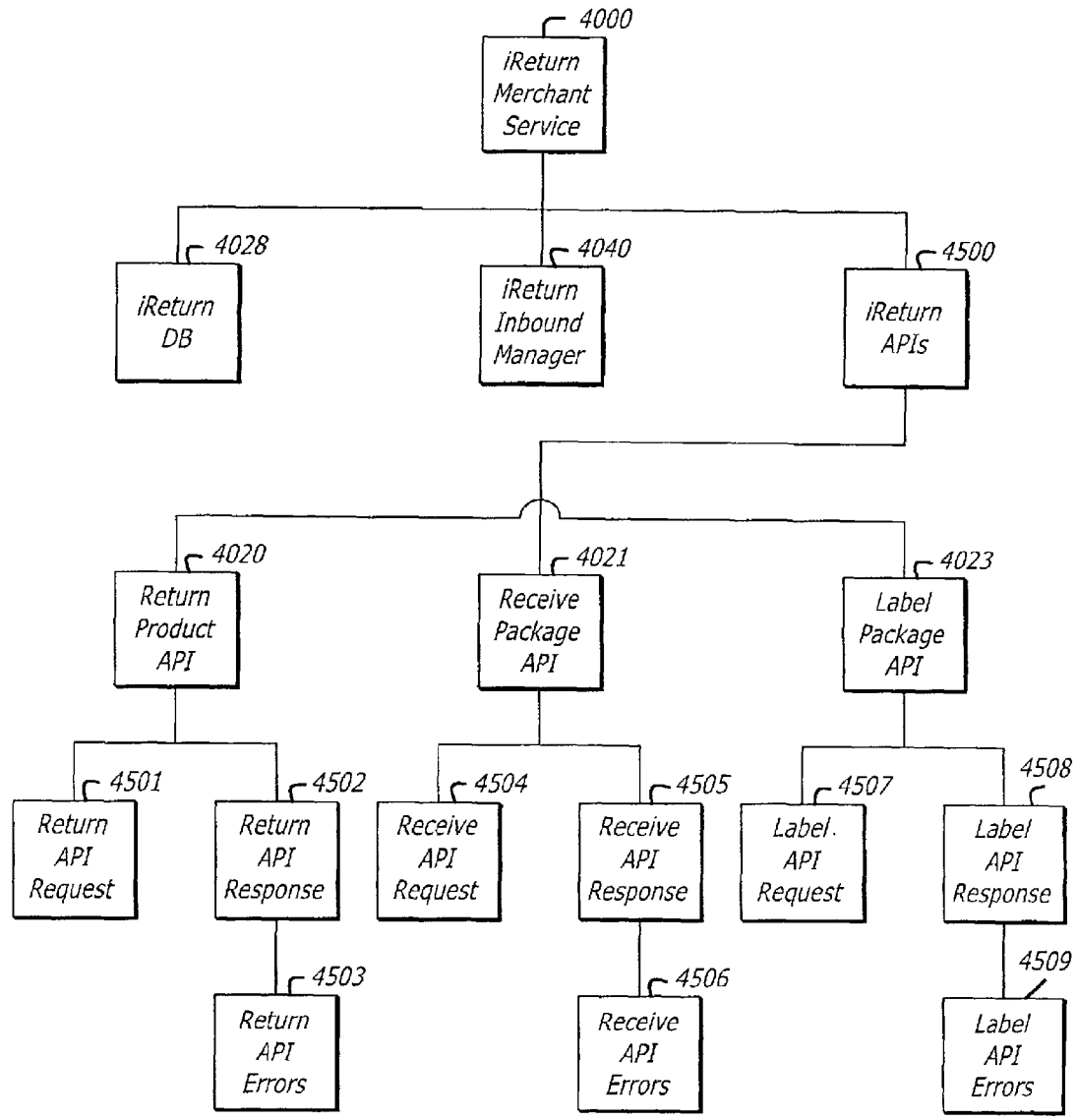
FIG. 72 is a high level block diagram depicting some of the API functional components in an exemplary embodiment of the invention.

FIG. 72 is a high level block diagram depicting some of the API functional components in an exemplary embodiment of the invention. Both API Requests and API Responses are sometimes referred to herein as API messages. In the exemplary embodiment, all API messages are XML formatted messages; all time values returned are in local time, and all API messages are sent and received using the secure Hypertext Transfer Protocol ("HTTPS") and Secure Sockets Layer ("SSL") for the encryption protocol.

As depicted in FIG. 72, there are three API functional components, including an Return Product API function 4020, a Receive Package API function 4021, and a Label Package API function 4023. The Return Product API function 4020 comprises a Return API Request function 4501, and a Return API Response function 4502. The Return API Response function 4502 further provides a Return API Errors function 4503.

The Receive Package API function 4021 comprises a Receive API Request function 4504 and a Receive API Response 4505. The Receive API Response function 4505 further provides a Receive API Errors function 4506.

The Label Package API function 4023 comprises a Label API Request function 4507 and a Label API Response function 4508. The Label API Response function 4508 further provides a Label API Errors function 4509.

Figure 73:
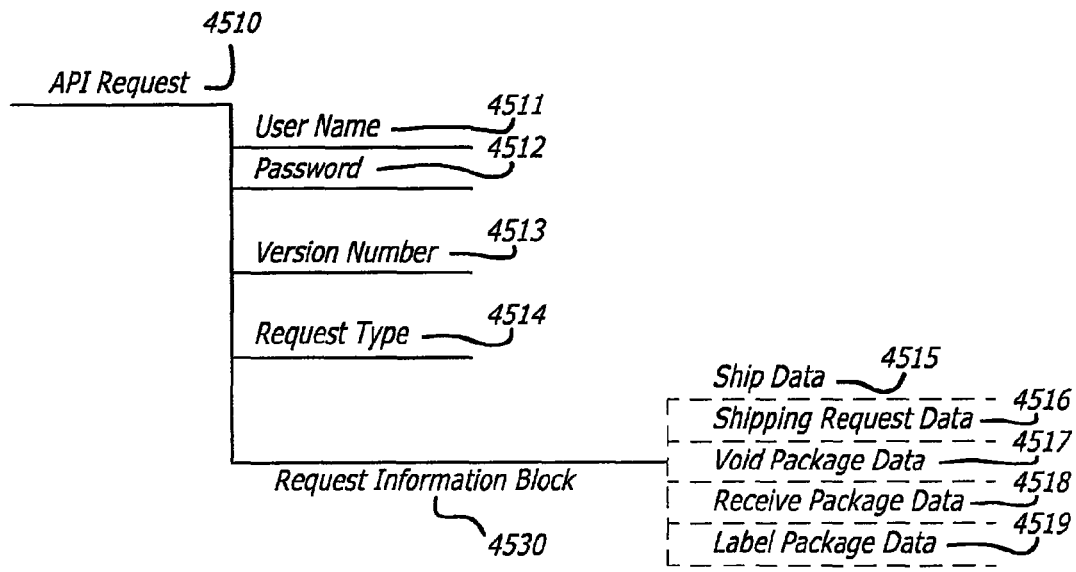
FIG. 73 is a high level structural diagram depicting the structural components of an API Request in an exemplary embodiment of the invention.

FIG. 73 is a high level structural diagram depicting the structural components of an API Request in an exemplary embodiment of the invention. As depicted in FIG. 73, each API Request 4510 comprises a User Name 4511 associated with the Merchant's account, a Password 4512, a Version Number 4513 that identifies the particular software version under which the API Request is generated, a Request Type 4514 (Return Product, Receive Product, or Label Product), and a Request Information Block 4530. The Request Information Block can comprise either, Ship Data 4515, Shipping Request Data 4516, Void Package Data 4517, Receive Package Data 4518, or Label Package Data 4519. In the exemplary embodiment, only one type, and only one instance of that type, of information block is allowed for each API Request.

Figure 74:
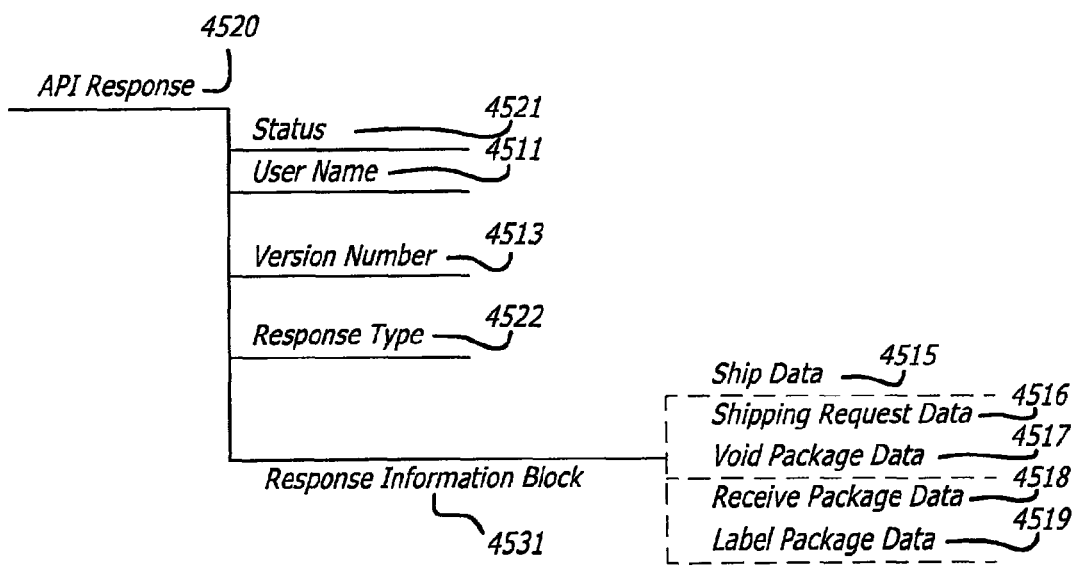
FIG. 74 is a high level structural diagram depicting the structural components of an API Response in an exemplary embodiment of the invention.

FIG. 74 is a high level structural diagram depicting the structural components of an API Response in an exemplary embodiment of the invention. As depicted in FIG. 74, each API Response 4520 comprises a Status 4521, a User Name 4511 associated with the Merchant's account, a Version Number 4513 that identifies the particular software version under which the API Response is generated, a Response Type 4522 (Return Product, Receive Product, or Label Product), and a Response Information Block 4531. The Response Information Block can comprise either, Ship Data 4515, Shipping Request Data 4516, Void Package Data 4517, Receive Package Data 4518, or Label Package Data 4519.

The Status 4521 will comprise a status indicator that identifies the status condition of the corresponding API Request and a Request Document Status Text that provides a brief description of the status condition if an error was encountered. If the API Request was successful, the Response status indicator will be set to zero (0). If there was an error, then the Response status indicator will be set the an error code that corresponds to the particular type of error encountered. If multiple errors were encountered, the iReturn system will set the status indicator to a single error code.

For each API Request, the iReturn System Servers, e.g., 20*a*-20*n*, 21*a*-21*z*, records: a date and time at which the Request was made; the account number for the Merchant's account making the request; the request type, the request version, the number of embedded requests, e.g., for a Receive Product Request, the number of received packages in the Receive Package Request; for each error status resulting from a non-business rule error, the error code, the error text, the date and time the error condition occurred.

There are two types of Returns API messages: a Ship Package type with which the iReturn System creates or updates a Returns record; and a Void Package type with which the iReturn System logically deletes a Returns record.

a. Ship Package Request Node.

The elements comprising a Ship Package Request Node in an exemplary embodiment of the invention are disclosed below:

1.) Transaction Type.

Transaction type defines the type of package record to be created or updated. The transaction type support pre-processing (Traveler) and shipping API initiatives. A value for transaction type is required. A transaction type tag is at the node level. Therefore all of the records for a particular node must be of the same transaction type. Valid transaction types include: Returns; Pre-Processing; Shipping; and other types that are defined over time. Error Conditions that may be encountered include: "Transaction Type required"—this error is returned if the Transaction Type is not provided; and "Invalid Value for Transaction Type"—this error is returned if the Transaction type provided is not a supported Transaction type.

2.) Returns Record Action Type.

The Action Type is at the node level. Therefore all of the records for a particular node must be of the same Action Type. An Action Type value is required. Valid types of Action Type values include: Create a Returns record; and Update a Returns record (the Update value implies first voiding an existing record, then creating new record). Rules governing each Action Type are described below. Error Conditions that may be encountered for Action Type: "Action Type required"—this error is returned if no Action Type is provided; and "Invalid Value for Action Type"—this error is returned if the Action Type provided is not a supported Action type.

3.) Number of Return Package Requests.

The Number of Return Package Requests is the number of separate Returns packages to follow. The value for this element is optional. If a value is not provided, the default value is "1".

Error Conditions that may be reported for this field include: "Invalid Value—ContentCount-[Value]"—this error is reported if the Content Count value is not a valid value (the system will report the invalid value in the Error Text of the error message); "Number of Return Package Requests exceeds maximum"—this error is returned if the number of Return Package Requests value exceeds a preset maximum value for the particular account, or for all accounts; "Invalid Request—Number of Return Package Requests does not match number of blocks in the request document"—this error is returned if the number of Return Package Request value does not match the actual number of individual Return Package Requests blocks.

4.) Return Package Block.

In the exemplary embodiment, the physical number of Return Package blocks must match the 'Number of Return Package Requests' value. In the exemplary embodiment, each Return Package Block comprises a Returns Record key, a Label type, a Label Image type, a Carrier Identifier, at least one (but may have many) Package Block, and each Package Block must have at least one (but may have many) Product Block. The elements comprising a Returns Record key, a Label type, a Label Image type, a Carrier Identifier, a Package Block, and a Product Block are disclosed below.

a.) Returns Record Key.

A Returns Record key should be set to null values if the Returns Action Type is equal to "create". Otherwise, if the Returns Action Type is set to "update", then the Returns Record Key must be a valid Returns Record Key for an existing record. Rules for processing different Action Types are disclosed below.

Error Conditions that may be encountered in processing a Returns Record Key include: "Returns Record key required"—this error is returned if the Returns Record key is not provided; "Invalid Value—Returns Record key"—this error is returned if the Returns Record key is not NULL for Returns Action type='create' or if the Returns Record key is not a valid Returns Record key.

b.) Label Type.

Label Type is optional. Valid Label Types include: None (which means that no label is requested at this time); Shipping label (a shipping label for the specified carrier); Traveler label (a Traveler label is provided to a person who desires to take the package to a retail shipping location. a description of a Traveler label is provided in more detail below); and Returns Label.

Error Conditions that may be encountered in processing Label Type include: "Label Type is Required"—this error is returned if the Label Type was not provided; "Invalid Value—Label Type-[Value]"—this error is returned if the Label Type value provided is not a valid Label Type value.

c.) Label Image Type.

If a shipping label is requested, a Label Image Type must be specified. Valid Label Image types include: "URL"—which refers to a link for display and print using the browser; and "Image"—which refers to return the actual image in *.png format.

Error conditions that may be reported with respect to Label Image Type include: "Label Image Type is Required"—this error is returned if a shipping label has been requested but no Label Image Type has been provided; and "Invalid Value—Label Image Type-[Value]"—this error is returned if an invalid Label Image Type has been provided (the System will report the invalid value in the Error Message Text).

d.) Carrier Identifier.

A Carrier Identifier ("ID") is required if the Label Type specified is equal to Shipping or Returns. Valid Carrier Identifiers are linked to Label Types. If the Label Type is equal to Returns, then the Label format will be either USPS return label format or UPS ARS label format.

Error Conditions that may be reported with respect to Carrier Identifier include: "Carrier ID Required"—this error is reported if the Label Type is specified to be Shipping or Returns and no Carrier ID has been provided; "Invalid Value—Carrier ID for this Label Type-[Carrier Id value, Label type value]"—this error is reported if the Carrier ID provided is not supported or is not supported for the requested Label Type value provided (the system will report the invalid Carrier ID values and Label type values in the Error message text).

e.) Package Information Block.

In the exemplary embodiment, all of the information that is stored for any package is provided. There must be at least one Package information block per Return Package Block. There may be many Package information blocks per Return Package Block. In the exemplary embodiment, Package_OID is not passed in the API request document, but rather is calculated by the iReturn system.

f.) Billing Information.

In the exemplary embodiment, the iReturn system supports only pre-paid shipping (billing type=1). Billing type is required. In one embodiment, billing type=1 is not required, and if it is not pre-paid, then the iReturns System is retrieved from the Accounts database from the account associated with the particular Merchant making the API request. In the exemplary embodiment, Carrier Account is an optional field, and if specified, instructs the system to bill a particular carrier account for the shipping.

g.) ShipFrom Information.

ShipFrom Information comprises: CompanyName, ContactName, EmailAddress, Address, City, State, Zip, Country Phone numbers (Fax numbers, business numbers), and Error Conditions. The CompanyName is option. It is normally not provided. If it is not provided, or is blank or null, the Contact Name is used. ContactName requires a value and represents the Merchant's customer returning the product. EmailAddress is optional. Address—a value is required. City value is required. State value is required based on associated Country rules. Zip value is required based on associated Country rules. Country value is optional; the default country value is the United States. International origin is not supported in the exemplary embodiment. Phone number values are optional. An error condition for each of these elements will be reported if the value provided is not a valid value for the element, or if it is a required element, if no value is provided.

h.) ShipTo Information.

Account Information is obtained from the logon account and password. This account information is used to tie a package to a company and a physical location. ShipTo Information includes: CompanyName (Optional); ContactName (Required); EmailAddress (Optional); Address (Required); City, State, Zip, and Country (Required); Address type (Required); Phone numbers: Fax, Business (Optional).

i.) Site Information.

Site Information includes: AccountNumber, CompanyName, ContactName, EmailAddress, Address, City, State, Zip, and Country, Phone numbers: Fax, Business, and Site type (required). In the exemplary embodiment, only site type=5 (scheduled pickup) is supported.

j.) Package Information.

Package Information includes: AccountNo; AlternateAccountNumber; UserId; CustomerId; Package DateTime Information (Required Date format YYYY-MM-DD; Required Time format HH:MM); DropOffDate (optional; if the default value is not passed, the expected drop off date is the Dropoff_delay plus the package record create date); ActualDeliveryDateTime (this is not provided but rather is calculated by the system—either the tracked delivery datetime or the received datetime); EarliestDeliveryTime (optional; default value is 17:00 (5 pm)); ExpectedDeliveryDate (Not provided but rather is calculated by the system—this is the DropOffDate plus the transit time (in days)); LatestDeliveryDateTime (Not passed; calculated by the system).

k.) Package TypeDimensionsWeight Information.

Package TypeDimensionsWeight Information includes: Package Type (required); Length (required if Package Type is equal to "other"; ignored otherwise); Height (required if Package Type is equal to "other"; ignored otherwise); Width (required if Package Type is equal to "other"; ignored otherwise); Weight (required). Various error conditions are reported if required elements are missing, or if an element value is provided that is not supported.

Error conditions reported include:

"Weight Required"—this error is returned if the Weight is not provided;

"Invalid Value—Weight-[Invalid]"—(the system reports the invalid weight value in the Error Message Text) this error is reported if the Weight is not a valid Weight value);

"Weight Too Large-[Weight]"—(the system reports the Weight value in the Error Message Text) this error is returned if the Weight exceeds the maximum Weight value for the selected Carrier;

"Weight Too Small-[Weight]"—the system reports the Weight value in the Error Message Text) this error is returned if the Weight does not meet the minimum Weight value for the selected Carrier;

"Dimensional Weight Too Large-[Length, Height, Width, Dim Weight]"—(the system will report the Length, Height, Width, and Dimensional Weight in the Error Message Text) this error is returned if the calculated Dimensional Weight exceeds the maximum Weight value for the selected Carrier and Service;

"Invalid Value—Packaging Type-[Invalid]"—(the system will report the invalid value in the Error Message Text) this error is returned if the Packaging Type is not a supported type;

"Invalid Value—Package Length-[Invalid]"—(the system will report the invalid value in the Error Message Text) this error is returned if the Package Length is not a valid value;

"Invalid Value—Package Height-[Invalid]"—the system will report the invalid value in the Error MessageText) this error is returned if the Package Height not a valid value;

"Invalid Value—Package Width-[Invalid]"—(the system will report the invalid value in the Error Message Text) this error is returned if the Package Width is not a valid value;

"Invalid Value—Additional Handling-[Invalid]"—(the system will report the invalid value in the Error MessageText) this error is returned if the Additional Handling value is not a valid;

"Package Length Required"—this error is returned if the Packaging Type is "Other" and if the Package Length is not provided;

"Package Height Required"—this error is returned if the Packaging Type is "Other" and if the Package Height is not provided;

"Package Width Required"—this error is returned if the Packaging Type is "Other" and if the Package Width is not provided;

"Length Too Large-[Length]"—the system will report the Package Length in the Error Message Text) this error is returned if the Packaging Type is "Other" and if the maximum Package Length for selected Carrier is exceeded;

"Length plus Girth Too Large-[Length, Girth]"—the system will report the Length and Girth in the Error Message Text) this error is returned if the Packaging Type is "Other" and if the maximum Length plus Girth for selected Carrier is exceeded;

"Package Too Small-[Length, Height, Width]"—the system will report the Length, Height, Width in the Error Message Text) this error is returned if the Packaging Type is "Other" and if the minimum package dimensions for selected Carrier are not met.

l.) Carrier Information.

Carrier Information includes: CarrierAccount (required); CarrierId or CarrierName (required; Valid Carrier ids are linked to Label type; for Label type=Returns: USPS return label format and UPS ARS label format are valid); CarrierServiceId or CarrierServiceName (required). Error Conditions reported with respect to Carrier Information include: "Carrier Required"—this error is returned if a Carrier is not provided; "Carrier Account Number Required"—this error is returned if a Carrier Account is not provided; "Carrier Service Required"—this error is returned if a Carrier Service is not provided; "Invalid Value—Carrier-[Carrier]"—(the system will report the invalid value in the Error Text) this error is returned if the Carrier is not a supported carrier; "Invalid Value—Carrier Account-[Carrier Account]"—(the system will report the invalid value in the Error Text) this error is returned if the Carrier Account is not a valid Carrier Account; "Invalid Value—Service-[Service]"—(the system will report the invalid value in the Error Text) this error is returned if the Service is not a valid for the selected carrier.

m.) Service Options and Other Flags.

All values for Service Options and other flags are optional. Service Options and other flags include: CallTag; CertifiedMail; ReturnReceipt; "Tracking Required" is an option of Return Receipt; COD; DeclaredValue; Value of Commodity; DeliveryConfirmation (Tracking Required; Signature Required); VerbalConfirmationofDelivery (this option is only valid for UPS); ProofofDelivery ("Signature Required" is an option of ProofofDelivery); DeliveryNoteEmail; GuaranteedDelivery; AllowSaturdayDelivery; AllowSundayDelivery. Error Conditions that may be reported with respect to Service Options and Other Flags include:

"Invalid Value—Delivery Confirmation-[Value]"
The system will report the invalid value in the Error Text. Error returned if Delivery Confirmation value is not a valid value.

"Invalid Value—Verbal Confirmation of Delivery-[Value]"
The system will report the invalid value in the Error Text. Error returned if Verbal Confirmation of Delivery value is not a valid value.

"Invalid Value—Call Tag-[Value]"
The system will report the invalid value in the Error Text. Error returned if Call Tag value is not a valid value.

"Invalid Value—Certified Mail-[Value]"

The system will report the invalid value in the Error Text.
Error returned if Certified Mail value is not a valid value.
"Invalid Value—Return Receipt-[Value]"
The system will report the invalid value in the Error Text.
Error returned if Return Receipt value is not a valid value.
"Invalid Value—Declared Value Amount-[Value]"
The system will report the invalid value in the Error Text.
Error returned if Declared Value Amount is not a valid value.
"Invalid Value—COD Amount-[Value]"
The system will report the invalid value in the Error Text.
Error returned if COD Amount is not a valid value.
"Invalid Value—Allow Saturday Delivery-[Value]"
The system will report the invalid value in the Error Text.
Error returned if Allow Saturday Delivery value is not a valid value.
"Invalid Value—Proof of Delivery-[Value]"
The system will report the invalid value in the Error Text.
Error returned if Proof of Delivery value is not a valid value.
"Invalid Value—Verbal Confirmation of Delivery-[Value]"
The system will report the invalid value in the Error Text.
Error returned if Verbal Confirmation of Delivery value is not a valid value.
"Service Option Conflict-[Service Option1, Service Option2]"
The system will report the two conflicting service option values in the Error Text:
Error returned if an indicated Service Option is not valid with another indicated
Service Option for the selected Carrier.
"Invalid Value—Allow Sunday Delivery-[Value]"
The system will report the invalid value in the Error Text.
Error returned if Allow Sunday Delivery value is not a valid value.
n.) Product Information Block.
The Product Information Block contains all of the information that the Merchant keeps about the product(s) being returned. There must be at least one Product Information Block in a Ship Package Request Node. All product information is optional except for the Merchant product key. All product information is alphanumeric text string. Product Information Block data includes: Merchant cross-reference key (Must be unique); Authorization Number; Category; SKU; Description; Manufacturer; Quantity; Price; Tax; Refund; Shipping Paid by; Order Number; Order Date; Order Status; Customer Name; Customer ID; Return Reason code; Return Reason description.
Error Conditions reported include: "Merchant product key Required"—this error is returned if Merchant Product key is not provided.
b. Ship Package Block Action Type Rules.
1.) Create Rules.
There are rules for creating new Return Records. In the exemplary embodiment of the invention, these rules require that if any error conditions were reported for a Return API Request, that no new Returns record be created.
In order to create a new Returns record, each Returns record key must be unique. In one exemplary embodiment, Pre-processing transaction records are treated the same as Returns transaction records.
2.) Update Rules.
There are also rules for updating existing records. In the exemplary embodiment of the invention, if there are error conditions, the system will not update a Returns record.

In order to update an existing Returns record, the Returns Record key in the API Request must be valid. Updates to any Package Block data must follow all package object rules and behaviors. The Package is voided in the Package_History table, and then a new Package is created in the Package_History table.
If Package is not in Package_History, then void Package in the Package table and create a new Package in the Package table.
A Merchant can only update records associated with their iReturn System account. A voided package may not be updated. Nor can updates be applied to a record that has been logically closed
3.) Delete and Void Rules.
There are also rules for deleting existing records. In the exemplary embodiment of the invention, if there are error conditions, the system will not delete a Returns record.
In order to delete an existing Returns record, the Returns Record key must be valid. When a Returns record is deleted, it is not physically deleted, but is only logically deleted—that is, the package is voided.
Deleting a Returns record must follow all package object rules and behaviors. A Merchant can only delete records associated with their Stamps account. A Returns record in Package_History can not be deleted.
For a package in the Package_History table, that has not been physically received, the receipt of a Void It™ API request document instructs the API to update the status of the package to 'EXPIRE".
A package that has been voided can not be deleted. For a package in the Package_History table, that has been physically received, the receipt of a Void It™ API request document instructs the API to update the status of the package to 'COMPLETE".
4.) Action Error Conditions.
Various Error Conditions may be reported when the system attempts to apply a particular action, including:
"Invalid Value—Returns Record Key-[Value]"
The system will report the invalid value in the Error Text.
Error returned if Returns Record Key value is not a valid value.
"Invalid Value—Can not update Returns Record for another merchant-[Value]"
The system will report the invalid value in the Error Text.
Error returned if Returns Record Key value is for a record other than merchant's.
"Invalid Value—Can not update Returns Record that has been physically received-[Value]"
The system will report the invalid value in the Error Text.
Error returned if Returns Record Key value is for an update of a record that has been physically received.
"Invalid Value—Can not void Returns Record that has been voided-[Value]"
The system will report the invalid value in the Error Text.
Error returned if Returns Record Key value is for a void of a record that has been voided.
"Invalid Value—Can not void Returns Record that has been shipped-[Value]"
The system will report the invalid value in the Error Text.
Error returned if Returns Record Key value is for a void of a record that is in Package_History table.
c. Ship Package Response Node.
The Ship Package Response Node includes the following elements:
Echo of Origin, Destination, Weight request elements for each received package;
System Returns record key for each package;

Package OID for each package;

System Tracking number for each package;

Echo of Label if so requested.

d. Void Package Request Node.

In the exemplary embodiment of the invention, a Void Package Request Node comprises: a. Number of Void Package Requests; and a corresponding number of Void Package Blocks.

The Number of Void Package Requests is the number of separate Void Package packages to follow. This is Optional. If a value is not provided, the default value is "1".

Error Conditions that may be reported include:

"Invalid Value—ContentCount-[Value]"

The system will report the invalid value in the Error Text. Error returned if the Content Count value is not valid value.

"Invalid Request—Number of Void Package Requests does not match number of blocks in the request document"

This error is returned if the number of Void Package Request value does not match the actual number of individual Return Package Requests blocks.

A Void Package Block comprises a Returns Record key. As mentioned above, the physical number of Void Package blocks must match the 'Number of Void Package Requests' value.

The Returns Record key is also known as the Package OID. This is Required.

Error Conditions that may be reported include:

"Returns Record key required"

This error is returned if the Returns Record key is not provided.

"Invalid Value—Returns Record key"

This error is returned if the Returns Record key is not a valid Returns Record key.

e. Void Package Rules.

If a package to be voided is in the Package Table, follow normal void package logic. Otherwise, if the package to be voided is in the Package_History Table, if the package status is not equal receive: if the package carrier is USPS, then update status to expire; otherwise, if the package carrier is not USPS, then report as an error. If the package to be voided is in The Package_History Table, but the status is equal received, then update status to complete.

f. Void Package Response Node.

The Return Product Response Node echoes the Void Package Request Node elements.

g. Receive Package Request Node.

In the exemplary embodiment of the invention, a Receive Package Request Node includes the following elements: Number of Receive Package Requests; one or more Receive Package Request blocks. The Number of Receive Package Requests indicates the number of separate Receive packages to follow. The element is Optional. If a value is not provided, the default value is "1".

Error Conditions that may be reported with respect to Number of Receive Package Requests include:

"Invalid Value—ContentCount-[Value]"

The system will report the invalid value in the Error Text. Error returned if the Content Count value is not valid value.

"Number of Receive Package Requests exceeds maximum"

This error is returned if the number of Receive Package Requests value exceeds the maximum value for this account.

"Invalid Request—Number of Receive Package Requests does not match number of blocks in the request document."

This error is returned if the number of Receive Package Request value does not match the actual number of individual Receive Package Requests blocks.

Each Receive Package Request block includes the following: Package OID (required); date package was received; and time package was received.

Based on the Package OID, check to determine if the Package is in Package_History. If the package is not in Package_History: Force Package into the Package_History table; and Flag Package as forced. The package must not have been previously physically received.

Error Conditions that may be reported include:

"Package OID is required"

Error returned if Package OID value is not provided.

"Package has already been received"

Error returned if package has already been physically received.

"Invalid Value—Package OID-[Value]"

The system will report the invalid value in the Error Text. Error returned if Package OID value is not a valid value.

The date that the package was received is required. In the exemplary embodiment of the invention, dates are provided in the following date format: "YYYY-MM-DD".

Error Conditions that may be reported include:

"Date Package was received is required"

Error returned if received data value is not provided.

"Invalid Value—Received Date-[Value]"

The system will report the invalid value in the Error Text. Error returned if received date value is not a valid value.

The time that the package was received is required. In the exemplary embodiment of the invention, time is provided in the following time format: "HH:MM".

Error Conditions that may be reported include:

"Time Package was received is required"

Error returned if received time value is not provided.

"Invalid Value—Received Time-[Value]"

The system will report the invalid value in the Error Text. Error returned if received time value is not a valid value.

h. Receive Package Response Node.

The Receive Package Response information block echo the Receive Package Request elements.

i. Label Package Request Node.

In the exemplary embodiment of the invention, very little data is passed in a Label Package Request API because the assumption is that a Returns record with all of the necessary information already exists. A Label Package Request Node includes the following elements: a Number of Label Package Requests; and one or more Label Package Request blocks.

A Number of Label Package Requests specifies the number of separate Label package requests to follow. This element is Optional. The maximum allowed value is a configurable item for each Merchant account. If a value is not provided, the default value is "1". Error Conditions that may be reported include:

"Invalid Value—ContentCount-[Value]"

The system will report the invalid value in the Error Text. Error returned if the Content Count value is not valid value.

"Invalid Request—Number of Label Package Requests does not match number of blocks in the request document"

This error is returned if the number of Label Package Request value does not match the actual number of individual Label Package Requests blocks.

In the exemplary embodiment of the invention, each Label Package Request block will include the following elements: Label Type, Label Image Type, Carrier ID, and Package OID.

Label Type is required. Valid Label types include: Shipping label; Traveler Label; and Returns label. Error Conditions that may be reported include:

"Label type is required."
Error returned if label type is not provided.
"Invalid Value—Label type-[Value]"
The system will report the invalid value in the Error Text.
Error returned if label type value is not a valid value.

Label Image type is required. Valid Label Image types include: URL—link for display and print using the browser; Image—return the actual image in *.png format. Error Conditions that may be reported include:

"Label Image type is required"
Error returned if label image type is not provided.
"Invalid Value—Label Image type-[Value]"
The system will report the invalid value in the Error Text.
Error returned if label image type value is not a valid value.

In the exemplary embodiment of the invention, Carrier ID is Required. Valid Carrier IDs are linked to Label type. For Label type=Returns: USPS return label format and UPS ARS label format are available. Error Conditions that may be reported include:

"Carried Id is required"
Error returned if carrier id is not provided.
"Invalid Value—Carrier Id for this Label type-[Carrier Id value, Label type value]"
The system will report the invalid values in the Error Text.
Error returned if carrier id is not supported for the requested label type value In the exemplary embodiment of the invention, Package OID is required. The value must be a valid Package OID. Error Conditions that may be reported include:

"Record key is required"
Error returned if record key is not provided.
"Invalid Value—Record key-[Value]"
The system will report the invalid value in the Error Text.
Error returned if record key value is not a valid value.

j. Label Package Process.

Based upon the Label Type in the relevant API Request, the iReturn System will prepare the following relevant type of label for the specified carrier and service:

1.) Print a USPS Label.

Figure 75A:
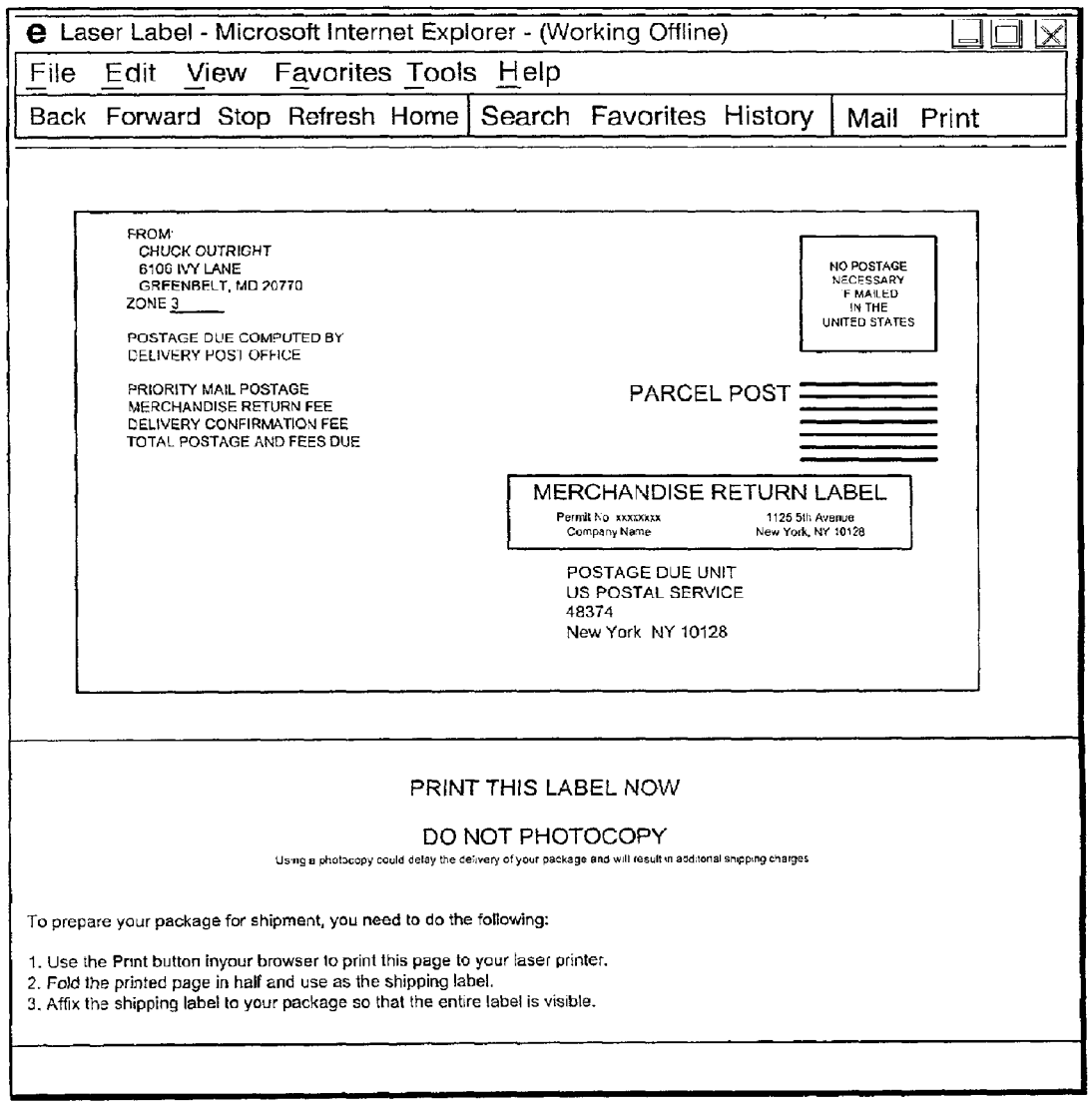
FIG. 75a is a graphic representation depicting an exemplary United States Parcel Service Electronic Merchandise Return label in an exemplary embodiment of the invention.

If the carrier is USPS, the iReturn System creates a USPS Electronic Merchandise Return (EMR) label as depicted in FIG. 75a. To do that, the iReturn System generates the EMR in PNG format on a system server.

The iReturn System formats, and causes to be printed, a bar code representing the system tracking number for placement on an 8½"×11" sheet of paper on which a user Customer will print the EMR. The bar code for the system tracking number would allow warehouse personnel to match physically received packages with information in the returns record database. The presence of the bar code on the label also facilitates recognition by warehouse personnel of a received package for identification to the system during the Receive Package API process.

The iReturn System also formats and causes to be printed a location of a retail shipping center, such as, for example, a Mail Boxes Etc., nearest to the customer's location. As part of the label, in one embodiment, the iReturn System also prints a record number so that the retail shipping center can access the iReturn System to view the record for the package. In one exemplary embodiment, the iReturn System also prints the location of the nearest retail store of the Merchant's.

The iReturn System causes the display of instructions to print the EMR using a laser printer, the appropriate way to tape the label on to the package, and to take the package to the Post Office or retail shipping center. Below the fold of the label, the iReturn System inserts a URL link back to the Merchant's website. Exemplary instructions are identified in FIG. 75b.

2.) Print a UPS Label

If the carrier is UPS, the iReturn System creates a UPS Authorized Return Service (ARS) label (not shown). To do that, the iReturn System generates the ARS in PNG format on a system server. In the exemplary embodiment, the system provides a mechanism by which the Customer provides payment information to UPS.

The iReturn System formats, and causes to be printed, a bar code representing the system tracking number for placement on an 8½"×11" sheet of paper on which a user Customer will print the ARS. The bar code for the system tracking number would allow warehouse personnel to match physically received packages with information in the returns record database. The presence of the bar code on the label also facilitates recognition by warehouse personnel of a received package for identification to the system during the Receive Package API process.

The iReturn System also formats and causes to be printed a location of a retail shipping center, such as, for example, a Mail Boxes Etc., nearest to the customer's location. As part of the label, in one embodiment, the iReturn System also prints a record number so that the retail shipping center can access the iReturn System to view the record for the package. In one exemplary embodiment, the iReturn System also prints the location of the nearest retail store of the Merchant's.

The iReturn System causes the display of instructions to print the ARS using a laser printer, the appropriate way to tape the label on to the package, and to take the package to the Post Office or retail shipping center. Below the fold of the label, the iReturn System inserts a URL link back to the Merchant's website. Exemplary instructions are similar to those identified in FIG. 75b.

3.) Print a Traveler Label

The iReturn System provides the ability for a customer to prepare packages for shipping and print what is referred to herein as a "Traveler" Label for use by a retail shipping center, for example, a Mail Boxes Etc. location near the customer. The customer uses the Merchant's Returns Policy Engine and Processing System to interface with the iReturn System to enter package information. Although the iReturn System provides for the printing of actual shipping labels, if, for some reason, the customer is unable or not ready to print a final shipping label, the client prints a temporary label called a Traveler.

The Traveler displays a bar code that contains the shipping details. When the customer delivers the package to a retail shipping location, the shipping professional scans the bar code and accesses the iReturn System to complete the process and print an actual shipping label. All the package information that the customer previously entered at his or her computer is now readily available to the retail shipping center shipping professional. At this point in time, the shipping professional weighs the package and adjusts the previously-entered weight, if necessary. Other information can be updated as well. The shipping professional then readies the package for the carrier by entering final details, printing out a final shipping label, and processing the package as shipped In the exemplary embodiment, Traveler Labels contain a package number, such as a system Client Package Number, a package number for the retail shipping center, e.g., an EPSO package number for Mail Boxes Etc., or an ISRF package number.

Figure 76:
FIG. 76 is a graphic representation depicting an exemplary Traveler Label in an exemplary embodiment of the invention.

To create a Traveler label, the iReturn System generates for printing the Traveler Label in PNG format on a system server. An exemplary Traveler Label is depicted in FIG. 76.

The iReturn System formats, and causes to be printed, a bar code 4602 representing the system tracking number 4601 for placement on an 8½"×11" sheet of paper on which a user Customer will print the Traveler Label. The bar code for the system tracking number would allow warehouse personnel to match physically received packages with information in the returns record database. The presence of the bar code on the label also facilitates recognition by warehouse personnel of a received package for identification to the system during the Receive Package API process.

The iReturn System also formats and causes to be printed a location of a retail shipping center, such as, for example, a Mail Boxes Etc., nearest to the customer's location. As part of the label, in one embodiment, the iReturn System also prints a record number so that the retail shipping center can access the iReturn System to view the record for the package. In one exemplary embodiment, the iReturn System also prints the location of the nearest retail store of the Merchant's.

The iReturn System causes the display of instructions describing how the Traveler Label is to be printed using a laser printer, that the label can not be photocopied, that the label must be placed in the clear pouch that came with the package, to affix the clear pouch to the package, and finally take the package to a retail shipping center. Below the fold of the label, the iReturn System inserts a URL link back to the Merchant's website.

k. Label Package Response Node

The Label Package Response information block include all of the Label Package request elements.

l. Configuration Parameters

In the exemplary embodiment, the following global API Returns configuration parameters are required. Additional rules are also listed.

Dropoff_delay: Number of day(s) to add to create date for the expected drop-off date calculation. Value is 1 day.

Move_package_delay: Number of days until a returns package is moved from the Package table to the Package_History table. Only use this rule when the carrier is USPS Add this value to the expected drop off date and time to determine if package must be moved. Value is 2 days.

NoScan_delay: Number of days without a first scan message before a package is marked as not scanned. Only use this rule when the carrier is UPS. Add this value to the expected drop-off date and time. Value is 2 days. The first scan message will be used to move the package from the Package table to the Package_History table. The merchant's customer service will use the No Scan Report to identify potential problem return packages. If the merchant discovers that the customer has not shipped the package yet, the merchant can:

Void the return package indicating the customer will not ship.

Update the return package with a new expected ship date and delivery date based on the customer's feedback.

If the merchant discovers that the customer has shipped the package, the merchant can begin a trace of the package.

Late_delay: Number of days beyond the expected delivery date before a Package is flagged as late. If the carrier is USPS the value is 2 days. If the carrier is UPS the value is 1 day.

The merchant's customer service will use the Late Arrivals Report to identify potential problem return packages. If the merchant discovers that the customer has not shipped the package yet, the merchant can:

Void the return package indicating the customer will not ship.

Update the return package with a new expected ship date and delivery date based on the customer's feedback.

If the merchant discovers that the customer has shipped the package, the merchant can begin a trace of the package.

9. Inbound Manager

FIG. 77 is a high level interactivity diagram depicting exemplary interactivity between a Merchant and the iReturn Merchant Service Servers to request Tracking information in an exemplary embodiment of the invention. As depicted in FIG. 77, the Merchant's Returns Inbound Manager accesses the iReturn System 4000 through a computer 4008 configured with a display device 4009 and a printer device 13. The Merchant's Returns Inbound Manager computer 4008 is connected to the Merchant's system 4001, which is connected to the iReturn System 4000 through the Internet 4003.

The Merchant's Returns Inbound Manager (alternatively, the "Returns Manager") logs in 4431 to the internal network 4001c of the Merchant's system 4001. The internal network of the Merchant's System 4001c displays to the Returns Manager's computer 4008, the Merchant's Internal Tools Screen 4432. From the Merchant's Internal Tools Screen, the Returns Manager selects the iReturn Manager Application 4433. The Merchant's internal network 4001c links to the iReturn Manager Login Screen 4434. The iReturn System 4000 displays the iReturn Manager Login Screen 4435 to the Return Manager's computer 4008/4009. The Returns Manager logs in to the iReturns System 4436. In response to the login, the iReturns System displays default inbound return shipments 4437 according to the Return Manager's login privileges as stored on the Account Database.

From the default display, the Return Manager selects a subset of Inbound Shipments 4438. The iReturn System displays the page of data requested by the Return Manager's selection 4439. The Return Manager then selects detailed shipment tracking information 4440. The iReturn System returns detailed tracking information 4441 for the package(s) selected by the Return Manager.

A Warehouse manager, after going through a similar login procedure as described above, would, for example, select shipments inbound to a particular warehouse 4442. The iReturn System 4000 returns a display of Return shipments destined for the selected warehouse 4443. The Warehouse manager then checks one or more boxes, each box corresponding to a particular package, to acknowledge receipt of the package 4444.

10. Exporting Data from iReturns

Figure 78B:
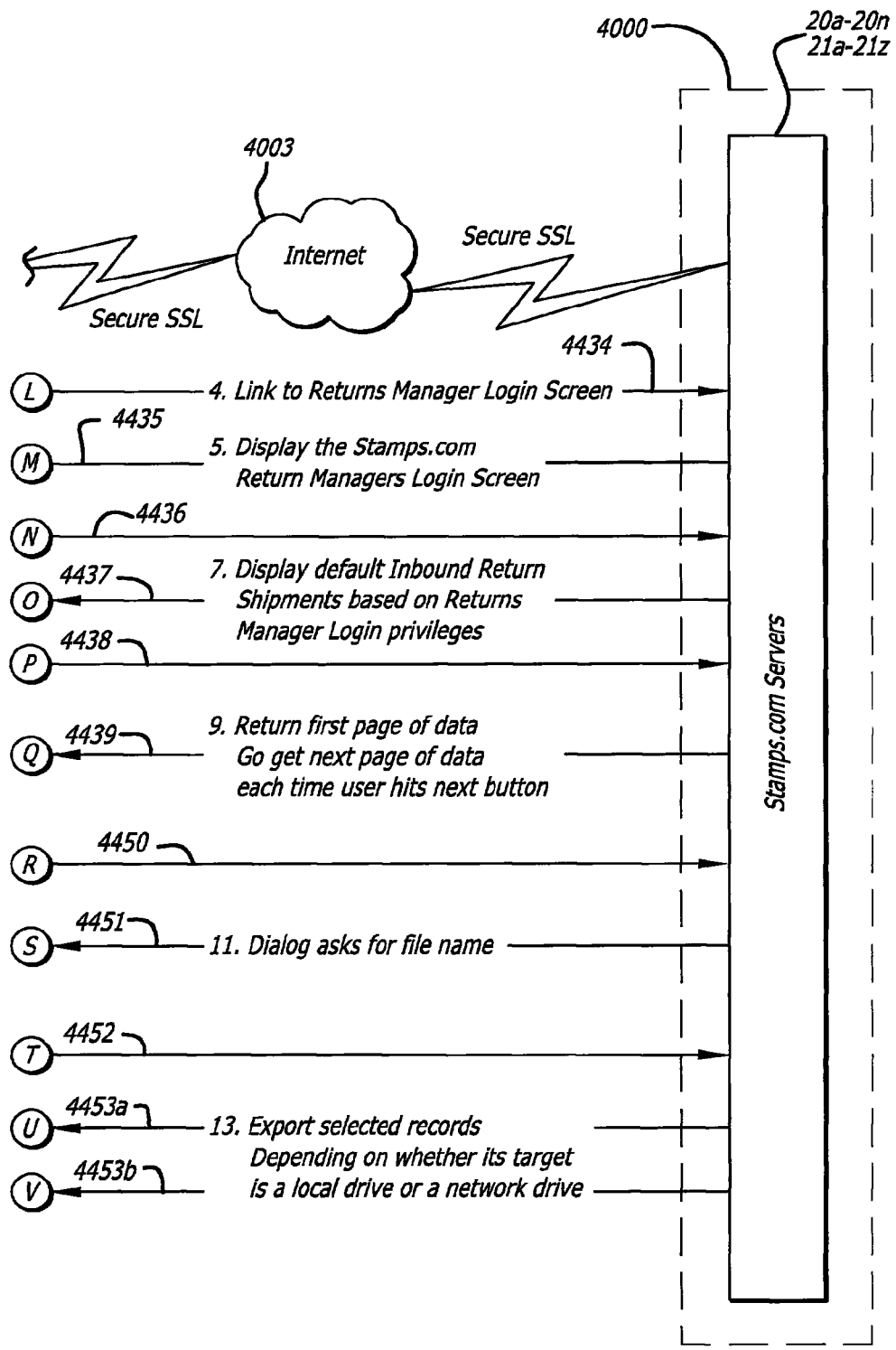
FIG. 78 is a high level interactivity diagram depicting exemplary interactivity between a Merchant and the iReturn Merchant Service Servers to export data from the iReturn Merchant Service System into the Merchant's System in an exemplary embodiment of the invention.

FIG. 78 is a high level interactivity diagram depicting exemplary interactivity between a Merchant and the iReturn Merchant Service Servers to export data from the iReturn Merchant Service System into the Merchant's System in an exemplary embodiment of the invention. As depicted in FIG. 77, the Merchant's Returns Inbound Manager accesses the iReturn System 4000 through a computer 4008 configured with a display device 4009 and a printer device 13. The Merchant's Returns Inbound Manager computer 4008 is connected to the Merchant's system 4001, which is connected to the iReturn System 4000 through the Internet 4003.

The Merchant's Returns Inbound Manager (alternatively, the "Returns Manager") logs in 4431 to the internal network 4001c of the Merchant's system 4001. The internal network of the Merchant's System 4001c displays to the Returns Manager's computer 4008, the Merchant's Internal Tools Screen 4432. From the Merchant's Internal Tools Screen, the Returns Manager selects the iReturn Manager Application 4433. The Merchant's internal network 4001c links to the iReturn Manager Login Screen 4434. The iReturn System 4000 displays the iReturn Manager Login Screen 4435 to the Return Manager's computer 4008/4009. The Returns Manager logs in to the iReturns System 4436. In response to the login, the iReturns System displays default inbound return shipments 4437 according to the Return Manager's login privileges as stored on the Account Database.

From the default display, the Return Manager selects a subset of Inbound Shipments 4438. The iReturn System displays the page of data requested by the Return Manager's selection 4439.

The Returns Manager selects the Export Data option 4450. The iReturn System 4000 requests the Returns Manager to identify a file name 4451 to which the data should be exported. The Returns Manager identifies a file name 4452, either local or network. The iReturn System only downloads Return records for the Returns Manager that correspond to the relevant Merchant's account. In the exemplary embodiment, data to be downloaded is formatted as a comma-delimited flat file. The iReturn System 4000 downloads data to a drive local 4453a to the Returns Manager's computer 4008 or to a network file 4453b on the Merchant's internal network 4001c, as directed by the Returns Manager. The Returns Manager can then utilize analysis tools within the Returns Manager's computer 4008 or within the Merchant's internal network 4001c to analyze the downloaded data 4454.

ILLUSTRATIVE EMBODIMENTS

Although this invention has been described in certain specific embodiments, many additional modifications and variations would be apparent to those skilled in the art. It is, therefore, to be understood that this invention may be practiced otherwise than as specifically described. Thus, the embodiments of the invention described herein should be considered in all respects as illustrative and not restrictive, the scope of the invention to be determined by the appended claims and their equivalents rather than the foregoing description.

What is claimed is:

1. An online merchandise return computer system comprising at least one computer device that is programmed to perform the following processes:
　respond to a consumer request for a return shipment of a previously-shipped item by displaying to a display device in communication with a remote computer, a question from a set of return questions;
　receive an answer input by the consumer from the remote computer in response to said question;
　select from a set of return question responses corresponding to the question a return question response that corresponds to the answer;
　execute each instruction in a set of instructions corresponding to the return question response that corresponds to the answer according to a return policy for an online merchant associated with the online merchandise return computer system, said set of return questions, said set of return question responses and said set of instructions comprising at least a portion of the return policy for the online merchant; and
　for a set of instructions comprising an instruction for facilitating return shipping of the previously-shipped item, generate a machine-readable return shipping label comprising machine-readable, carrier-specific shipping indicia for a selected carrier and delivery service to return-ship the previously-shipped item to the online merchant, said selected carrier and delivery service comprising a selection by the online merchant or by the consumer, said carrier-specific shipping indicia comprising information about the previously-shipped item obtained from saved information about the previously-shipped item, and facilitate printing at a printing device adapted for operation with the remote computer, the machine-readable return shipping label.

2. The online merchandise return computer system of claim 1, said set of instructions comprising instructions selected in accordance with the answer from a group comprising:
　facilitating paid return shipping of the previously-shipped item;
　facilitating return shipping of the previously-shipped item to be paid by the consumer;
　facilitating paid replacement shipping of a replacement item;
　issuing a refund for a return of the previously-shipped item;
　issuing a store credit for the return of the previously-shipped item; and
　asking additional return reason questions.

3. An online merchandise return computer system, comprising at least one computer device that is programmed to perform the following processes:
　process a merchandise return request by a consumer from a remote computer for return shipment of a previously-shipped item according to a set of instructions that correspond to a set of return question responses that correspond to each answer by the consumer to each return question asked by the online merchandise return computer system, each said return question, said set of return question responses and said set of instructions comprising at least a portion of a return policy for an online merchant associated with the online merchandise return computer system;
　for a previously-shipped item that is returnable according to the return policy for the online merchant associated with the online merchandise return computer system, facilitate payment for return shipping charges for a return shipment of the previously-shipped item, said payment comprising payment by the online merchant or by the consumer, according to said return policy; and
　generate a machine-readable return shipping label comprising machine-readable, carrier-specific shipping indicia for a selected carrier and delivery service to return-ship the previously-shipped item to the online merchant, said selected carrier and delivery service comprising a selection by the online merchant or by the consumer, said carrier-specific shipping indicia comprising information about the previously-shipped item obtained from saved information about the previously-shipped item, and facilitate printing at a printing device adapted for operation with the remote computer, the machine-readable return shipping label.

4. The online merchandise return computer system of claim 3, said at least one computer device further programmed to perform the following processes:
　recognize merchandise to be returned by the consumer according to product categories and product subcategories; and
　apply return policy rules according to said product categories and product subcategories.

5. The online merchandise return computer system of claim 4, said at least one computer device further programmed to perform the following processes:
execute exception instructions for merchandise comprising an exception product category.

6. The online merchandise return computer system of claim 3, said at least one computer device further programmed to perform the following processes:
for an approved return request, facilitate printing of a return shipping label on a printer in communication with the remote computer.

7. The online merchandise return computer system of claim 3, wherein said selected carrier and delivery service comprise a selection by the online merchant or by the consumer, according to said return policy.

8. A method using a computer system for online merchandise return shipping, said computer system comprising at least one computer device, said method comprising:
displaying to a display device in communication with a remote computer, a set of return questions;
receiving from the remote computer a set of answers input by a consumer in response to the set of return questions regarding a return request by the consumer for a return shipment of a previously-shipped item;
selecting, by said at least one computer device, from a set of return question responses corresponding to the set of return questions, a first set of return question responses that corresponds to the set of answers;
executing, by said at least one computer device, each instruction in a set of instructions corresponding to each return question response of the first set of return question responses that correspond to the answers, said set of return questions, said set of return question responses and said set of instructions comprising at least a portion of a return policy for an online merchant associated with the online merchandise return computer system; and
for a set of instructions for which return shipping of the previously-shipped item is indicated as approved by the online merchant, facilitating return shipment of the previously-shipped item to the online merchant comprising
generating, by said at least one computer device, a machine-readable return shipping label comprising machine-readable, carrier-specific shipping indicia for a selected carrier and delivery service to return-ship the previously-shipped item to the online merchant, said selected carrier and delivery service comprising a selection by the online merchant or by the consumer, said carrier-specific shipping indicia comprising information about the previously-shipped item obtained from saved information about the previously-shipped item, and facilitating printing at a printing device adapted for operation with the remote computer, the machine-readable return shipping label.

9. The method of claim 8, said method further comprising:
processing a merchandise return request by the consumer according to the set of instructions.

10. The method of claim 9, said method further comprising:
recognizing an item of merchandise to be returned as identified by the consumer according to product categories and product subcategories; and
applying return policy rules according to said product categories and product subcategories.

11. The method of claim 10, said method further comprising:
executing exception instructions for the item of merchandise, wherein the item of merchandise corresponds to an exception product category.

12. The method of claim 10, said method further comprising:
executing exception instructions for merchandise, wherein the item of merchandise corresponds to an exception product subcategory.

13. The method of claim 8, said method further comprising:
for an approved return request, printing a return shipping label on a print rendering device in communication with the remote computer.

14. The method of claim 8, said facilitating return shipment of the previously-shipped item to the online merchant comprising:
determining a set of carriers approved by the online merchant for return shipping of merchandise.

15. The method of claim 14, said facilitating return shipment of the previously-shipped item to the online merchant further comprising:
determining a shipping rate by each carrier of the set of carriers approved by the online merchant for return shipping of merchandise.

16. The method of claim 15, said facilitating return shipment of the previously-shipped item to the online merchant further comprising:
displaying to the display device in communication with the remote computer, the shipping rate by each carrier of the set of carriers approved by the online merchant for return shipping of merchandise.

17. The method of claim 16, said facilitating return shipment of the previously-shipped item to the online merchant further comprising:
receiving a selection by the consumer of a particular shipping rate by a particular carrier of the set of carriers approved by the online merchant for return shipping of merchandise.

18. The method of claim 17, said facilitating return shipment of the previously-shipped item to the online merchant further comprising:
printing at a printing device adapted for operation with the remote computer, a shipping label for the particular carrier of the set of carriers according to said selection by the consumer.

* * * * *